United States Patent [19]
Byers et al.

[11] Patent Number: 5,809,543
[45] Date of Patent: Sep. 15, 1998

[54] FAULT TOLERANT EXTENDED PROCESSING COMPLEX FOR REDUNDANT NONVOLATILE FILE CACHING

[75] Inventors: Larry L. Byers, Apple Valley; James F. Torgerson, Andover; Ferris T. Price, deceased, late of Mayer, all of Minn., by Robert Howe Price, executor

[73] Assignee: Unisys Corporation, Blue Bell, Pa.

[21] Appl. No.: 745,111

[22] Filed: Nov. 7, 1996

Related U.S. Application Data

[63] Continuation of Ser. No. 173,459, Dec. 23, 1993, abandoned.
[51] Int. Cl.⁶ .............................. G06F 12/16; G06F 12/08
[52] U.S. Cl. .......................... 711/162; 711/120; 711/167; 395/182.04; 395/182.12
[58] Field of Search ...................... 395/440, 446, 395/447, 456–458, 488, 200.08, 182.04, 182.12, 182.01, 182.03, 180, 876; 711/162, 159, 161, 119, 120, 167, 170, 171, 172, 173, 133

[56] References Cited

U.S. PATENT DOCUMENTS

| | | | |
|---|---|---|---|
| 4,445,174 | 4/1984 | Fletcher | 711/121 |
| 4,794,521 | 12/1988 | Ziegler | 711/130 |
| 5,130,922 | 7/1992 | Liu | 711/144 |
| 5,193,162 | 3/1993 | Bordsen et al. | 711/152 |
| 5,193,166 | 3/1993 | Menasce | 711/120 |
| 5,261,053 | 11/1993 | Valencia | 711/133 |
| 5,313,609 | 5/1994 | Baylor et al. | 711/121 |
| 5,408,651 | 4/1995 | Flocken et al. | 395/182.17 |
| 5,437,022 | 7/1995 | Beardsley et al. | 395/182.04 |

OTHER PUBLICATIONS

Improved cost, performance, and reliability by simultaneous accesses to pipelined caches with duplicate data protection and enhanced multiprocessor performance, IBM Tehnical Disclosure Bulletin, vol. 33, No. 1A, pp. 264–265, Jun. 1990.

Renade, Software for mass storage systems, Optical Information Systems, vol. 10, No. 5, p. 256 (14), Sep. 1990.

*Primary Examiner*—Matthew M. Kim
*Attorney, Agent, or Firm*—Charles A. Johnson; Mark T. Starr

[57] ABSTRACT

An outboard file cache extended processing complex for use with a host data processing system for providing closely coupled file caching capability is described. Data movers at the host provide the hardware interface to the outboard file cache, provide the formatting of file data and commands, and control the reading and writing of data from the extended processing complex. Host interface adapters receive file access commands sent from the data movers and provide cache access control. Directly coupled fiber optic links couple each of the data movers to the associated one of the host interface adapters and from the nonvolatile memory. A nonvolatile memory to store redundant copies of the cached file data is described. A system interface including bidirectional bus structures and index processors that control the routing of data signals, provides control of storage and retrieval of file cache data derived from host interface adapters and from the nonvolatile memory. Multiple power domains are described together with independent clock distribution within each power domain. The independent clock distribution sources are synchronized with each other. A system for fault tolerant redundant storage of file cache data redundantly in at least two portions of the nonvolatile file cache storage is described.

45 Claims, 52 Drawing Sheets

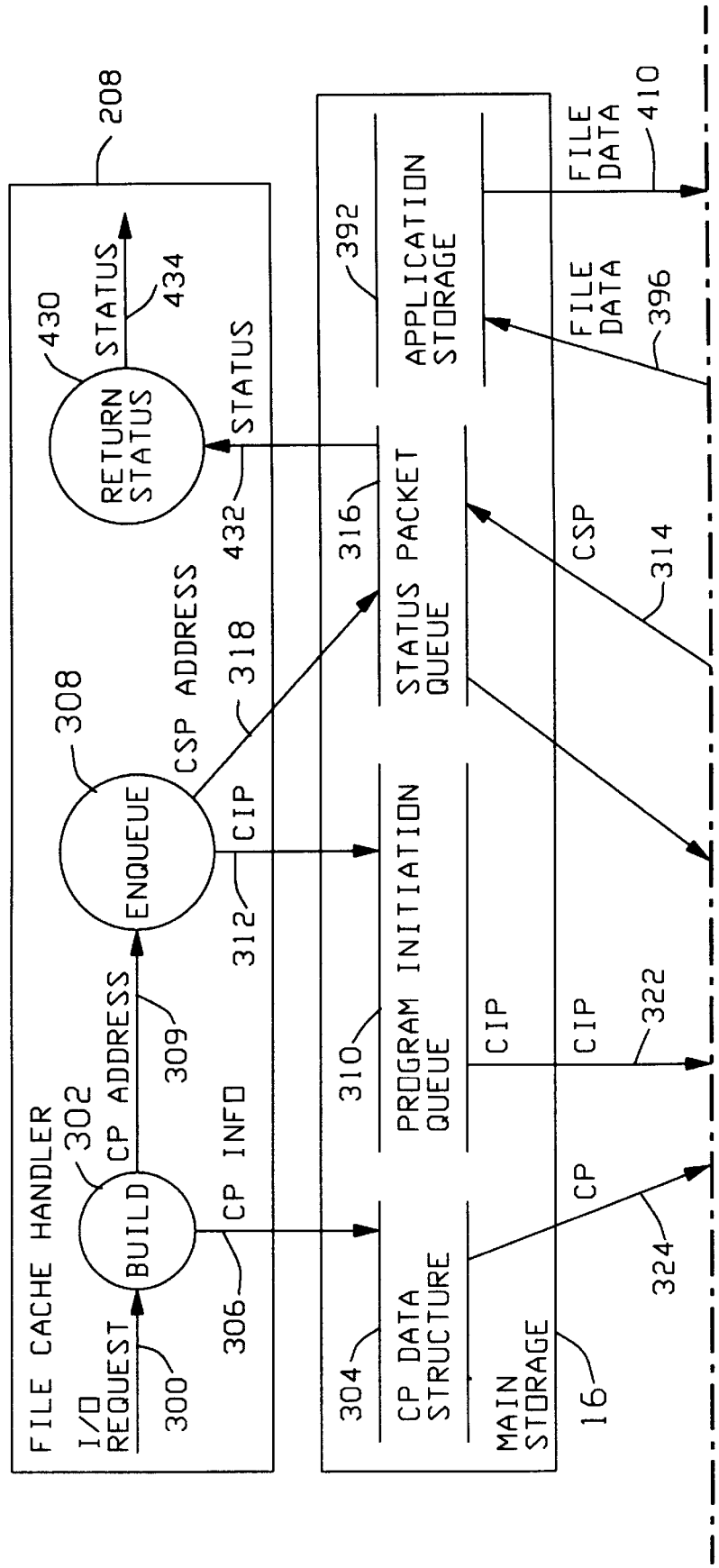

(SEGDESCR)

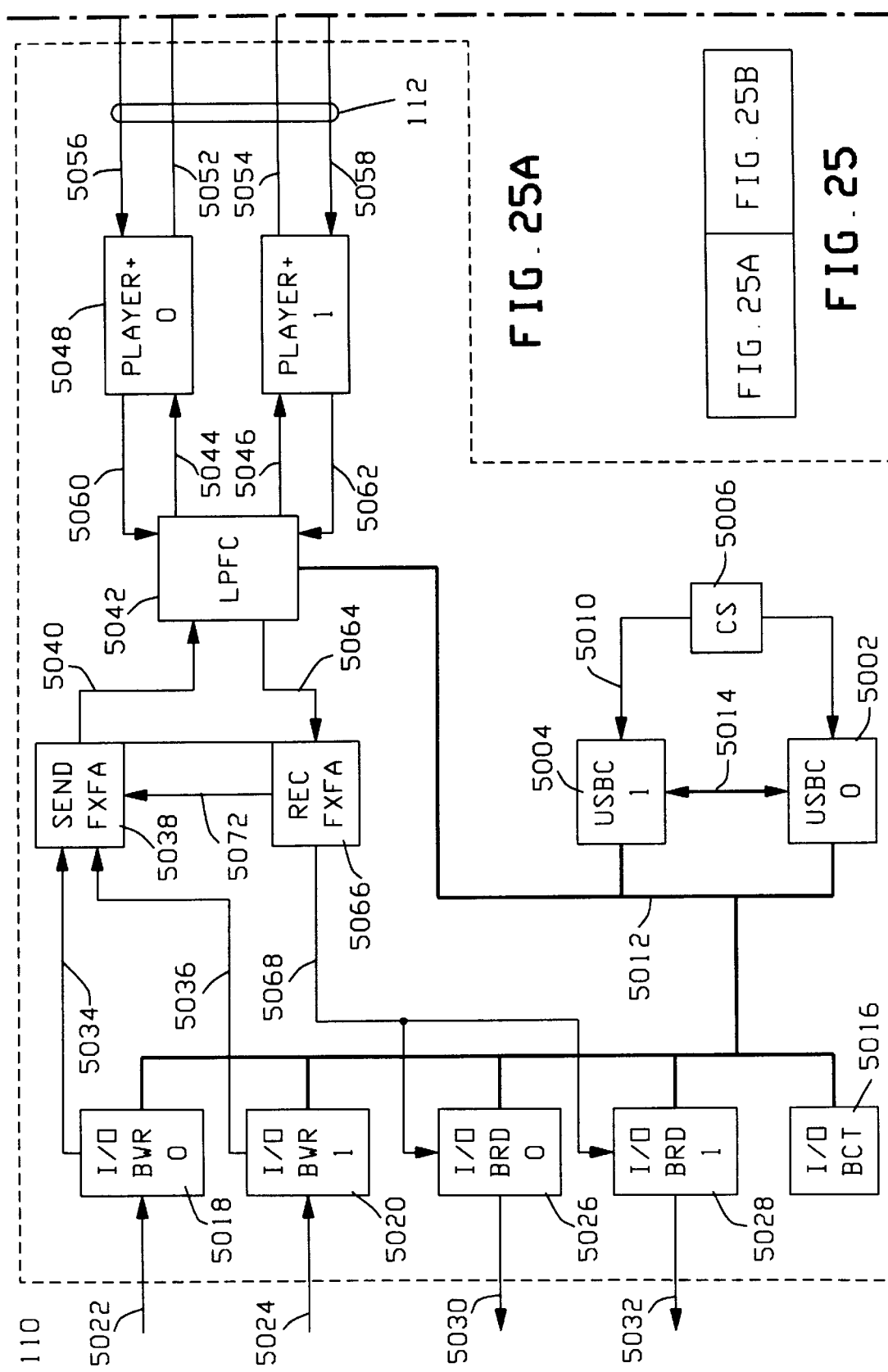

| SYMBOL | 4B CODE | 5B CODE | SYMBOL | 4B CODE | 5B CODE |
|---|---|---|---|---|---|
| 0 | 0000 | 11110 | C | 1100 | 11010 |
| 1 | 0001 | 01001 | D | 1101 | 11011 |
| 2 | 0010 | 10100 | E | 1110 | 11100 |
| 3 | 0011 | 10101 | F | 1111 | 11101 |
| 4 | 0100 | 01010 | N | 0000 | 11110 OR |
| 5 | 0101 | 01011 |   |   | 11111 |
| 6 | 0110 | 01110 | JK 2234 | 1101 | 11000 AND |
| 7 | 0111 | 01111 |   |   | 10001 |
| 8 | 1000 | 10010 | T 2236 | 0100 OR 0101 |   |
| 9 | 1001 | 10011 |   |   | 01101 |
| A | 1010 | 10110 | UNUSED | 0110 | 00111 |
| B | 1011 | 10111 | UNUSED | 0111 | 11001 |

FIG. 40

| SYMBOL | 5B CODE | 4B CODE | SYMBOL | 4B CODE | 5B CODE |
|---|---|---|---|---|---|
| 0 | 11110 | 0000 | C | 11010 | 1100 |
| 1 | 01001 | 0001 | D | 11011 | 1101 |
| 2 | 10100 | 0010 | E | 11100 | 1110 |
| 3 | 10101 | 0011 | F | 11101 | 1111 |
| 4 | 01010 | 0100 | I | 11111 | 1010 |
| 5 | 01011 | 0101 | H | 00100 | 0001 |
| 6 | 01110 | 0110 | JK 2234 | 11000 AND 10001 | 1101 |
| 7 | 01111 | 0111 |   |   |   |
| 8 | 10010 | 1000 | T | 01101 | 0101 |
| 9 | 10011 | 1001 | UNUSED | 00111 | 0110 |
| A | 10110 | 1010 | UNUSED | 11001 | 0111 |
| B | 10111 | 1011 | Q 2246 | 00000 | 0010 |

FIG. 41

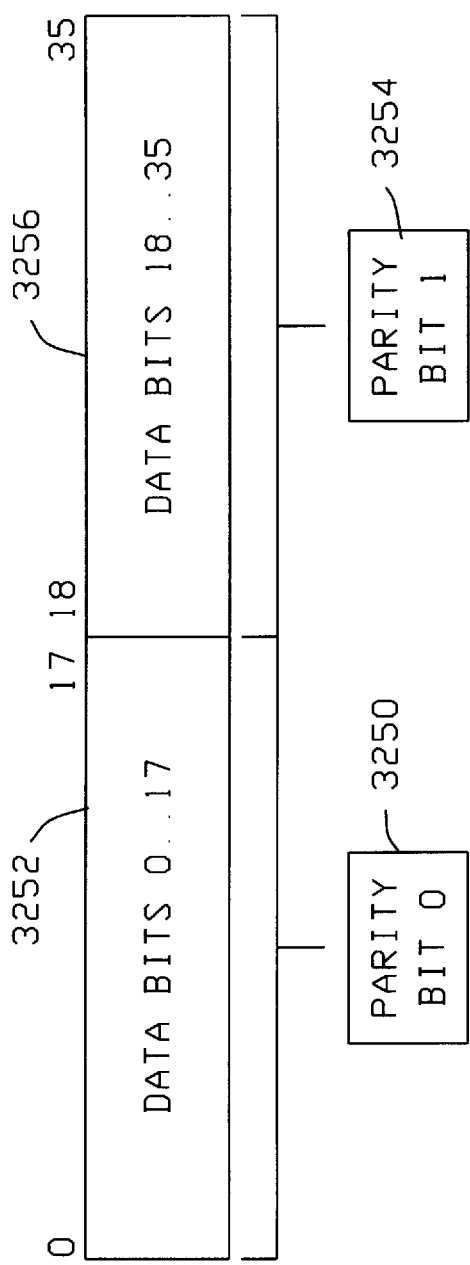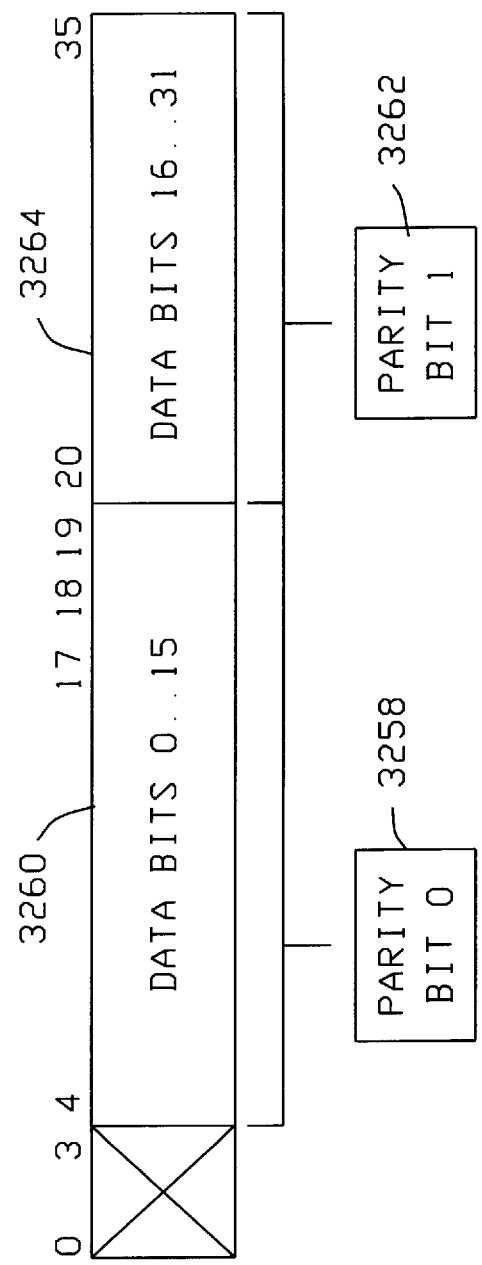

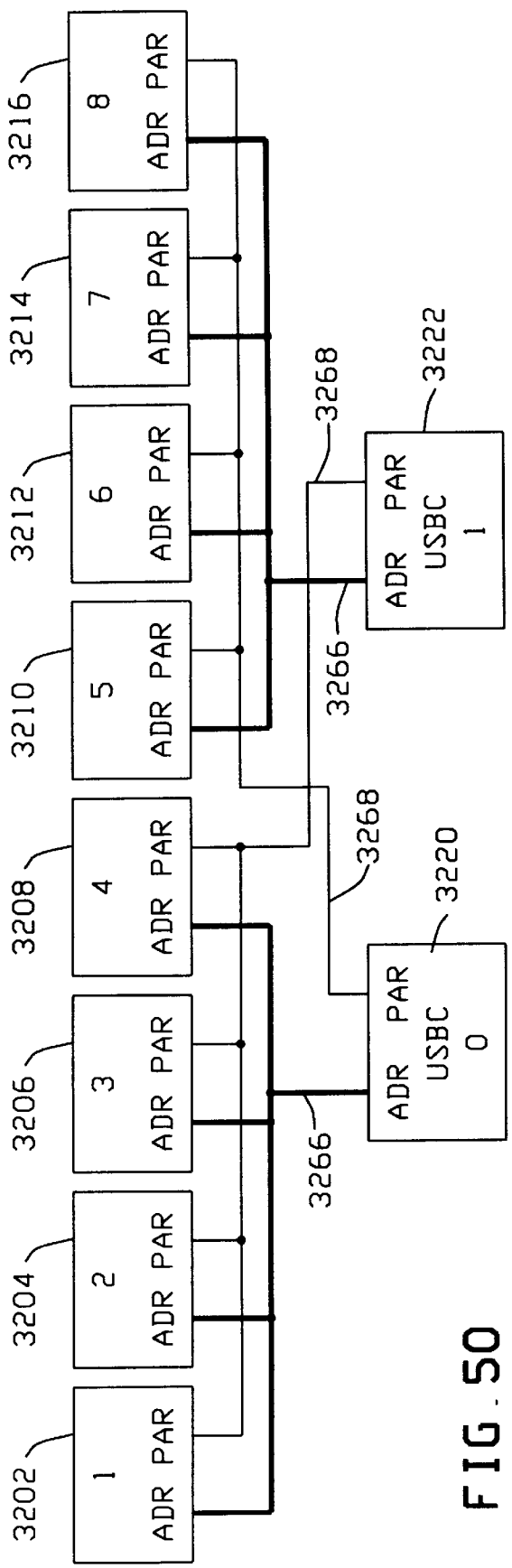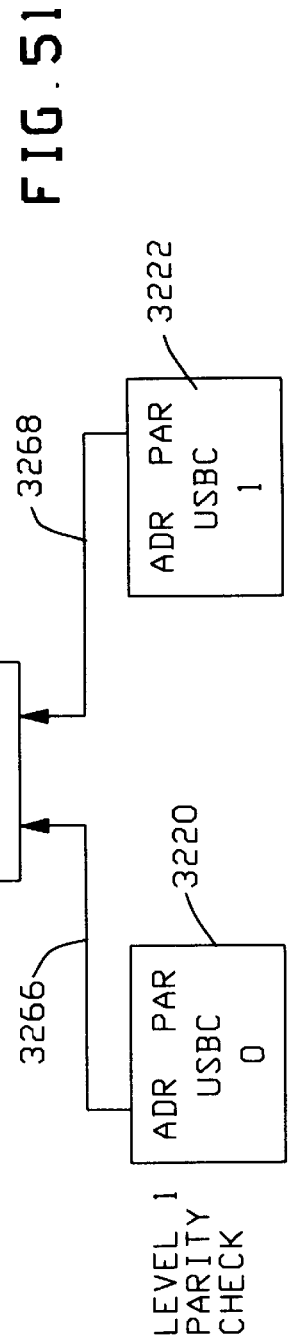
FIG. 50
FIG. 51

OUTPUT PRIORITY

| | | UP STREET | DOWN STREET | IXP | HIA | INTERNAL |
|---|---|---|---|---|---|---|
| HUB 0 | 1 | UP | CWN | UP | UP | UP |
| | 2 | IXP | IXP | CWN | CWN | CWN |
| | 3 | HIA | HIA | HIA | IXP | IXP |
| | 4 | INT | INT | INT | INT | HIA |
| HUB 1 | 1 | UP | CWN | UP | UP | UP |
| | 2 | NVS | NVS | CWN | CWN | CWN |
| | 3 | INT | INT | INT | NVS | NVS |
| | 4 | XOVR | XOVR | XOVR | XOVR | INT |

FIG. 60

| 0 | 1 | 2 | 3 | 4 | 7 | 8 | 11 | 12 | 15 |
|---|---|---|---|---|---|---|---|---|---|
| S | R | CO | C1 | NOT USED | | UID | | BPID | |

S=STREET FLAG
R=RELEASE FLAG
C=CROSSOVER FLAGS
UID=UNIT IDENTIFICATION
  8,9=UNIT TYPE
  10,11=UNIT SET OR SIF LOCATION
BPID=BACKPANEL IDENTIFICATION

FIG. 61

UID VALUES

| UID | UNIT |
|---|---|
| 0 | HIA 0 |
| 1 | HIA 1 |
| 2 | HIA 2 |
| 3 | HIA 3 |
| 4 | IXP/RLP/SSF 0 |
| 5 | IXP/RLP/SSF 1 |
| 6 | IXP/RLP/SSF 2 |
| 7 | IXP/RLP/SSF 3 |
| 8 | NOT USED |
| 9 | NOT USED |
| 10 | NOT USED |
| 11 | NOT USED |
| 12 | NVS NORMA |
| 13 | NVS DIAGNOSTIC |
| 14 | NVS A |
| 15 | NVS B |

5,809,543

FAULT TOLERANT EXTENDED PROCESSING COMPLEX FOR REDUNDANT NONVOLATILE FILE CACHING

CROSS REFERENCE TO RELATED PATENT APPLICATIONS

This application is a continuation of application Ser. No. 08/173,459 filed on Dec. 23, 1993 and which is now abandoned. This application is related to the concurrently filed applications listed below, the disclosures of which are incorporated herein by reference. The identified applications are commonly assigned to Unisys Corporation, the assignee of the present invention:

OUTBOARD FILE CACHE SYSTEM, Ser. No. 08/174,750 filed on Dec. 23,1993, invented by Thomas P. Cooper and Robert E. Swenson;

DEDICATED POINT TO POINT FIBER OPTIC INTERFACE, Ser. No. 08/172,652, filed on Dec. 23, 1993, invented by Larry L. Byers, Donald Davies, Joseba M. Desubijana, Michael E. Mayer, Randall L. Piper, and Lloyd Thorsbakken, and which issued as U.S. Pat. No. 5,524,218 on Jun. 04, 1996;

XPC HUB AND STREET ARCHITECTURE, Ser. No. 08/173,429, filed on Dec. 23, 1993, invented by Donald W. Mackenthun, Larry L. Byers, Gregory B. Wiedenman and Ferris T. Price (Deceased), and which issued as U.S. Pat. No. 5,495,589 on Feb. 27, 1996;

ROUTING PRIORITIES WITHIN A HUB AND STREET ARCHITECTURE, Ser. No. 08/172,647, filed on Dec. 23, 1993, invented by Donald W. Mackenthun, and which issued as U.S. Pat. No. 5,450,578 on Sept. 12, 1995;

MICRO SEQUENCER BUS CONTROLLER SYSTEM, Ser. No. 08/172,657, filed on Dec. 23, 1993, invented by Larry L. Byers, Joseba M. Desubijana, and Wayne Michaelson, and which issued as U.S. Pat. No. 5,535,405 on Jul. 09, 1996;

FAULT TOLERANT CLOCK DISTRIBUTION SYSTEM, Ser. No. 08/172,661, filed on Dec. 23, 1993, invented by Larry L. Byers, Thomas T. Kubista, and Gregory B. Wiedenman, and which issued as U.S. Pat. No. 5,422,915 on Jun. 06, 1995;

FOUR PORT RAM CELL, Ser. No. 08/173,379, filed Dec. 23, 1993, invented by Larry L. Byers, Duane Kurth, and Ashgar Malikt, and which issued as U.S. Pat. No. 5,434,818 on Jul. 18, 1995; and DATA COHERENCY PROTOCOL FOR MULTI-LEVEL CACHE HIGH PERFORMANCE MULTI-PROCESSOR SYSTEM, Ser. No. 08/235,196, filed Apr. 29, 1994, invented by Kenichi Tsuchiya, Thomas Adelmeyer, Glen Kregness, Gary Lucas, Heidi Guck and Ferris Price, and which is a continuation of Ser. No. 07/762,276, filed Sept. 19, 1991, for which a File Wrapper Continuance Application was filed on Apr. 29, 1994 and which is now abandoned.

This application is a continuation Ser. No. 08/173,459 filed on Dec. 23, 1993.

BACKGROUND OF THE INVENTION

A. Field of the Invention

This invention relates to a data processing system having file caching capabilities, and more particularly to an Extended Processing Complex coupled to a host processor system for managing file caching. Still more particularly, this invention relates to an Extended Processing Complex that is outboard of a related host processing system, but is closely coupled thereto, the Extended Processing Complex including redundant characteristics that render it highly reliable.

B. General Background

The performance of data processing systems has improved dramatically through the years. While new technology has brought performance improvements to all functional areas of data processing systems, the advances in some areas have outpaced the advances in other areas. For example, advancements in the rate at which computer instructions can be executed have far exceeded improvements in the rate at which data can be retrieved from storage devices and supplied to the instruction processor. Thus, applications that are input/output intensive, such as transaction processing systems, have been constrained in their performance enhancements by data retrieval and storage performance.

The relationship between the throughput rate of a data processing system, input/output (I/O) intensity, and data storage technology is discussed in "Storage hierarchies" by E. I. Cohen, et al., IBM Systems Journal, 28 No. 1 (1989). The concept of the storage hierarchy, as discussed in the article, is used here in the discussion of the prior art. In general terms, the storage hierarchy consists of data storage components within a data processing system, ranging from the cache of the central processing unit at the highest level of the hierarchy, to direct access storage devices at the lowest level of the hierarchy. I/O operations are required for access to data stored at the lowest level of the storage hierarchy.

To help alleviate input/output limitations on throughput, some early systems developed high-speed storage systems internal to the processor system, where groupings of words encompassing addressed words were stored or "cached" for reference by the processor without having to resort to an I/O processor for each reference. While this caching concept improved throughput, it did so at the expense of processor overhead necessary implement the caching function.

Varied attempts have been made to relieve the I/O bottleneck which constrains the performance of I/O intensive applications, while attempting to reduce the overhead impact on the associated instruction processor. Three ways in which the I/O bottleneck has been addressed include solid state disks, cache disks, and file caches.

Solid state disks (SSDs) were developed to address the relatively slow electromechanical speeds at which data stored on magnetic disks or other mass storage devices is read or written. SSDs are implemented using dynamic random access memory (DRAM) technology. The logical organization of the DRAM corresponds to the particular magnetic disk which the SSD is emulating. This allows software applications to access files stored on the SSD in the same manner they would access files stored on a magnetic disk. Files are understood to be records of associated and related data records.

The major advantage SSDs have over magnetic disks is that data can be read or written at electronic speeds rather than the electromechanical speeds of magnetic disks. An application's throughput may be significantly improved if the application makes a substantial number of disk requests to an SSD rather than a magnetic disk.

At least three problems persist with SSDs. First, the data path length for making requests to the SSD remains the same as for magnetic disks; second, the overhead involved in addressing the proper location in SSD storage is still allotted to the instruction processor or central processing unit; and third, a fault tolerant SSD configuration requires two write operations for data security. All three problems result in added processing time and reduced system throughput.

The first disadvantage associated with SSDs remains because a SSD resides at the same level of the data storage hierarchy as a magnetic disk or other addressable mass storage devices. To access a given file at a particular location within the file, which can be considered to be the "offset" from a point of reference, the file and offset must be located in the storage hierarchy: the SSD on which the file is stored must be identified; the disk controller which provides access to the SSD must be identified; the input/output channel to which the disk controller is coupled must be identified; and the input/output processor to which controls the input/output channel must be identified. All this processing is performed by the instruction processor. While the instruction processor is performing these tasks, others must wait, and the result is a reduction in the overall data processing throughput rate. Furthermore, the application software seeking access to the file data must wait for the input/output request to travel to the I/O processor, through the I/O channel, through the disk controller, to the desired disk, and back up the data path to the application software be executed by the instruction processor.

The second disadvantage for SSDs is that the instruction processor is required to map a relative file address to a physical disk address and manage allocation of SSD space. While the instruction processor is mapping file requests and managing disk space it cannot perform other tasks and the data processing system throughput rate suffers.

The third disadvantage associated with SSDs remains because two SSDs are required if fault tolerant capabilities are required. Fault tolerance with SSDs involves coupling two SSDs to a data processing system through two different data paths. A backup SSD mirrors the data on the primary SSD and is available in the event of failure of the primary SSD. To keep the backup SSD synchronized with the primary SSD, the instruction processor must perform two write operations when updating a file: the first write operation updates the primary SSD, and the second write operation updates the backup SSD. This method adds additional overhead to the data processing system to the detriment of the system throughput rate.

The Extended Processing Complex of this invention is outboard of the instruction processor and is closely coupled thereto, whereby the disadvantages of system overhead and operation attendant to SSD systems are overcome.

A cache disk subsystem is an invention which was made to address the I/O bottleneck attendant to caching of data stored on disks. U.S. Pat. No. 4,394,733, issued to Robert Swenson and assigned commonly to the assignee of this invention, discloses a cache disk subsystem. The cache disk subsystem utilizes DRAM storage for buffering selectable groupings of data words to be written to or read from magnetic disks, and resides at the disk controller level of the data storage hierarchy so that groupings of a data words associated with a plurality of magnetic disks can be cached.

The chief advantage of the cache disk subsystem is that I/O requests addressing a portion of a disk which is cached can be processed at electronic speeds rather than the electromechanical speed of a disk. While this advantage is substantial, the cache disk subsystem's position in the data storage hierarchy constricts the flow of I/O requests. The I/O performance gained by cache disk subsystems is limited by the data path length and numerous files competing for limited cache storage space. Because the caching of disk storage takes place at the disk controller level of the data storage hierarchy, the operating system must determine the appropriate data path in the same manner as described with the SSD. As described above, a lengthy data path reduces overall system throughput.

Where a large number of files compete for cache disk subsystem cache space, the I/O performance gains may be severely limited due to excess overhead processing. If two or more files have a high I/O request rate and they are stored on the same or different disks under a common disk controller, a substantial amount of the processing performed by the cache disk subsystem may be overhead. The overhead is incurred when most or all of cache storage is in use, and the cache disk subsystem is experiencing a high miss rate. A miss is defined as an I/O request which references a portion of disk which is not currently in cache storage. When a miss occurs, the cache disk subsystem must select a segment of cache storage to allocate to the latest I/O request (the selected segment may currently hold a different portion of different disk), and read the referenced portion of disk and store it in the cache segment. If this processing is required for a large proportion of I/O requests, the benefit of caching disk storage is lost to overhead processing.

One way in which the aforementioned problem is addressed is by separating files with a high access rate by storing them on separate disks under different storage controllers. This solution is expensive in two respects. First, human resources are required to physically separate the files and ensure that the operating system has the correct configuration information. Continual monitoring is required to detect when the location of files is hampering the I/O rate, and then redistributing files as necessary. Second, hardware costs are substantial because additional disks, disk controllers, and cache disk subsystems are required to physically separate the files.

A third strategy for relieving the I/O bottleneck is file caching. File caching differs from cache disk subsystems in that file data is buffered in main DRAM storage of a data processing system, and file management software manages allocation of main storage for file buffers. In "Scale and Performance in a Distributed File System" by John Howard, et al., ACM Transactions on Computer Systems, 6, No. 1, (1988), 51–81; "Caching in the Sprite Network File System", by Michael Nelson, et al., ACM Transactions on Computer Systems, 6, No. 1, (1988), 134–154; and U.S. Pat. No. 5,163,131, entitled, "Parallel I/O Network File Server Architecture", to Edward Row, et al., three different approaches to file caching are discussed.

The file caching described in "Scale and Performance in a Distributed File System" involves files which are distributed across a network of workstations. Each workstation contains server software for providing access to each of the files it manages. File cache software on the workstation seeking access to a selected file locates the server which controls access to the file and requests the file data from the server software. The file cache software stores the file data it receives on the local disk storage of the client workstation. In contrast, the file cache system described in "Caching in the Sprite Network File System" caches file data to the main memory of the client workstation. The disadvantages with each approach are readily apparent.

With the approach of Howard et al. to file caching, the "cached" file data is stored on a disk controlled by the client workstation. This means that the rate at which file data can be accessed is still dependent upon the access rate of the local disk. Furthermore, any updates to the locally cached file must be written to the server's version of the file before other clients are allowed to access the file.

While the Howard et al. approach provides access to file data at main memory access speed, it is still burdened with the overhead of keeping the server's version of the file consistent with the client's cached version. In addition, file data loss is also possible if main memory on the client workstation fails. In particular, if the cached file is updated and the client workstation fails before the update is forwarded to the server, the file update may be lost. Therefore, to provide file data integrity for a file update occurring on the client workstation, before the operation is allowed to complete, the file update must be transmitted to the server workstation and stored on its disk.

U.S. Pat. No. 5,163,131 also discusses a file cache architecture applicable to a networked workstation environment. In this patent, the file data is cached in the main memory of the server workstation. For other workstations on the network to access the file data cached on the server, network communication must be initiated for the transfer of file data. Thus, the benefits of file caching are limited by the amount of traffic on the network and the network bandwidth.

The current state of file caching schemes involves the tradeoff between the security of storing file data on disk and an increased access rate by storing the file data stored in main memory. Alternatively, the file data can be stored in electronic memories which are closer to the disk in the storage hierarchy, but the access rate is constrained by the length of the data path from an application to the electronic memory. Therefore, it would be desirable for a file cache to provide a high I/O rate while and still maintain data security which is comparable to disk storage.

The Extended Processing Complex of the present invention addresses the instruction processor overhead of prior art systems by providing most of the file caching control and manipulation external to the host processing system, but while being closely linked to the host processing system through a high speed dedicated communication media that is independent of the normal I/O system.

As pointed out above, the prior art caching systems for which high reliability is required, necessarily either requires redundant processing within the instruction processor, or redundant I/O arrangements. The Extended Processing Complex of this invention materially improves the reliability of the file caching system by utilizing nonvolatile storage devices for the cache memory and by providing redundant power and clocking capabilities, together with redundant cache management circuitry, to provide the cache management in parallel such that failure of any individual element within the Extended Processing Complex will not defeat this operation and accurate data files will be maintained.

II. OBJECTS

It is an object of the invention to increase the rate at which access to file data is provided when the file data is not present in the main memory of a host processing system.

Another object is to cache file data in storage which is non-volatile relative to a host processing system.

Yet another object of the invention is to provide an Extended Processing Complex for managing caching of data files as directed by an associated host processing system.

Still another object of the invention is to provide an Extended Processing Complex that is closely coupled through a host processing system through a dedicated high speed transmission system.

Still another object of the invention is to provide a fault and failure tolerant Extended Processing Complex that is outboard of an associated host processing system.

Still a further object of the invention is to provide an improved Extended Processing Complex where file cache management that utilizes a redundant nonvolatile storage for use in providing identical copies of each file caching operation.

A further object of the invention is to provide a fault and failure tolerant Extended Processing Complex or outboard file caching that utilizes separate power domains.

Still another object of the invention is to provide an improved Extended Processing Complex that utilizes multiple independent clocking sources that are synchronized and individually powered by independent power sources.

Still a further object of the invention is to provide an Extended Processing Complex that utilizes redundant processing and transmission paths for performing file cache manipulations in parallel for storage in associated portions of a redundant nonvolatile file cache memory system.

Another object of the invention is to provide an Extended Processing Complex that is coupled by a fiber optic link to an associated host processing system such that the transmission of commands and file data is closely coupled to the processing system.

A further object of the invention is to provide a HUB and street architecture within an Extended Processing Complex that can route file data to and from a redundant nonvolatile memory system under control of associated micro sequencers driven by commands received from one or more associated host processing systems.

Still another object of the invention is to minimize the processing required to write back or destage file data from the cache storage to storage device where the file data resides.

Yet another object is to cache file data from a plurality of host processing systems in shared cache storage.

A further object is to cache file data which is shared between a plurality of host processing systems.

III. SUMMARY OF THE INVENTION

According to the present invention, the foregoing and other objects and advantages are attained by coupling an outboard file cache to a host file data processing system. The host issues file access commands which include a logical file-identifier and a logical offset. The outboard file cache includes a file descriptor table and cache memory for electronic random access storage of the cached files. The file descriptor table stores the logical file-identifiers and offsets of the portions of the files in the cache storage. Cache detection logic is interfaced with the file descriptor table and receives file access commands from the host. The file descriptor table is used to determine whether the portion of the file referenced by the file access command is present in the cache memory. Cache access control is responsive to the cache detection logic, and if the portion of the file referenced in the cache access command is present in cache memory, the desired access is provided. The outboard file cache is non-volatile relative to the main memory of the host because it is a separately powered storage system. Neither the host nor the outboard file cache is required to map the file data referenced in a file access command to the physical storage device and the physical address of the backing store on which the file data is stored if the referenced data is present in cache storage.

The outboard file cache extended processing system is closely coupled to an associated host file data processing system. In this context "close coupling" implies a direct point-to-point transmission path extending from the input/output section of the host to the outboard file cache extended processing complex. It is not directly coupled in the sense that the host data processing system does not directly include the outboard file cache in the addressing architecture of its memory section, but rather requires that the file data signals to be cached be appropriately assembled in packets and addressed with reference to the file itself. Data mover circuitry provides the formatting and establishment of control commands both for transmitting file data signals to be cached and for reading file data signals that have been cached and retrieved. The data mover circuitry also provides the control to drive and receive signals across the associated data link.

A fiber optic data link is utilized to provide the data file signal and command signal transmission to and from the outboard file cache extended processing complex.

The outboard file cache extended processing complex of the present invention utilizes redundant nonvolatile file cache storage means for storing and retrieving duplicate cached file signals. A file cache storage interface means which is coupled to the redundant volatile file cache storage controls caching and retrieval operations of the duplicate cached file signals in accordance with control commands received from the host file data processing system. Index processor means are coupled to the file cache storage interface means and are operative to control transmission of file data signals and command signals via bidirectional HUB and street bus structures. A host interface adapter means includes control circuitry for establishing signals to be sent across the link to the data mover means and to translate signals received across the link from the data mover means to signal levels that can be utilized in the extended processing complex. The host interface adapter means provide the first level of selection and control for controlling caching and retrieval of file data signals stored in the outboard file cache. Index processor means are coupled to the file cache storage interface means and control transmission of file data signals and command signals to and from the redundant nonvolatile file cache storage means.

To provide redundancy and resiliency against error, the file data signals to be cached are stored in duplicate files in separate portions of the redundant nonvolatile file cache storage. All of the control and access circuitry is duplicated such that a complete set is applicable to each half of the redundant nonvolatile file cache storage. By providing the redundant copy of the cached file signals, a failure in any of the control or access circuitry will not result in system failure, but will accommodate recovery of the cached file data signals from the portion of the redundant nonvolatile file cache storage to which access has been maintain.

Another aspect of the extended processing complex system resiliency is established from the redundant nonvolatile file cache storage and the duplicated control circuitry being driven from two separate and independent power sources. If there is a power failure to one half of the system, the balance of the system will continue to function from the other independent power domain source.

With the use of the redundant nonvolatile file cache storage and the redundant control and access circuitry and power domains, it has been found advantageous to also provide redundant clock signal distribution systems with one of the clock distribution systems clocking one portion of the redundant nonvolatile file cache storage and its associated control circuitry and other of the clock distribution systems clocking the other portion of the redundant nonvolatile file cache storage and the control and access circuitry associated therewith. In order to have the redundant file caching proceed in parallel, the redundant clock distribution systems are synchronized one to the other so that the cache of file data signals always remains in step.

The invention also contemplates utilization of the outboard file cache extended processing complex by multiple host data processing systems. It is generally advantageous for each host to have at least two data mover circuits and two interconnecting links coupled to the outboard file cache extended processing complex such that failure of any data mover or any link will not cut off availability of the cached file data signals.

In an additional aspect of the invention a first and a second, host are coupled to the outboard file cache. The cache memory in the outboard file cache extended processing system is shared between the files of the first host and the files of the second host. The outboard file cache includes dual cache detection logic sections. Each of the cache detection logic sections may process file access commands from either the first host or the second host and each section operates concurrently with the other. The outboard file cache includes a first cache access control section and a second cache access control section. The first cache access control section is dedicated to providing access to the cache storage for the first host and the second cache access control section is dedicated to providing access to the cache storage for the second host.

Still other objects and advantages of the present invention will become readily apparent to those skilled in the art from the Drawings and the following Detailed Description of the Preferred Embodiment, wherein a preferred embodiment of the invention is shown, by way of illustration of the best mode contemplated for carrying out the invention. As will be realized, the invention is capable of other and different embodiments, and its several details are capable of modifications in various obvious respects, all without departing from the spirit and scope of the invention. Accordingly, the Drawings and Detailed Description of the Preferred Embodiment are to be regarded as illustrative in nature, and what is to be protected by Letters Patent is defined in the appended Claims.

The control of caching and retrieval of cached data signals external to the host data processing system results in substantially increased throughput of the total data processing system through the host being relieved of most of the control and processing necessary to establish, maintain, and utilize the cached file signals.

IV. BRIEF DESCRIPTION OF THE DRAWINGS

Figures 9, 11:
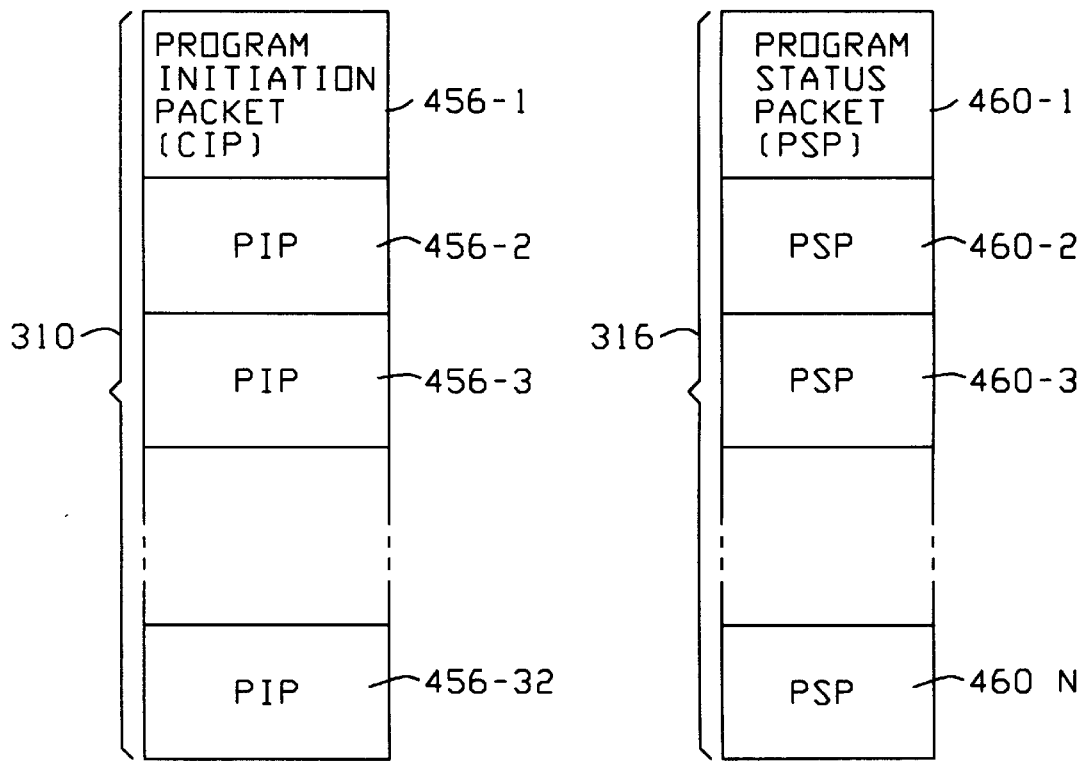
Figure 8:
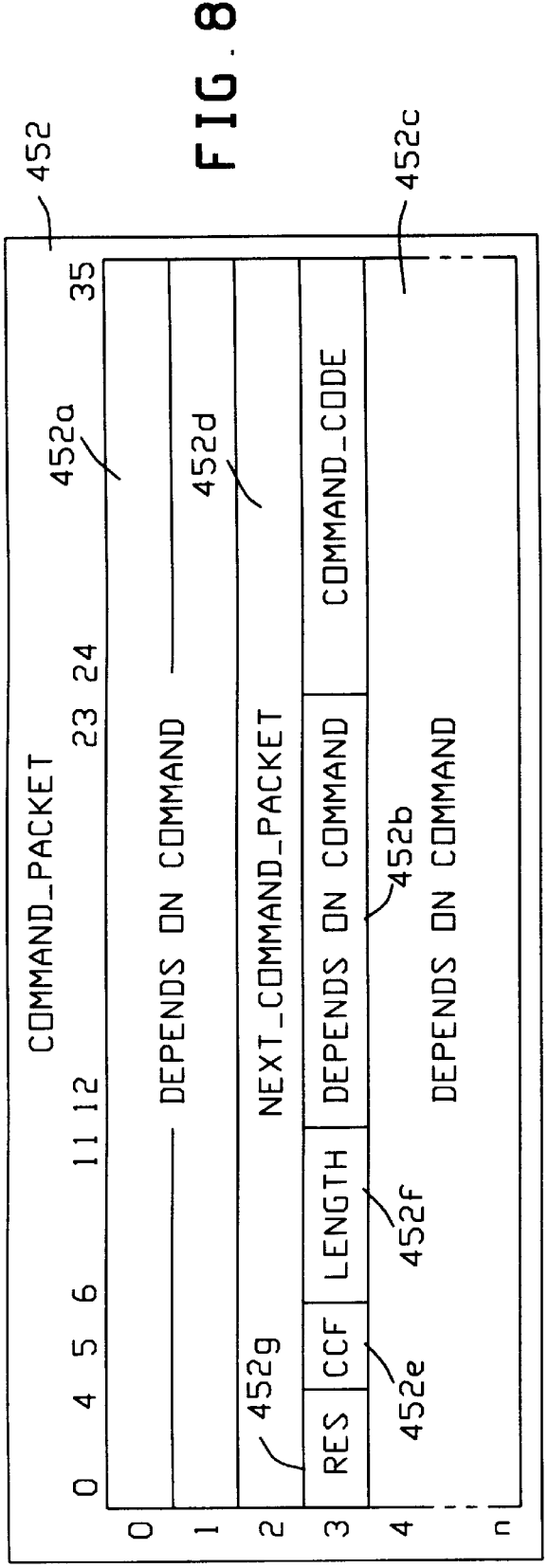
Figure 10:
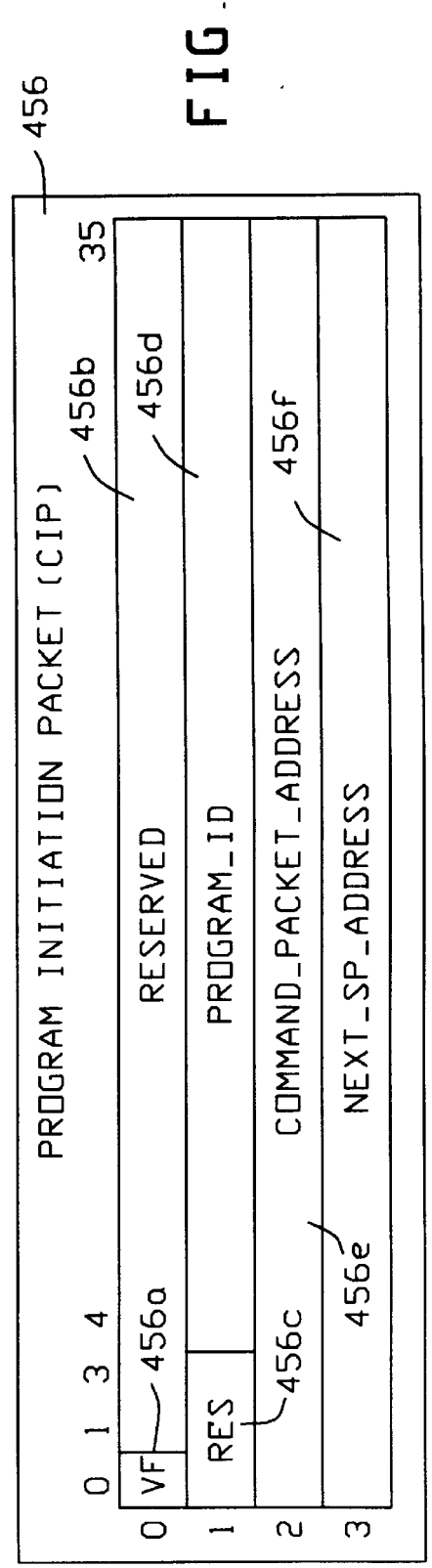
Figure 12:
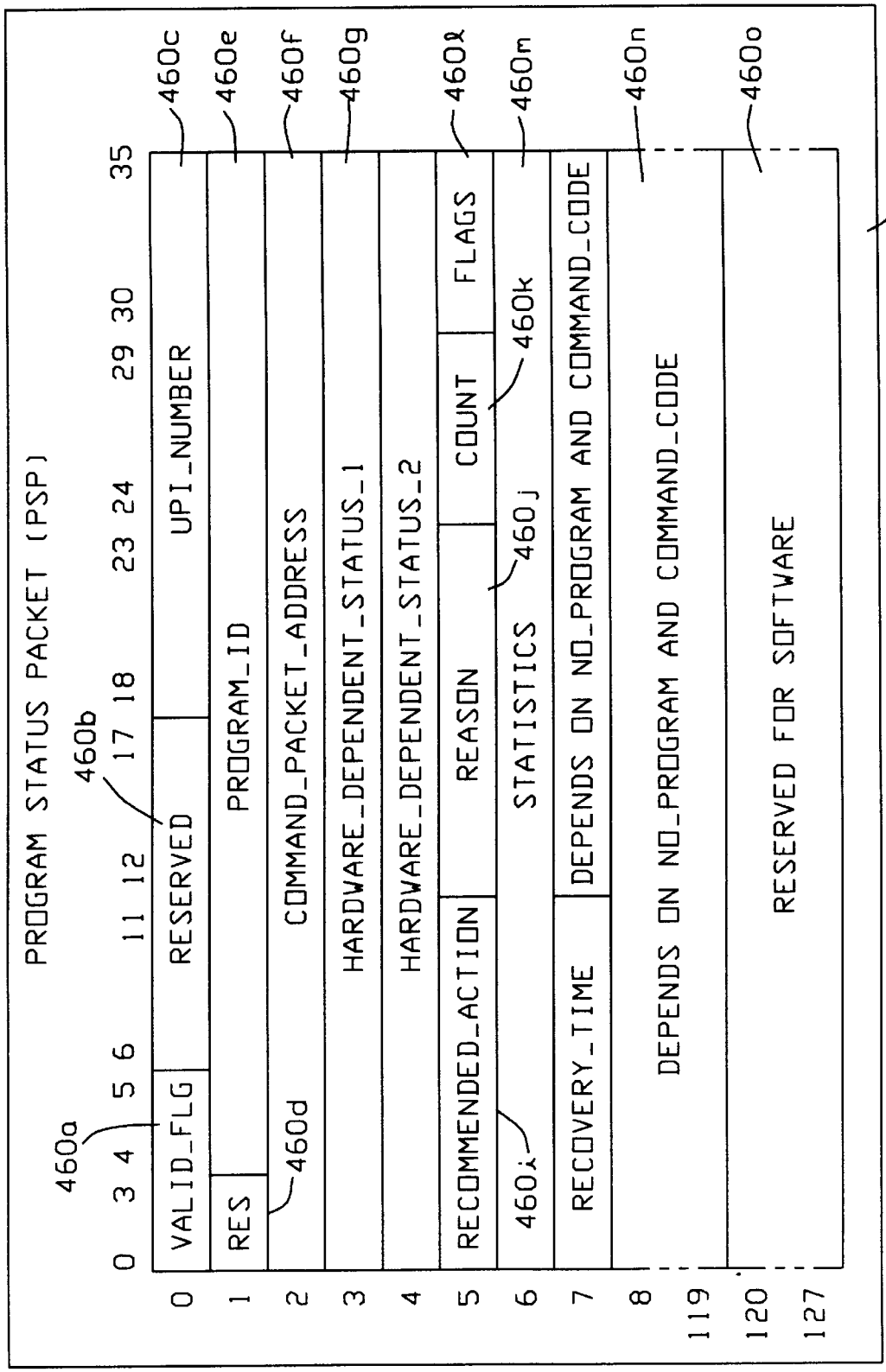
Figures 13, 14:
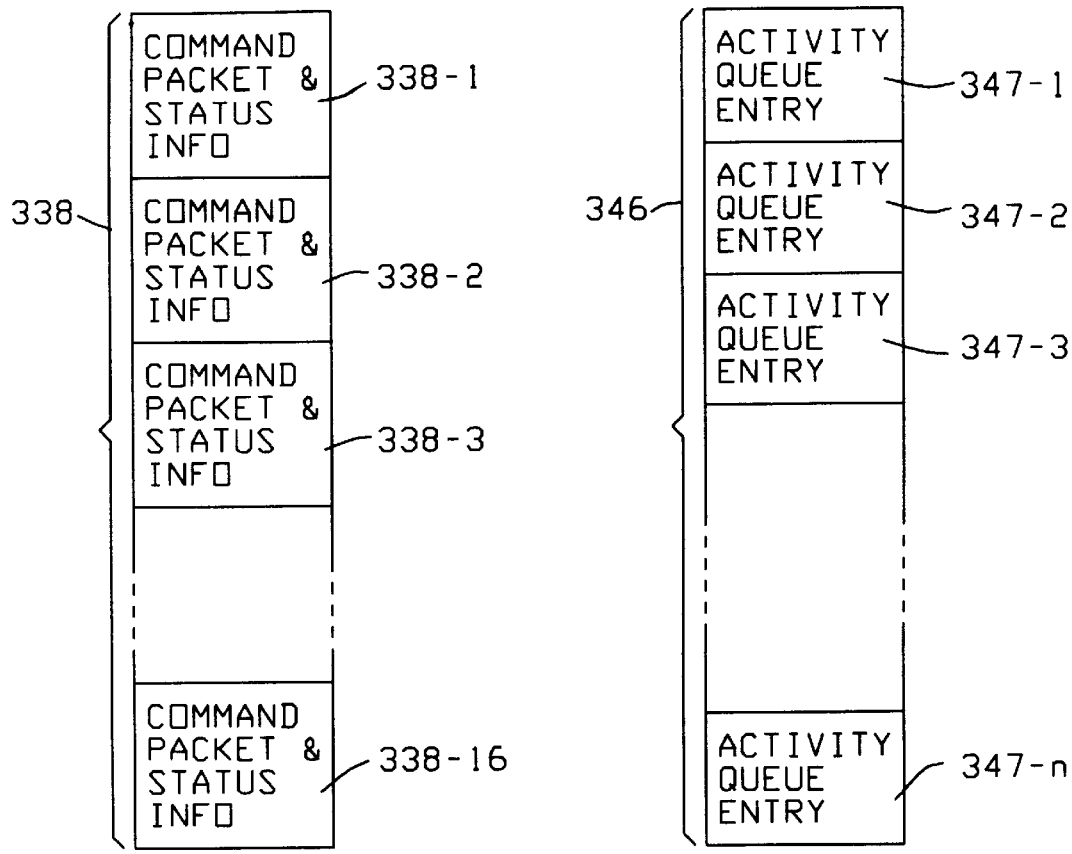
Figure 15:
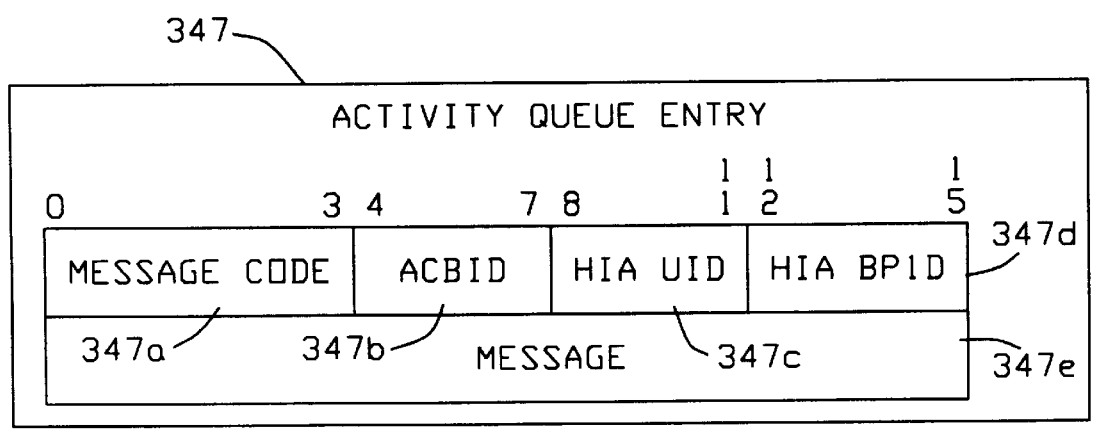
Figures 16, 17:
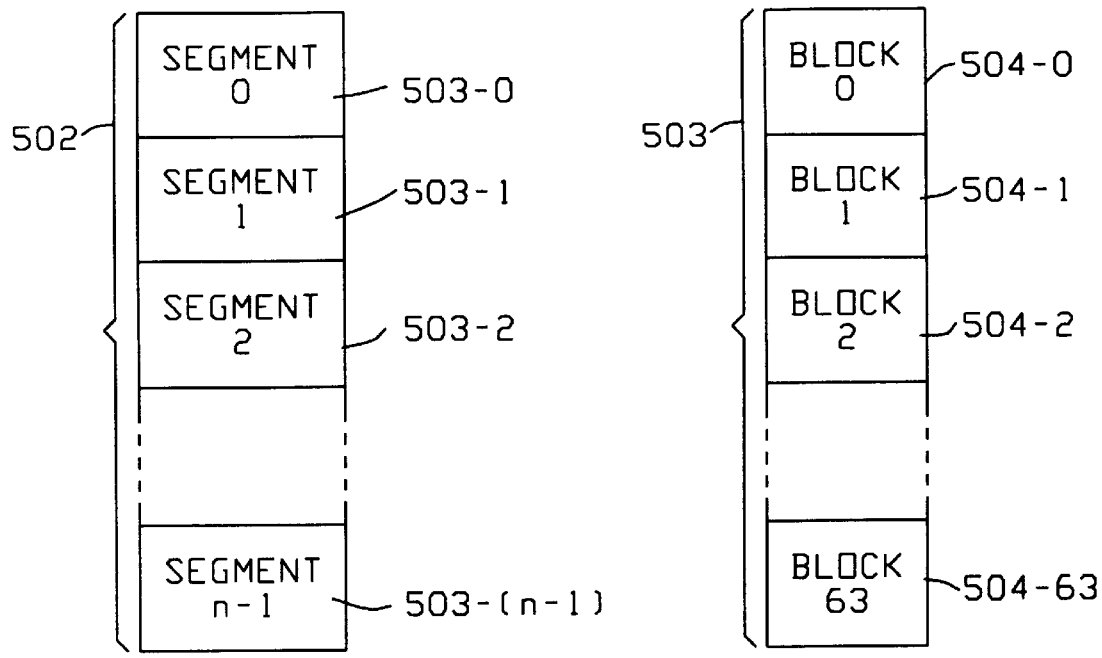
Figure 18:
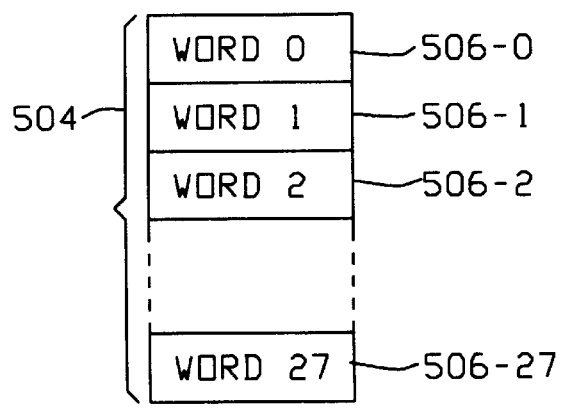
Figure 19:
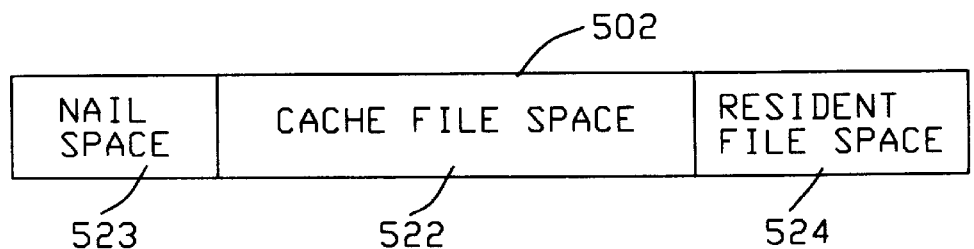
Figure 20:
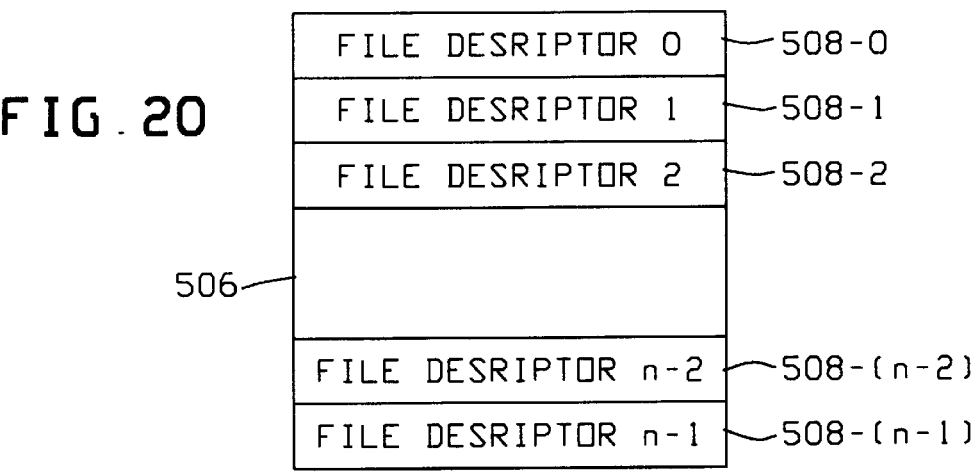
Figure 21:
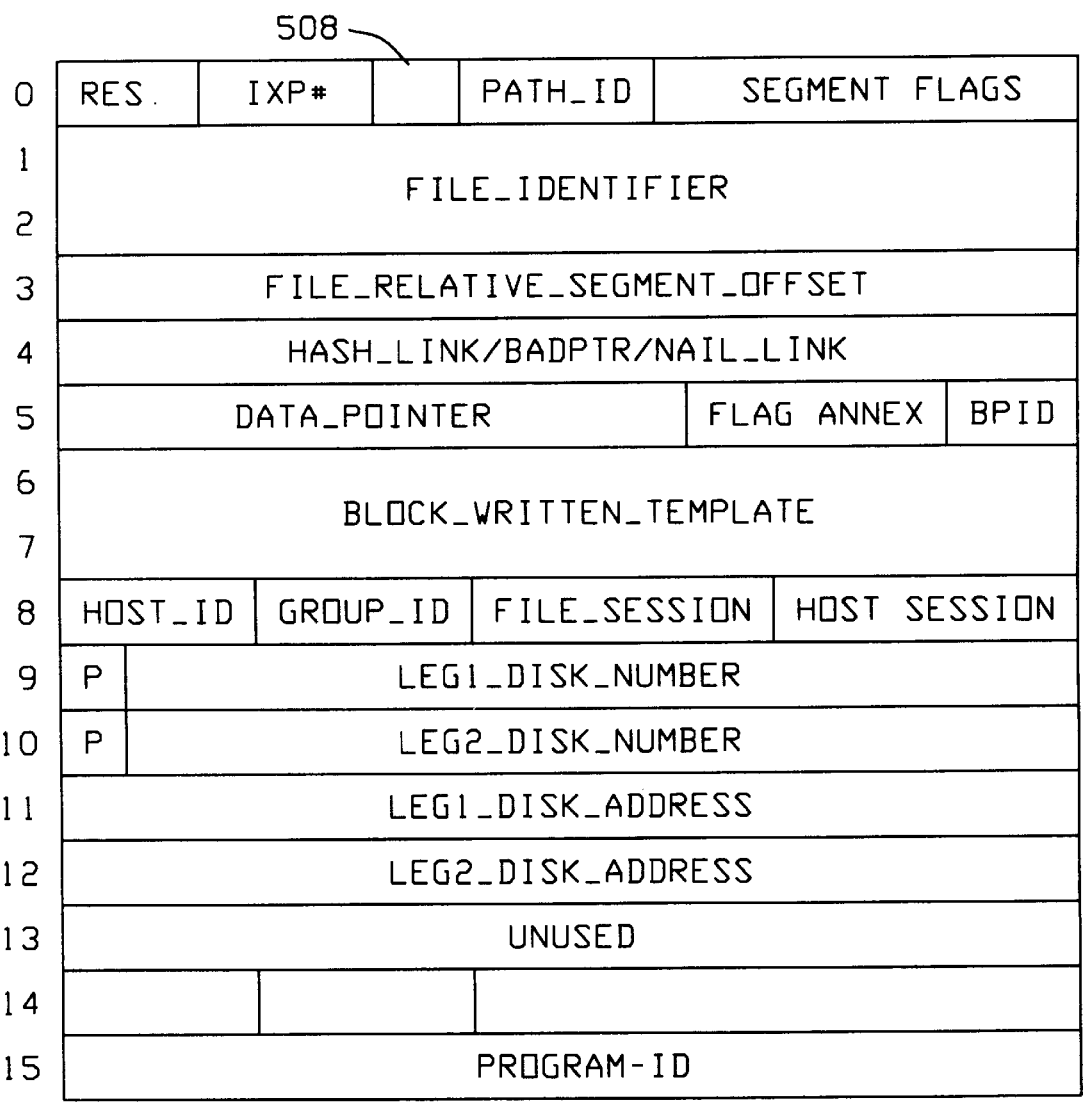
Figure 22:
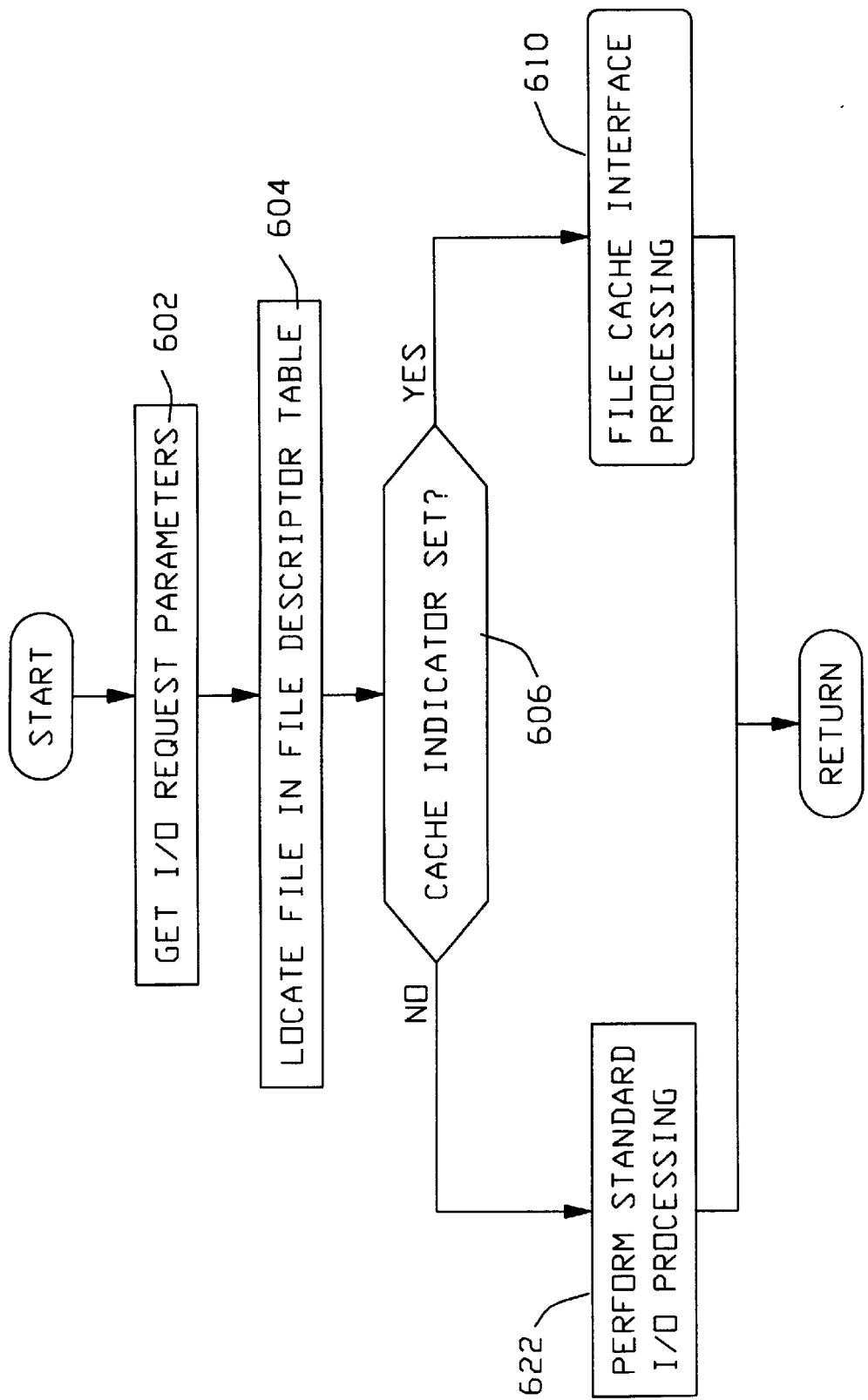
Figure 23:
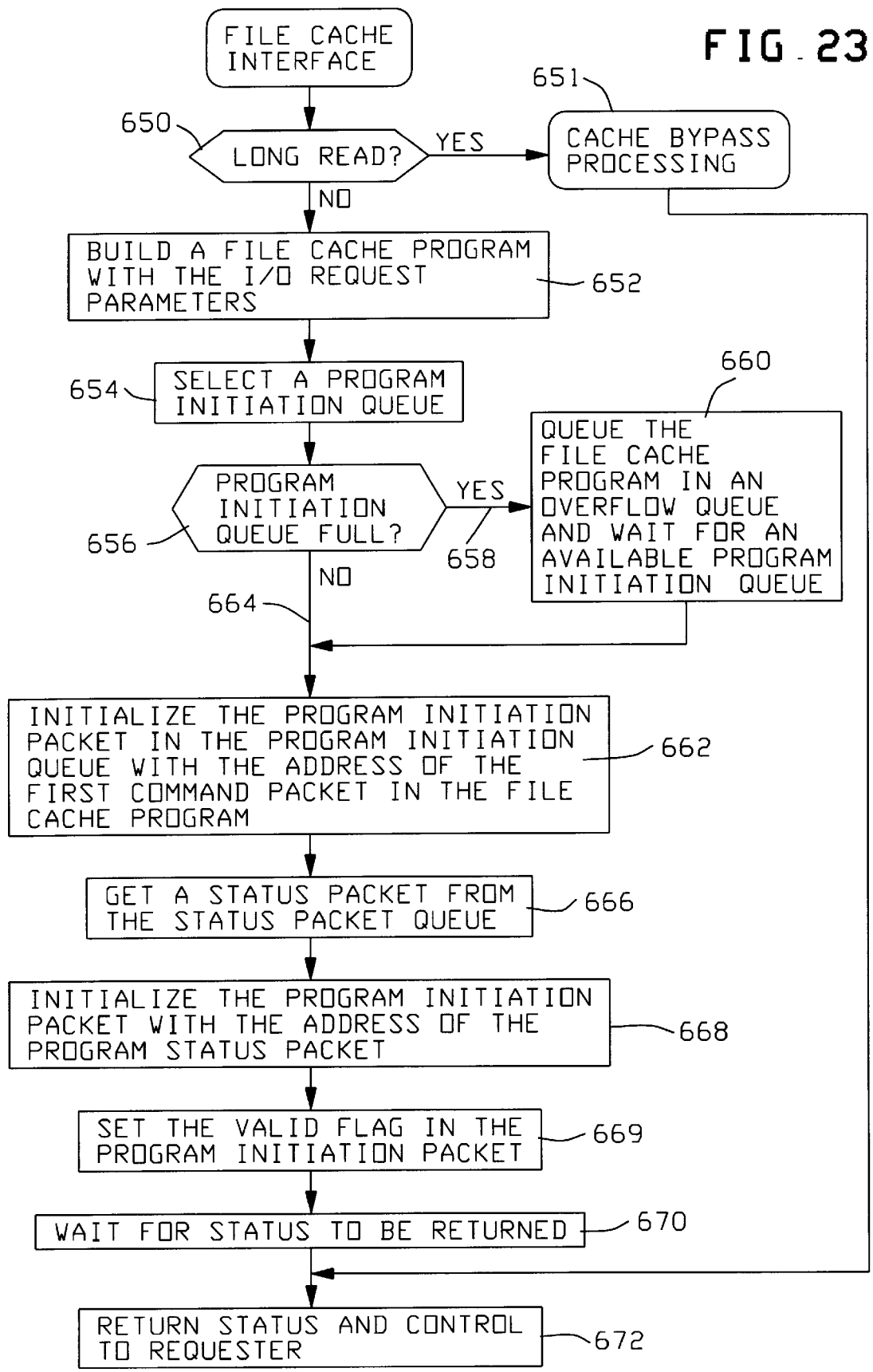
Figure 24:
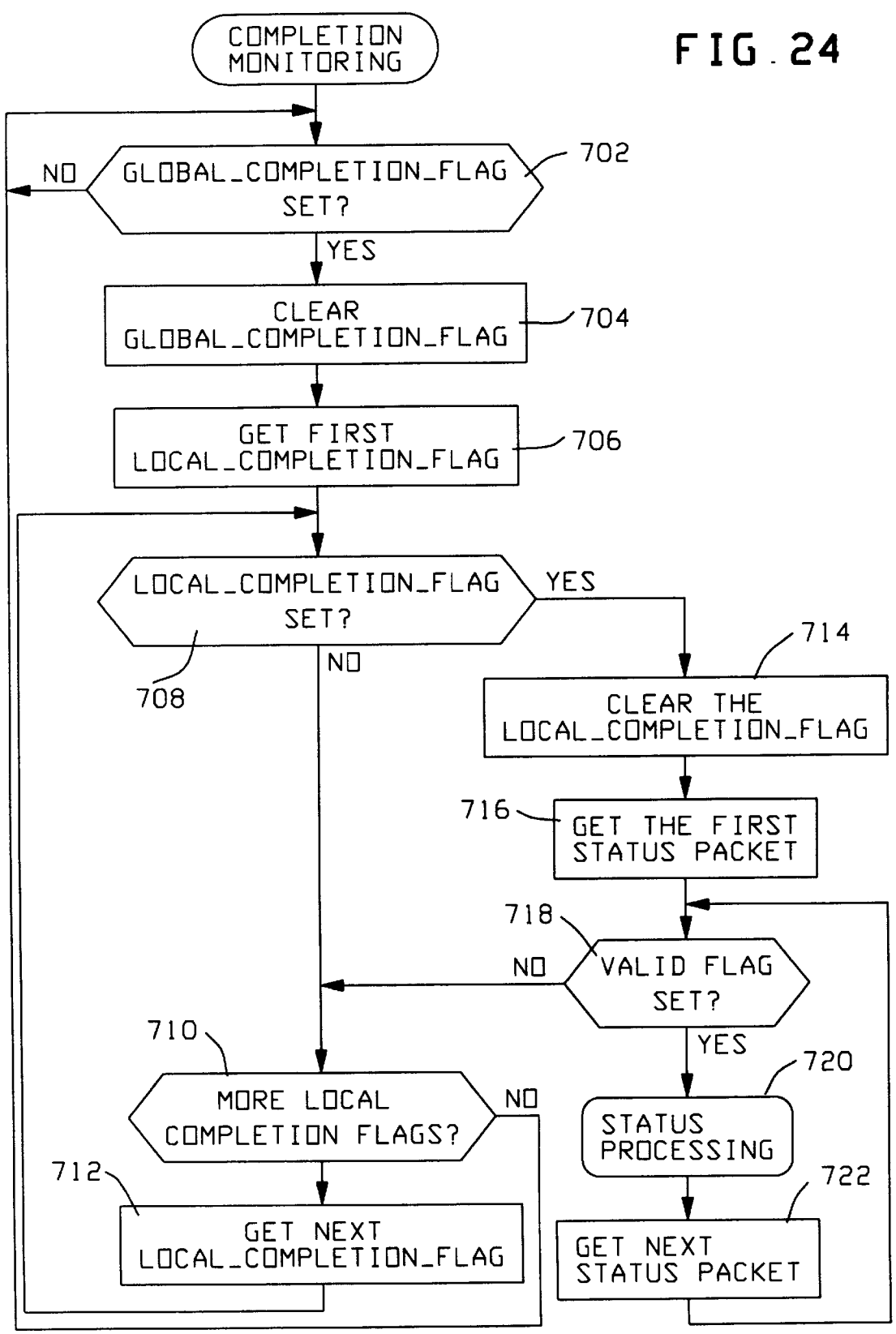
Figure 25B:
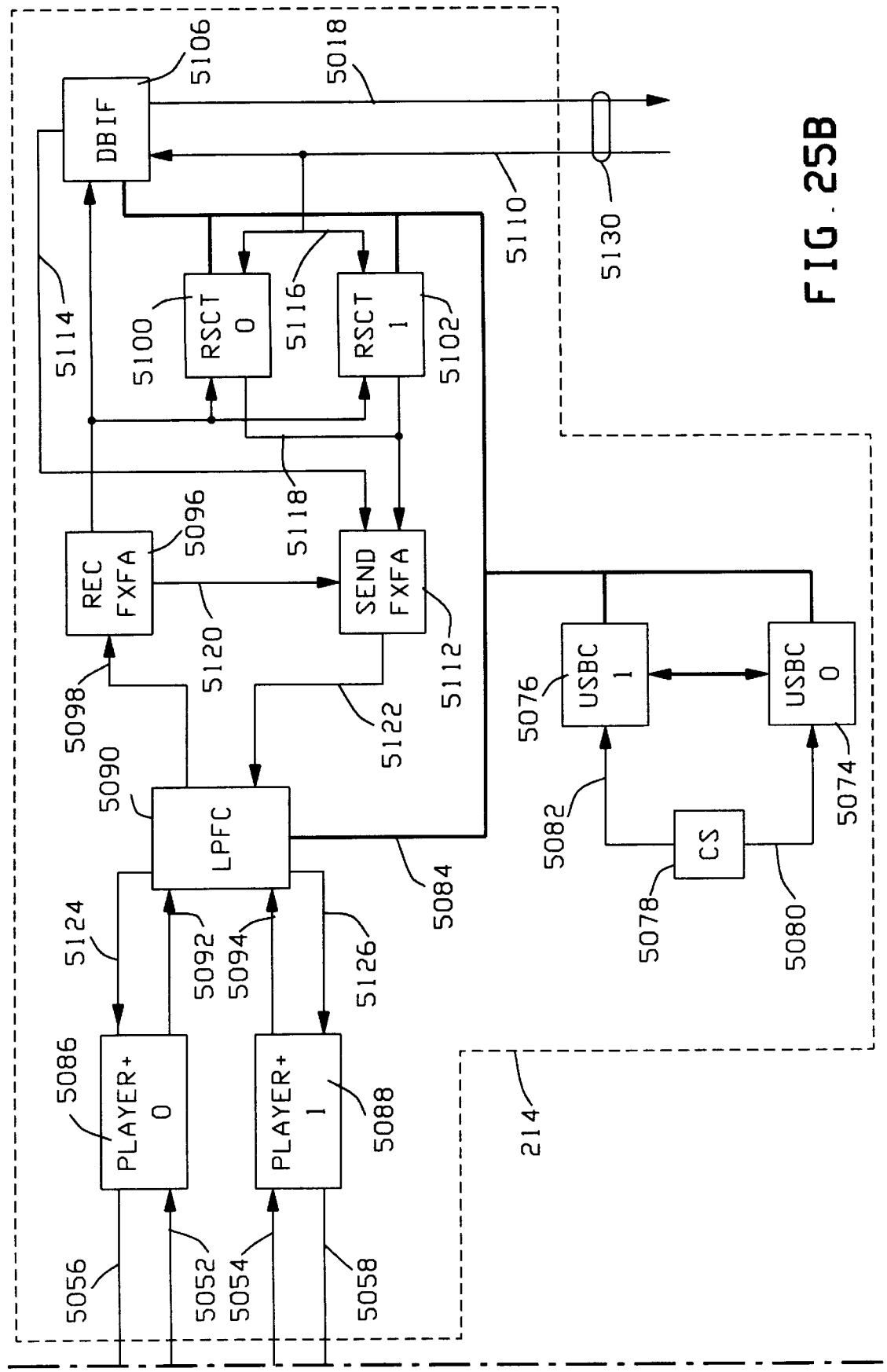
Figure 26:
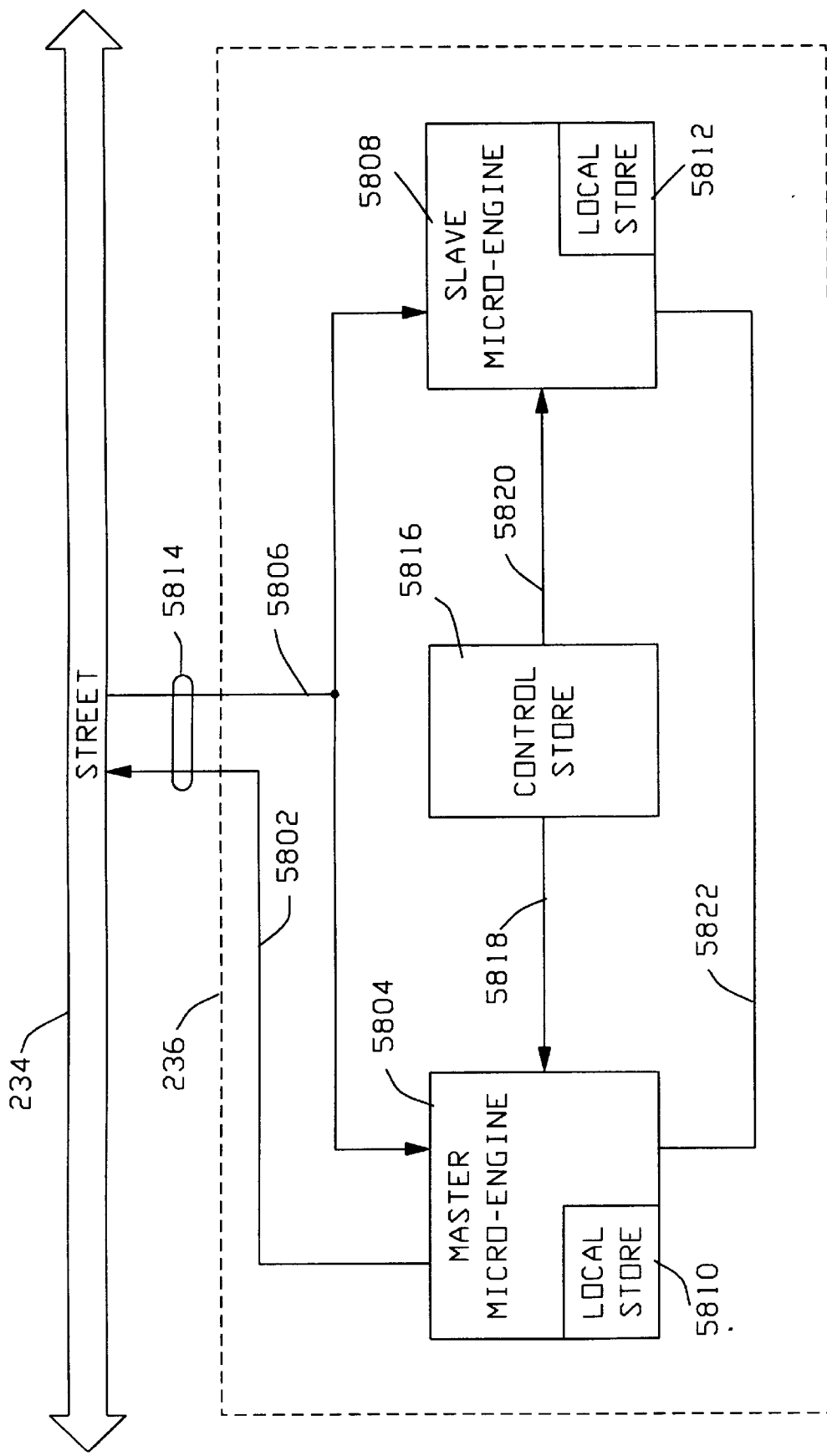
Figure 27:
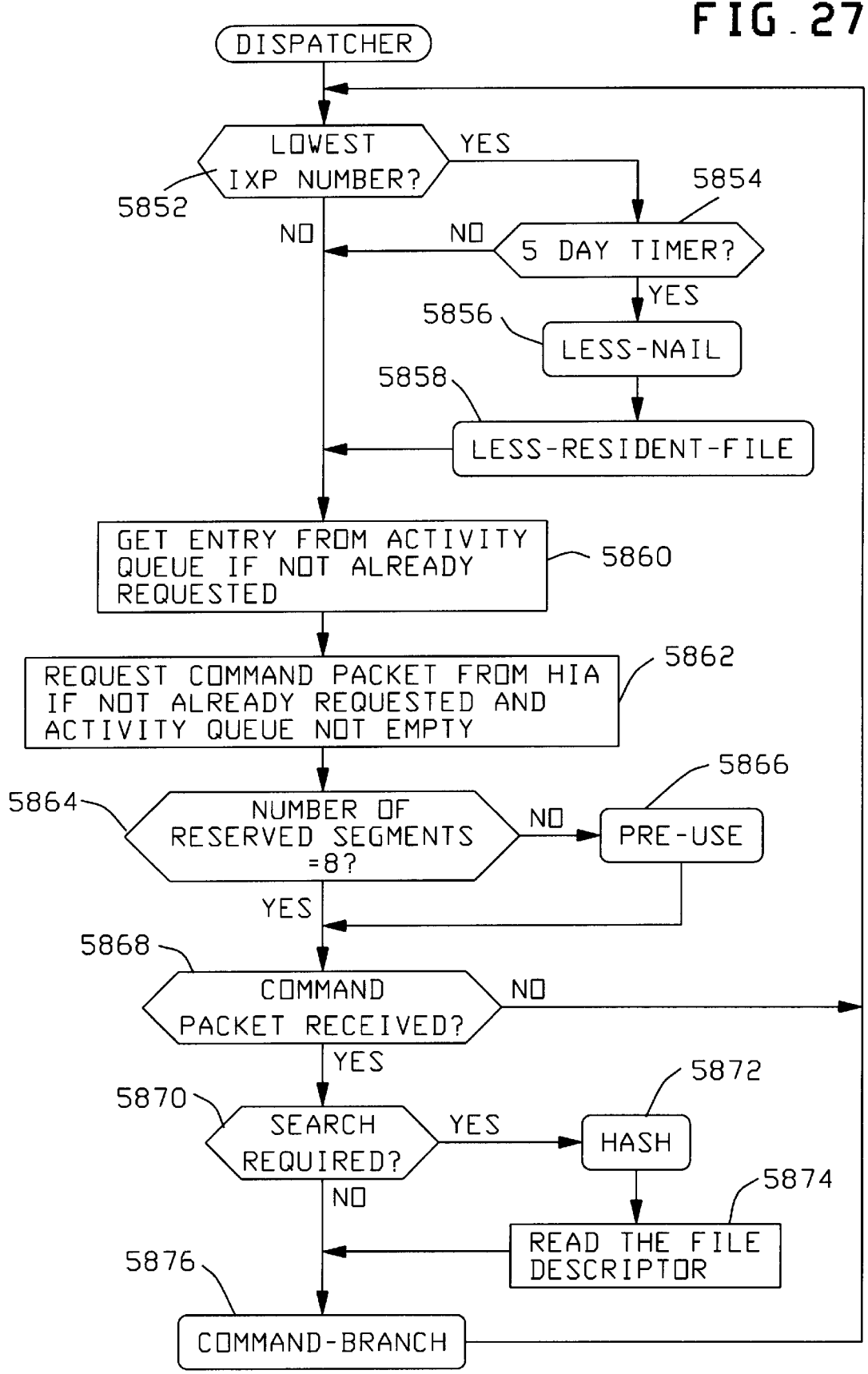
Figure 28:
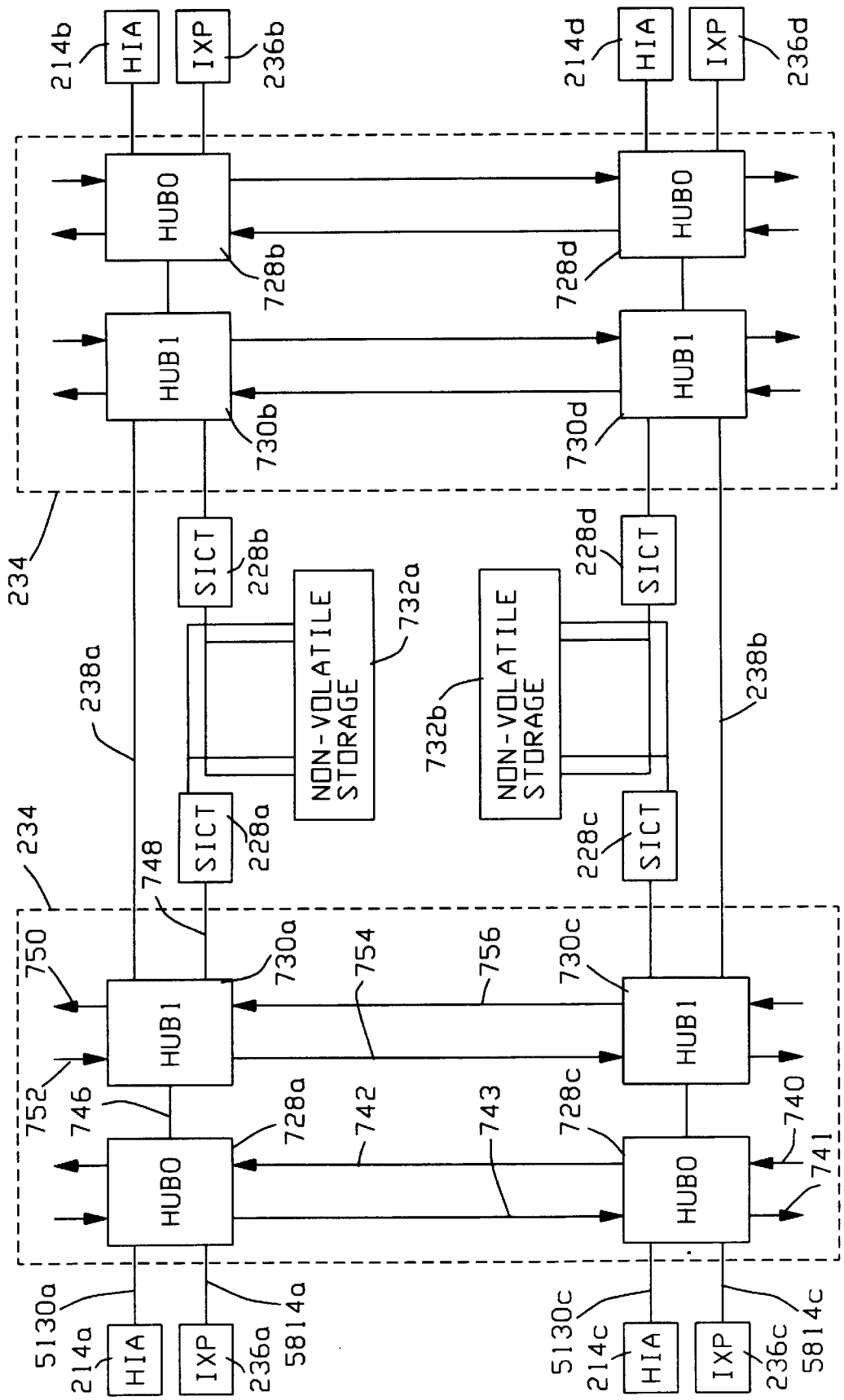
Figure 29:
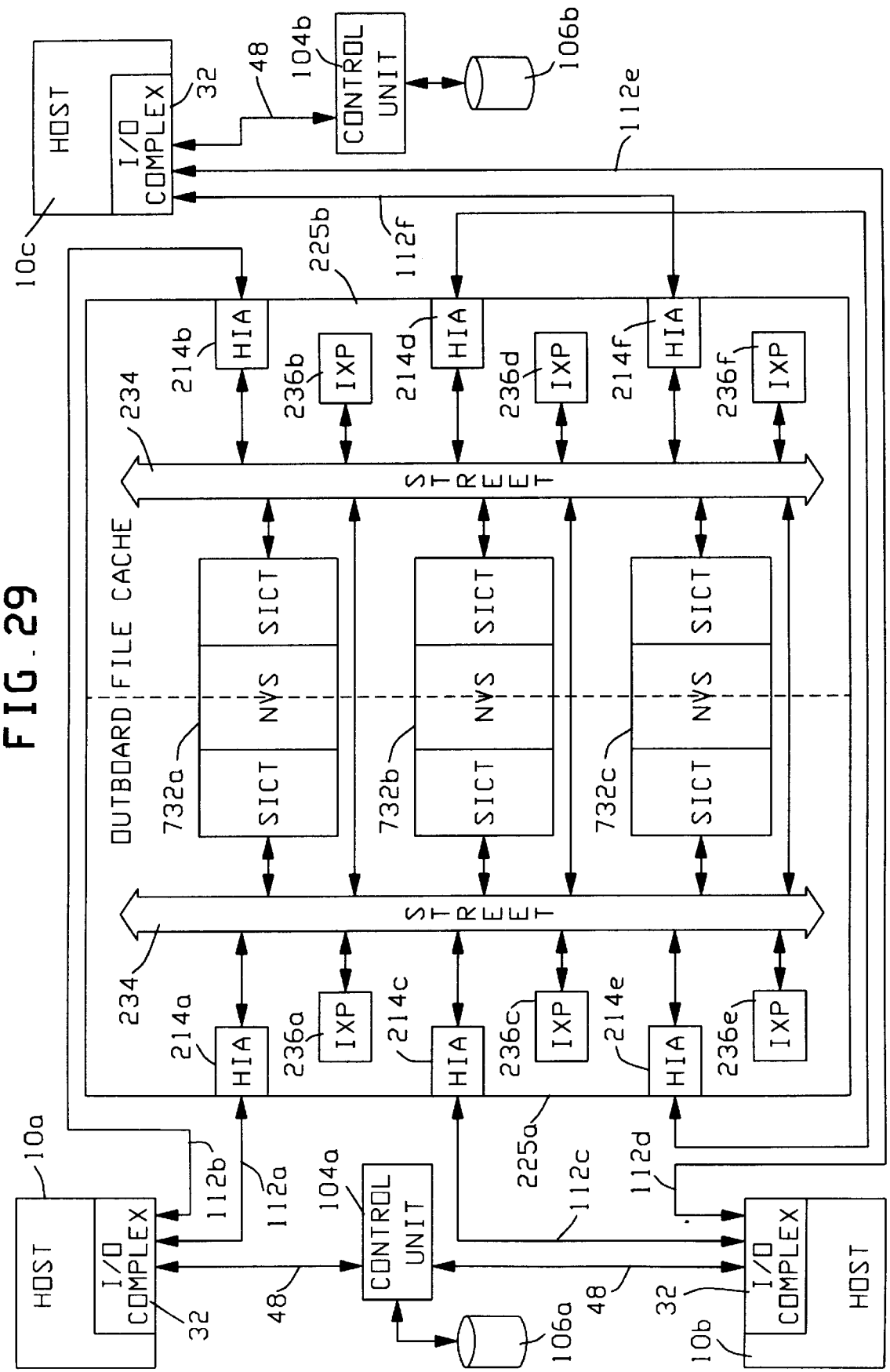
Figure 30:
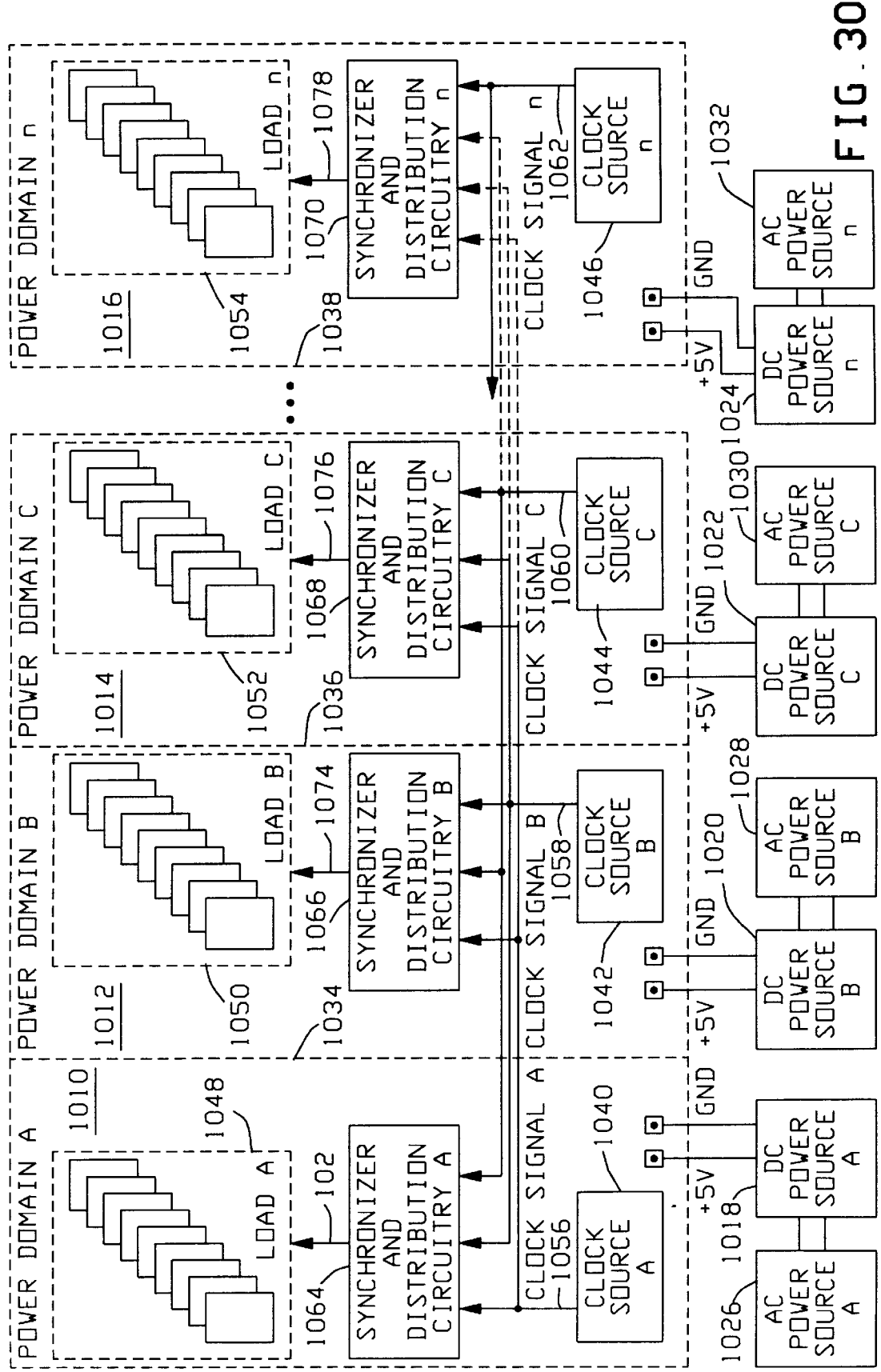
Figure 31:
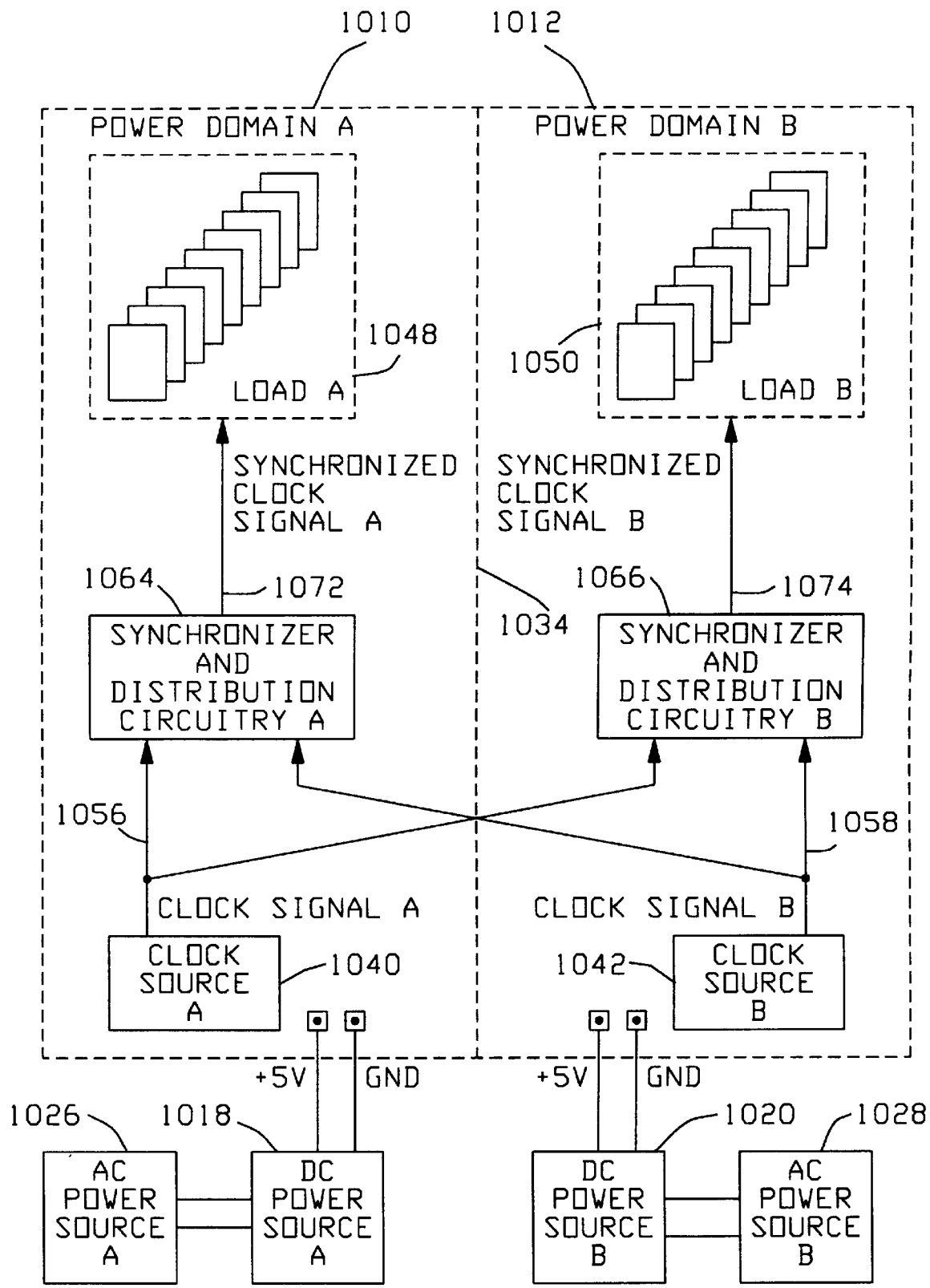
Figure 32:
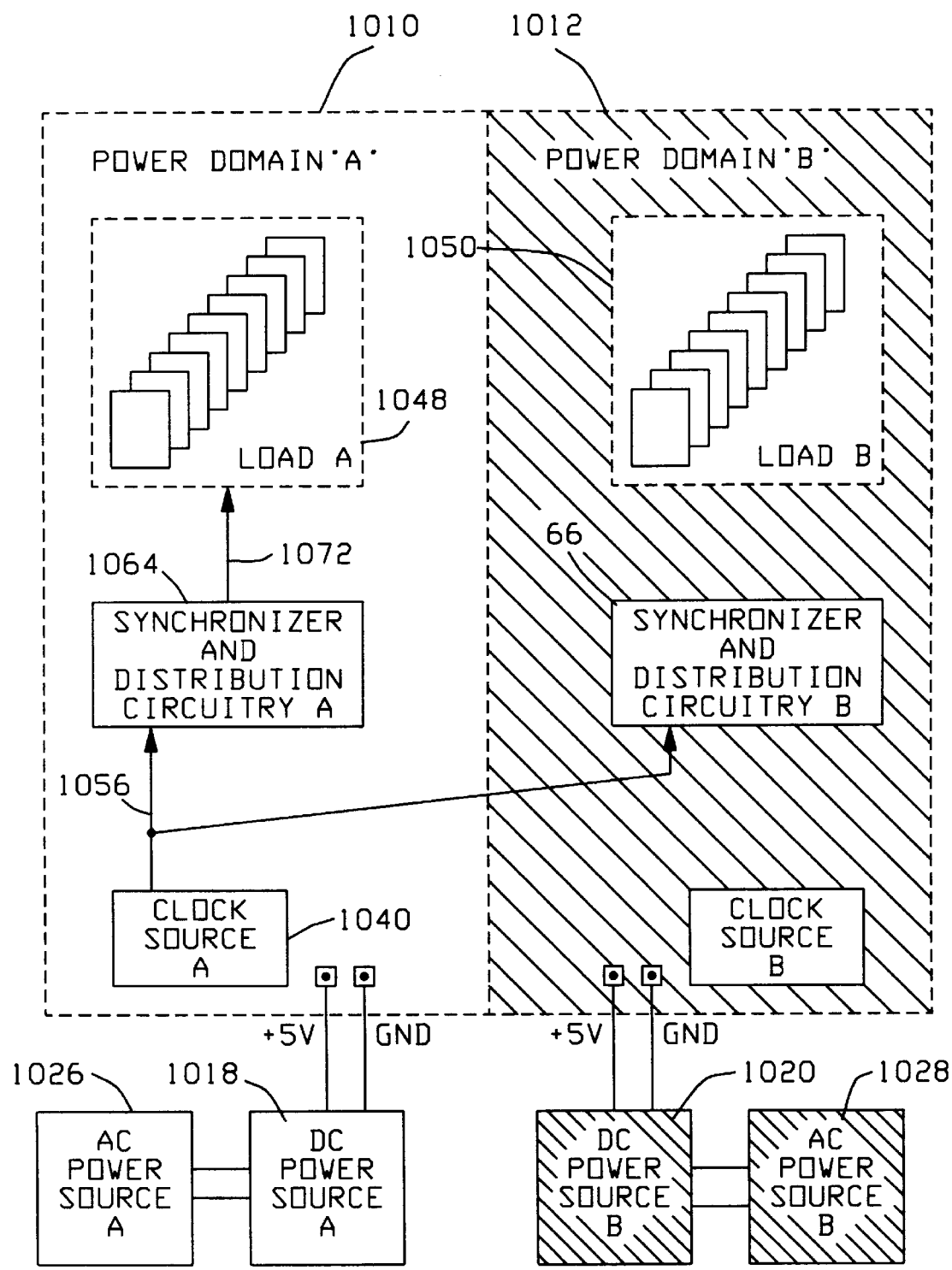
Figure 33:
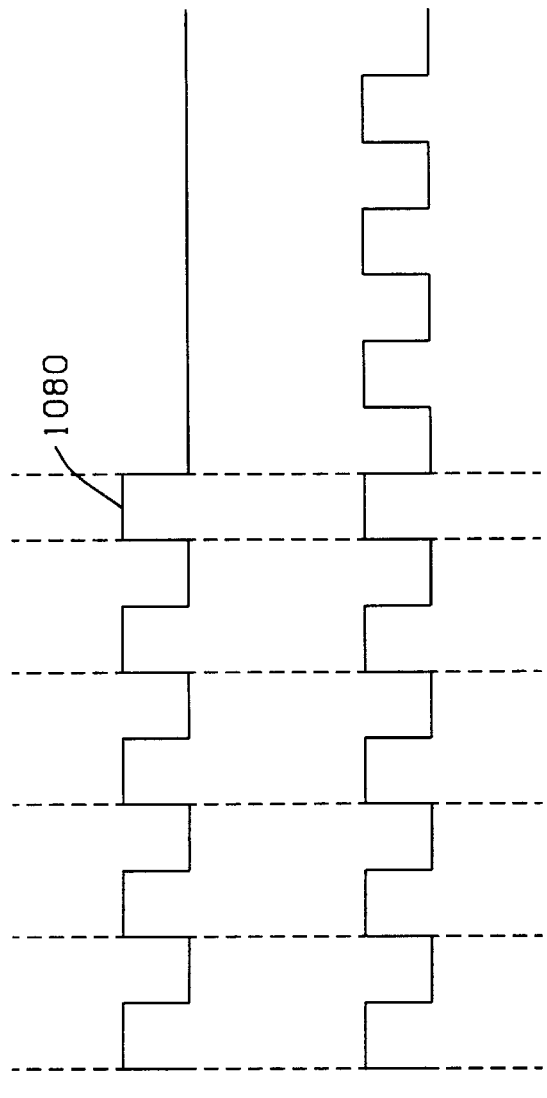
Figure 35:
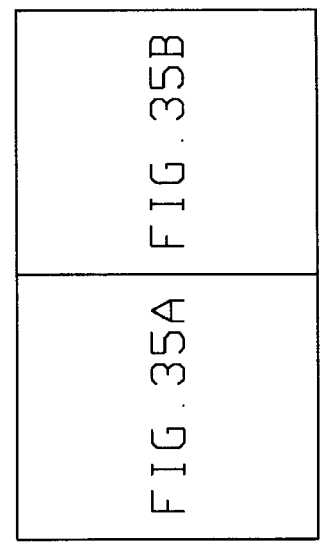
Figure 34:
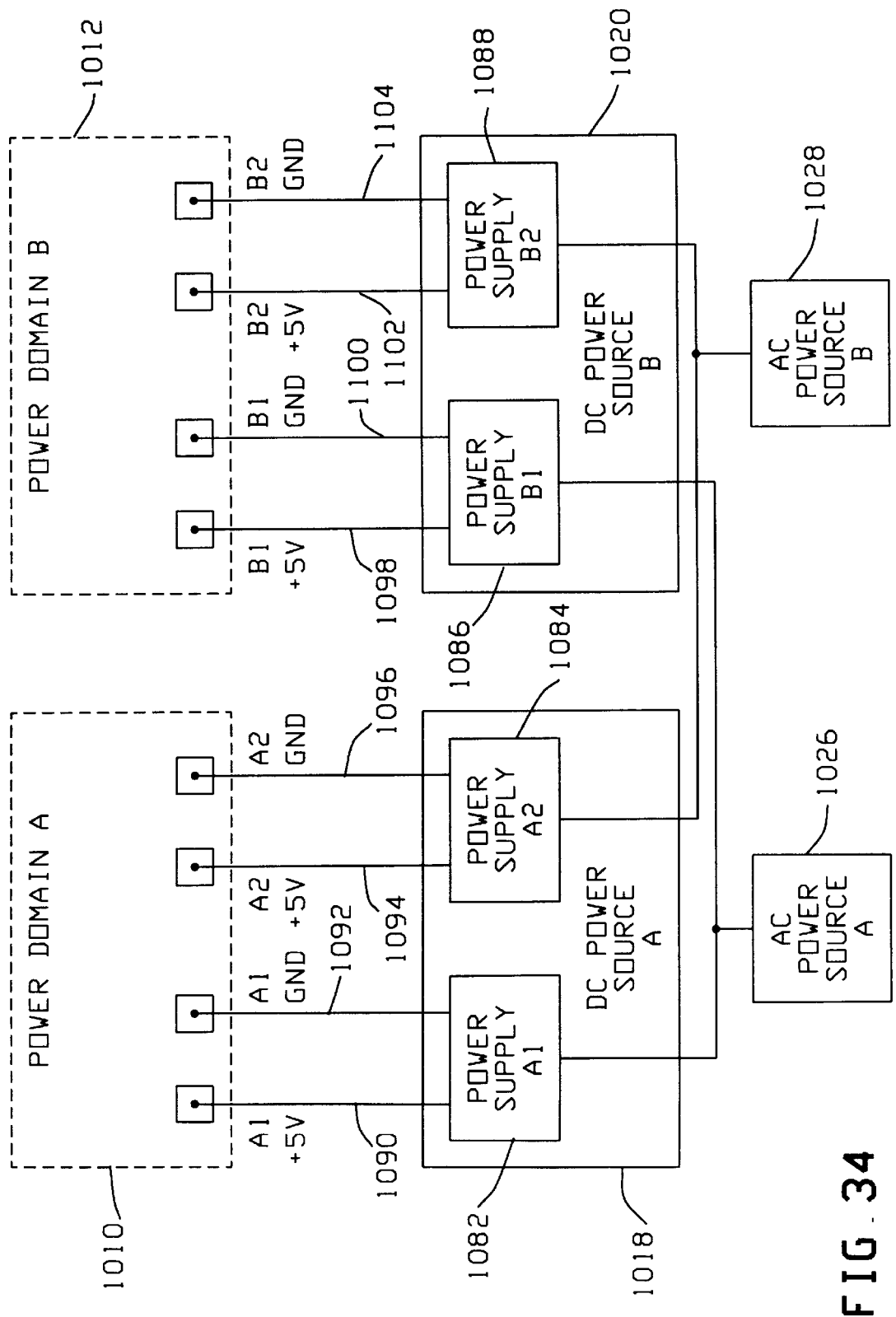
Figure 35A:
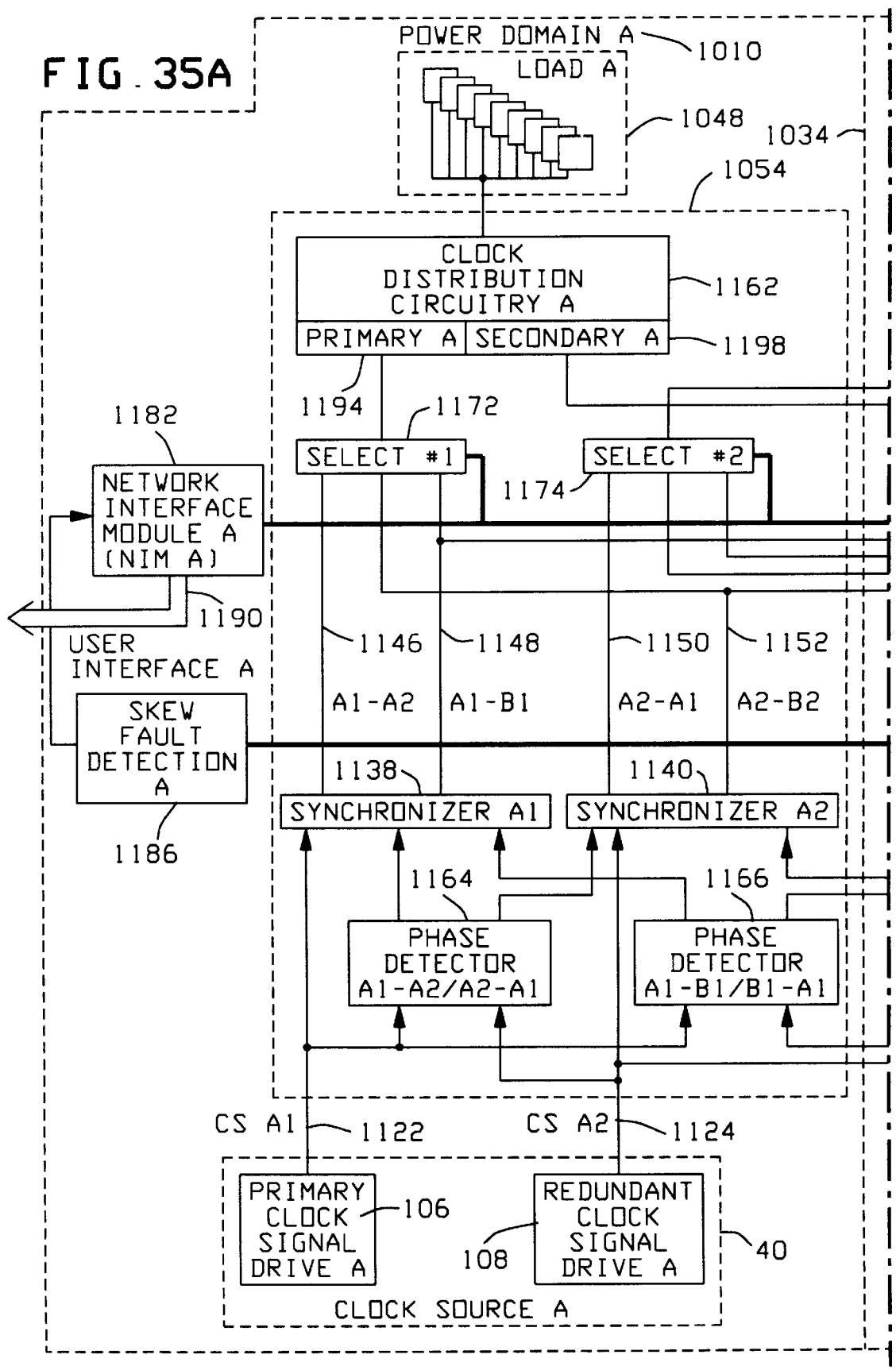
Figure 35B:
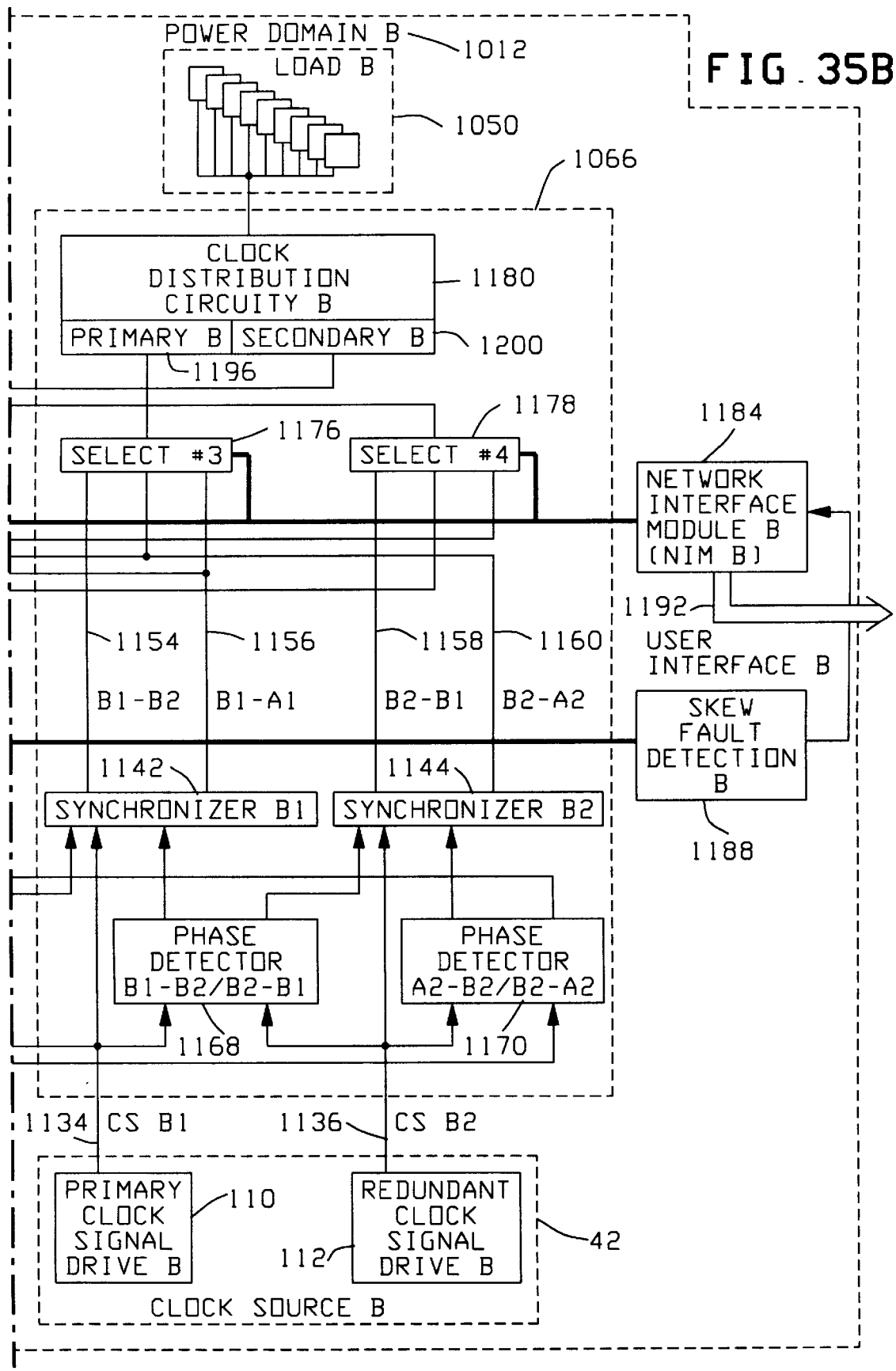
Figure 36:
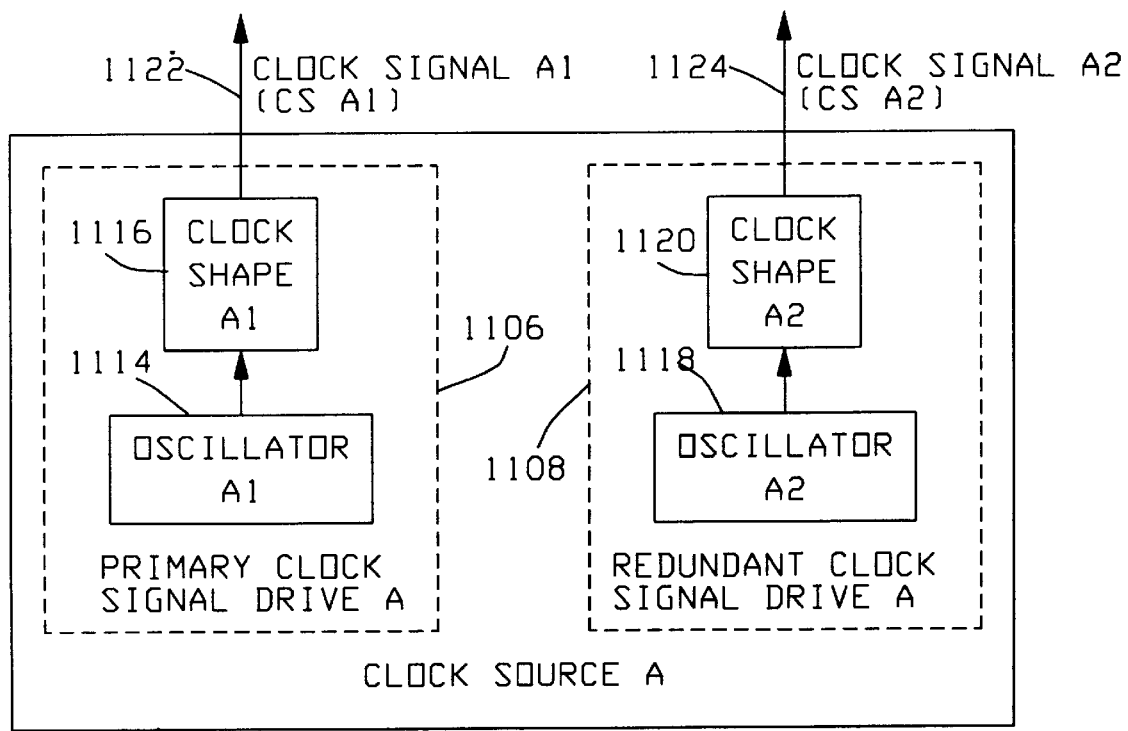
Figure 37:
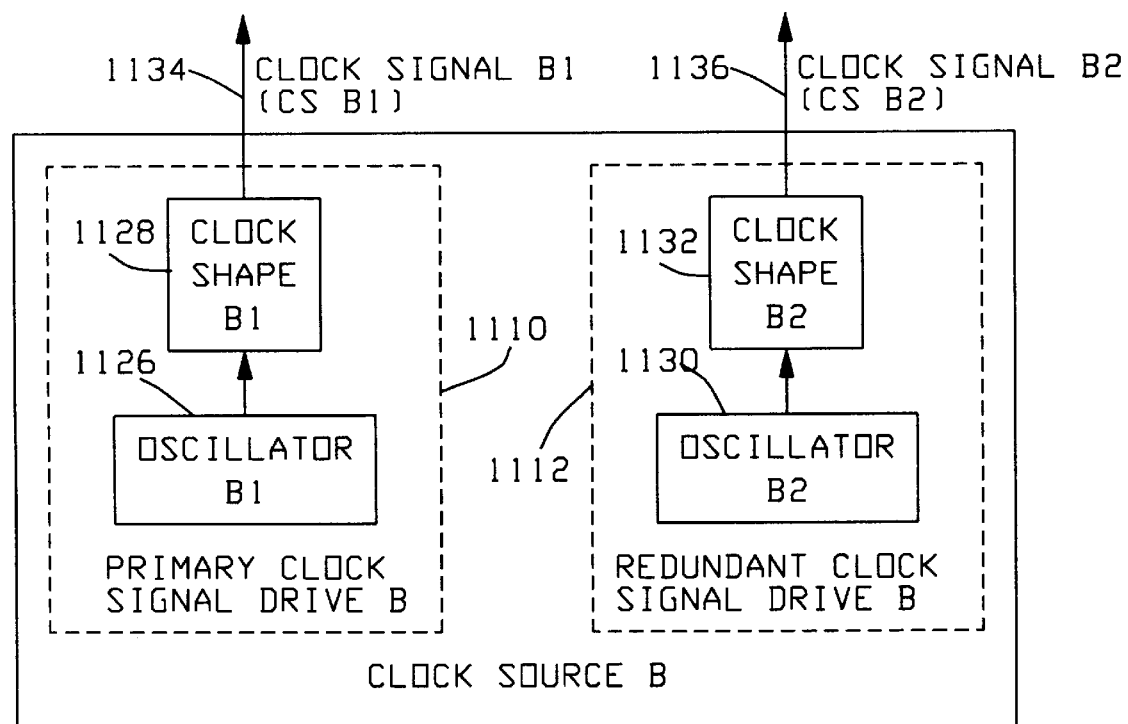
Figure 38:
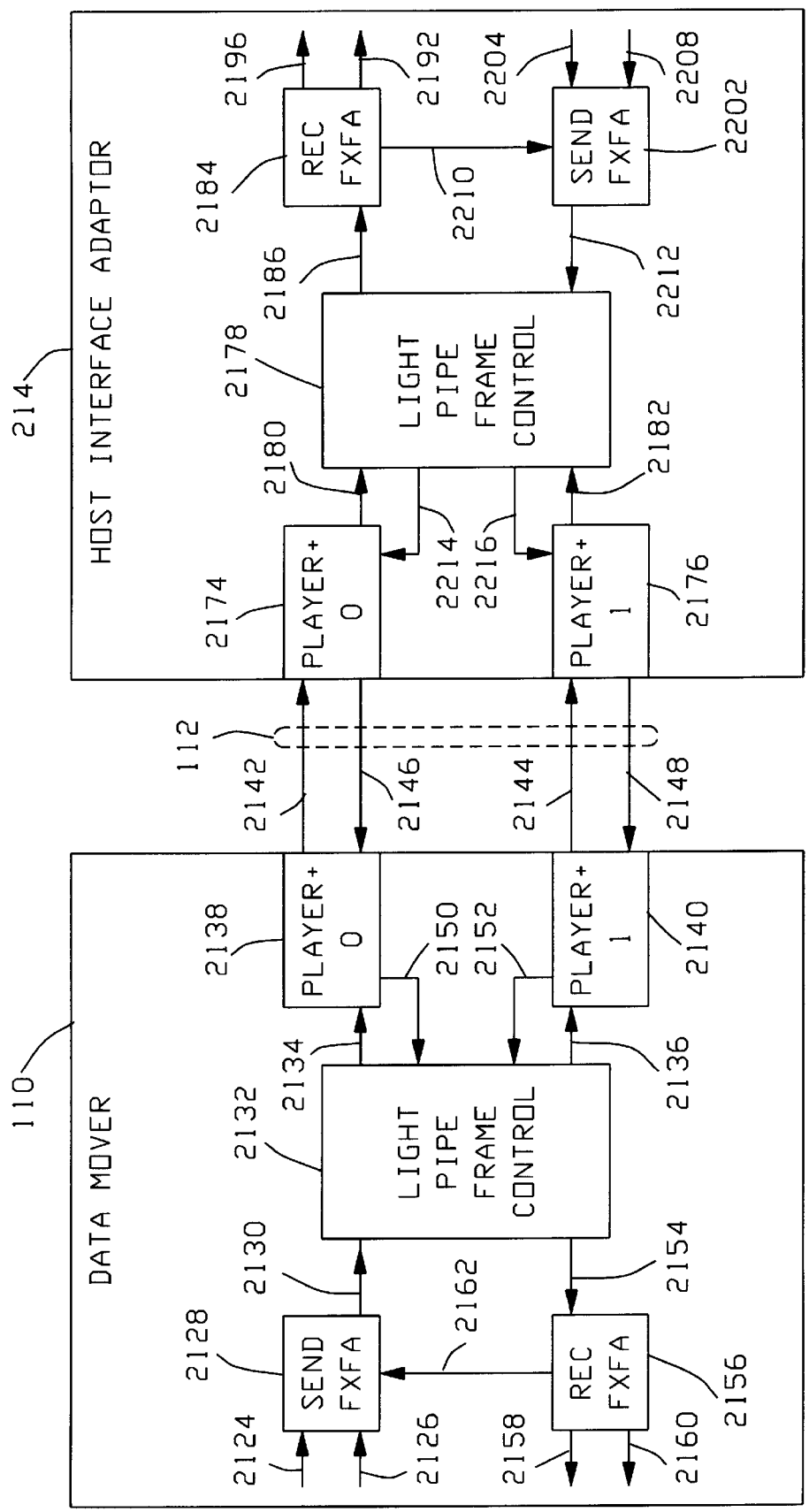
Figure 39:
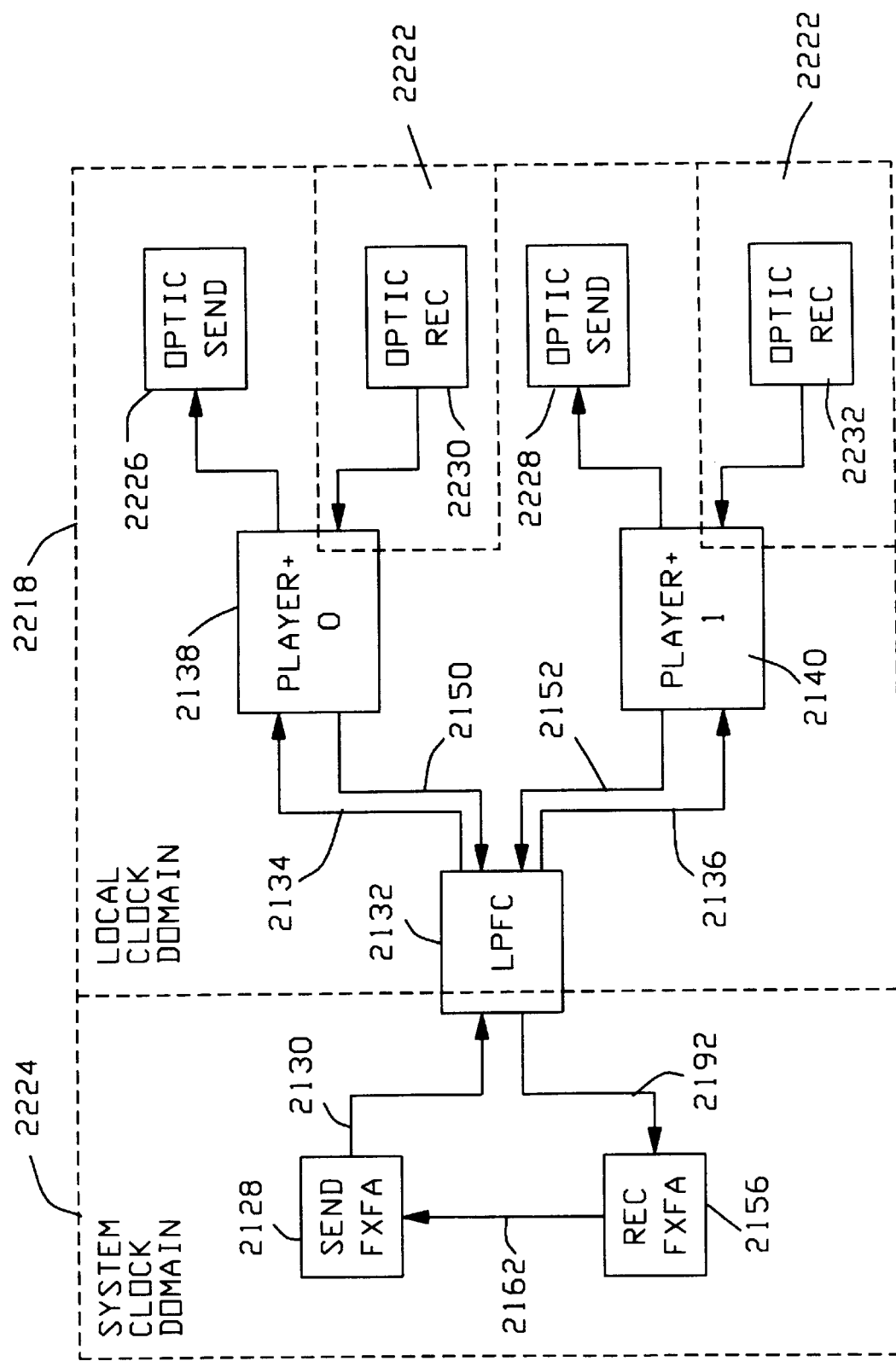
Figure 42:
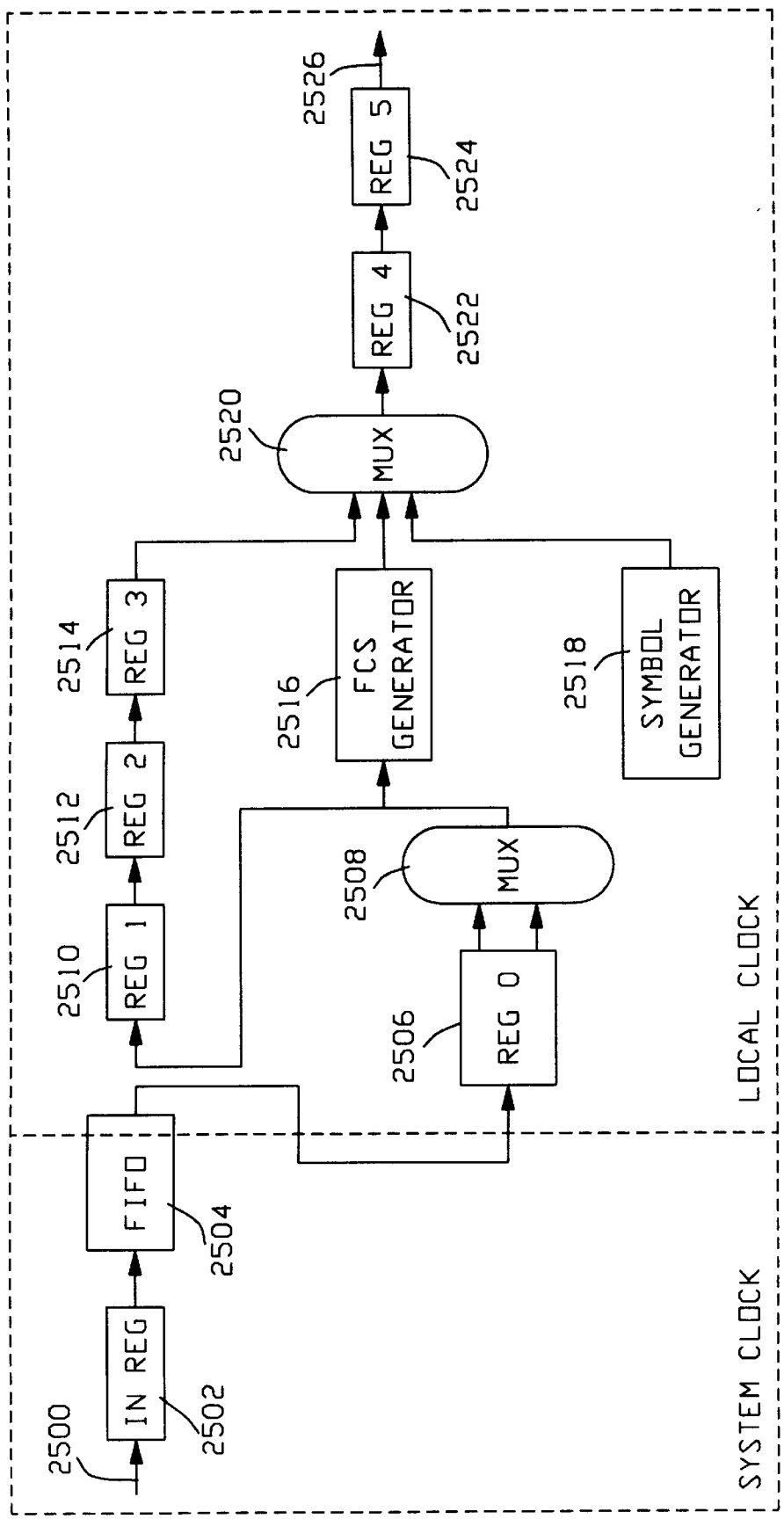
Figure 43:
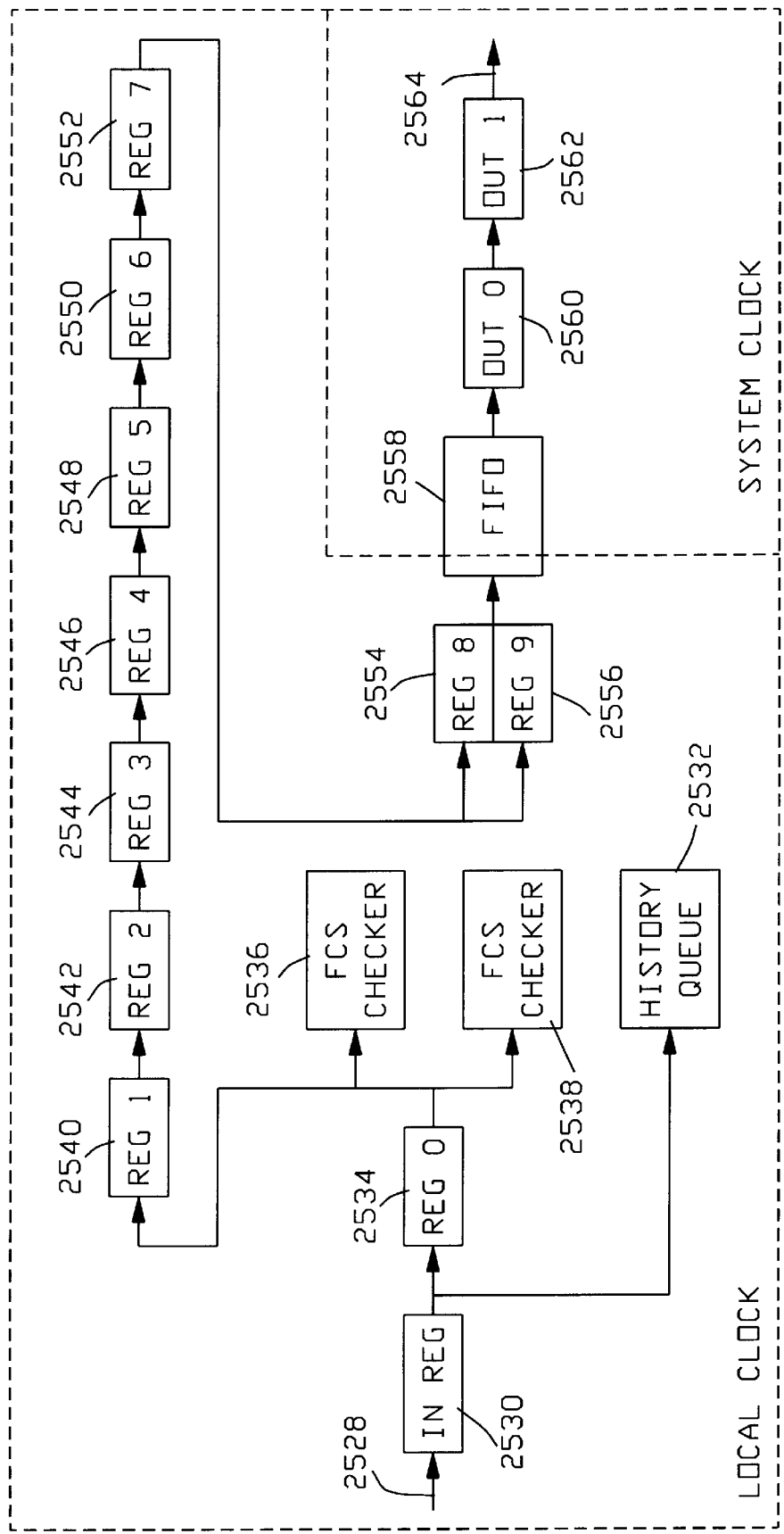
Figure 44:
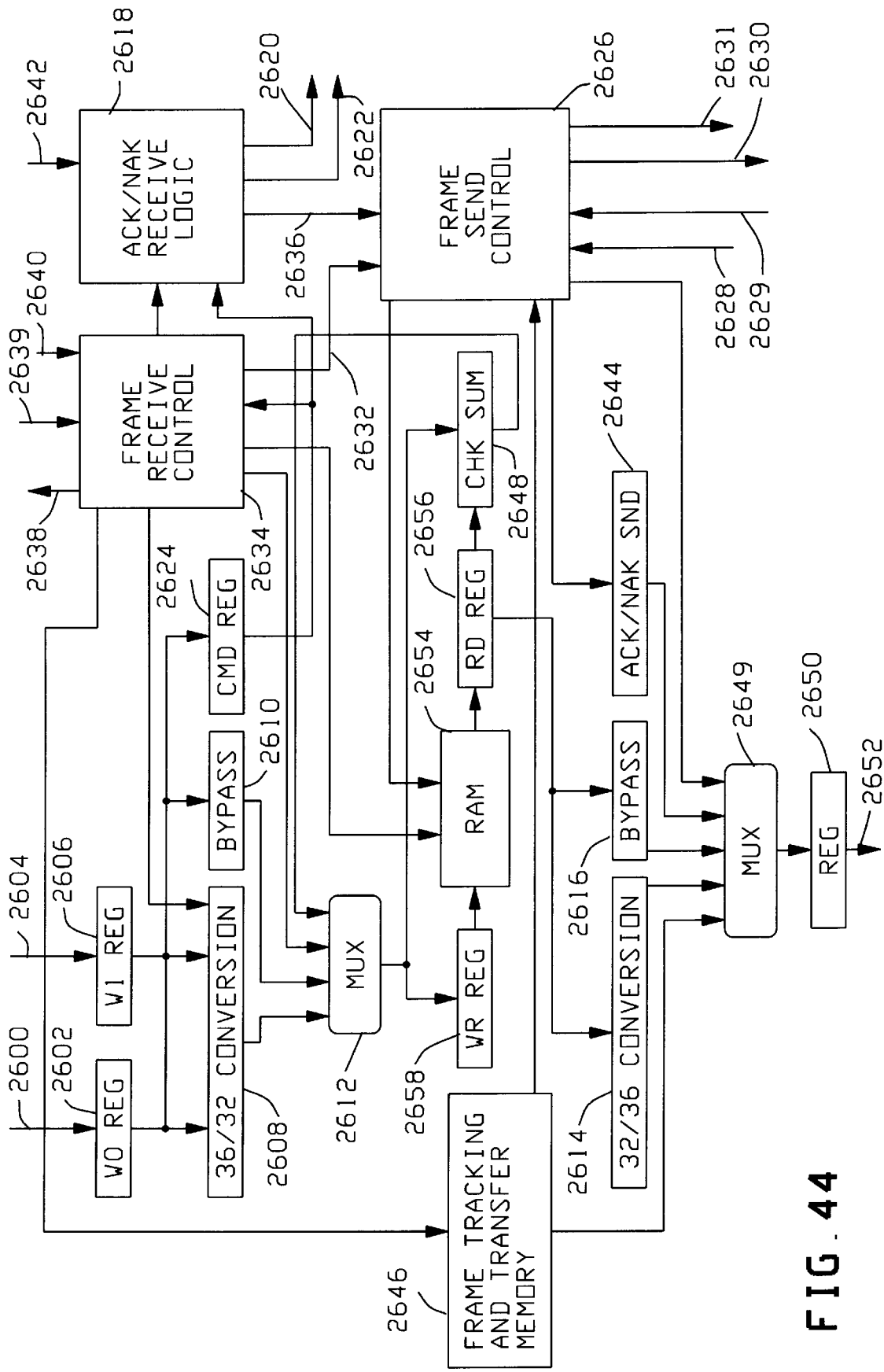
Figure 45:
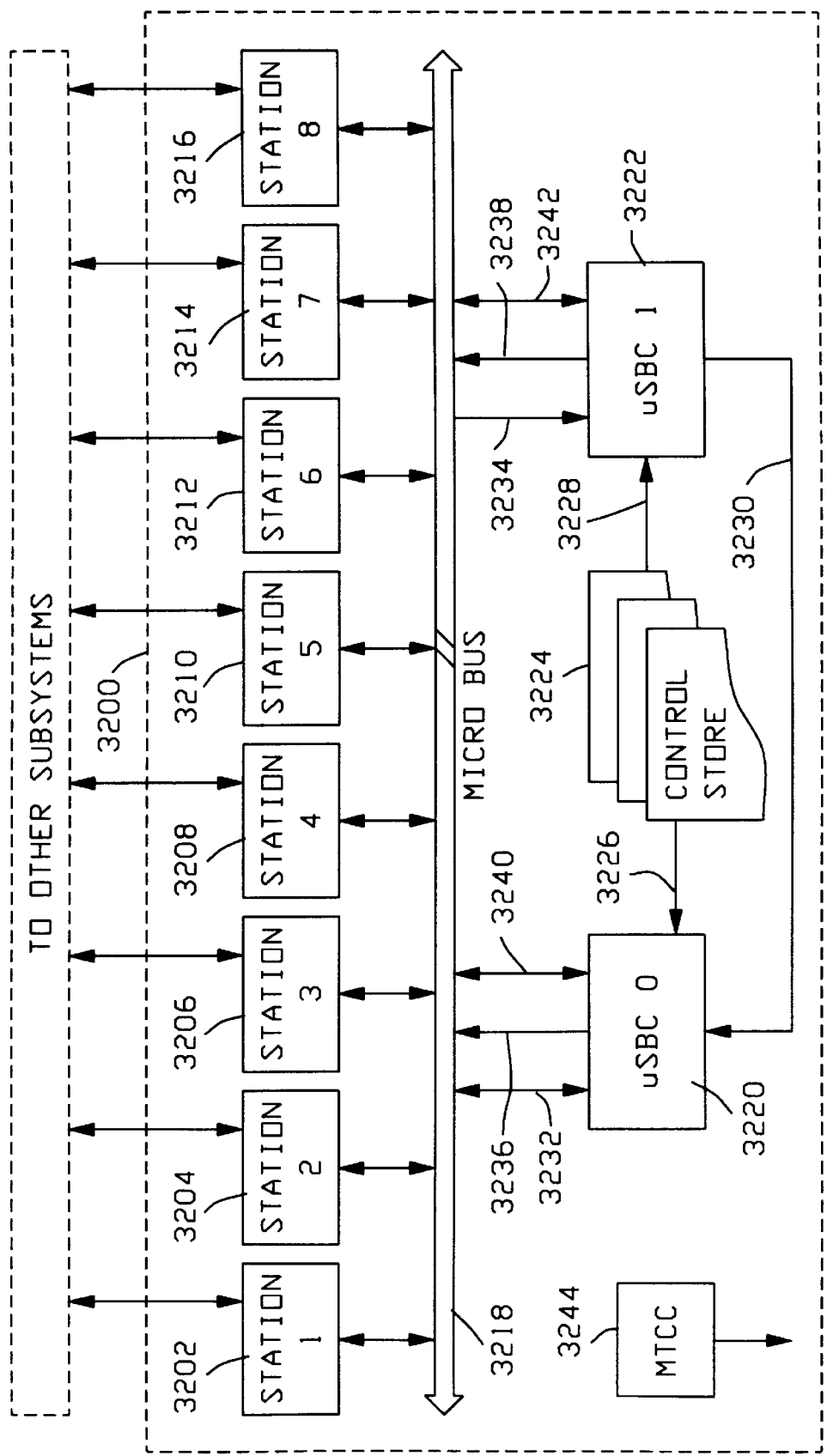
Figure 46:
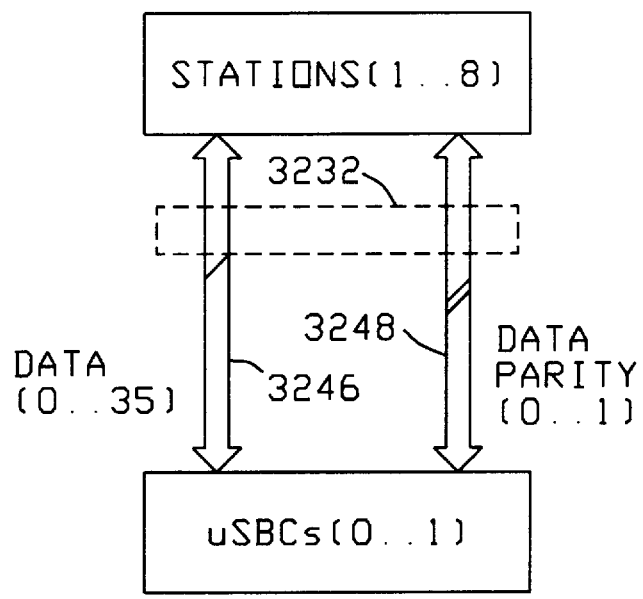
Figure 49:
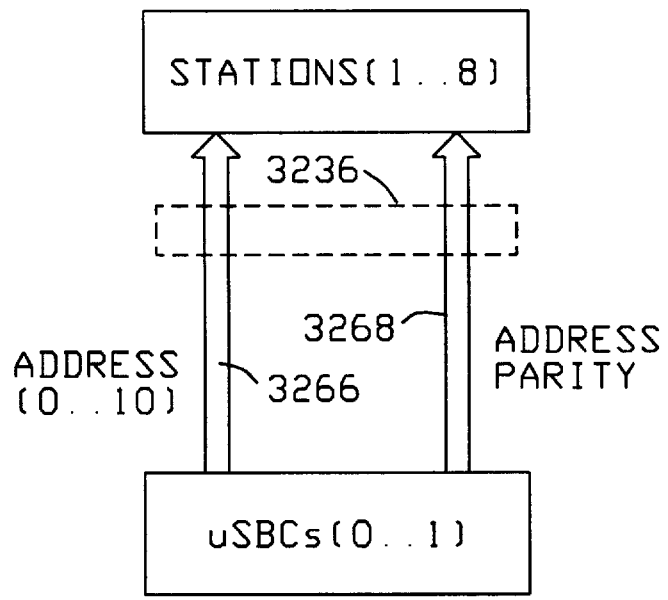
Figure 52:
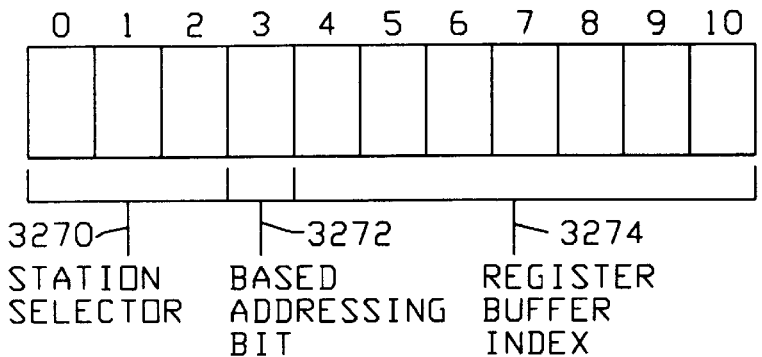
Figure 53:
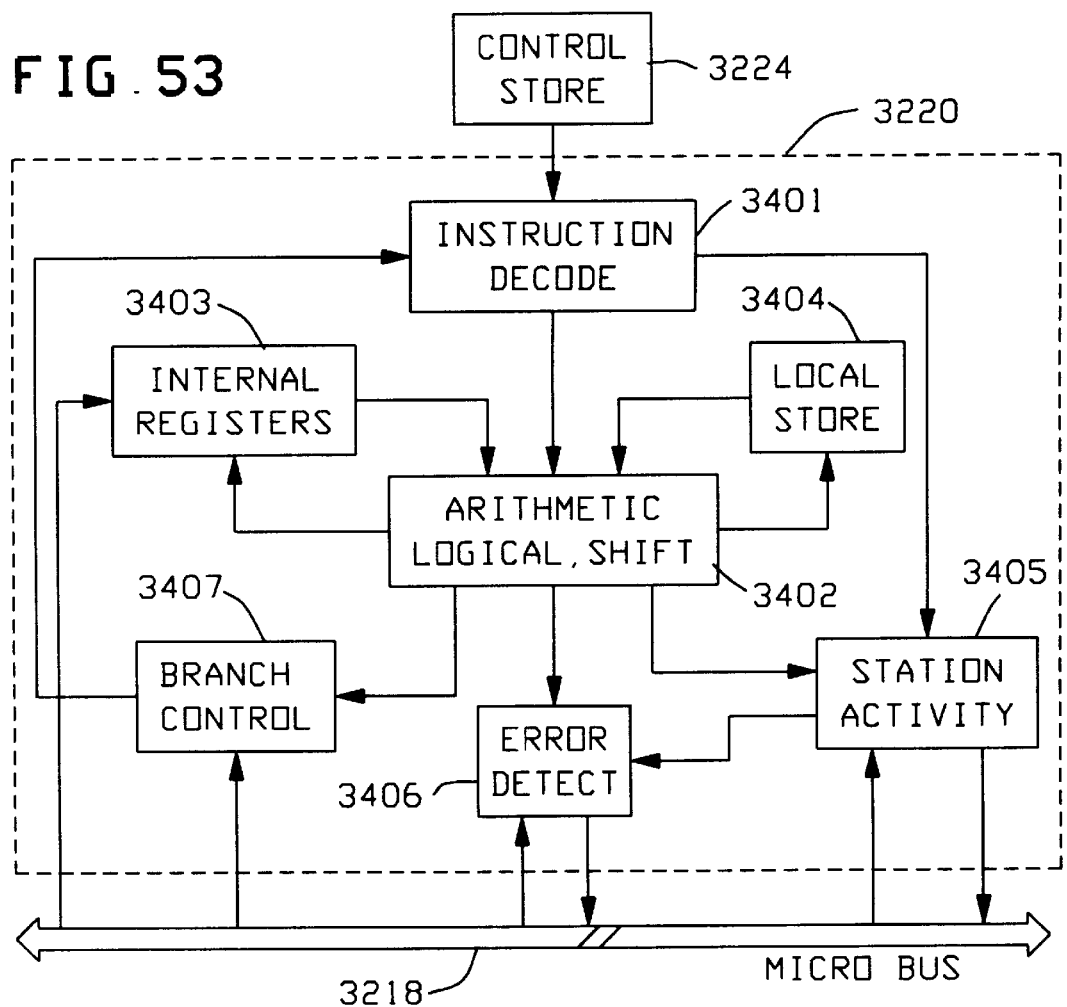
Figure 54:
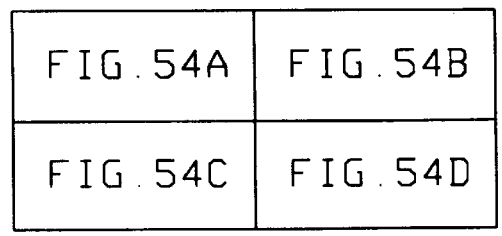
Figure 54A:
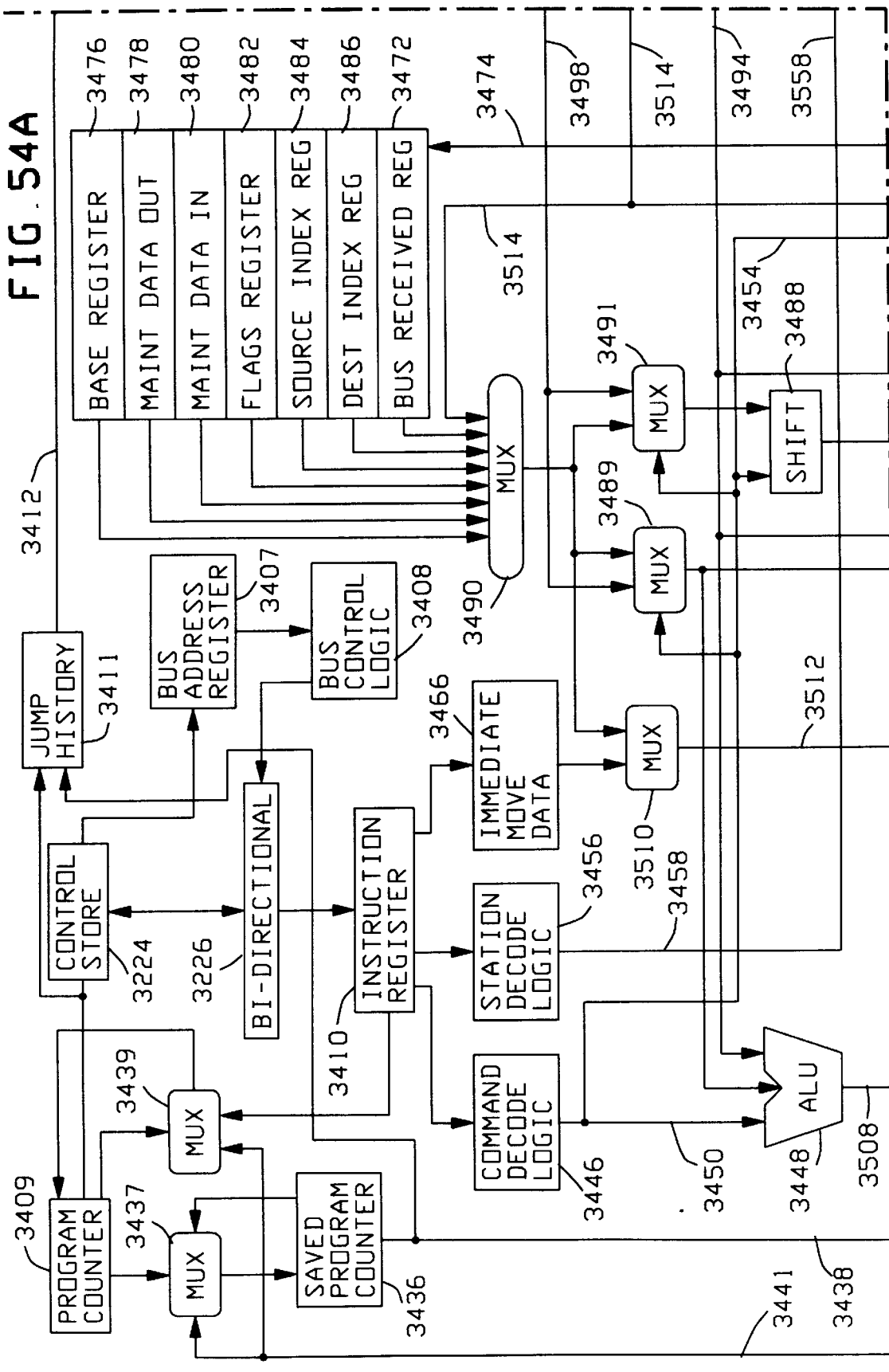
Figure 54B:
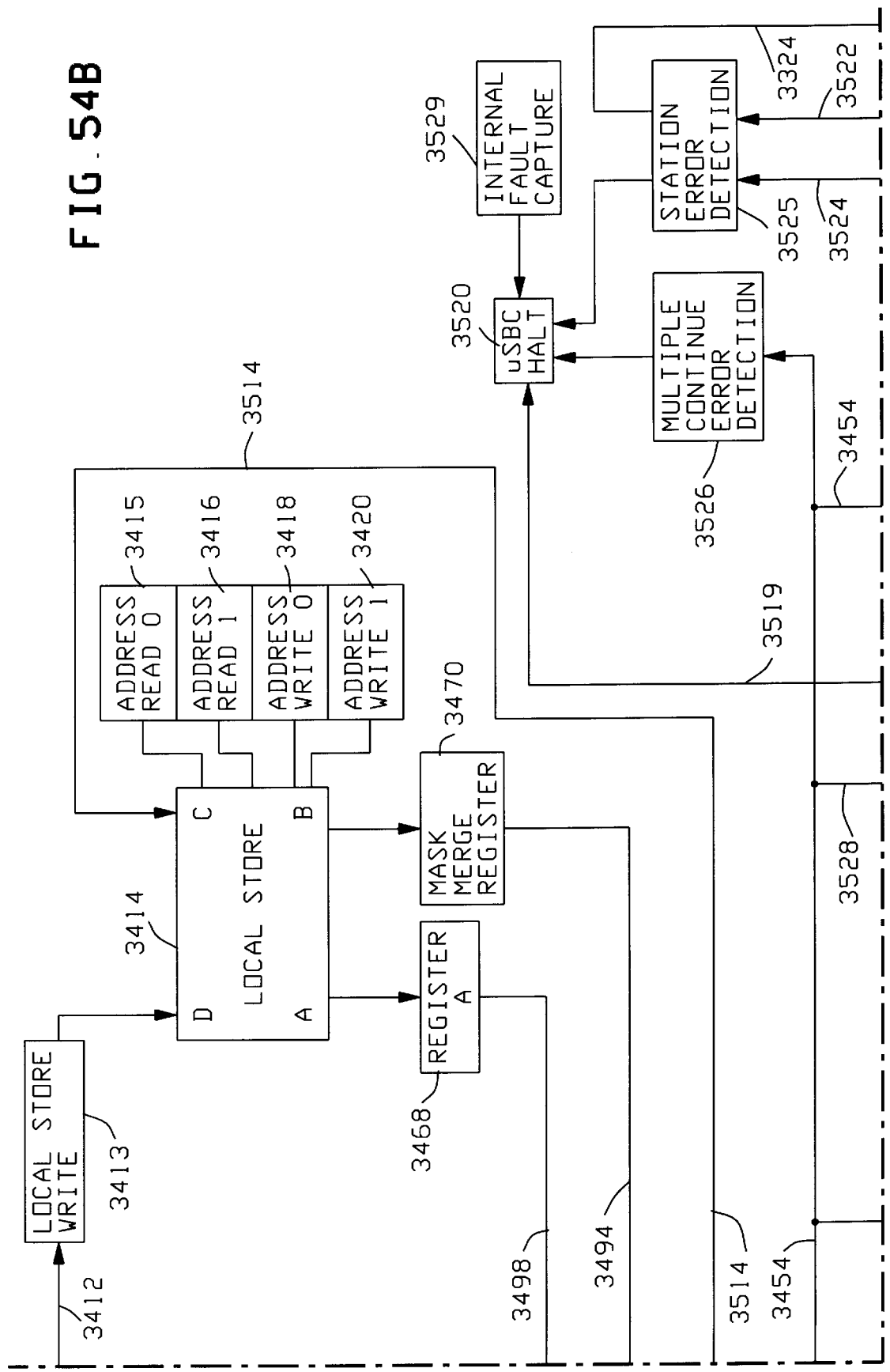
Figure 54C:
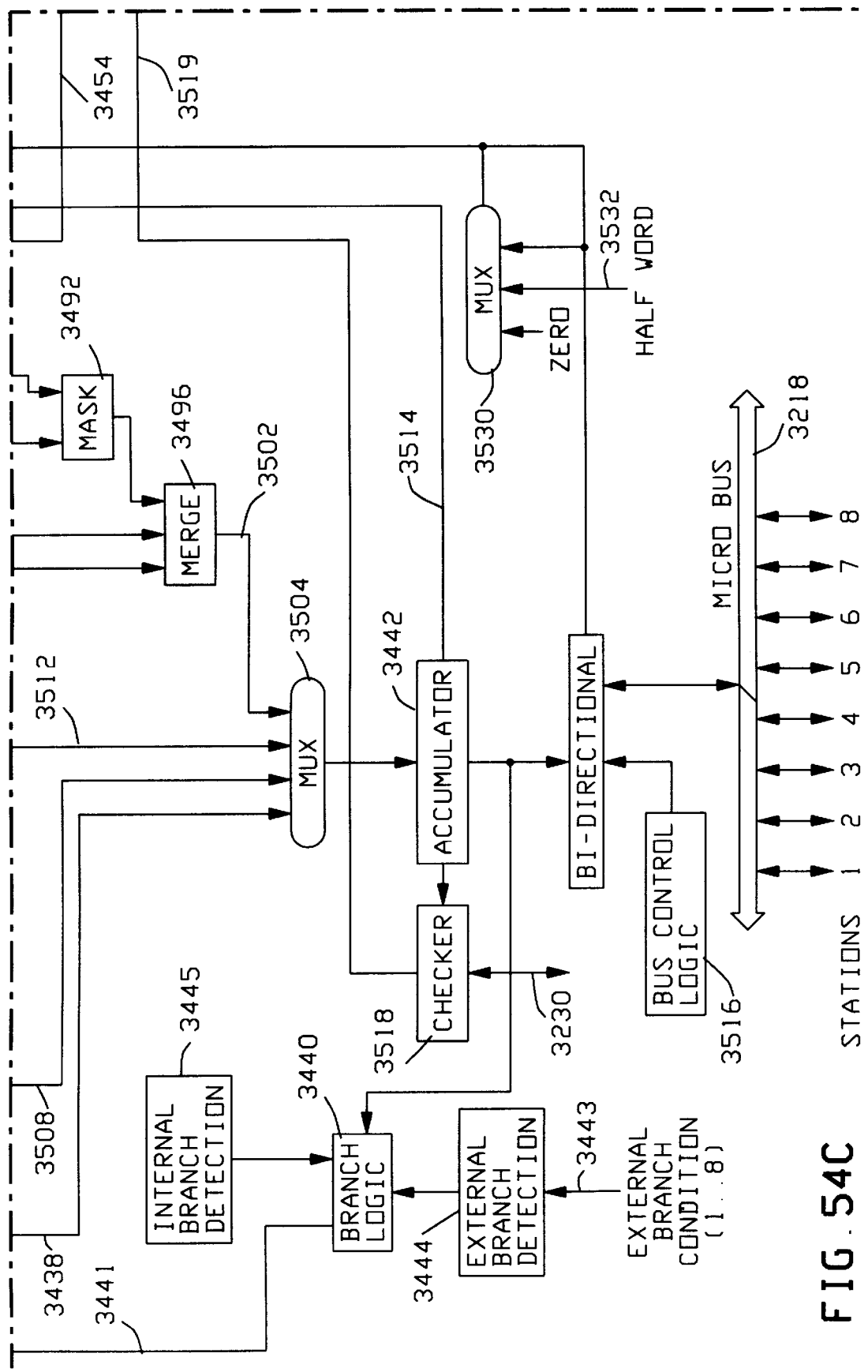
Figure 54D:
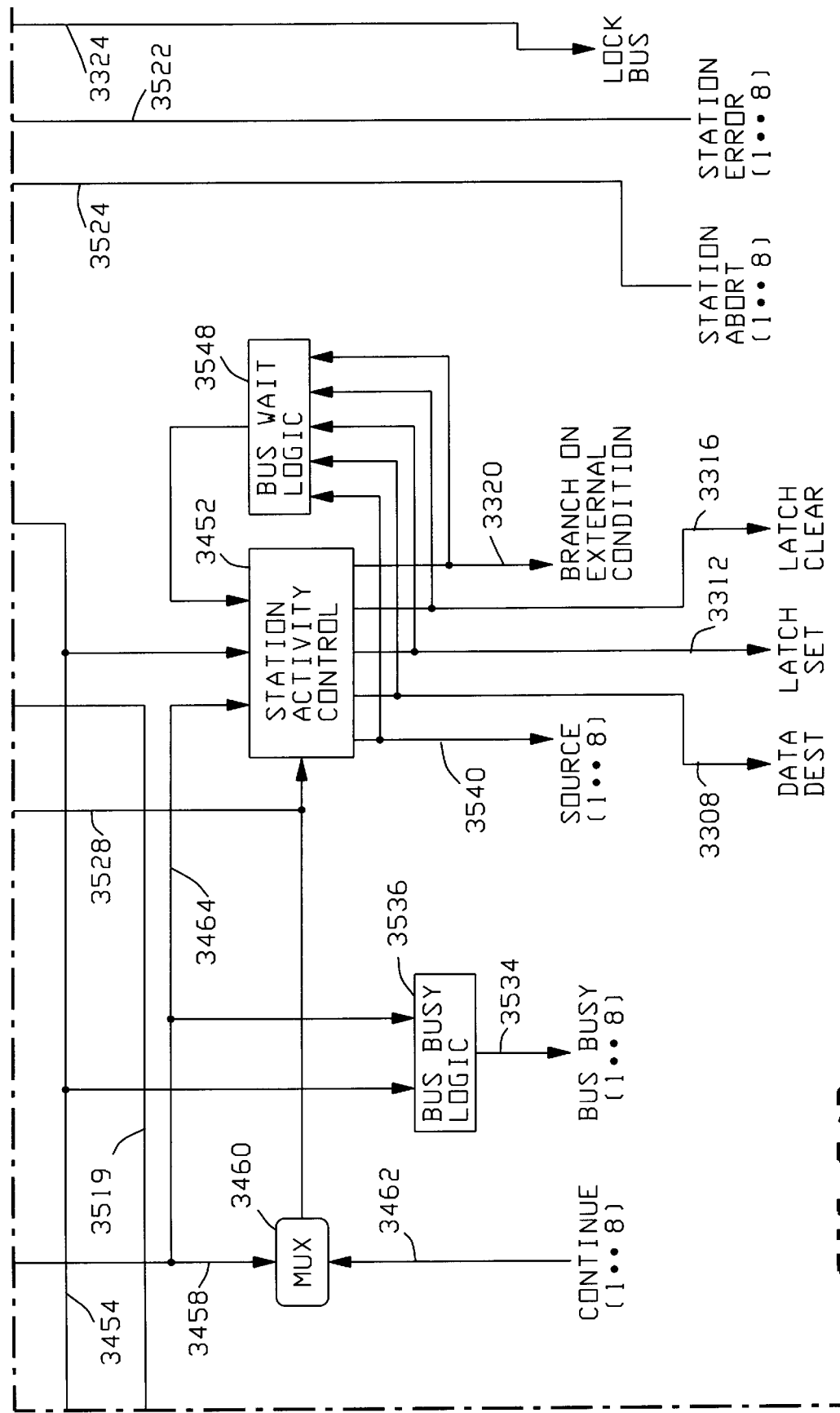
Figure 55:
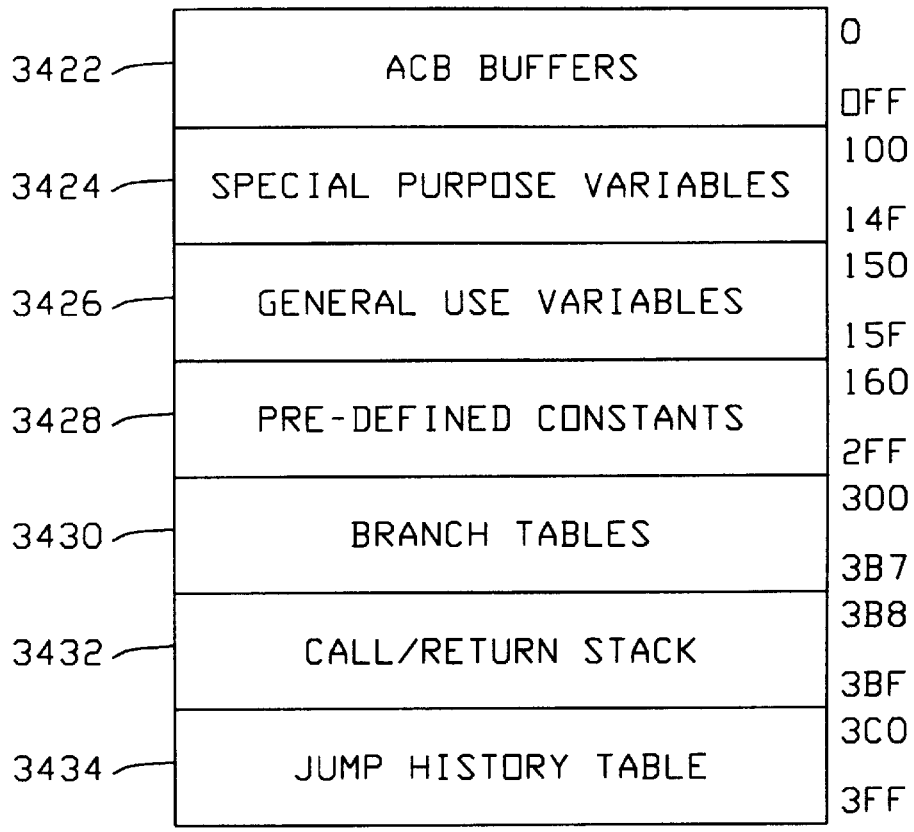
Figure 56:
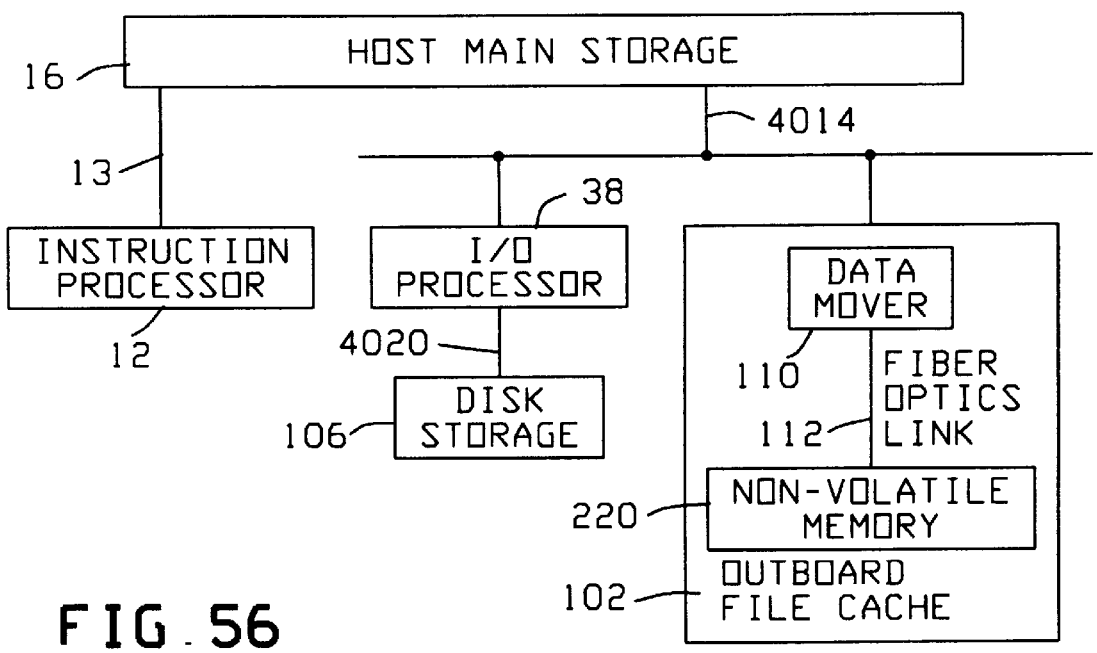
Figure 57:
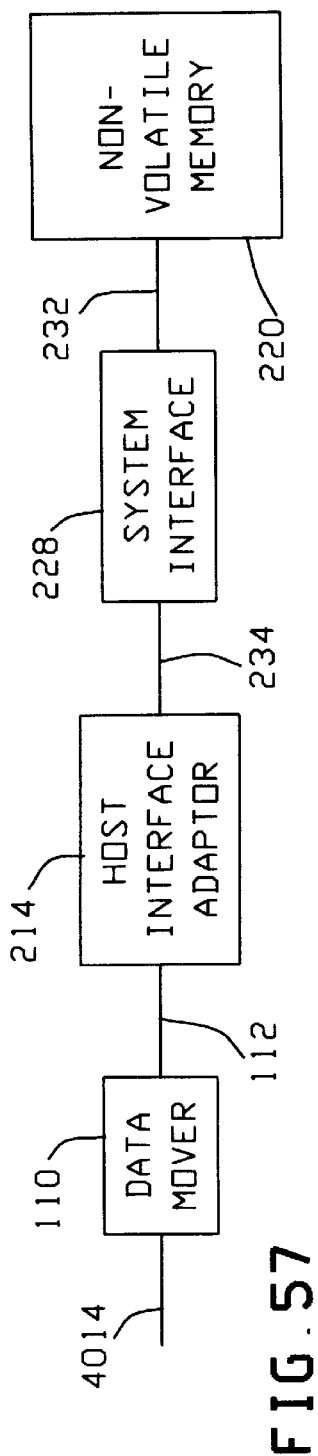
Figure 59:
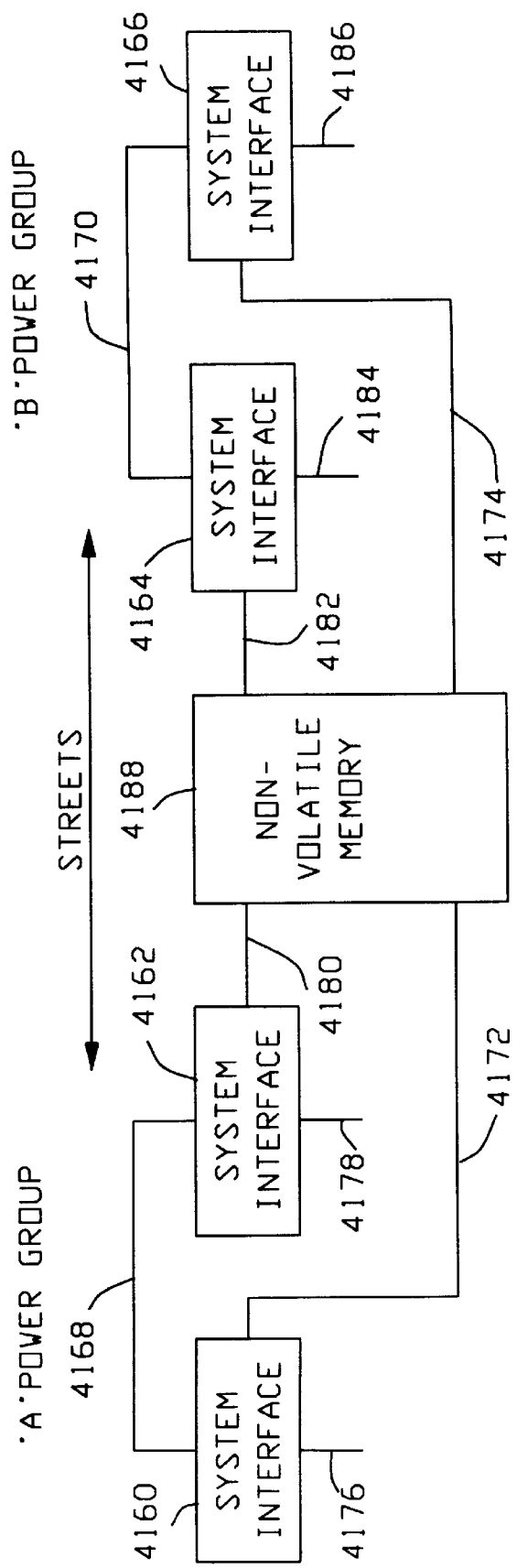
Figure 58:
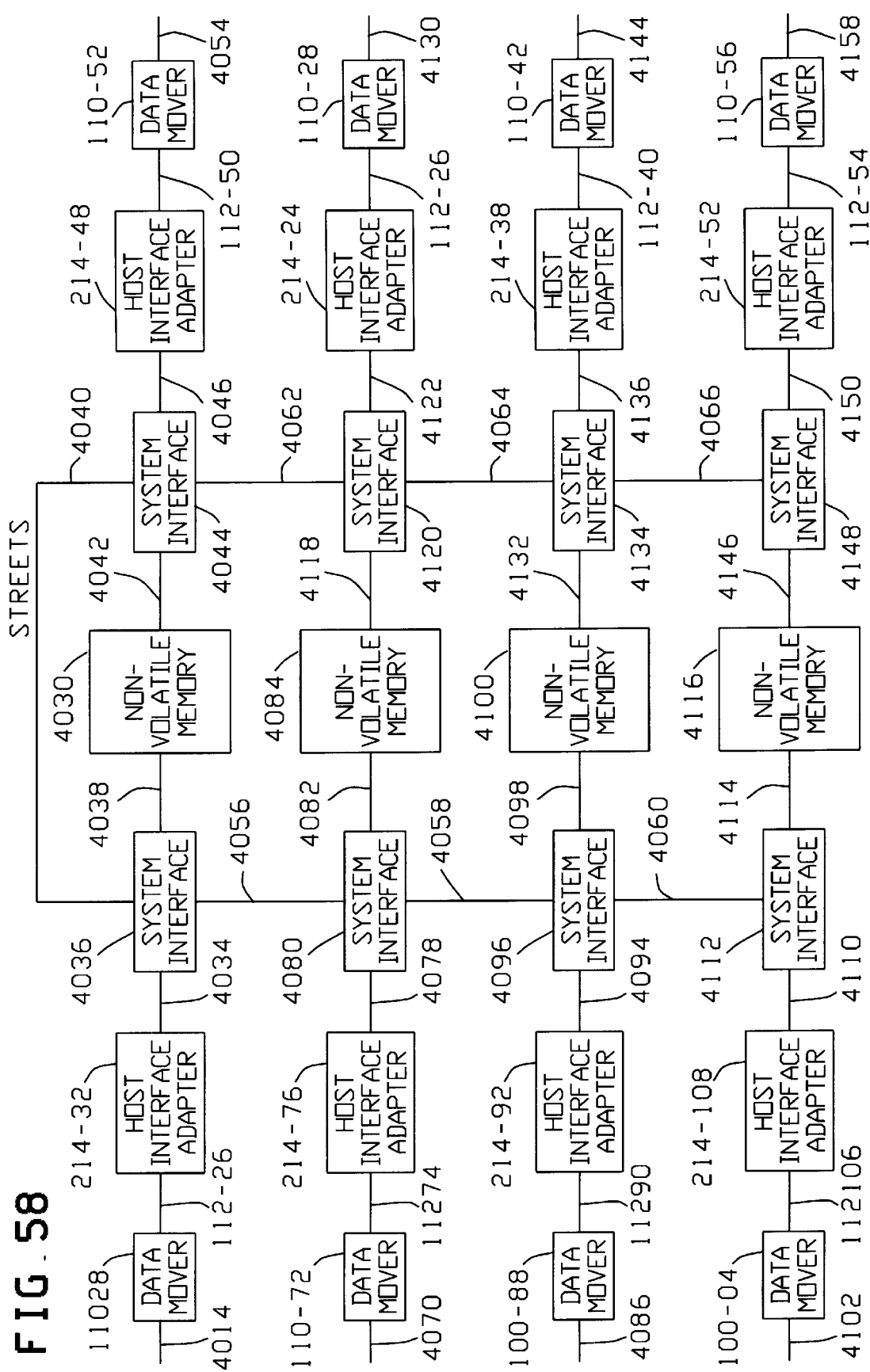
Figures 62, 63:
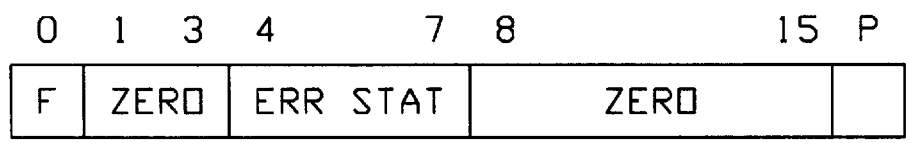
Figure 64:
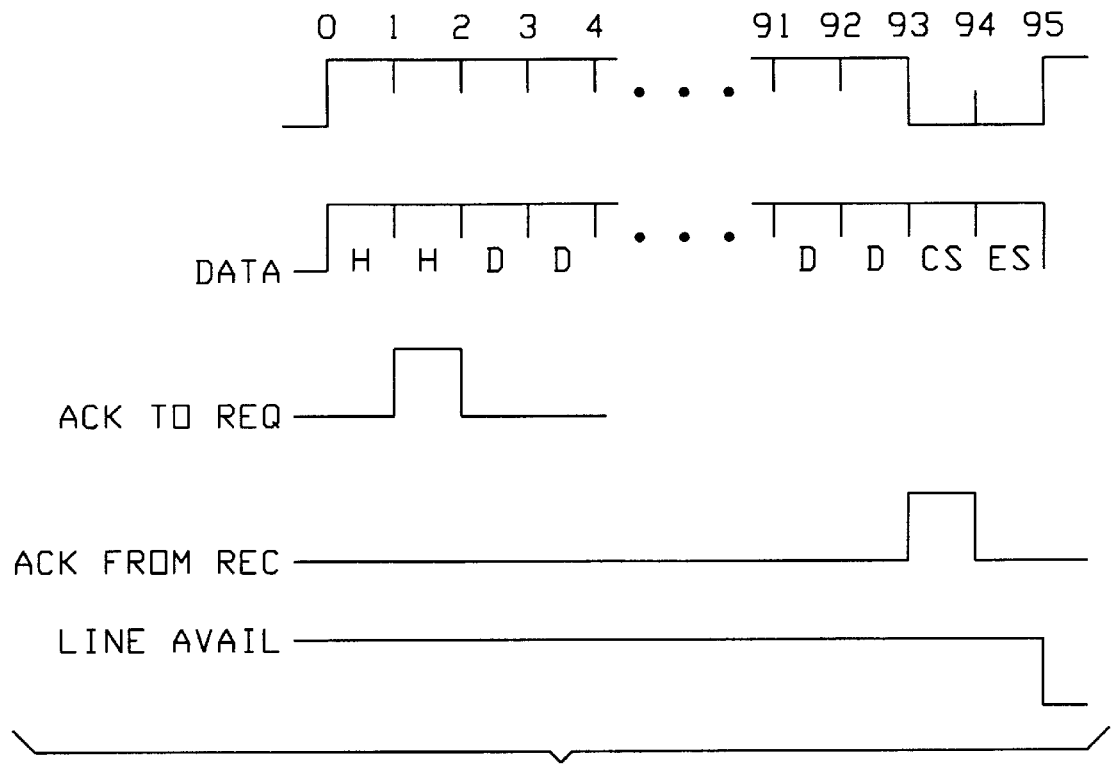
Figure 65:
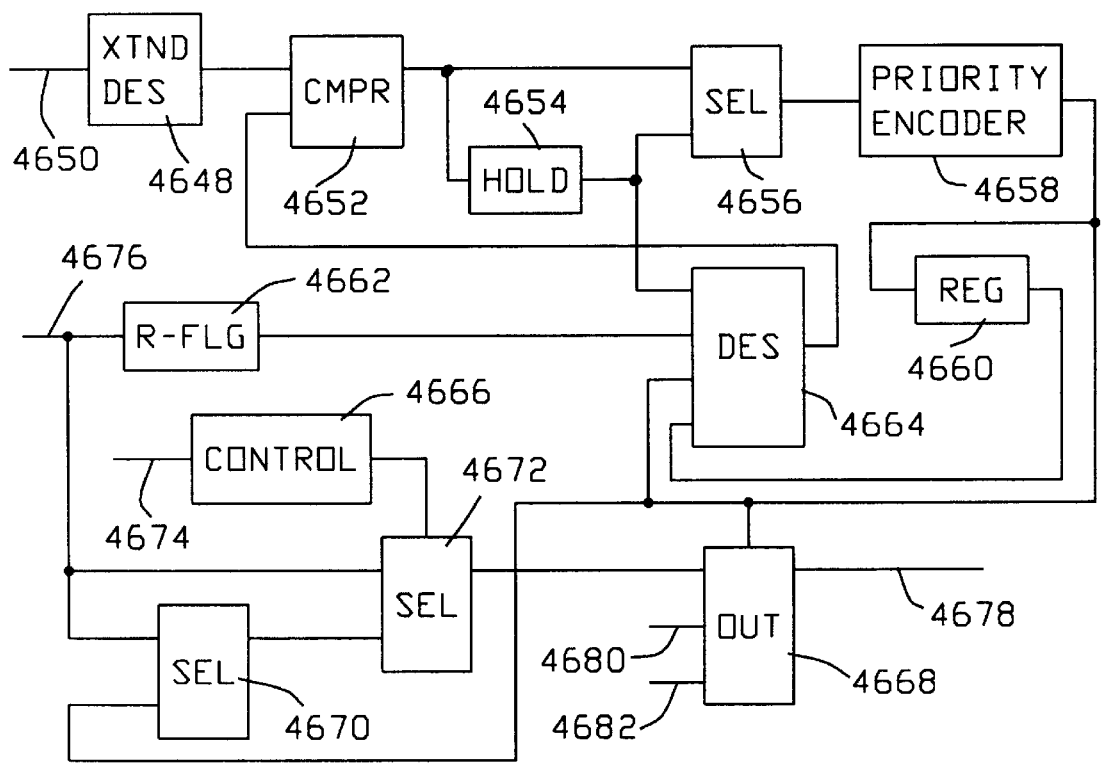

FIGS. 7, 7A, 7B, and 7C contain a data flow diagram illustrating the flow of data between each of the major functional components of the file cache system;

FIG. 8 shows the general layout of a Command Packet and the information contained therein;

FIG. 9 illustrates the Program Initiation Queue;

FIG. 10 shows the information contained in and the format of a Program Initiation Packet;

FIGS. 11 and 12 respectively illustrate the Status Packet Queue and the format and information contained in a Program Status Packet;

FIG. 13 illustrates the HIA ACB Buffer;

FIG. 14 illustrates Activity Queue, and FIG. 15 shows the information contained in each Activity Queue Entry;

FIG. 16 illustrates the file space available in the Outboard File Cache;

FIG. 17 shows the logical organization of a single Segment;

FIG. 18 shows the logical composition of a Block;

FIG. 19 shows the logical division between Cache File Space, Nail Space, and Resident File Space in the File Space of the Outboard File Cache;

FIG. 20 illustrates the File Descriptor Table;

FIG. 21 shows the information contained in a File Descriptor;

FIG. 22 is a flow chart of the general processing the I/O Software performs for file requests from Application Software;

FIG. 23 shows a flow chart of the FILE CACHE INTERFACE processing performed by the File Cache Handler Software;

FIG. 24 shows a flow chart of the general processing for detecting when the processing of a Command Packet (or a chain) is complete;

FIGS. 25, 25A, and 25B respectively show the components of a Data Mover (DM) and Host Interface Adapter (HIA);

FIG. 26 is a functional block diagram of the Index Processor (IXP);

FIG. 27 is a flow chart of the main processing loop of the IXP;

FIG. 28 is a block diagram to further illustrate the functional components of the Street interprocessor communication and storage access network within the Outboard File Cache;

FIG. 29 is an block diagram illustrating a data processing configuration including a plurality of Hosts coupled to a Outboard File Cache;

FIG. 30 is a block diagram of a clock distribution system where a plurality of clock sources powered by separate voltage busses are synchronized across the power domain boundaries in order to simultaneously clock an equal number of equivalent circuit loads;

FIG. 31 is a block diagram of the preferred embodiment of the Fault Tolerant Clock Distribution System;

FIG. 32 shows the Fault Tolerant Clock Distribution System when DC Power Source B or AC Power Source B has failed;

FIG. 33 is a waveform diagram which shows the Synchronized Clock Signals which supply each load, and which further illustrates how the Synchronized Clock Signal in a given power domain continues to clock its respective load upon the loss of the other Synchronized Clock Signal;

FIG. 34 illustrates the AC power source and DC power source redundancy of the preferred embodiment;

FIG. 35 is a block diagram showing the detail of the preferred embodiment;

FIG. 36 is a block diagram of Clock Source A in Power Domain A;

FIG. 37 is a block diagram of Clock Source B in Power Domain B;

FIG. 38 is a block diagram of the components of the Fiber Optic Interface;

FIG. 39 is a block diagram of the clock domains for one end of the Fiber Optic Interface;

FIG. 40 is a table of the symbols transferred from the Light Pipe Frame Control to the PLAYER+components;

FIG. 41 is a table of the symbols transferred from the PLAYER+components to the Light Pipe Frame Control;

FIG. 42 is a block diagram of the Transmitter logic of the Light Pipe Frame Control gate array;

FIG. 43 is a block diagram of the Receiver logic of the Light Pipe Frame Control gate array;

FIG. 44 is a block diagram of the Frame Transfer Facility gate array;

FIG. 45 is a block diagram of the Microsequencer Bus Controller System;

FIG. 46 is a block diagram illustrating the Data and Data Parity paths of the Micro Bus;

FIG. 47 shows the parity domain for the Data path of the Micro Bus when the Microsequencer Bus Controller System is a Data Mover;

FIG. 48 shows the parity domain for the Data path of the Micro Bus when the Microsequencer Bus Controller System is a Host Interface Adapter;

FIG. 49 is a block diagram illustrating the Address and Address Parity paths of the Micro Bus;

FIG. 50 is a block diagram showing how the parity domains for the Addresses on the Micro Bus are distributed;

FIG. 51 is a block diagram showing the two levels of Address Parity checking performed by the Microsequencer Bus Controller System;

FIG. 52 shows the format of an Address for the Micro Bus;

FIG. 53 is a block diagram of the main components of the Microsequencer Bus Controller;

FIG. 54, comprising FIG. 54A through FIG. 54D, is a detailed diagram illustrating the architecture of a Microsequencer Bus Controller;

FIG. 55 shows the allocation of the Local Store memory locations;

FIG. 56 is a block diagram of the Extended Processor Complex (XPC);

FIG. 57 is a block diagram of the outboard file cache System;

FIG. 58 is a block diagram of the interconnect of outboard file cache blocks;

FIG. 59 is a detailed block diagram of the interconnect between system interface cards and the Nonvolatile Memory;

FIG. 60 is a table containing the output priority scheme for the HUB0 and the HUB1 elements;

FIG. 61 is a diagram defining the HUB control format;

FIG. 62 is a diagram defining the Unit Identification field;

FIG. 63 is a diagram defining the HUB error status format;

FIG. 64 is a timing diagram for the basic interface for the transmission of one maximum length packet; and FIG. 65 is a block diagram showing the HUB Street priority circuitry.

V. DESCRIPTION OF THE PREFERRED EMBODIMENT

A. Host Data Processing System

Figure 1:
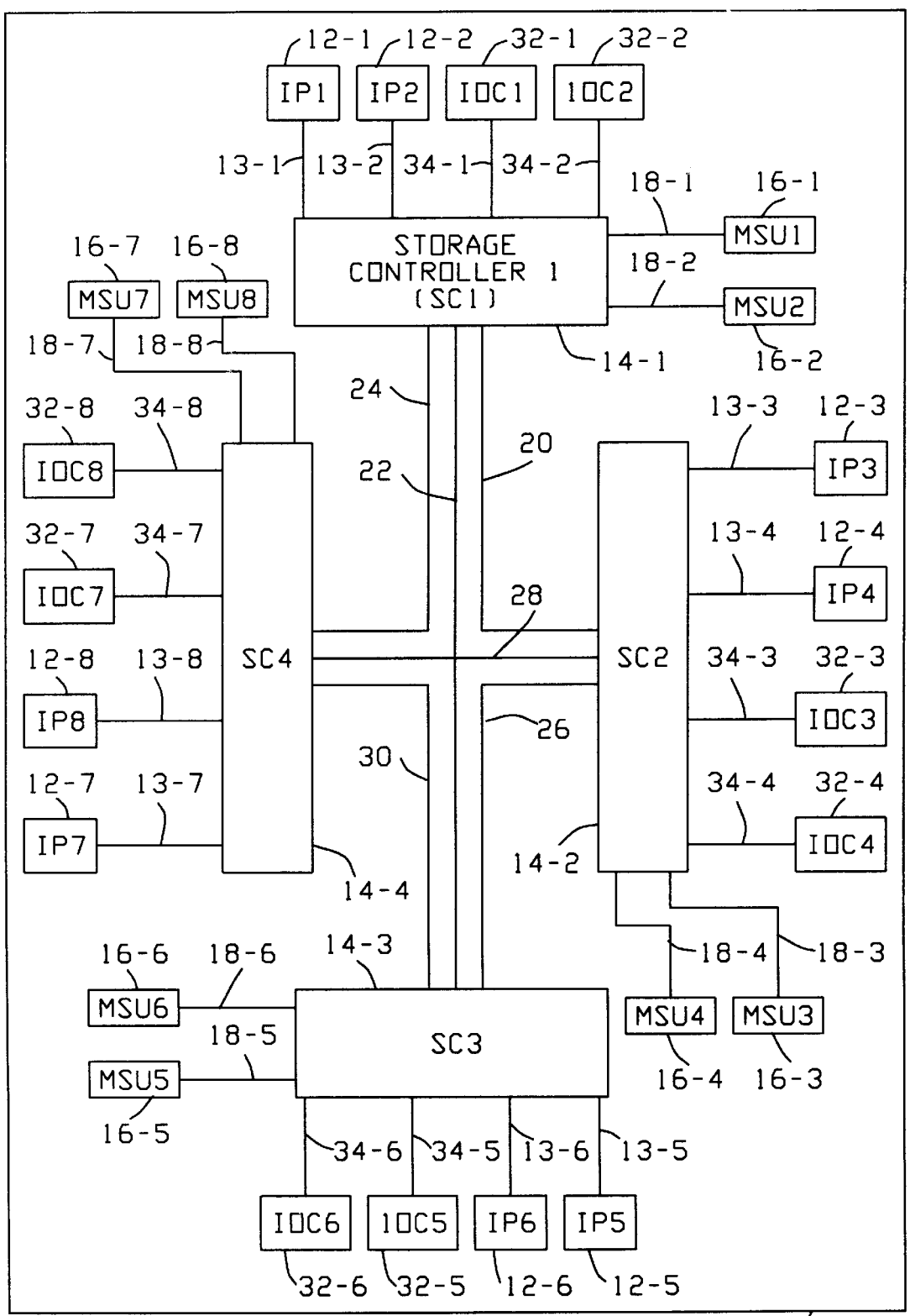
FIG. 1 shows an exemplary data processing system, or "host" or "host processing system", with which the present invention could be used.

FIG. 1 shows an exemplary data processing system, or "host", or "host processing system" with which the present invention could be used. The illustrative Host 10 architecture is that of the 2200/900 Series data processing system which is commercially available from the Unisys Corporation, it being understood that other instruction processor, input/output handling devices, and main memory systems, ranging from mainframe systems to workstation systems can function as the Host as used with this invention.

The Instruction Processors (IPs) 12 are the basic instruction execution units of the system. In this configuration there are eight IPs labelled 12-1 through 12-8, and a system may include one or more such IPs. Each IP includes a first level cache (not shown) having a section for instructions and a section for operands. The IPs 12 are functional to call instructions from memory, read data from memory, execute the instructions and store the results, and in general, perform data manipulation.

Each of the IPs 12 is directly coupled via Cables 13, labelled 13-1 through 13-8, respectively, to a Storage Controller (SC) 14, respectively labelled 14-1 through 14-2. The operation of the SC configuration is described in a co-pending patent application entitled DATA COHERENCY PROTOCOL FOR MULTILEVEL CACHED HIGH PERFORMANCE MULTIPROCESSOR SYSTEM, Ser. No. 07/762,276, filed Sep. 19, 1991, naming Kenichi Tsuchiya, Thomas Adelmeyer, Glen R. Kregness, Gary J. Lucas, Heidi Guck, and Ferris Price (Deceased), inventors, and assigned to the assignee of this invention. It is sufficient for this application that SCs are understood to provide control of communication between SCs, and between associated MSUS, IPs, and IOCs. One configuration for the 2200/900 data processing system includes four SCs 14, each SC having two directly coupled IPs 12. The SCs 14 each provide logic and interconnects which provide access to associated Main Storage Units (MSUs) 16, labelled 16-1 through 16-8. The MSUs comprise the high-speed main random access memory of the Host 10. Each SC 14 controls access to two associated directly coupled MSUs 16, and to two associated directly coupled IPs 12, and to two associated directly coupled IOCs 32. Cables 18 labelled 18-1 through 18-8 couple the MSUs to their respective SCs 14.

The SCs 14 contain interconnect logic that ties all IPs 12 together in a tightly coupled system. SC1 is coupled to SC2 via Cable 20; SC1 is coupled to SC3 via Cable 22; SC1 is coupled to SC4 via Cable 24; SC2 is coupled to SC3 via Cable 26; SC2 is coupled to SC4 via Cable 28; and SC3 is coupled to SC4 via Cable 30. Each IP 12 can address every MSU 16 of Host 10 via the SCs. For example, the SC intercoupling allows IP6 to have access to the addressable memory of MSU8. A memory request originating in IP6 is first sent to SC3 labelled 14-3; SC3 sends the memory request to SC4 labelled 14-4; SC4 provides access to the portion of addressable memory; and if requested, SC4 14-4 returns data to SC3 14-3 which in turn forwards the data to IP6.

Each of the SCs 14 also provide interfaces for two Input/Output Complexes (IOCs) 32, labelled 32-1 through 32-8. Cables 34 labelled 34-1 through 34-8 couple each of the IOCs 32 to their respective SCs 14. Each of the IOCs 32 may contain multiple Input/Output Processors (IOPs not shown). The IOPs read data from the MSUs 16 for writing to peripheral devices, and read data from peripheral devices for writing to the MSUs 16. Peripheral devices may include printers, tape drives, disk drives, network communication processors, etc.

The 2200 Series data processing architecture allows a Host 10 to be logically partitioned into one or more independent operating environments. Each independent operating environment is referred to as a partition. A partition has its own operating system software which manages the allocation of resources within the partition. Because a partition has its own operating system, it may be also referred to as a Host. Using Host 10 as an example, it could be partitioned into four Hosts: a first host having the resources accompanying SC1, a second host having the resources accompanying SC2, a third host having the resources accompanying SC3, and a fourth host having the resources accompanying SC4.

Figure 2:
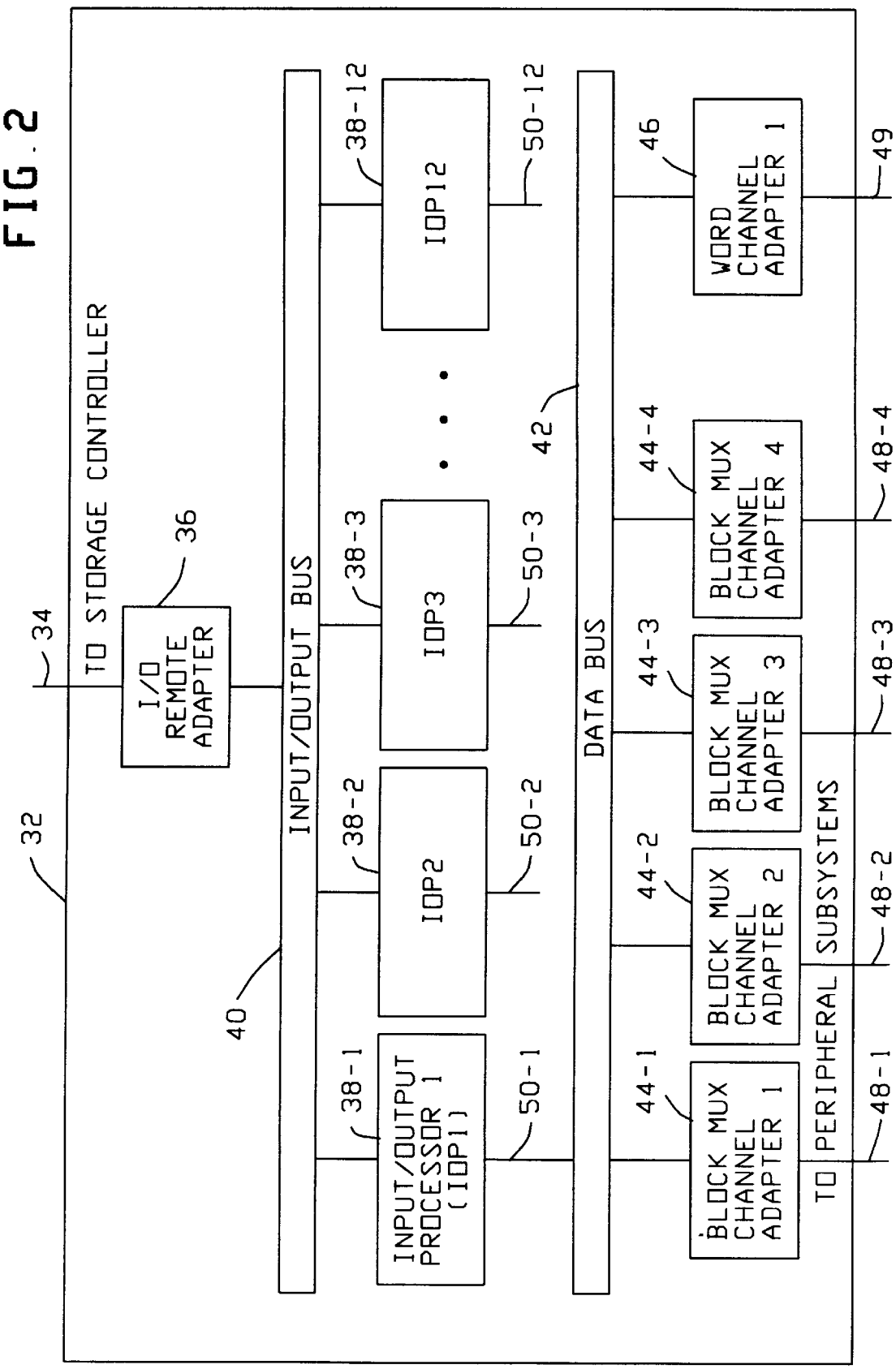
FIG. 2 shows the architecture of an Input/Output Complex of the exemplary Host.

FIG. 2 shows the architecture of an Input/Output Complex 32 of the exemplary Host. Input/Output Remote Adapter (IRA) 36 is a non-intelligent adapter which transfers data and messages between an associated SC 14 on cable 34 and an associated IOP 38 labelled 38-1 through 38-12, respectively, via an Input/Output Bus 40. The IRA 36 occupies one physical drop out of the thirteen available on Input/Output Bus 40 and has the highest priority of any unit connected to Input/Output Bus 40. IRA 36 does not participate in any rotational priority operations and can gain access to the Input/Output Bus 26 through the normal request process even when other units coupled to the Input/Output Bus are operating in a rotational priority mode.

The Input/Output Bus 40 provides the communication path and protocol to transfer data between the attached units. The Input/Output Bus 40 can accommodate twelve Input/Output Processors 38. It will be recognized that bus architectures are well known in the prior art and a further discussion of the Input/Output Bus shown is not necessary for the purposes of the present invention.

The IOPs 38 are microprocessor controlled units that control the initiation, data transfer, and termination sequences associated with software generated I/O channel programs. Initiation and termination sequences are executed by the microprocessor (not shown) and data transfer is controlled by hard-wired logic (not shown). Each IOP 38 is coupled to a Data Bus 42, which in turn has available slots for up to four Block Mux Channel Adapters 44, labelled 44-1 through 44-4 and a Word Channel Adapter 46. Channel Adapters 44 and 46 are coupled to their respective peripheral subsystems via Cables 48, labelled 48-1 through 48-4 and Cable 49. It should be understood that each of IOP2, IOP3, . . . , and IOP12 is coupled to its associated Data Bus (not shown). The other 11 Data Buses which are not shown, provide connections for additional Channel Adapters. Lines 50, labelled 50-1 through 50-12, represent the coupling between IOP1, IOP2, IOP3, . . . , and IOP12 and their associated Data Buses.

B. Prior Art Data Storage Hierarchy

Figure 3:
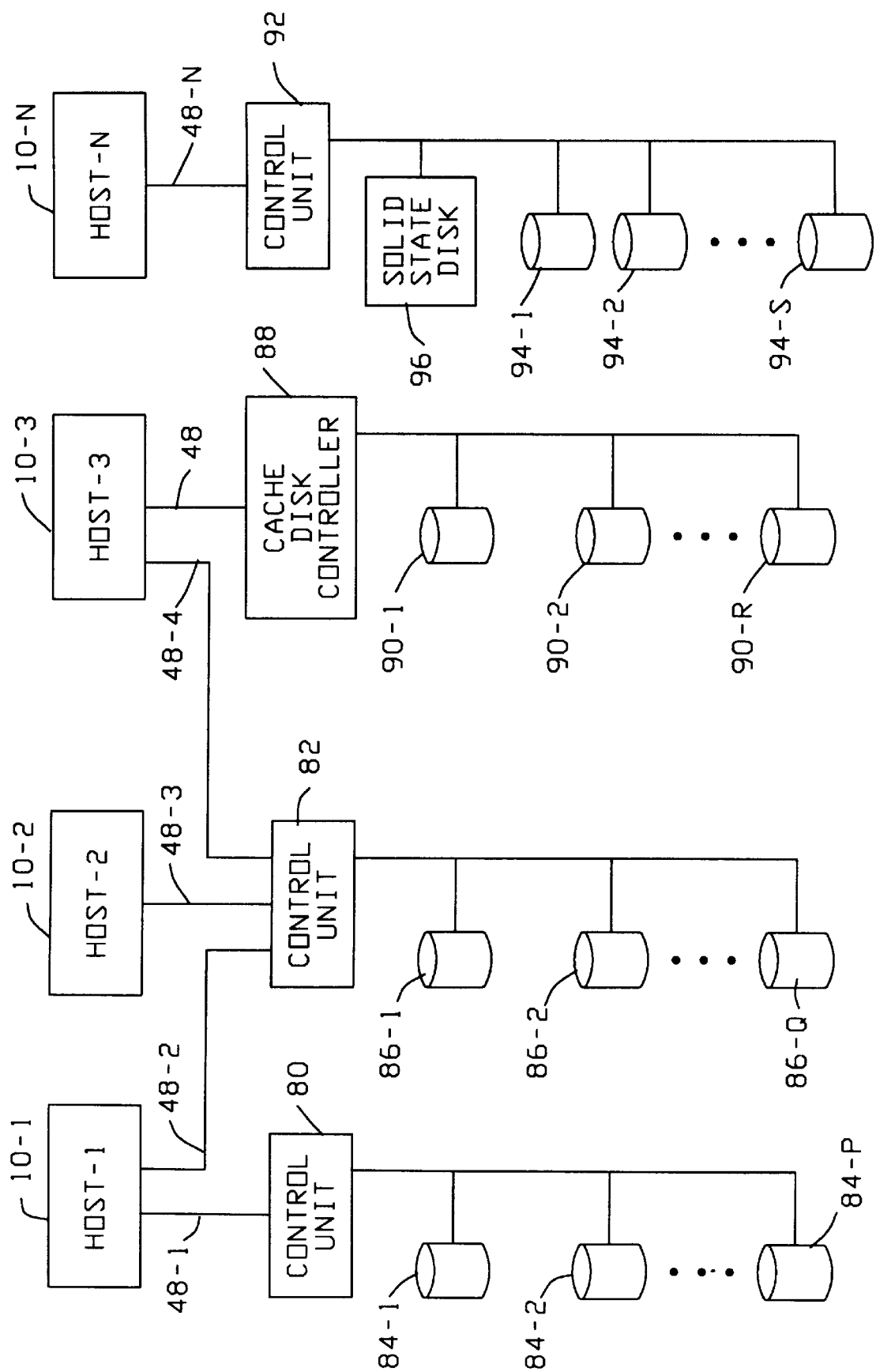
FIG. 3 is a block diagram of a plurality of Hosts coupled to a variety of prior art disk subsystem configurations.

FIG. 3 is a block diagram of a plurality of Hosts coupled to a variety of prior art disk subsystem configurations. FIG. 3 serves to illustrate the hierarchical relationship between the configurations. Each Host 10 labelled 10-I through 10-N is coupled to one or more of the Control Units 80, 82, 88, or 92 by Cables 48, labelled 48-I through 48-N. Host-1 is coupled to Control Units 80 and 82. Control Unit 80 provides access to Magnetic Disks 84, labelled 84-I through 84-P and Control Unit 82 provides access to Magnetic Disks 86, labelled 86-I through 86-Q. If application software on Host-1 requests access to a file stored on any Magnetic Disks 84 or 86, operating system software is required to find: (1) the Disk 84 or 86 on which the file is stored; (2) which Control Unit 80 or 82 provides access to the Identified Magnetic Disk; (3) the IOP 38 (see FIG. 2) to which the selected Control Unit is coupled; and (4) the Input/Output Bus 40 to which the IOP 38 is coupled. Once the necessary information is determined, a control program can be constructed and sent along the identified data path to provide access to the file. File data may be buffered in the Main Storage 16 of Host-1 to enhance the retrieval rate for file data; however, the file data must be written back (destaged) to appropriate Disks 84 or 86 to protect against data loss.

Control Unit 82 is coupled to and shared by Host-1, Host-2, and Host-3. Each of the coupled Hosts can gain access to data stored on Disks 86-I through 86-Q. A Multi-Host File Sharing (MHFS) system (not shown), which is commercially available from Unisys Corporation, allows application software on Host-1, Host-2, and Host-3 to share file data stored on Disks 86 and coordinates locking files or portions thereof.

Host-3 is coupled to Cache Disk Controller 88. Cache Disk Controller 88 provides access to Disks 90, labelled 90-I through 90-R, and buffers portions of Disks 90. The cache storage (not shown) that Cache Disk Controller 88 uses to buffer Disks 90 resides within the Cache Disk Controller 88. This configuration is an example of the cache disk subsystem described in U.S. Pat. No. 4,394,733 mentioned above, and is a prior attempt to remove caching overhead and burden from the IPs, through it can be seen that such a configuration is still in the data path of the IOCs in the illustrative configuration. Operation of the Cache Disk Controller 88 is transparent to application and system software on Host-3. The cache storage is allocated to all application and system software having access to files stored on Disks 90 on a first-come first-served basis.

Control Unit 92 is coupled to Host-N and controls access to Disks 94 labelled 94-I through 94-S, and a Solid State Disk 96. The Solid State Disk 96 resides at the Disk 94 level of the data storage hierarchy and provides access to data stored therein at electronic rather than the electromechanical speed of the Disks 94. In order to gain access to data stored on Solid State Disk 96, the data path on which the disk resides must be constructed in the same manner as discussed above for Disks 84.

C. File Cache System Overview

Figure 4:
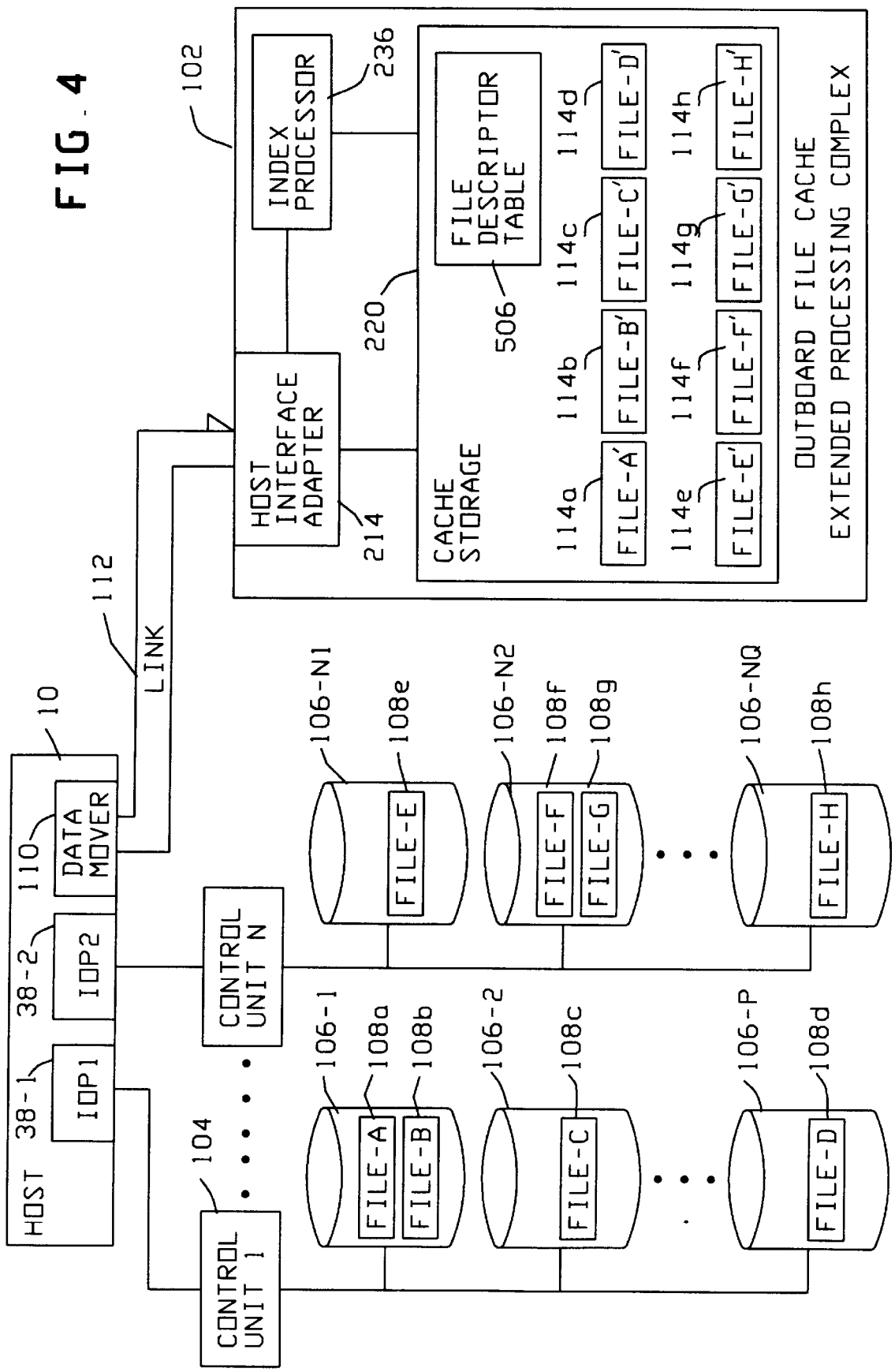
FIG. 4 illustrates an Outboard File Cache in a data storage hierarchy.

FIG. 4 illustrates an Outboard File Cache in a data storage hierarchy. A plurality of Control Units 104 labelled 104-I . . . 104-N, are coupled to Host 10 via IOPs 38-1 and 38-2 for providing access to Disks 106-1, 106-2, . . . 106-P and 106-N1, 106-N2, . . . 106-NQ. Application and system software executing on Host 10 reads data from and writes data to Files 108*a*–h. While Files 108*a*–h are depicted as blocks it should be understood that the data is not necessarily stored contiguously on the Disks 106. The Disks provide a backing store for retaining the Files. In the storage hierarchy, disks would fall into the category of secondary storage, with primary storage being the main memory of a Host.

Extended Processing Complex (XPC) 102 is an outboard file cache that provides cache storage for Files 108*a*–h which is comparable to Disks 108, with resiliency against data loss. A Data Mover 110 is coupled to the Input/Output Bus 40 (see FIG. 2) in the Host and provides a functionality which is similar to the IOPs 38-1 and 38-2. The Data Mover in Host 10 provides a closely coupled direct high-speed communications Link 112 to the XPC. In the preferred embodiment Link 112 includes a Fiber Optic Interface that will be described in more detail below. All or part of Files 108 may be stored in the XPC 102 depending upon the storage capacity of the Outboard File Cache 102, and the size and number of Files 108 selected to be cached.

The portion of Files 108*a*–h that are stored in the outboard file cache of XPC 102 are shown as blocks 114*a*–h. The cached portion of respective Piles 108 are labeled File-A', File-B', . . . , File-H' for discussion purposes. File-A' 114*a* is all or the portion of File-A that is stored in outboard file cache 102, File-B' 114*b* is all or the portion of File-B that is stored in outboard file cache of XPC 102, and so on for Files C through H, respectively. The outboard file cache at this level of the storage hierarchy allows references to cached files to be immediately directed to the outboard file cache XPC 102 for processing, in contrast with a non-cached file where an I/O channel program must be constructed to access the proper disk and the request and data must flow through a possibly lengthy data path.

Figure 5:
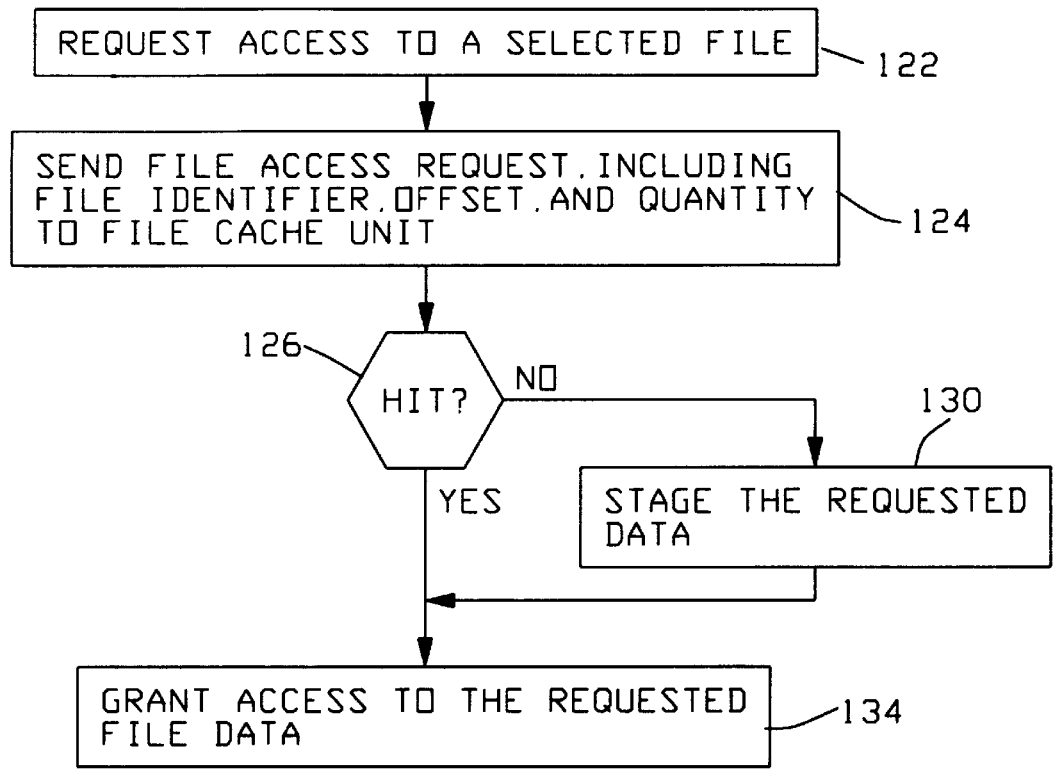
FIG. 5 shows the overall file processing within the data storage hierarchy shown in FIG. 4.

FIG. 5 shows the overall file processing within the data storage hierarchy shown in FIG. 4. The processing begins at Step 122 where a software application executing on Host 10 requests access to a selected file. The access request may involve either reading data from or writing data to the selected file.

A file access command is sent to the outboard file cache XPC 102 at Step 124. Included in the file access command are a file identifier which specifies the file on which the operation is to be performed, an offset from the beginning of the file which specifies precisely where in the file the operation is to begin, and the quantity of data which is to be read from or written to the file. At Decision Step 126, the outboard file cache XPC determines whether the referenced data is present in the outboard file cache based on the file identifier, offset, and quantity. If the referenced data is not in the outboard file cache 102, Control Path 128 is followed to Step 130.

Step 130 involves staging the data from the appropriate Disk 106 (see FIG. 4) to the outboard file cache XPC 102. Staging the data involves reading the required data from a selected Disk and then storing the data in the outboard file cache. Subsequent references to the staged data normally will not result in a miss, and the data can be accessed in the Outboard File Cache. If Decision Step 126 finds that the referenced data is in Outboard File Cache 102, Control Path 132 is followed to Step 134 where access is granted to the referenced data.

1. Functional Block Diagram

Figure 6:
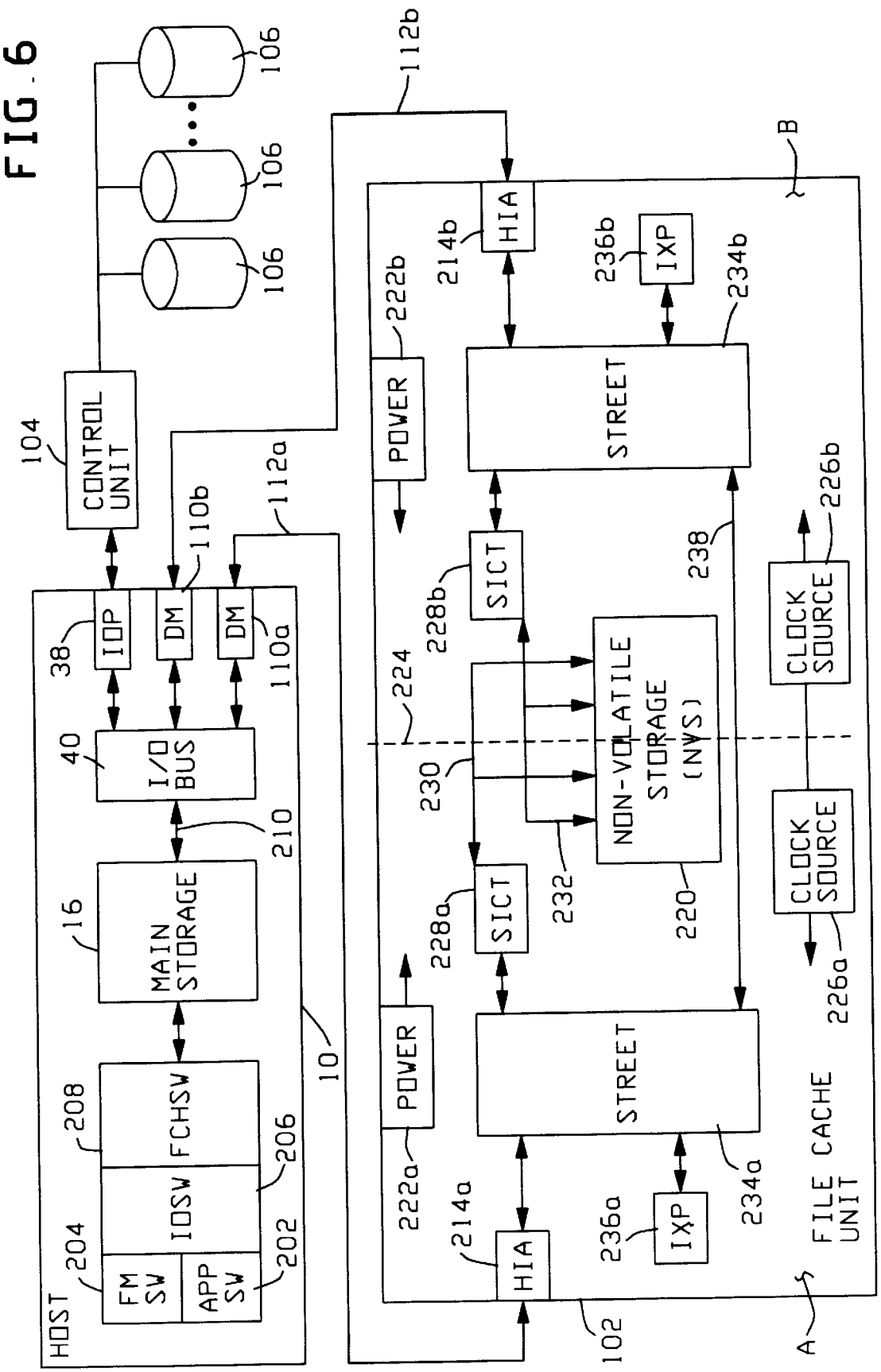
FIG. 6 is a functional block diagram of the hardware and software components of the preferred embodiment of the outboard file cache system.

FIG. 6 is a functional block diagram of the hardware and software components of the preferred embodiment of the outboard file cache system. The overall system is comprised of hardware and software elements in both the Host 10 and outboard file cache XPC 102. The software on Host 10 is shown by blocks 202, 204, 206, and 208. The blocks are joined to signify the interrelationships and software interfaces between the software elements. The software elements or programs are stored in the Main Storage Unit(s) 16 (see FIG. 1) for execution. Programs may be loaded from Disk(s) 106 (see FIG. 4). The software programs are executed by IP(s). Operating system software (not shown) directs and controls performance of the various software elements.

Application Software 202 provides data processing functionality to end users and includes applications such as bank transaction processing and airline reservations systems. Data bases maintained by Application Software 202 may be stored in one or more the exemplary Files 108 as shown in FIG. 4. File Management Software 204, Input/Output Software 206, and File Cache Handler Software 208 are all part of the operating system (not shown). In general File Management Software 204 provides overall management of file control structures, and in particular handles the creating, deleting, opening, and closing of files.

Input/Output Software 206 provides the software interface to each of the various I/O devices coupled to the Host 10. While not illustrative specification, the I/O devices may include network communication processors, magnetic disks, printers, magnetic tapes, and optical disks. Input/Output Software 206 builds channel programs, provides the channel programs to the selected appropriate IOP 38, and returns control to the requesting program at the appropriate time.

File Cache Handler Software 208 coordinates the overall processing for cached files. In general, File Cache Handler Software 208 provides the operating system level interface to the outboard file cache XPC 102, stages file data from Disks 106 to the outboard file cache XPC 102, and destages file data from the outboard file cache XPC 102 to Disks 106. The File Cache Handler Software 208 provides file data and file access commands to the hardware interface to the outboard file cache via Main Storage 16. Main Storage 16 is coupled to the Input/Output Bus 40 by Line 210. Line 210 logically represents the Storage Controller 14 and Input/Output Remote Adapter 36 of FIGS. 1 and 2.

A Data Mover (DM) 110a provides the hardware interface to the outboard file cache XPC 102. While two DMs 110a and 110b are shown, the system does not require two DMs for normal operations. A configuration with two DMs processing identical cache functions provides fault tolerant operation; that is, if DM 110a fails, DM 110b is available to process file requests. Each of the DMs is coupled to the Input/Output Bus 40 of Host 10. File Cache Handler Software 208 distributes file access commands among each of the DMs coupled to Input/Output Bus 40. If DM 110a fails, file access commands queued to DM 110a can be redistributed to DM 110b.

The DMs 110a and 110b provide functionality which is similar to the IOPs 38 (see FIG. 2), that is to read data from and write data to a peripheral device. The DMs can read from and write to Main Storage 16 without the aid of IPs 12. The DMs coordinate the processing of file access commands between File Cache Handler Software 208 and the outboard file cache XPC 102 and move file data between Main Storage 16 and the outboard file cache. Each of the DMs is coupled to an associated Host Interface Adapter (HIA) 214 logic section within the outboard file cache XPC 102. DM 110a is coupled to HIA 214a by a pair of fiber optic cables shown as Line 112a, and DM 110b is coupled to HIA 214b by a second pair of fiber optic cables shown as Line 112b. The fiber optic interconnection will be described in more detail below.

The outboard file cache XPC 102 is configured with redundant power, redundant clocking, redundant storage, redundant storage access paths, and redundant processors for processing file access commands, all of which cooperate to provide a fault tolerant architecture for storing and manipulating file data. The outboard file cache XPC 102 is powered by dual Power Supplies 222a and 222b, which provide independent power domains within the XPC. The portion of the XPC to the left of dashed line 224 is powered by Power Supply 222a and is referred to as Power Domain A, and the portion of the XPC to the right of dashed line 224 is powered by Power Supply 222b and is referred to as Power Domain B. Each of Power Supplies 222a and 222b has a dedicated battery and generator backup (not shown) to protect against loss of the input power source.

Two separately powered Clock Sources 226a and 226b provide timing signals to all the logic sections of outboard file cache XPC 102. Clock Source 226a provides timing to the logic sections within Power Domain A and Clock Source 226b provides timing to the logic sections within Power Domain B. Redundant oscillators within each Clock Source provide protection against the failure of one, and Clock Sources A and B are synchronized for consistent timing across Power Domains A and B. The clock distribution system will be described in more detail below.

Non-Volatile Storage (NVS) section 220 includes multiple DRAM storage modules and provides the file cache memory. Half of the storage modules are within Power Domain A and the other half are within Power Domain B. The data stored within the storage modules in Power Domain B reflects the data stored in storage modules within Power Domain A. NVS 220 thereby provides for redundant storage of cached file data and the control structures used by the outboard file cache XPC 102. The redundant storage organization provides for both single- and multiple-bit error detection and correction according to techniques that are known in the prior art.

The portions of NVS 220 within each of the Power Domains A and B are each coupled to two Storage Interface Controllers (SICTs) 228a and 228b. While only two SICTs are shown in FIG. 6, each half of NVS 220 is addressable by up to four SICTs. Line 230 represents the coupling between SICT 228a and the portion of NVS 220 within each of Power Domains A and B. Similarly, Line 232 represents the coupling between SICT 228b and NVS 220.

Read and write requests for NVS 220 are sent to the SICTs 228a and 228b via Street Networks 234a and 234b. The Street Network provides the data transfer and interprocessor communication between the major logic sections within the outboard file cache XPC 102. The Street Network is built to provide multiple requesters (HIAs 214a and 214b or Index Processors 236a and 236b) with high bandwidth access to NVS 220, as well as multiple paths for redundant access. Crossover 238 provides a path whereby NVS 220 requests may be sent from Street 234a to Street 234b, or visa versa, if a SICT is unavailable. For example, if SICT 228a fails, NVS requests sent from requesters (HIAs and IXPs) are sent to Street 234b via Crossover 238, whereby NVS 220 access is provided by SICT 228b. The Street Network will be described in more detail below.

The HIAs 214a and 214b (Host Interface Adapters) provide functionality in the outboard file cache XPC 102 which is similar to the functionality provided by the DMs 110a and 110b (Data Movers) on the Host 10. In particular, the HIAs receive file access commands sent from the DM and provide general cache access control such as writing file data sent from the Host to Non-Volatile Storage (NVS) 220 and reading file data from NVS and sending it to the Host. The HIAs also contain the logic for sending and receiving data over fiber optic Lines 112a and 112b.

Index Processors (IXPs) 236a and 236b manage allocation and cache replacement for the storage space available in NVS 220, service file data access commands sent from Host 10, and generally provides for overall file cache management. The IXPs contain microcode control for detecting whether the file data referenced in a file data access command is present in the cache memory, and for managing and coordinating access to the cache memory. The functionality provided by an IXP will be discussed in greater detail later in this specification.

2. Data Flow

Figure 7B:
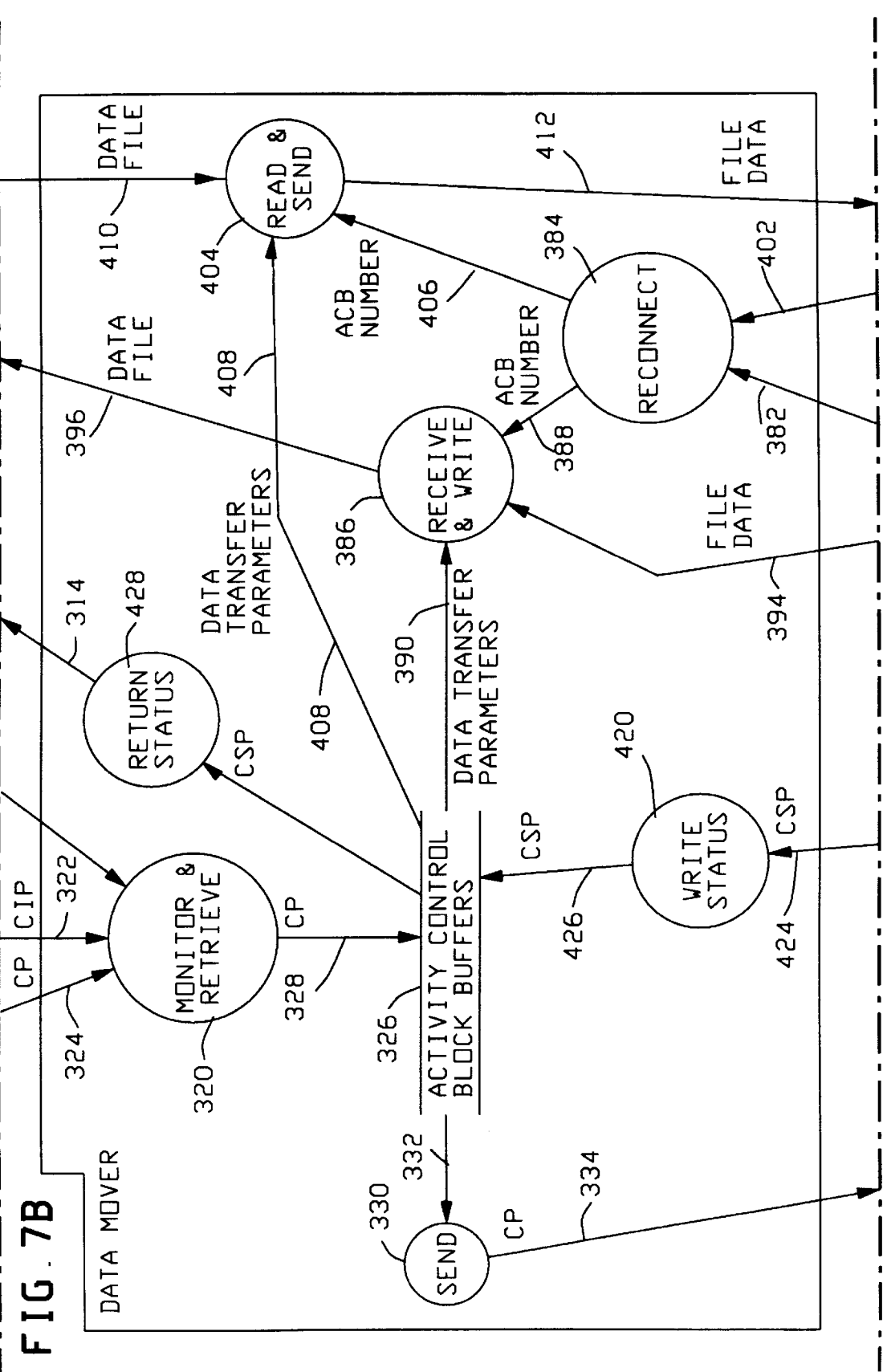
Figure 7C:
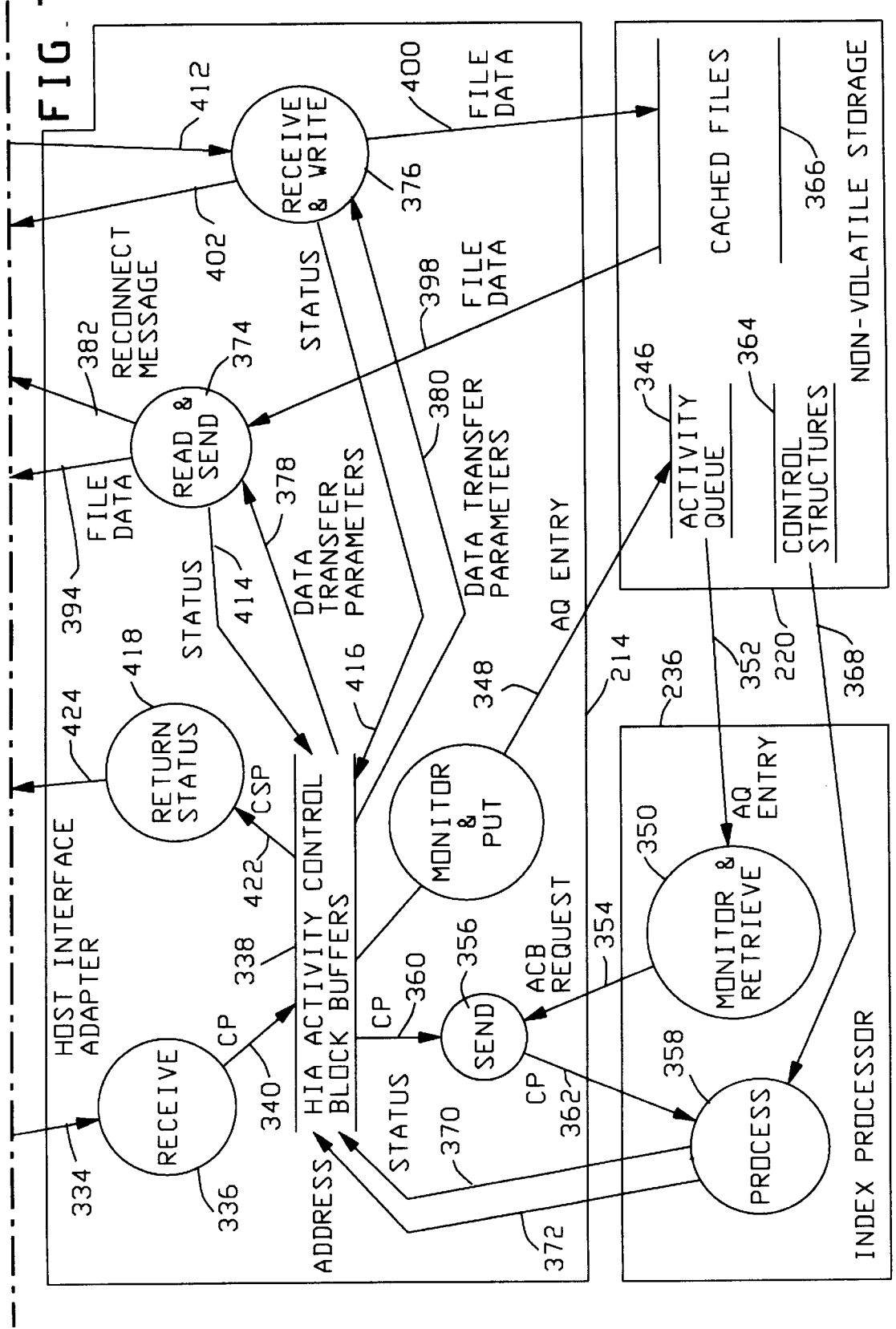

FIGS. 7A, 7B, and 7C when arranged as shown in FIG. 7 contain a data flow diagram illustrating the flow of data between each of the major functional components of the file cache system. Each of the blocks represents a major logic section, a software component, or a storage section of the file cache system. Within each of the blocks are data structures which are shown as labelled online storage symbols and circles representing processing performed by the component. Although the circles represent the processing performed, they are not intended to illustrate the flow of control. The directional lines represent the flow of data between processing circles and data structures and are labelled according to the data being transferred. FIGS. 8 through 15 show the information contained within the data structures referenced in FIG. 7. Each of FIGS. 8 through 15 will be discussed as it is encountered in the discussion of FIG. 7.

File access commands begin with application software on the Host 10 (not shown in FIG. 7) requesting input or output services (I/O) for a selected file. I/O requests for cached files are processed by the File Cache Handler Software 208. Data flow Line 300 shows the input of an I/O request to File Cache Handler Software 208. I/O requests are sent from the Host 10 to the outboard file cache XPC 102 in Command Packets. At Process Node 302 the File Cache Handler Software 208 builds a Command Packet (CP) for the specified I/O request and stores the Command Packet in a Command Packet Data Structure 304. Line 306 represents storing the I/O request information in the Command Packet Data Structure 304.

a. Command Packet

FIG. 8 shows the general layout of a Command Packet and the information contained therein. The Command Packet 452 contains information that describes one of the available outboard file cache commands (read, write, stage, destage, etc.). Each of the commands is identified and discussed later in this specification. FIG. 8 shows only the command information which is common to all Command Packets for the various command types.

A Command Packet can have from 4 to 67 36-bit words, depending upon the command type. Words 0 and 1, bits 12 through 23 of Word 3, and Words 4 through n of the Command Packet, respectively referenced by 452a, 452b, and 452c, are dependent upon the command type.

The file cache system permits Command Packets to be chained together. That is, a first Command Packet 452 may point to a second Command Packet, and the second Command Packet may point to a third Command Packet, and so on. The NEXT_COMMAND_PACKET 452d is used for chaining the Command Packets together. It contains the address of the next Command Packet in the command chain. If the CCF 452e (Command Chain Flag) is set, then NEXT_COMMAND_PACKET contains the address of the next Command Packet in the command chain. A chain of commands is also referred to as a "program." If CCF is clear, then no Command Packets follow the Command Packet in the command chain. The CCF is stored at Bit 5 of Word 3 in the Command Packet.

The LENGTH 452f of the Command Packet, that is the number of words in the Command Packet following Word 3, is stored in bits 6 through 11 of Word 3. Bits 24 through 35 of Word 3 contain COMMAND_CODE 452f which indicates the operation to be performed by the outboard file cache. Bits 0-4 of Word 3 and referenced by 452g are reserved.

Processing Node 308 in FIG. 7 enqueues a Program Initiation Packet (PIP) in a Program Initiation Queue (PIQ) 310. Line 312 represents the flow of Program Initiation Packet information to the Program Initiation Queue 310. The Command Packet (CP) Address from Node 302 is used in enqueuing a PIP. The CP Address supplied to Node 308 is shown by Line 309.

b. Program Initiation Queue

FIG. 9 illustrates the Program Initiation Queue. The Program Initiation Queue 310 may contain up to 32 Program Initiation Packets (PIPs), respectively referenced 456-1, 456-2, 456-3, . . . , 456-32. The Program Initiation Queue may be larger or smaller depending upon implementation chosen. Once the Program Initiation Queue is filled with Program Initiation Packets, further queuing is performed to handle the overflow.

FIG. 10 shows the information contained in and the format of a Program Initiation Packet. VF (Valid Flag) 456a is stored in bit 0 of Word 0 of the Program Initiation Packet 456. VP indicates whether the information in the Program Initiation Queue 310 entry is valid.

Bits 1 through 35 of Word 0 and Bits 0 through 3 of Word 1 are reserved for future use and are respectively referenced in FIG. 10 by 456b and 456c. The PROGRAM_ID 456d is stored in bits 4 through 35 of Word 1. The PROGRAM_ID uniquely identifies the program being submitted to the outboard file cache XPC 102. The PROGRAM_ID is used to associate the status returned from the outboard file cache with the program to which it applies.

Word 2 of the Program Initiation Packet 456 contains the COMMAND_PACKET_ADDRESS 456e which is the real address of the first Command Packet 452 in a command chain or a single Command Packet. Word 3 contains the NEXT_SP_ADDRESS 456f. The NEXT_SP_ADDRESS is the real address in Main Storage 16 of an area where the outboard file cache XPC 102 can write status information.

After the XPC 102 has processed a command, the status of the command is reported back to the Host 10 in a Program Status Packet (PSP). Line 314 shows the flow of a Program Status Packet from the Data Mover (DM) 110 to an entry in the Status Packet Queue (SPQ) 316. The format of the Status Packet Queue 316 and the Program Status Packet is described next, followed by further discussion of Command Packet processing.

c. Status Packet Queue and Program Status Packet

FIGS. 11 and 12 respectively illustrate the Status Packet Queue and the format and information contained in a Program Status Packet. The number of Program Status Packets 460 in the Status Packet Queue 316 is equal to the number of programs queued in the Program Initiation Queue and are respectively referenced 460-1, 460-2, 460-3, . . . , 460-n. Generally, the content and format of a Program Status Packet is as follows:

| Word | Bit | Definition |
| --- | --- | --- |
| 0 | 0–5 | Valid Flag (VF) 460a indicates whether the Program Status Packet contains valid status information. If VF = 0, then the Program Status Packet does not contain valid status information. If the VF = 1, then the Program Status Packet does contain valid status information. |
| 0 | 6–17 | Reserved as referenced by 460b. |
| 0 | 18–35 | UPI_NUMBER 460c is the Universal Processor Interrupt (UPI) number associated with the outboard file cache interface. |
| 1 | 0–3 | Reserved as reference by 460d. |

-continued

| Word | Bit | Definition |
|---|---|---|
| 1 | 4–35 | PROGRAM_ID 460e is a value which identifies the Command Packet (or Command Packet Chain) which is associated with the Program Status Packet. If NO_PROGRAM in the FLAGS field is set, PROGRAM_ID is reserved. Every outboard file cache XPC program issued by a Host has an associated PROGRAM_ID which is unique within the Host. When status is returned to the Host, PROGRAM_ID is used to relate the status to the program to which it applies. Note that PROGRAM_ID applies to all commands within a single program. A status is associated with a command in a command chain by using the COMMAND_PACKET_ADDRESS. The portion of the File Cache Handler that builds and initiates outboard file cache programs generates the PROGRAM_ID. |
| 2 | 0–35 | COMMAND_PACKET_ADDRESS 460f is a value which contains the real address of the Command Packet to which the status applies. When a chain of commands is submitted to the outboard file cache XPC 102 for processing, the Command Packet Address will point to the Command Packet which caused an error. If all the Command Packets in the command chain were processed without error, then the Command Packet Address points to the last Command Packet in the command chain. |
| 3 | 3–35 | HARDWARE_DEPENDENT_STATUS-1 460g is an address within Main Storage 16 which was referenced and an error was detected. The File Cache Handler Software 208 takes the RECOMMENDED_ACTION. |
| 4 | 0–35 | This word is reserved and is beyond the scope of this invention. |
| 5 | 0–11 | RECOMMENDED_ACTION 460i is the processing that should be performed by the File Cache Handler Software 208 upon receiving a Program Status Packet. |
| 5 | 12–23 | REASON 460j indicates the condition that caused the particular status to be returned. |
| 5 | 24–29 | COUNT 460k is the recommended number of times that the File Cache Handler Software 208 should retry when responding to the status in the Program Status Packet. For example, if the RECOMMENDED_ACTION returned is Resend, then the Count indicates the number of times which the File Cache Handler Software 208 should resend the Command Packet. If NO_PROGRAM in the FLAGS field is not set and the RECOMMENDED_ACTION does not equal "no action required", this field specifies the number of times the command specified by the Command Packet pointed to by COMMAND_PACKET_ADDRESS should be retried. Retries apply only to that command and not to any other commands in a command chain. All retries use the same Outboard File Cache Interface to which the original command was directed. If NO_PROGRAM in the FLAGS field is not set and RECOMMENDED_ACTION equals "no action required", COUNT must be equal to 0. If NO_PROGRAM in the FLAGS field is set, this field is reserved. |
| 5 | 30–35 | FLAGS 460l is a set of bits that relay ancillary information. |
| 5 | 30 | PRIORITY_DESTAGE indicates whether priority destage is required. If PRIORITY_DESTAGE is set, then the Destage Request Packets in the Destage Request Table (see the READ Status Packet) refer to segments that must be destaged as soon as possible. If NO_PROGRAM is set or DESTAGE_REQUEST_PACKETS is not set, PRIORITY_DESTAGE must equal 0. |
| 5 | 31 | DESTAGE_REQUEST_PACKETS is a flag which indicates whether the Destage Request Table exists (see the READ Status Packet). If NO_PROGRAM is set, or the status applies to an invalid command, or the status applies to a non-I/O command, then this flag must be 0. |
| 5 | 32 | TERMINATED_POLLING is a flag which indicates that a Program Initiation Queue is no longer being polled. |
| 5 | 33 | Reserved. |
| 5 | 34 | NO_PROGRAM is a flag which indicates whether the status is associated with a Command Packet. If NO_PROGRAM is set, then the status is not associated with a Command Packet. If TERMINATED_POLLING is set, NO_PROGRAM must also be set. If the Program Status Packet is returned via the Status Packet Queue, NO_PROGRAM must equal 0. This flag is beyond the scope of this invention. |
| 5 | 35 | Reserved and is beyond the scope of this invention. |
| 6 | 0–35 | STATISTICS 460m is a set of codes which indicate how successful the XPC has been in avoiding destaging file data, speculating upon the future file access commands, and the time the XPC spent in processing the Command Packet(s). |
| 7 | 0–11 | RECOVERY_TIME is used to indicate to a Host 10 that the outboard file cache XPC 102 is in the process of performing a set of actions to recover from an internal fault condition. The nature of the fault recovery prohibit the Outboard File Cache from responding to any commands received from a Host. When a command is received, it is not processed by the Outboard File Cache and is returned to the sending Host with a RECOMMENDED_ACTION equal to "Resend." RECOVERY_TIME is only used when the NO_PROGRAM flag is not set and the RECOMMENDED_ACTION is Resend. The value contained in RECOVERY_TIME provides the number of six second intervals required to complete the necessary recovery actions. |
| 7 | 12–35 | See Words 8–127 |
| 8–127 | | These words contain information which is dependent upon the particular command in the Command Packet which is associated with the Program Status Packet. Words 7–119, referenced by 460n depend upon NO_PROGRAM and COMMAND_CODE (see the READ Status Packet), and words 120 through 127 are reserved for future use as referenced by 460o. |

The discussion now returns to Command Packet processing as shown in FIG. 7. Before the enqueue Processing Node 308 writes an entry in the Program Initiation Queue 310, it first obtains the address of an available Program Status Packet 460 from the Status Packet Queue 316, as shown by Line 318. If the Valid Flag 460a in the Program Status Packet is 0, then the Program Status Packet is available for status reporting. The address of the Program Status Packet is stored in NEXT_SP_ADDRESS 456e in the Program Initiation Packet 456 in the Program Initiation Queue 310.

The Data Mover 110 continually monitors the Program Initiation Queue 310 for the presence of Command Packets 452 to process as shown by the Monitor and Retrieve Processing Node 320. A pointer to an entry in the Program Initiation Queue 310 is used for monitoring the Program Initiation Queue. If the VF 456a for the Program Initiation Packet 456 referenced by the pointer is equal to 1, then the Program Initiation Packet is valid and a Command Packet is available. If the VF equals 0, then the Program Initiation Packet is invalid which means there is no Command Packet available for processing; the same Program Initiation Packet is monitored until the VF is set. Line 322 represents the reading of a Program Initiation Packet from the Program Initiation Queue.

Where the VF 456a in the PIP is set, the Program Initiation Queue 310 pointer is advanced to the next entry in the queue, and the next entry is thereafter monitored. The Program Initiation Packet 456 with the VF set is then used to retrieve the Command Packet 452. The COMMAND_PACKET_ADDRESS 456e in the Program Initiation Packet is used to read the Command Packet from the Command Packet Data Structure 304 as indicated by Line 324.

The information in the Command Packet 456 is then written to one of the Activity Control Block (ACB) Buffers 326 which is local to the Data Mover 110, as indicated by data flow Line 328. There are three buffers used by the Data Mover 110 to manage Command Packets. Each of the ACB Buffers is described in greater detail in the discussion for the Data Mover. The Buffers are large enough for 16 entries, which allows for a maximum 16 Command Packets to be "active." When there are 16 active commands, the Data Mover 110 suspends monitoring the Program Initiation Queue 310 until one of the 16 commands is complete. In general, the ACB Buffers hold Command Packets and assorted control codes for the transfer of data between the Data Mover 110 and Main Storage 16.

After a Command Packet is written to the ACB Buffers 326, the Send Processing Node 332 reads the Command Packet 452 from the appropriate ACB Buffer as shown by data flow Line 332. The Command Packet is then sent via the Fiber Optic Cable 216 to the Host Interface Adapter 214 as shown by data flow Line 334. The Receive Processing Node receives the Command Packet and enters the Command Packet into the HIA ACB Buffer 338 as indicated by data flow Line 340.

FIG. 13 illustrates the HIA ACB Buffer. The HIA ACB Buffer 338 has 16 entries, respectively referenced 338-1 through 338-16, for managing activities. Each entry in the HIA ACB Buffer contains a Command Packet and Status Information associated with the Command Packet. Associated with each entry in the HIA ACB Buffer is an ACB Number. ACB Number 1 references the first entry 338-1 in the HIA ACB Buffer, ACB Number 2 references the second entry 338-2, . . . , and ACB Number 16 references the sixteenth entry 338-16.

The Monitor and Put Processing Node 342 monitors the HIA ACB Buffer 338 for the arrival of Command Packets. When a Command Packet arrives in the HIA ACB Buffer 338, the ACB Number associated with the HIA ACB Buffer entry is read as indicated by data flow Line 344. Processing Node 342 then puts an Activity Queue (AQ) Entry in the Activity Queue as shown by data flow Line 348. An entry in the Activity Queue 346 indicates to the Index Processor 236 that there is a Command Packet available for processing.

FIG. 14 illustrates Activity Queue, and FIG. 15 shows the information contained in each Activity Queue Entry. The Activity Queue 346 may contain up to n Activity Queue Entries, referenced in FIG. 14 as 347-1, 347-2, 347-3, . . . , 347-n. As shown in FIG. 15, word 0 of an Activity Queue Entry contains a MESSAGE CODE 347a, an ACBID 347b, a HIA UID 347c, and a HIA BPID 347d. Word 1 of the Activity Queue Entry contains a MESSAGE 347e. Each of these fields will be discussed in greater detail in the discussions relating to the Host Interface Adapter and Index Processor. But briefly, the MESSAGE CODE indicates the type of operation to be performed by the Index Processor 236. For an operation type indicating a new entry has been made in the HIA ACB Buffer 338, the ACBID indicates the ACB Number of the entry in the HIA ACB Buffer where the Command Packet information resides. The HIA Identifier field indicates the particular Host Interface Adapter 214 which put the Activity Queue Entry in the Activity Queue 346. In the interest of clarity, the description of the HIA BPID and the MESSAGE fields will be reserved for later sections of the specification.

The Monitor and Retrieve Processing Node 350 in the Index Processor 236 monitors the Activity Queue 346 for Activity Queue Entries. When an entry is added to the Activity Queue, Processing Node 350 reads the ACB Entry from the Activity Queue 346 as indicated by data flow Line 352. Based upon the information in the Activity Queue Entry, Processing Node 350 sends an ACB Request to the HIA 214 as shown by data flow Line 354. The ACB Request contains the ACB Number from the Activity Queue Entry.

Send Processing Node 356 takes the Command Packet from the entry in the HIA ACB Buffer 338 which is associated with the ACB Number specified in the ACB Request and sends the Command Packet to the Process Node 358 of Index Processor 236. Data flow Lines 360 and 362 show the flow of a Command Packet from the HIA ACB Buffer 338 to the Process Node 358.

Process Node 358 decodes the command contained in the Command Packet and references the Control Structures 364 which contain information for managing the available storage space in NVS 220 and referencing Cached Files 366 stored therein. For file access commands, File Information is read from the Control Structures 364 as shown by data flow Line 368. Based upon the File Information and the decoded command, Process Node 358 initiates the appropriate processing. For the rest of this discussion for FIG. 7 assume that either a read or write request was contained in the Command Packet, and the referenced file data is present in Cached Files 366.

Two pieces of information are returned to the HIA 214 from the Process Node 358: a Status and Address as indicated by data flow Lines 370 and 372. Both pieces of information are tagged with the ACB Number so that the Status and Address information are stored in the appropriate entry in the HIA ACB Buffer 338.

Read and Send Processing Node 374 and Receive and Write Processing Node 376 control the flow of data between the Data Mover 110 and the NVS 220. Processing Node 374 is active when file data is read from Cached Files 336, and Processing Node 376 is active when file data is being written to Cached Files 366. For both Processing Nodes 374 and 376, Data Transfer Parameters are read from an entry in the HIA ACB Buffer 338 as respectively shown by data flow Lines 378 and 380. The Data Transfer Parameters indicate the address within NVS 220 where the operation is to begin and the number of words to be transferred.

Read and Send Processing Node 374 sends a Reconnect Message to the Data Mover 110 as shown by data flow Line 382. The Reconnect Processing Node 384 on the Data Mover 110 receives the Reconnect Message and supplies the ACB Number in the Reconnect Message to Receive and Write Processing Node 386. Data flow Line 388 shows the ACB Number flowing from Processing Node 384 to Receive and Write Processing Node 386.

Receive and Write Processing Node 386 retrieves the Data Transfer Parameters from the appropriate ACB Buffer 326 as referenced by the ACB Number. Data flow Line 390 illustrates the Data Transfer Parameters retrieved by Processing Node 386 from ACB Buffers 326. The Data Transfer Parameters indicate the location in Application Storage 392 where the file data is to be written. As File Data is received by Processing Node 386, as shown by data flow Line 394, it is written to Application Storage 392. Data flow Line 396 shows the File Data flowing to Application Storage 392. In Host Interface Adapter 214, the Read and Send Processing Node 374 reads the referenced File Data from Cached Files 366 as illustrated by data flow Line 398.

As previously stated, Receive and Write Processing Node 376 writes file data to Cached Files 366. File Data is shown as being written to Cached Files 366 by data flow Line 400. The transfer of File Data from the Data Mover 110 to the Host Interface Adapter 214 is initiated by the Receive and Write Processing Node 376 by sending a Reconnect Message. Data flow Line 402 shows the Reconnect Message. The Reconnect Message contains an ACB Number which is forwarded to Read and Send Processing Node 404. The ACB Number is shown at Line 406. Read and Send Processing Node 404 obtains the Data Transfer Parameters from the appropriate ACB Buffer 326 as referenced by the ACB Number. Data flow Line 408 shows the Data Transfer Parameters. The Data Transfer Parameters indicate the real address in Main Storage 16 where the file data to transfer resides. Processing Node 404 reads the referenced File Data from Application Storage 392 as shown by data flow Line 410. Data flow Line 412 shows File Data being sent by Processing Node 404 in the Data Mover 110 to the Receive and Write Processing Node 376 in the Host Interface Adapter 214. The File Data is then written to Cached Files 366.

For each of Processing Nodes 374 and 376, when the respective data transfer tasks are complete, a Status is written to the appropriate entry in the HIA ACB Buffer 338. Data flow Lines 414 and 416 respectively show the writing of the Status for Processing Nodes 374 and 376.

Return Status Processing Node 418 reads the Program Status Packet from the HIA ACB Buffer 338 when an activity completes and sends the Program Status Packet to the Write Status Processing Node 420 on the Data Mover 110. Processing Node 420 writes the Program Status Packet to the appropriate entry in one of the ACB Buffers 326. Data flow Lines 422, 424, and 426 illustrate the flow of a Program Status Packet from the HIA ACB Buffer 338 to the ACB Buffers 326 on the Data Mover 110.

Once the Data Mover 110 has received a Program Status Packet in its ACB Buffers 326, the Program Status Packet can be returned to the File Cache Handler Software 208. Return Status Processing Node 428 reads the Program Status Packet from ACB Buffers 326. The Program Status Packet is then written to an available entry in the Status Packet Queue 316. The entry in the Status Packet Queue to which the Program Status Packet is written is selected from a queue of pointers to available entries in the Status Packet Queue 316. The File Cache Handler Software reads the Status from the entry in the Status Packet Queue 316 and returns the appropriate status to the application software from which the I/O request originated. Processing Node 430 and data flow Lines 432 and 434 illustrate the status reporting.

3. File Space Management

This section provides an overview of the logical organization and maintenance of storage space in the outboard file cache XPC 102. The preferred embodiment for this invention is operable with the file management and input/output systems (not shown) associated with the OS1100 and OS2200 operating systems (not shown) available from Unisys Corporation. Those skilled in the art will recognize that this invention could be adapted to the file management systems associated with other operating systems without departing from the spirit of this invention.

FIG. 16 illustrates the file space available in the outboard file cache. The File Space 502 is logically organized in Segments 503-0, 503-1, 503-2, . . . , 503-(n-1), wherein for this embodiment each Segment contains 1792 words. The number of Segments available varies according to the amount of RAM storage configured in the XPC 102. A Segment has the same logical format as a logical track, which is the basic unit of storage allocation in the 1100/2200 file system.

FIG. 17 shows the logical organization of a single Segment. Each Segment 503 contains 64 blocks, numbered consecutively from 0 to 63 and respectively referenced 504-0, 5041, 504-2, . . . , 504-63, with each Block containing 28 words.

FIG. 18 shows the logical composition of a Block. Each block is comprised of 28 words, numbered consecutively from 0 to 27 and respectively referenced 506-0, 506-1, 506-2, . . . , 506-27.

A Segment 503 may either be assigned or unassigned. Assigned means that the Segment is directly associated with a specific track on a Disk 106 which belongs to a particular file and contains data which belongs to that file. An unassigned Segment is not associated with any track or file. When the outboard file cache XPC 102 is first started, all Segments in the File Space 502 are unassigned. A Segment's transition from unassigned to assigned is initiated by Host 10 software and occurs when an appropriate command is sent to the outboard file cache XPC 102. The transition from an assigned state to an unassigned state (hereafter referred to as "deassignment") is jointly controlled by the Host 10 and the XPC 102. Any of the following three events may cause a Segment to deassigned .

First, a Host 10 may send a command to the outboard file cache XPC 102 which specifies that the identified Segment 503 is to be purged. Purged means that the identified Segment 503 should no longer be associated with the identified file. The Segment may thereafter be used for storing Segments of other files.

Second, File Space 502 in the outboard file cache XPC 102 may be in short supply. The Segment may be required to be assigned or "allocated" to a different file. The particular Segment 503 chosen depends upon the cache segment replacement algorithm implemented in the outboard file cache XPC 102.

Third, the outboard file cache XPC 102 may detect that a hardware condition has rendered the RAM space occupied by the segment unusable. The Segment is deassigned and is thereafter unavailable for future assignment.

Deassignment of a Segment may require that the data contained in the Segment be copied to the Disk 106 and track with which it is associated. For example, if a Segment to be deassigned contains data that does not also exist in the track with which it is directly associated, the track may need to be made current with the data contained in the Segment. The data transfer is called destaging.

If the need to deassign a Segment is detected and initiated by Host 10 software, the requirement to destage a Segment is also determined by Host 10 software. The outboard file cache XPC 102 may also initiate the deassignment of a Segment, and the decision whether the Segment must also be destaged is made according to the following rule: If the Segment contains data that is not in its associated track, the Segment must be destaged before it can be deassigned. This is initiated by sending a destage request from the outboard file cache XPC 102 to the Host 10. The Host 10 responds by transferring the data in the identified Segment(s) from the outboard file cache XPC 102 to Disk 106. When the Host 10 has completed destaging the segment(s), the Outboard File Cache 102 may deassign the segment(s). If the segment and its associated track contain identical data, then no destaging is required and the Outboard File Cache 102 may unilaterally deassign the segment.

FIG. 19 shows the logical division between Cache File Space, Nail Space, and Resident File Space in the File Space of the Outboard File Cache. The proportion of Segments allocated between Cache File Space 522, Nail Space 523, and Resident File Space 524 varies according to runtime requirements. Cache File Space is allocated Segment-by- Segment to files. As demand for Cache File Space increases, allocation of Segments is managed according to a cache replacement algorithm. Segments in Resident File Space are assigned to tracks of files which are to remain in File Space for an extended period of time. For example, Resident File Space may be used for files which are accessed frequently and for data which is recovery critical. The Segments in Resident File Space are not eligible for replacement by the cache replacement algorithm for Cache File Space. An overview of Cache File Space management and Resident File Space management is provided in the following paragraphs.

A Segment in Cache File Space 522 may either be "nailed" or "unnailed." A nailed Segment is one that is permanently stored in the Outboard File Cache 102. A nailed Segment remains in Cache File Space until it is purged by a Host 10. The outboard file cache XPC 102 never initiates deassignment and destaging of a nailed Segment because there is no disk space backing up a nailed Segment. Nailed Segments are used where Host software determines that certain Segments must be in cache when accessed and should not be eligible for cache replacement, such as for recovery files. Nailed Segments can only reside in Cache File Space but are not allowed to consume all of Cache File Space. The desired maximum number of nailed Segments is 1000.

An unnailed Segment will remain in Cache File Space 522 until any one of the following occurs:
1. The unnailed Segment is purged by Host 10 software.
2. The outboard file cache XPC 102 detects that the RAM occupied by the Segment is unusable.
3. The Cache File Space replacement algorithm determines that the Segment should be assigned to another track.
4. The outboard file cache XPC determines that the Segment should be removed from Cache File Space and made part of the Resident File Space 524.

Resident File Space 524 is comprised of segments which are associated with tracks of files. Once a Segment in Resident File Space is assigned to a track, it will remain assigned until any one of the following occurs:
1. The Segment is purged by a Host 10.
2. The outboard file cache XPC 102 detects that the RAM occupied by the Segment is unusable.
3. The outboard file cache XPC 102 determines that the demand for Resident File Space relative to the demand for Cache File Space 522 is such that the Segment should be deassigned that it can be reallocated to Cache File Space.

Allocation of Segments in Resident File Space 524 is done on a first-come first-served basis. Once all Resident File Space Segments have been allocated, a Segment in Cache File Space 522 is allocated. A Segment in Cache File Space which is allocated to a file which has other segments in Resident File Space, is subject to the Cache File Space cache replacement algorithm. Therefore, Host 10 software which requests Resident File Space must monitor the availability and usage of Resident File Space.

FIG. 20 illustrates the File Descriptor Table. The File Descriptor Table 506 is stored and maintained by the outboard file cache XPC 102 and contains information for allocation and referencing each of the segments in the File Space 502. There are n File Descriptors in the File Descriptor Table, numbered consecutively from 0 to n−1 and respectively referenced 508-0, 508-1, 508-2, . . . , 508-(n−1).

FIG. 21 shows the information contained in a File Descriptor. Each File Descriptor 508 has 16 32-bit words. The content and format of a File Descriptor is as follows:

| Word | Bit | Definition |
|---|---|---|
| 0 | 0–3 | These bits are reserved. |
| 0 | 4–7 | IXP_# identifies the last IXP which updated this File Descriptor. This flag is useful for troubleshooting. |
| 0 | 8–15 | The PATH_ID indicates the Host Interface Adapter 214 that is in the process of destaging, purging, or staging the Segment. |
| 0 | 16–31 | SEGMENT FLAGS are used to indicate various characteristics of the selected Segment 503 referenced by the File Descriptor 508. The flags include the following: SEGMENT_WRITTEN is set when the Segment has been updated via a write command since the Segment was assigned. This flag is cleared when the Segment is destaged. TOTAL_SEGMENT_VALID is set when all blocks within a Segment are valid. A Segment is valid when each block in the Segment contains the most recent copy of the user's data. SEGMENT_DISABLED identifies when a hardware error was discovered for the associated Segment. SPECULATIVE/ORPHAN is a context sensitive flag. If the RESIDENT_FILE flag is set, then this flag indicates whether the Segment is an orphan Segment. If the RESIDENT_FILE flag is not set, this flag indicates whether the Segment was speculatively allocated. SEGMENT_UNAVAILABLE is used to indicate whether the Segment referenced by the File Descriptor is eligible for cache replacement (reassignment). If this flag is set, then cache replacement algorithm does not consider the referenced Segment for reassignment. When this flag is set, the HASH_LINK points to the next Segment available for cache replacement SEGMENT_BUSY is used to indicate whether a read or write operation is in progress for the referenced Segment. The flag is set when a command is decoded, and remains set until the BLOCKS_WRITTEN_TEMPLATE has been updated. PURGE_PENDING is used to indicate that a PURGE command found the referenced Segment had been updated, and is presently waiting for the Segment to be destaged before purging the Segment. DESTAGE_PENDING is used to indicate that a DESTAGE command is in process. The flag is set when a DESTAGE command is decoded and cleared when the corresponding DESTAGE COMPLETE command is decoded. STAGE_PENDING is used to indicate that a READ or WRITE command resulted in a miss condition, the Segment has been assigned, and the Segment is busy until the data has been written to the Segment. ALLOCATED_WRITE_MISS this flag indicates that the segment was assigned by either an ALLOCATE command or a WRITE command. SEQUENTIAL_SEGMENT is set when multiple Segments are staged together or where the Segment immediately preceding the Segment is a Segment with the same FILE_IDENTIFIER. The flag is used for determining which Segments should be destaged as a group. RESIDENT_FILE indicates whether the Segment belongs to a Resident File. STICKING_MASTER indicates whether the Host 10 has specified that the Segment should have a longer lifetime in the cache than Segments whose STICKING_MASTER flag is not set. NAIL is set when a Segment is not eligible for reassignment. The Index Processor 236 sets the NAIL flag for a segment for segments which are Nailed and segments which belong to Resident files. HOSTNAIL is set when a Segment in Nail Space has been created by the ALLOCATE command. PRE-USE is set by an IXP 236 to prevent another IXP from using the Segment. This flag indicates that an IXP has reserved the Segment so that the Segment is |

| Word | Bit | Definition |
|---|---|---|
| | | immediately available for assignment by the IXP. |
| 1–2 | | FILE_IDENTIFER identifies the File 106 to which the Segment is assigned. |
| 3 | | FILE_RELATIVE_SEGMENT_OFFSET indicates the location of the Segment relative to the first Segment in the file. |
| 4 | | HASH_LINK / BADPTR / NAIL_LINK is the pointer to the next File Descriptor in a linked list of File Descriptors. If the SEGMENT_UNAVAILABLE flag is set, the value in this field is used as the BADPTR, which is a pointer to the next Segment whose BAD_OR_UNAVAILABLE_AREA is not set. If the NAIL flag is set, then the value in this field is used as the NAIL_LINK which points to the next File Descriptor for a nailed Segment. |
| 5 | 0–20 | DATA_POINTER is the physical address in NVS 220 where the Segment is stored. It is fixed at initialization and always points to the same segment. |
| 5 | 21–27 | FLAG ANNEX contains more flags which indicate characteristics of the Segment 503 referenced by the File Descriptor 508. The flags include the following: STICKING_SLAVE is used to indicate the number of times the round robin cache replacement processing should exclude the referenced Segment from consideration for replacement. DESTAGE_REPORTED is used to ensure that the IXP does not make more than one request for the Segment to be destaged. NEW is set if the Segment is within K Segments from selection for reassignment by the cache replacement algorithm. K is equai to one-half the number of Segments available in Cache File Space 522. NOTEPAD is a flag which has multiple uses. These uses will become apparent in the detailed discussion of the IXP processing. |
| 5 | 28–31 | BPID is the Back Panel Identifier associated with the NVS 220 in which the Segment is located. |
| 6–7 | | BLOCKS_WRITTEN_TEMPLATE contains one bit for each block in the Segment. If a bit is set, it indicates that at some time after the Segment was last destaged, the corresponding block was updated. Bit 0 of Word 6 corresponds to Block 504-0 of a Segment 503, Bit 1 of Word 6 corresponds to Block 504-1 of Segment 503, . . . , Bit 31 of Word 6 corresponds to Block 504-31 of Segment 503, Bit 0 of Word 7 corresponds to Block 504-32 of Segment 503, . . . , and Bit 31 of Word 7 correspouds to Block 504-63 of Segment 503. |
| 8 | 0–7 | HOST_ID is a value identifying the Host 10 that is in the process of destaging, purging, or staging the Segment. |
| 8 | 8–15 | GROUP_ID indicates the group of Hosts 10 that are able to destage the Segment. In particular, the Group Identifier is the group of Hosts 10 that have direct access to the Disks 106 identified by the LEG1_DISK_NUMBER and LEG2_DISK_NUMBER. The group of Hosts 10 identified by the Group Identifier is called a "destage group." There are three types of destage groups: local, shared, and global. If the Group Identifier equals 0, then the Segment belongs to the global destage group; if the Group Identifier equals 1, then the Segment belongs to a local destage group; and if 2 < = Group Identifier < = 255, then the Segment belongs to a shared destage group. The number of local destage groups is equal to the number of Hosts 10 which are coupled to the outboard file cache XPC 102. There are 255 possible local destage groups. A Segment which is assigned to a local destage group can only be destaged by the Host 10 to which that local destage group is assigned. Note that if GROUP_ID = 1, the HOST_ID contained in the FILE_IDENTIFIER must not equal zero and must specify a connected Host 10 that is able to destage the Segment. Otherwise, an error state has occurred. There are 254 possible shared destage groups. The set of Hosts 10 contained in a shared destage group is defined by the Host 10 software. The particular Hosts 10 contained in each shared destage group is dependent upon the Hosts 10 which are coupled to the outboard file cache XPC 102, the Disks 106 which are shared between the Hosts 10, and the particular files shared among the Hosts 10. |
| 8 | 16–23 | FILE_SESSION is used for recovery purposes when a Host fails unexpectedly. This field is beyond the scope of this invention. |
| 8 | 24–31 | HOST_SESSION is Host Session Number in which the Segment was assigned to a file belonging to the Host. The Host Session Number is used for recovery purposes when a Host fails unexpectedly. This field is beyond the scope of this invention. |
| 9 | 0–31 | LEG1_DISK_NUMBER identifies the first disk on which the Segment is stored. "Leg" refers to the I/O Path on which the disk resides. |
| 10 | 0–31 | LEG2_DISK_NUMBER identifies the second disk on which the Segment is stored. |
| 11 | | LEG1_DISK_ADDRESS specifies the address on the leg-1 disk at which the Segment is stored. |
| 12 | | LEG2_DISK_ADDRESS specifies the address on the leg-2 disk at which the Segment is stored. |
| 13–14 | | These words are unused. |
| 15 | | PROGRAM_ID identifies the Outboard File Cache program issued by a Host 10 that is in the process of destaging, purging, or staging the segment. |

4. Major Component Overview

This section provides an overview of each of the major functional components of the File Cache System. The general architecture and processing for each component is discussed, as well as an overview of the interfaces between components.

a. Host Software

The two main software components of the File Cache System are the Input/Output Software 206 and the File Cache Handler Software 208. Input/Output (I/O) Software provides the interface between Application Software 202 and the device specific software associated with each peripheral device coupled to a Host 10.

(1) Input/Output Software

FIG. 22 is a flow chart of the general processing the I/O Software performs for file requests from Application Software. The I/O Software is invoked with a operating system call which includes various I/O request parameters. Step 602 processes the input I/O request parameters. Included in the I/O request parameters is a file-identifier and a file-portion-indicator together which reference the portion of the file for which access is requested. Step 604 locates the entry in the system file descriptor table for the file having the specified File Identifier. The file descriptor table contains the type, the device on which the file is stored, and various other information for each file known to the operating system.

A cache indicator flag in the file descriptor table is used to identify when a file is cached by the File Cache System. If the cache indicator flag is set, Decision Step 606 forces Control Path 608 which leads to Step 610. Step 610 passes the I/O request parameters and control to the File Cache Handler Software 208 for further processing. If the cache indicator flag is not set, Decision Step 606 forces Control Path 612 to Decision Step 614. Decision Step 614 check whether the I/O request parameters specify that the file should be cached. If Decision Step 614 is positive, then Control Path 616 is followed to Step 618 where the cache indicator flag in the file descriptor table is set. Processing then proceeds to Step 610 which was discussed above. If the I/O request parameters do not indicate that a file should be cached, then Control Path 620 is followed to Step 622. Step 622 performs the necessary I/O processing for files which are not cached.

(2) File Cache Handler Software

FIG. 23 shows a flow chart of the FILE CACHE INTERFACE processing performed by the File Cache Handler Software. Decision Step 650 tests whether the I/O request entails a read operation which calls for reading a large amount of data from a Disk 106. For long reads, staging the data to the outboard file cache XPC 102 may be inefficient, in which case Cache bypass processing is invoked at Step 651. Cache bypass processing involves the same processing which would be involved when an outboard file cache XPC is not part of the data processing system.

Step 652 builds a Command Packet according to the I/O request parameters which were passed from the I/O Software 206. The various types of Command Packets are discussed in more detail in the referenced co-pending applications.

Step 654 selects a Program Initiation Queue (PIQ) to which a Program Initiation Packet (PIP) 456 should be queued. As was shown in FIG. 6, one or more Data Movers 110 can be coupled to the Input/Output Bus 40 of a Host 10. For each Data Mover (or "file cache unit interface"), a separate PIQ is maintained. In this manner the processing load for sending Command Packets to the outboard file cache XPC 102 is distributed across multiple Data Movers 110. The selection of a PIQ is based upon the number of PIPs in the PIQ. The PIQ with the fewest active PIPs is selected to receive the PIP. If the selected Program Initiation Queue is full (indicating that all are full), then Decision Step 656 forces Control Path 658 to Step 660. At Step 660 an entry is made in an overflow queue for the specified Command Packet. When the PIQ is no longer fall, processing proceeds to Step 662 for making a PIP. Likewise, if Decision Step 656 determines that the PIQ is not full, Control Path 664 is followed to Step 662.

Step 662 initializes the PIP with the address of the CP built at Step 652. Next, Step 666 retrieves a Status Packet (SP) from the Status Packet Queue (SPQ), and Step 668 initializes the PIP with the address of the SP. The address is used by the Data Mover 110 to return SP information upon completion of a command. The SP address supplied in the PIP will not necessarily be used in reporting status back on the Command Packet associated with the PIP. The SP address is merely a pointer to an available SP where status can be reported. The COMMAND_PACKET_ADDRESS in the Program Status Packet is used to associate the Status Packet with the appropriate Command Packet. After the necessary information has been entered in the PIP, the valid flag for the entry is set to indicate that the PIP references a Command Packet which is ready for processing.

Step 670 waits for a Status Packet to be returned before continuing. When a Status Packet is returned, the status information is returned to the I/O Software 206 as shown by Step 672, and control is then returned to the I/O Software.

FIG. 24 shows a flow chart of the general processing for detecting when the processing of a Command Packet (or a chain) is complete. A Global Completion Flag and a Local Completion Flag are set by the Data Mover 110 after a Program Status Packet is written to Host Main Storage 16. A single Local Completion Flag is associated with each Program Initiation Queue and Status Packet Queue. When the File Cache Handler Software 208 detects that the Global Completion Flag is set, the Local Completion Flags are tested. If any of the Local Completion Flags are set, then the first Program Status Packet in the associated Status Packet Queue is retrieved and the status processed. The completion flags are continuously monitored for status processing.

Decision Step 702 checks whether the Global Completion Flag is set. Until the Global Completion Flag is set, no processing of Outboard File Cache status information is performed. After the Global Completion Flag has been set, processing proceeds to Step 704 where the Global Completion Flag is cleared. This allows the Data Mover to set the Global Completion Flag for the next Program Status Packet it returns. Step 706 gets the first Local Completion Flag.

If the Local Completion Flag is not set, the Decision Step 708 directs control to Decision Step 710. Decision Step 710 checks whether there are any more Local Completion Flags to check. If there are, then Decision Step 710 directs control Step 712 which gets the next Local Completion Flag. After Step 712, the Local Completion Flag is checked at Decision Step 708. If all the Local Completion Flags have been checked, then Decision Step 710 returns control to Decision Step 702 for monitoring the Global Completion Flag.

If the Local Completion Flag is set, then a Program Status Packet has been returned for one of the commands referenced in the Program Initiation Queue which is associated with the Local Completion Flag. Decision Step 708 directs control to Step 714 where the Local Completion Flag is set. Step 714 clears the Local Completion Flag and proceeds to Step 716.

Step 716 retrieves the first Program Status Packet from the Status Packet Queue which is associated with the Local Completion Flag. Decision Step 718 checks the Valid Flag contained within the Program Status Packet is set. If the Valid Flag is not set, control is directed to Decision Step 710 because the Program Status Packet referenced does not contain valid data. If the Valid Flag is set, then control is directed to Step 720 for Status Processing. The particular status processing performed depends upon the particular command associated with the Program Status Packet, and the RECOMMENDED_ACTION code in the Program Status Packet. After Status Processing is complete, Step 722 retrieves the next Program Status Packet from the Status Packet Queue and returns control to Decision Step 718.

b. Data Mover (DM) and Host Interface Adapter (HIA)

FIGS. 25A and 25B when arranged as shown in FIG. 25, respectively show the components of a Data Mover (DM) and Host Interface Adapter (HIA). FIG. 25A shows the components of a Data Mover 110. The architecture of the DM as an instance of a Microsequencer Bus Controller System shows that there are two Microsequencer Bus Controllers (uSBCs) 5002, 5004 connected to a Control Store (CS) 5006 via Lines 5008, 5010. The uSBC 0 5002 and uSBC 1 5004 are Reduced Instruction Set (RISC) microprocessors that control various special purpose circuits, gate arrays in this embodiment, called Stations over the Micro Bus 5012. The Micro Bus 5012 is a bidirectional communications bus. The uSBCs support an instruction set with seven basic instructions in it. The instructions are of fixed length and specify either one or two operands only. The internal circuitry of the uSBCs is "hard-wired", i.e., it is not microprogrammed, through programmed microprocessors could be used. The results from operations performed by uSBC 1 5004 are transferred to uSBC 0 5002 for error detection purposes over Line 5014. The Control Store 5006, consisting of seven static random access memories (SRAMs), is used to store an instruction stream that the uSBCs execute in parallel.

The I/O-Bus Controller (I/OBCT) Station 5016 handles I/O-Bus 40 arbitration and controls data transfers between other DM Stations and the I/O-Bus 40. There are two DM Stations to transfer data to the I/O-Bus 40 and two DM Stations to transfer data from the I/O-Bus. The I/O-Bus Write (I/OBWR) 0 5018 and I/OBWR 1 5020 Stations receive data from the I/O-Bus 40 via Lines 5022 and 5024, respectively. The I/O-Bus Read (I/OBRD) 0 5026 and I/OBRD 1 5028 Stations send data to the I/O-Bus 40 via Lines 5030 and 5032 respectively. The I/OBCT 5016 controls the access by these DM Stations to the I/O-Bus 40 over an interface (not shown) separate from the Micro Bus. Data is passed from I/OBWR 0 5018 and I/OBWR 1 5020 via Lines 5034 and 5036 to the Send Frame Transfer Facility (SEND FXFA) gate array 5038. The SEND FXFA 5038 packages the data into transmission packets called frames, which are passed over Line 5040 to the Light Pipe Frame Control (LPFC) gate array 5042. The LPFC 5042 sends the frame over Lines 5044 and 5046 to dual PLAYER+Physical Layer Controllers, consisting of PLAYER+0 5048 and PLAYER+1 5050, which are commercially available from National Semiconductor Corporation. The PLAYER+0 5058 and PLAYER+1 5050 transmit frames over Fiber Optic Links 5052 and 5054, which are a portion of Link 112, to the HIA 214.

When the HIA 214 sends frames to the DM 110, PLAYER+0 5058 and PLAYER+1 5050 receive the frames over Fiber Optic Links 5056 and 5058, which are a portion of Link 112. The PLAYER+0 5058 component forwards its frame over Line 5060 to the LPFC 5042. Similarly, the PLAYER+1 5050 component forwards its frame over Line 5062 to the LPFC. The LPFC sends the frames via Line 5064 to the Receive Frame Transfer Facility (REC FXFA) gate array 5066, which unpacks the data and stores it in I/OBRD 0 5026 and I/OBRD 1 5028 via Line 5068. The REC FXFA 5066 sends an acknowledgment for the data transfer to the SEND FXFA 5038 over Line 5072.

FIG. 25B shows the components of a Host Interface Adapter. The architecture of the HIA 214 as an instance of a Microsequencer Bus Controller System shows that there are two uSBCs 5074, 5076 connected to a Control Store 5078 via Lines 5080, 5082, respectively. The uSBCs 5074, 5076 access the HIA Stations via the Micro Bus 5084. The PLAYER+0 5086 and PLAYER+1 5088 components receive frames over Fiber Optic Links 5052 and 5054, respectively. PLAYER+0 5086 forwards its frame to LPFC 5090 over Line 5092. Similarly, PLAYER+1 5088 forwards its frame to LPFC 5090 over Line 5094. The LPFC 5090 transfers the frames to the Receive Frame Transfer Facility (REC FXFA) 5096 over Line 5098. The REC FXFA 5096 unpacks the frames and stores control information in the Request Status Control Table 0 (RSCT) 5100 and the RSCT 1 5102 Stations via Line 5104. The RSCT 0 and RSCT 1 Stations monitor the data that has been received from the DM 110. The data which was contained in the frame received by the REC FXFA 5096 is sent to the Database Interface (DBIF) Station 5106 over Line 5104. The DBIF 5106 forwards the data over Line 5108 to the Street 234.

Data received by the DBIF 5106 over Line 5110 from the Street 234 is sent to the Send Frame Transfer Facility (SEND FXFA) 5112 via Line 5114. Control information received over Line 5110 from the Street is sent to RSCT 0 5100 and RSCT 1 5102 over Line 5116. The SEND FXFA 5112 takes this data and control information from RSCT 0 5100 and RSCT 1 5102 via Line 5118 and formats a frame for transmission by the LPFC 5090. Acknowledgements from REC FXFA 5096 are received by SEND FXFA 5112 over Line 5120. The frame is forwarded over line 5122 to the LPFC 5090. The LPFC 5090 creates two frames from the frame it received and sends one frame to PLAYER+0 5086 over Line 5124 and the other frame to PLAYER+1 5088 over Line 5126. The frames are then transmitted over the Fiber Optic Links 5056 and 5058 to the DM 110.

The uSBCs 5002, 5004, 5074, 5076 and the Micro Busses (see FIG. 25N) 5012, 5084 manipulate data in the system according to a hardware mode pin setting. When the mode pin is set, the Microsequencer Bus Controller System instance is a DM 110 operating on 36-bit data words in communicating with its Stations. When the mode pin is clear, the Microsequencer Bus Controller System is a HIA 214 operating on 32-bit data words in communicating with its Stations.

c. Index Processor (IXP)

The Index Processor (IXP) 236 manages the File Space 502 of the outboard file cache XPC 102. The IXP performs the logical to physical address mapping for file access commands, as well a providing overall cache control functions. Cache control functions include tracking which file segments are present in the File Cache and selecting a segment to assigned to a file. The IXP provides for initiating destaging selected segments and manages conflicts for access to the same segment. Protection against one file monopolizing cache is provided, as well as a recovery mechanism in the event that one of the IXPs 236*a* or 236*b* fails. While the IXP does not perform the actual data transfer from NVS 220 to a Host 10, it does provide for set-up and control of the data transfer activity.

FIG. 26 is a functional block diagram of the Index Processor (IXP). The IXP 236 communicates with the other components of the Outboard File cache XPC 102 via the Street 234. Interface Line 5802 connects the Master Micro-engine 5804 to the Street. Interface Line 5802 consists of 20 read signal lines. The 20 read signal lines include sixteen data lines, one parity line, one request line, one available line, and one acknowledge line. Similarly, Interface Line 5806 consists of 20 write signal lines. The write signal lines include sixteen data lines, one parity line, one request line, one available line, and one acknowledge line.

The IXP 236 includes two Micro-engines 5804 and 5808. Each Micro-engine operates at a 10 MIP rate and each includes a 32 function ALU for performing arithmetic and logical functions. Each micro-instruction has the ability to read from the respective Local Store 5810 or 5812, execute an ALU cycle, and store the results in the respective Local Store.

The Micro-engines 5804 and 5808 are special purpose RISC microprocessors that interface with the Street 234 via Lines 5802 and 5806, together referenced as 5814. The Micro-engines execute an instruction stream that is stored in the Control Store 5816, a high speed static random access memory (SRAM). The instruction stream is written into the Control Store at system initialization time. The instruction stream is fetched by Master Micro-engine 5804 from the Control Store over Line 5818. The same instruction stream is fetched by the Slave Micro-engine 5808 from the Control Store over Line 5820. The Master and Slave Micro-engines execute the same instructions at the same time but only the Master Micro-engine writes data to the Street via Line 5802. Results of operations performed by the Slave Micro-engine are forwarded over Line 5822 to the Master Micro-engine where they are compared with the results of operations performed by the Master Micro-engine to detect any possible errors or loss of program control.

FIG. 27 is a flow chart of the main processing loop of the IXP 236. Each IXP is assigned a distinct IXP Number. Decision Step 5852 tests whether the IXP 236 performing decision Step 5852 is assigned the lowest IXP Number. Only the IXP with the current lowest IXP Number monitors Nail Space 523 and Resident File Space 524 for purposes of reapportioning File Space 502.

Control is directed to decision Step 5854 if the IXP 236 is the lowest numbered IXP. File Space 502 is reapportioned, if necessary, on a predetermined schedule, for example every five days. Decision Step 5854 tests whether the five day timer has elapsed. Control is directed to Step 5856 to invoke LESS-NAIL processing when the five day timer has elapsed. LESS-NAIL processing converts segments from Nail Space to Cache File Space 522. Similarly, Step 5858 invokes LESS-XRF processing to convert segments from Resident File Space 524 to Cache File Space.

At Step 5860 the IXP obtains an entry from the Activity Queue 346. The IXP retrieving the entry from the Activity Queue must coordinate with any other IXPs which are part of the Outboard File Cache 102 because the Activity Queue is shared amongst all the IXPs. If an entry from the Activity Queue was requested from an earlier iteration of the main processing loop, Step 5860 does not attempt to read another Activity Queue entry.

Step 5862 requests that the HIA 214 send to the IXP 236 the Command Packet 452 corresponding to the entry obtained from the Activity Queue 346. The entry retrieved will indicate the particular HIA 214 from which the Command Packet should be requested. The main processing loop of the IXP does not sit idle while waiting for a Command Packet from the HIA. Therefore, processing continues at decision Step 5864 after a Command Packet is requested from a HIA at Step 5862. Note that Step 5862 will not request another Command Packet if it has already has an outstanding request to a HIA.

Decision Step 5864 tests whether eight segments have been reserved by the IXP 236 for use in the event that a miss condition is detected while processing a command. Each of the IXPs attempts to have eight segments reserved so that when a miss condition is detected the IXP may immediately assign one or more of its reserved segments rather than waiting until a miss has occurred to select segments for assignment. This enhances the rate at which file access commands are honored. If eight segments are already reserved, decision Step 5864 directs control around Step 5866. Step 5866 invokes PRE-USE processing to reserve a segment for future use.

Decision Step 5868 tests whether a Command Packet 452 has been received from the HIA 214. If no Command Packet is present to process, control is returned to Step 5860 to obtain an entry form the Activity Queue 346 if necessary. Similarly, Step 5862 only requests a Command Packet from the HIA if one has not already been requested. Control is directed to decision Step 5870 if decision Step 5868 finds that a Command Packet is present for processing.

If the command in the Command Packet 452 is a type that requires searching File Space 502 for referenced segments, decision Step 5870 directs control to Step 5872. Step 5872 invokes HASH processing to find the index in the Hash Table 6000 for the segment addressed by the command. Using the Hash Table entry found at Step 5872, Decision Step 5874 tests whether a lock was granted on the group of eight Hash Table entries which references the first segment referenced by the command. If the lock was not granted, control is directed to Step 5876 where a lock is requested at some later time. Once a lock is granted, Step 5878 reads the File Descriptor 508 from the File Descriptor Table 506. Step 5880 invokes COMMAND-BRANCH processing to decode the command in the Command Packet and invoke the necessary processing for performing the required operations.

d. Storage Interface Controller (SICT)

The Storage Interface Controller (SICT) 228 (see FIG. 6) is the interface control between the Street 234 and the Non-volatile Storage (NVS) 220. The SICT has four basic interfaces, a receiver interface from the Street, transmit interfaces to NVS in the Power Domains A and B, receiver interfaces from NVS in each Power Domain, a transmit interface to the Street, and clock and scan/set interfaces.

The first basic function of the SICT is to receive requests from the Street 234, verify their validity, and pass them on to the NVS 220. It must also save packet information so that functional differences can be detected and that status and data can be routed back to the proper requester (either an IXP 236 or a HIA 214).

The second basic function is to receive data from the NVS 220, reassemble it into packets, and transmit the requested data back over the Street 234 to the requester. In the process of receiving data from the NVS arrays the SICT must correct for NVS multiple bit errors, card failures, detect and report error status information, and generate packet headers and checksums.

The third and last basic function is to provide an interface to the NVS 220 for maintenance requests to the storage. Examples include initialization, restoration, and general reading and writing of data.

Write requests received via the Street 234 are sent on to the NVS 220 as interface timing allows. The SICT 228 will buffer a maximum of eight requests if the NVS interface is not immediately available. As the request is being transmitted to the NVS, the requester's identification and location are saved for later use so that data can be returned to the requester. Write requests are normally sent to the NVS in each Power Domain 225. The SICT will wait for an acknowledge from the NVS in each Power Domain before proceeding with the next write request.

Read requests received via the Street 234 are handled in much the same manner as are write requests. The difference is that data read from NVS 220 is returned to the requester via the Street 234.

e. Non-volatile Storage (NVS)

Non-volatile Storage 220 consists of from one to five NVS array cards (not shown) within each of the Power Domains A and B. The two Power Domains always contain the same number of NVS array cards. The structure is not illustrated in detail, it being understood that various memory structures capable of the following functions may be used. The data may be stored across one to four of the NVS array cards with a fifth array card which stores a check sum of the data in the other array cards.

Each NVS array card contains a four port 40 bit storage array plus single bit error correction, double bit error detection, data buffering, interface, priority, clock, and maintenance logic. The logic will resolve simultaneous requests from each port while maintaining a maximum band pass of one word every 100 ns. The four port interfaces each consist of a nineteen bit parity protected serial input bus, a four bit parity protected serial read data bus, an error line, and a valid line. Error Correction Codes are generated on the data and address by the NVS gate array for write requests and checked and/or corrected by the NVS gate array during read requests. Each NVS array card includes 320 DRAM storage devices, wherein the capacity of the storage devices is either 4 MB, 16 MB, or 64 MB.

f. Street Interprocessor Network

FIG. 28 is a block diagram to further illustrate the functional components of the Street interprocessor communication and storage access network within the Outboard File Cache. While FIG. 28 illustrates a configuration with four IXPs and HIAs, larger configurations are contemplated and the configuration shown is merely illustrative. The Street spans Power Domains A and B and allows IXPs 236 and HIAs 214 to read and write data to and from NVSs 220 by sending requests to the SICTs 228. Additionally, each IXP may communicate with each of the other HIAs. For example, IXP 236a may send data packets to HIAs 214a, 214b, 214c, and 214d. Likewise, HIAs 214a, 214b, 214c, and 214d may send data packets to each of the IXPs 236a, 236b, 326c, and 236d.

The Street 234 is implemented using VSLI gate arrays referred to as HUBs. A HUB0 728 (728a, 728b, 728c, and 728d) provides an interface to the Street 234 for one IXP 236/HIA 214 pair. The respective interfaces are provided via Lines 5130 and 5814. The IXPs and HIAs send and receive data packets via their associated HUB0.

Each HUB has five interfaces to route data packets. The five interfaces for a HUB0 728 include: an IXP interface, a HIA interface, an Up street interface, a Down street interface, and a HUB1 730 interface. The IXP interface (not explicitly shown) routes data packets to and from and IXP 236 via line 5714. The HIA interface (not explicitly shown) routes data packets to and from HIA 214 via Line 5130.

The Up street interface (not explicitly shown) receives data packets from another HUB0 and routes the data packet via the Up street interface to another HUB0 if necessary. For example, HUB0 728c receives data packets on its Up street interface via Line 740. If the data packet is addressed to either IXP 236c or HIA 214c, the data packet is directed to the respective component. If the data packet is addressed to HIA 214a or IXP 236a, the data packet is directed by the Up street interface via Line 742 to the Up street interface for HUB0 728a. The Down street interface operates in a similar fashion. The HUB1 interface in a HUB0 728 sends and receives data packets to and from a HUB1 730.

The five interfaces for a HUB1 include: a HUB0 interface for sending and receiving data packets from HUB0, a SICT interface for sending and receiving data packets from the SICT, an Up Street interface, a Down Street interface, and a Cross-over interface.

It should be noted that a data packet sent from an IXP or HIA to an SICT is directed along the portion of the Street controlled by HUB0s 728 until the data packet reaches the particular HUB0 which is directly coupled to the HUB1 730 which is directly coupled to the SICT. Whereas a data packet sent from a SICT to either an IXP or HIA is directed along the portion of the Street controlled by HUB1s 730 until the data packet reaches the particular HUB1 which is directly coupled to the HUB0 which provides the Street interface for the IXP or HIA to which the data packet is addressed.

The Cross-over interfaces of the HUB1s 730 provide for data packet re-routing in the event that an error condition prevents transmission of a data packet along the normal Up street or Down street. The Cross-over interfaces of HUB1 730a and HUB1 730b are coupled via Line 238a and the Cross-over interfaces of HUB1 730c and HUB1 730d are coupled via Line 238b. The Cross-over interfaces allow for rerouting of data packets traveling on the portion of the Street 234 controlled by HUB1s 730 and for rerouting of data packets traveling on the portion of the Street controlled by HUB0s 728. For example, a data packet at the Up street interface of HUB0 728c which is to be sent to HUB0 728a may be redirected to the Up street interface of HUB0 728d via HUB1 730c and HUB1 730d if HUB0 728a is unable to receive on its Up street interface a data packet from HUB0 728c.

5. Multi-Host Capability

The multi-host capabilities of the File Cache System include sharing the outboard file cache XPC 102 among multiple Hosts 10, and sharing selected ones of Files 114a–h among multiple Hosts. Storage management and locking control processes implemented in the outboard file cache XPC 102 provide this functionality.

FIG. 29 is an block diagram illustrating a data processing configuration including a plurality of Hosts coupled to a Outboard File Cache. The exemplary configuration includes three Hosts 10a, 10b, and 10c. Each of the Hosts is coupled to a Control Unit 104, thereby providing access to one or more Disks 106. In the exemplary configuration, Hosts 10a and 10b share access to one or more Disks designated as 106a via Control Unit 104a. Host 10c has access to one or more Disks designated as 106b via Control Unit 104b.

It should be understood that while only three Hosts are illustrated, the Outboard File Cache provides up to 64 HIAs 214 thereby yielding a total of 32 redundant Host connections. For each Host, the outboard file cache XPC 102 has two available Host Interface Adapters (HIAs) 214. The first HIA provided for a Host resides in Power Domain A, and the second HIA provided for a Host resides in Power Domain B. HIAs 214a and 214b provide access to the Outboard File Cache for Host 10a, wherein HIA 214a resides in Power Domain A, and HIA 214b resides in Power Domain B. Fiber Optic Links 112a and 112b respectively couple HIAs 214a and 214b to their associated Data Movers (DMs) 110 in the I/O Complex 32. Similarly, HIAs 214c and 214d are provided for Host 10b, wherein Fiber Optic Links 112c and 112d couple the Host 10b to the Outboard File Cache 102. Host 10c is coupled to the Outboard File Cache in a similar fashion.

For each HIA 214a–f included in the exemplary configuration, an IndeX Processor (IXP) 236 is provided. It should be noted that any one of the Index Processors 236a–f may process commands sent through any one of the HIAs 214a–f. When an additional HIA is provided in the outboard file cache XPC 102, an additional IXP is also added to provide extra processing capacity. Thus, any one of the IXPs 214a–f may interact with anyone of the HIAs 214a–f. For example, an Command Packet 452 may be sent from Host 10a via Fiber Optic Link 112b and HIA 214a, and then processed by IXP 236f.

Cache storage in the outboard file cache XPC 102 is provided the Storage Interface ConTrollers (SICTs) and Non-Volatile Storage modules (NVS) as represented by blocks 732b, 732b, and 732c. Each of blocks 732b–c represent a pair of SICTs (shown as 228a and 228b in FIG. 6) and a Non-Volatile Storage Module (shown as 220 in FIG. 6). Memory management functionality is provided by IXPs 236a–f.

Streets 234a and 234b provide interprocessor communication facilities between HIAs 214a–f and IXPs 236a–f, as well as data transfer capabilities between the Storage 732a–c and the HIAS and IXPs. For each HIA-IXP pair in the configuration, there is an associated Crossover 238a–c for routing data and requests.

The software, data transfers, command processing, descriptors, file locking and unlocking, and other operations in the use of XPC 102, are described in co-pending application entitled, Outboard File Cache System identified above.

6. Major Component Detailed Descriptions

Having described the major components and their interrelationships to provide the functionality for the outboard file cache XPC 102, a more detailed treatment will be made to assist in providing full understanding of the scopes and aspects of the various features of the invention. Attempts will be made to utilize to the extent possible common a. Clock and Power Distribution

A fault tolerant clock distribution system for use in an outboard file cache system utilizes redundant synchronized clock signals to clock multiple circuit loads. High fault tolerance is provided through the use of redundant oscillators, phase detection and synchronization circuitry, clock distribution circuitry, and AC and DC power sources. Error detection circuitry is provided to allow automatic or manual recovery from synchronization errors, and selection circuitry is used to switch from a faulty clock signal to an operational clock signal. The present invention generates a single phase clock signal, and provides multiple phase enable signals at the circuit loads, in order to elude the complex synchronization and distribution of multiple clock phases. The combination of these elements creates a very fault tolerant, relatively skew-free multiple phase clock distribution system.

The clock distribution system utilizes multiple power domains, which are powered by separate DC power sources. Clock sourcing circuitry is included within each power domain to provide a digital oscillator signal in each power domain. This digital oscillator signal is then synchronized with each of the digital oscillator signals from each of the other power domains in the system. Therefore, each power domain will have a digital oscillator signal which is synchronized with all other digital oscillator signals, and these signals are referred to as synchronized clock signals. Each power domain also includes clock signal distribution circuitry to distribute the synchronized clock signal within its power domain to circuit loads within the same power domain. Each of the synchronized clock signals can clock the circuit load within its power domain at the same time as the synchronized clock signals from other power domains clock their respective circuit loads. Therefore, activity within each of the circuit loads in each of the power domains will occur simultaneously, and any data which is stored in the circuit load of one power domain will be equivalent to that which is stored on the other power domains.

In order to ensure continuous operation in the event of a power failure, multiple levels of power sourcing redundancy are used in the present invention. Each power domain is powered by a separate DC power source. If a DC power source associated with one of the power domains were to fail, the other power domains would continue operating due to the presence of independent DC power source circuitry within each power domain. In order to further increase DC power source reliability, another aspect of the present invention contains multiple DC power supplies in each DC power source. Each of these DC power supplies is connected in parallel to concurrently power their associated power domain. In this way, the failure of one of the DC power supplies will not cause the DC power source associated with that power domain to become ineffective. The power redundancy of the present invention is further enhanced in another aspect of the present invention through the use of redundant AC power sources. A separate AC power source is used to provide AC power to each of the DC power supplies within each DC power source. For instance, if two DC power supplies are used within each DC power source, two AC power sources will be used, and one of the DC power supplies in each DC power source will be driven by a first AC power source, and the other DC power supplies in each DC power source will be driven by a second AC power source. Therefore, if either AC power source fails, the other AC power source will continue to provide AC power to one power supply within each DC power source, and none of the DC power sources will cease to supply DC power.

Oscillator signals within each power domain are synchronized with one another to produce a group of synchronized clock signals. Where redundant oscillators are used in each power domain, and each is synchronized with each of the oscillators in the remaining power domains, a group of simultaneously synchronized clock signals is available to be selected to drive a number of circuit loads. Any number of these synchronized clock signals can be selected to provide synchronized clocking to the circuit loads. If two redundant circuit loads were to be clocked, two of the synchronized clock signals can be selected by selection circuitry to clock each of the redundant circuit loads simultaneously. In order for the selection circuitry to select the appropriate synchronized clock signals, selection control circuitry is required, which designate which of the synchronized clock signals is to be selected to simultaneously clock the redundant circuit loads. The selection control circuitry of the present invention allows the automatic selection of synchronized clock signals, or manual selection through a user interface to select the desired synchronized clock signals to clock the circuit loads.

To provide a high level of security from circuitry failure, multiple clock distribution circuits are provided. Each clock distribution circuit receives a synchronized clock signal which has been selected to clock a circuit load, and provides the necessary clock drive capabilities to clock the circuitry within that circuit load. If one clock distribution circuit fails, the other synchronized clock signals will be distributed through the remaining clock distribution circuits, and the circuit loads associated with those clock distribution circuits will continue to be clocked. If all circuit loads being clocked are redundant circuit loads, the loss of one clock distribution circuit will not result in data loss, since each of the redundant circuit loads would contain the same data, and the remaining clock distribution circuits will continue to properly provide the remaining redundant circuit loads with valid clock signals.

The selection circuitry also includes redundancy. Each synchronized clock signal can be selected through at least two different selection circuits. Therefore, if one selection circuit fails, the selection control circuitry can still select the desired synchronized clock signal through the remaining operational selection circuit. Each clock distribution circuit therefore requires multiple inputs to receive the desired synchronized clock signal from each of the redundant selection circuits providing the desired synchronized clock signal. From these multiple inputs, the clock distribution circuitry then chooses one of the identical synchronized clock signals from one of these inputs as the driving clock signal, and disregards the other synchronized clock signals at the remaining inputs. If the selection circuit providing a synchronized clock signal to the chosen input of the clock distribution circuitry fails, the clock distribution circuitry will automatically switch to one of its remaining inputs to receive the same synchronized clock signal from another redundant selection circuit. In order to perform this input switch, the clock distribution circuitry must monitor the synchronized clock signal at each of its inputs, and a multiplexer will select which of the synchronized clock signals should drive the circuit loads.

The present invention includes skew detection circuitry to ensure proper synchronization of the synchronized clock signals. If the skew detection determines that two synchronized clock signals are not maintaining proper synchronization, the skew detection circuitry will notify the selection control circuitry to select different synchronized clock signals by sending the appropriate control signals to the selection circuitry. This provides continuous clocking of the circuit loads although a synchronized clock signal error has occurred.

Another aspect of the present invention provides for the clocking of the circuit loads at different phases of the selected synchronized clock signal. It is desirable to allow the capability to clock the circuit loads on selected pulses of the synchronized clock signal, but the use of multiple oscillators in each power domain would create a very complex synchronization situation if multiple phases of the oscillator signals were generated and distributed to the circuit loads. Rather than first generating multiple phases of the oscillator signals, then synchronizing all of the phases to corresponding phases of redundant oscillator signals in other power domains, the present invention drives only the single phase synchronized clock signal to the circuit loads. Upon receipt of the synchronized clock signal at the circuit loads, multiple phase enable circuitry exists which will "enable" the single phase synchronized clock signal to clock the circuit load on specified pulses of the single phase synchronized clock signal. Therefore, the synchronized clock signal provides the clock triggering pulses for all circuit loads in its associated power domain, and each circuit load generates enable signals to enable or disable each circuit within the circuit load to receive or disregard these clock triggering pulses.

This highly redundant multiple phase clock distribution system is very beneficial in systems requiring continuous operation. The redundancy in power systems, clock sourcing and synchronization, and clock distribution allow the system to continue to operate properly where a failure has occurred. This fault tolerant clock distribution system is particularly advantageous where redundant circuit loads are utilized in order to ensure that no data loss occurs. The system provides automatic or manual error recovery, and provides for flexibility in circuit load design through the use of multiple phase enable signals.

FIG. 30 is a block diagram of a clock distribution system where a plurality of clock sources powered by separate voltage busses are synchronized across the power domain boundaries in order to simultaneously clock an equal number of equivalent circuit loads. This block diagram illustrates the purpose of the clock distribution redundancy, wherein n (n=any number greater than 1) equivalent loads storing identical copies of data are clocked simultaneously by clock sources in separate power domains in order to maintain equivalency of load data, and ensure that no single AC or DC power failure will result in the loss of data. From this diagram, it can be seen that additional clock sources may be added in additional power domains, and the original clock signals can then be synchronized with the additional clock signals to simultaneously clock as many loads as necessary (n loads) to obtain the desired assurance that power failures or clock source failures will not cause any loss of data.

In FIG. 30, Power Domain A 1010, Power Domain B 1012, Power Domain C 1014, and Power Domain n 1016 are powered by separate DC Power Sources (DC power supplies in the preferred embodiment), and each power domain represents a completely isolated voltage bus. DC Power Source A 1018 supplies DC voltage to the circuitry in Power Domain A, DC Power Source B 1020 supplies DC voltage to the circuitry in Power Domain B, DC Power Source C 1022 supplies DC voltage to the circuitry in Power Domain C, and DC Power Source n 1024 supplies DC voltage to the circuitry in Power Domain n. Any voltage could be used to supply power to the power domains, depending on the component logic family preferred. In the preferred embodiment, the DC Power Sources supply +5 volts DC to their respective power domains. Each of the DC power sources is powered by an AC power source, labelled AC Power Source A 1026, AC Power Source B 1028, AC Power Source C 1030, through AC Power Source n 1032. It would be an option to reduce the number of independent AC power sources from one per power domain to at least one AC power source. This depends on the desired AC power source redundancy required for the particular application. For instance, where three power domains are utilized, it would be possible to provide AC power to the three DC power sources through only two AC power sources. In that case, two of the DC power sources would be powered by a single AC power source.

Power Domain A 1010 and Power Domain B 1012 are separated by the Power Domain Boundary A/B 1034, Power Domain B and Power Domain C 1014 are separated by the Power Domain Boundary B/C 1036. Power Domain n 1016 would be separated from Power Domain n−1 by the Power Domain Boundary n/n−1 1038, which is dependent upon the number of independent power domains chosen. These boundaries physically isolate the voltage bus a power domain from the voltage bus of an adjacent power domain. Within each power domain, clock sourcing circuitry exists which provides an oscillatory digital clock signal. Clock Source A 1040 resides in Power Domain A, Clock Source B 1042 resides in Power Domain B, Clock Source C 1044 resides in Power Domain C, and so forth through Clock Source n 1046 in Power Domain n. Since each clock source circuit is powered by an isolated voltage bus, redundant clock source circuits will remain operative if either the AC power source or DC power source supplying voltage to the one clock source circuit fails or becomes inoperative. For example, if the power supply/power supplies comprising DC Power Source A was/were to fail, causing the clock signal of Clock Source A to stop operating, Clock Source B, Clock Source C, and all clock sources through Clock Source n 1046 would be unaffected, and would continue to supply clock signal to its load. The system could continue operations, and the data which was lost in Load A 1048 of Power Domain A will have already been preserved in Load B 1050 of Power Domain B, Load C 1052 of Power Domain C, and through Load n 1054 of Power Domain n, since the same data that was manipulated in Load A prior to the failure of DC Power Source A was simultaneously manipulated in Load B, Load C, and through Load n. Therefore, no data loss will occur since only one of the n copies of data lost its DC power source.

The use of redundant power domains, redundant circuit loads, and redundant clock distribution circuitry allows each load to have the same information clocked in at the same time. In order that each load in each power domain maintains the same information, the information or data sent to each load must be clocked at precisely the same time. To ensure that each load is clocked simultaneously, the clock signal from Clock Source A 1040 is synchronized with the clock signals from Clock Source B 1042, Clock Source C 1044, through Clock Source n 1046. These clock signals will be referred to as Clock Signal A 1056, Clock Signal B 1058, Clock Signal C 1060, through Clock Signal n 1062. Synchronizer & Distribution Circuitry A 1064, B 1066, C 1068, and n 1070 in Power Domain A, B, C, and n respectively, performs the synchronization of the clock signal in a given power domain with those clock signals from the remaining power domains.

Synchronization of the clock signals is performed across the Power Domain Boundaries A/B 1034, B/C 1036, through n/n−1 1038. The Synchronizer & Distribution Circuitry detects phase differentials between n clock signals, resynchronizes the clock signals, and distributes the Synchronized Clock Signal A 1072, B 1074, C 1076, and n 1078 to Load A 1048, B 1050, C 1052, and n 1054 respectively. In the preferred embodiment, each load comprises equivalent memory and memory control circuitry. All of the information which is clocked into one load is also being simultaneously clocked into the other loads. In this way, the loss of voltage in any power domain will only affect the information stored in that power domain's load, and the other loads will continue to store valid data. Since each load had identical information simultaneously clocked into it prior to the loss of power to one power domain, the remaining power domain's load will hold all of the previous data, plus any new data which is then clocked into it.

FIG. 31 is a block diagram of the preferred embodiment of the Fault Tolerant Clock Distribution System. In the preferred embodiment, only two power domains were necessary to obtain the desired reliability. Put another way, the number of power domains (n) of FIG. 1 equals two. The power domains are labelled Power Domain A 1010 and Power Domain B 1012. Power Domain A is powered from AC Power Source A 1026, and DC Power Source A 1018 which consists of one or more DC power supplies. Similarly, Power Domain B 1012 is powered from AC Power Source B 1028 and DC Power Source B 1020.

Looking first to Power Domain A, Clock Signal A 1056 from Clock Source A 1040, and Clock Signal B 1058 from Power Domain B's 1012 Clock Source B 1042, are inputs to Synchronizer & Distribution Circuitry A 1064. The Synchronizer & Distribution Circuitry detects phase differentials between Clock Signals A and B, adjusts Clock Signal A if the two clock signals are not properly synchronized, and distributes the Synchronized Clock Signal A 1072 to Load A 1048. Synchronized Clock Signal A consists of Clock Signal A 1056 which has been adjusted to be synchronized with Clock Signal B 1058. Looking now to Power Domain B, Clock Signal B from Clock Source B, and Clock Signal A from Power Domain A's Clock Source A, are inputs to Synchronizer & Distribution Circuitry B 1066, which detects phase differentials between Clock Signals B and A, adjusts Clock Signal B if the two clock signals are not properly synchronized, and distributes the Synchronized Clock Signal B 1074 to Load B 1050. Therefore, Synchronized Clock Signal B is Clock Signal B 1058 which has been adjusted to be synchronized with Clock Signal A 1056. By simultaneously synchronizing each clock signal with the other, Load A and Load B will be clocked at precisely the same time.

In the preferred embodiment, Load A 1048 and Load B 1050 comprise equivalent memory and memory control circuitry. All of the information which is clocked into one load is also being simultaneously clocked into the other load. In this way, the loss of voltage in either power domain will only affect the information stored in that power domain's load, and the other load will continue to store valid data. Since each load had identical information simultaneously clocked into it prior to the loss of power to one power domain, the remaining power domain's load will hold all of the previous data, plus any new data which is then clocked into it. Furthermore, if any other circuitry within a given power domain fails so that its synchronized clock signal can not properly clock its load, another entire power domain exists along with associated clock sourcing capabilities so that the system can continue to operate or gracefully recover, depending on the specific failure which occurred and the mode of operation that the system is operating under. A more detailed description of error detection and recovery for the clock distribution system is provided in a later portion of this description.

FIG. 32 shows the Fault Tolerant Clock Distribution System when DC Power Source B 1020 or AC Power Source B 1028 has failed. When DC Power Source B or AC Power Source B fails, the voltage to Power Domain B 1012 is no longer present on the voltage bus to supply the circuitry. None of the circuitry in Power Domain B will be operational in such a case. In this case, Clock Source A 1040 will continue to provide clock signals to Load A 1048 through Synchronization & Distribution Circuitry A 1064 even though Power Domain B has failed. Since the data which was stored in Load B 1050 was simultaneously stored in Load A, the data is not lost as a result of the loss of voltage to Power Domain B. A similar situation exists where DC Power Source A 1018 or AC Power Source A 1026 fails, in which case the circuitry of Power Domain B will remain operational. If a larger degree of reliability was desired, and an additional power domain and associated circuitry were being used (i.e., Power Domain C 1014 of FIG. 30), two power domains would remain operational upon the loss of one power domain. In that case, two failures in two different power domains could occur without losing valuable system data or error recovery capability.

FIG. 33 is a waveform diagram which shows the Synchronized Clock Signals which supply each load, and which further illustrates how the Synchronized Clock Signal in a given power domain continues to clock its respective load upon the loss of the other Synchronized Clock Signal. As previously described, if DC Power Source A 1018 was to fail, Clock Source A 1040 would stop producing Clock Signal A 1056, which would result in the loss of Synchronized Clock Signal A 1072, and Load A 1048 would no longer receive clock signals. FIG. 33 depicts the loss of Synchronized Clock Signal A 1072 at the falling edge of Pulse 1080, but shows that Synchronized Clock Signal B 1074 will remain operative to clock Load B 1050. This is because each Clock Source circuit is powered by separate DC Power Sources. A similar scenario can be envisioned where Synchronized Clock Signal B 1074 stopped functioning and Synchronized Clock Signal A 1072 continued operating.

FIG. 34 illustrates the AC power source and DC power source redundancy of the preferred embodiment. To provide an extra level of security against voltage loss, redundant power supplies are used in each DC power source. Power Supply A1 1082 and Power Supply A2 1084 reside in DC Power Source A 1018, and Power Supply B1 1086 and Power Supply B2 1088 reside in DC Power Source B 1020. Power Supply A1 1082 connects to Power Domain A 1010 through A1 +5 V 1090 and A1 GND 1092. Power Supply A2 1084 connects to Power Domain A 1010 through A2 +5 V 1094 and A2 GND 1096. Power Supply B1 1086 connects to Power Domain B 1012 through B1 +5 V 1098 and B1 GND 1100. Power Supply B2 1088 connects to Power Domain B 1012 through B2 +5 V 1102 and B2 GND 1104. If either power supply fails within DC Power Source A or DC Power Source B, the remaining power supply can supply enough current to keep the circuitry of the power domain operative. When both power supplies are operative, the power supplies share current, and both provide current to the power domain. A higher number of redundant power supplies could be used if a higher degree of DC power reliability was desired; however, dual power supplies in each DC power source provided the requisite reliability in the preferred embodiment due to the low failure rate of the power supplies implemented.

Each of the AC power source outputs is connected to one power supply in DC Power Source A 1018 and B 1020. AC Power Source A 1026 provides AC power to Power Supply A1 1082 and Power Supply B1 1086. AC Power Source B 1028 provides AC power to Power Supply A2 1084 and Power Supply B2 1088. In this way, a failed AC power source will only affect one power supply in each DC power source, and the other power supply in each DC power source will remain operational. For example, if AC Power Source A 1026 fails, Power Supply A1 and Power Supply B1 will lose AC input power, and will stop producing a +5 volt DC output. However, AC Power Source B 1028 would still be producing AC power, and Power Supply A2 and Power Supply B2 would continue to provide the +5 volt DC voltage to Power Domain A and Power Domain B. Similarly, if AC Power Source B 1028 fails, only Power Supply A2 and Power Supply B2 would stop producing +5 volts, and Power Supply A1 and Power Supply B1 would still be fully operational. The AC Power Source used in the preferred embodiment consists of using either utility AC power or diesel generator power, one of which will be selected through the use of an uninterruptable power source. However, it must be appreciated that any other type of AC power source would serve as well, such as motor/alternator AC power sources and the like.

FIG. 35 is a block diagram showing the detail of the preferred embodiment. As FIG. 31 previously showed, each power domain consists of clock sourcing capabilities, synchronization and distribution circuitry, and recipient load circuitry. FIG. 35 shows that two Clock Signals exist in each Clock Source A 1040 and B 1042. Clock Source A consists of Primary Clock Signal Drive A 1106 and Redundant Clock Signal Drive A 1108, and Clock Source B consists of Primary Clock Signal Drive B 1110 and Redundant Clock Signal Drive B 1112. The Primary Clock Signal Drives provide the default clock signal, and the Redundant Clock Signal Drives provide the clock signal which can be selected upon a failure of the Primary Clock Signal Drive.

FIG. 36 is a block diagram of Clock Source A 1040 in Power Domain A 1010. The Primary Clock Signal Drive A 1106 contains Oscillator A1 1114 and Clock Shape A1 1116, and the Redundant Clock Signal Drive A 1108 contains Oscillator A2 1118 and Clock Shape A2 1120. Each oscillator produces a digital clock signal which is connected to the Clock Shape circuitry. The Clock Shape circuitry is included to produce a symmetric clock pulse with a 50% duty cycle, which creates more pronounced triggering edges, and allows inverted clock signals to be utilized. Clock Signals A1 1122 and A2 1124 of Clock Shape A1 1116 and A2 1120 are the clock signals of which one will be synchronized with a clock signal from Power Domain B 1012. Clock signal A1 1122 and Clock Signal A2 1124 are species of the generic Clock Signal A 1056 depicted in FIGS. 30, 31, and 33.

Returning to FIG. 35, Clock Signals A1 1122, A2 1124, B1 1134, and B2 1136 are connected to Synchronizers A1 1138, A2 1140, B 1142, and B2 1144 respectively. A Synchronizer will resynchronize its associated Clock Signal with another Clock Signal that clocks the load in the other power domain. The synchronizers resynchronize the Clock Signal upon a request from a phase detector, which monitors the phase differential between two given Clock Signals. The four Clock Signals, Clock Signal A1 1138, Clock Signal A2 1124, Clock Signal B1 1134, and Clock Signal B2 1136, are synchronized with each other in various combinations of "clock pairs". A clock pair is a synchronized pair of Clock Signals, where each of the two resulting Synchronized Clock Signals clocks a load in one of the two power domains. Therefore, two of the four Clock Signals are selected as the "active" signals, and each will clock one of the loads in a power domain. These two clock signals are synchronized with each other before clocking its respective load so that the loads are guaranteed to perform functions at precisely the same time. The remaining two Clock Signals (the two of the four which were not selected as the active signals) are "inactive" in the sense that they will not be currently clocking a load.

Four different pairs of Clock Signals are simultaneously synchronized in the preferred embodiment. Those Synchronized Clock Signals comprise four sets of clock pairs: 1) Synchronized Clock Signal A1-A2 1146 and Synchronized Clock Signal A2-A1 1148, 2) Synchronized Clock Signal A1-B1 1150 and Synchronized Clock Signal B1-A1 1152, 3) Synchronized Clock Signal A2-B2 1154 and Synchronized Clock Signal B2-A2 1156, and 4) Synchronized Clock Signal B1-B2 1158 and Synchronized Clock Signal B2-B1 1160. It should be noted that two of these clock pairs comprise pairs of Synchronized Clock Signals within the same power domain: Synchronized Clock Signal A1-A2 and Synchronized Clock Signal A2-A1, and Synchronized Clock Signal B1-B2 and Synchronized Clock Signal B2-B1. The reason for providing these clock pairs is to allow for the replacement of circuitry within one power domain while allowing the circuit loads associated with that power domain to continue to be clocked by the circuitry of the other power domain. For example, if the circuitry within Clock Source B 1042 was to fail, Synchronized Clock Signal A2-A1 1150 could clock Load B 1050. Therefore, if Clock Source B 1042 was on a separate printed circuit board, as in the preferred embodiment, this board can be replaced without having to discontinue clock signals to Load B 1050. However, if Power Domain B 1012 was never powered up, Synchronized Clock Signal A1-A2 1146 would clock Load A 1048 by itself, and Synchronized Clock Signal A2-A1 1150 would not be used. Although Synchronized Clock Signal A2-A1 could have been used as a redundant signal for Load A 1048, it was not used as such in the preferred embodiment because it was determined that Power Domain B 1012 would always be used, and it would be powered up immediately following the application of power to Power Domain A 1010. In the preferred embodiment, the very short time between application of power to Power Domain A and the application of power to Power Domain B did not justify the need for supplying Synchronized Clock Signal A2-A1 1150 to the Secondary A 1198 input for redundancy. Therefore, although the active clock pair will be the clock pair comprising Synchronized Clock Signal A1-A2 1146 and Synchronized Clock Signal A2-A1 1150 at system power up, only Synchronized Clock Signal A1-A2 1146 will be clocking Load A 1048. When Power Domain B 1012 is then powered up, the system will choose a Clock Signal from each Power Domain to clock its respective load. For example, when Power Domain B is powered up, the clock pair comprising Synchronized Clock Signal A1-A2 1146 and Synchronized Clock Signal A2-A1 1150 will be aborted, and the clock pair comprising Synchronized Clock Signal A1-B1 1148 and Clock Signal B1-A1 156 will be selected. This description applies by analogy if Power Domain B 1012 were powered up before Power Domain A 1010.

A unique phase detector is assigned to each of these four sets of Clock Signals. Phase Detector A1-A2/A2-A1 1164 monitors for phase differences between Clock Signal A1 1122 and Clock Signal A2 1124. If Phase Detector A1-A2/A2-A1 establishes that Clock Signal A1 is leading Clock Signal A2, it will send a signal to Synchronizer A1 1138 to delay for a short time to resynchronize Clock Signal A1 with Clock Signal A2. If Phase Detector A1-A2/A2-A1 determines that Clock Signal A2 is leading Clock Signal A1, it will send a signal to Synchronizer A2 1140 to delay for a short time to resynchronize Clock Signal A2 with Clock Signal A1. A similar scenario occurs with the remaining three sets of Clock Signals and their associated phase detectors. Phase Detector A1-B1/1-A1 1166 monitors Clock Signal A1 and Clock Signal A2, and sends a signal to Synchronizer A1 1138 or Synchronizer B1 1142 if necessary to delay the clock signal which is leading the other. Phase Detector B1-B2/B2-B1 1168 monitors Clock Signal B1 and Clock Signal B2, and sends a signal to Synchronizer B1 1142 or Synchronizer B2 1144 if necessary to delay the clock signal which is leading the other. Finally, Phase Detector A2-B2/B2-A2 1170 monitors Clock Signal A2 and Clock Signal B2, and sends a signal to Synchronizer A2 1140 or Synchronizer B2 1144 if necessary to delay the clock signal which is leading the other.

A clock pair is a set of two Clock Signals which have been synchronized with each other to produce complementary Synchronized Clock Signals. Therefore, one clock pair consists of two complementary clock signals. For instance, the pair of Synchronized Clock Signals including Synchronized Clock Signal A1- B1 1148 and Synchronized Clock Signal B1 -A1 1156 are referred to as the A1-B1/B1-A1 clock pair. Thus, four clock pairs comprising four Synchronized Clock Signals and their complements (eight Synchronized Clock Signals total) are produced by the four sets of Clock Signals. FIG. 35 shows the four sets of clock pairs at the outputs of the synchronizers. The four sets of clock pairs are A1-A2/A2-A1 (comprising Synchronized Clock Signals A1-A2 1146 and A2-A1 1150), A1-B1/B1-A1 (comprising Synchronized Clock Signals A1-B1 1148 and B1-A1 1156), B1-B2/B2-B1 (comprising Synchronized Clock Signals B1-B2 1154 and B2-B1 1158), and A2-B2/B2-A2 (comprising Synchronized Clock Signals A2-B2 1152 and B2-A2 1160).

All four of the clock pairs are available at the output of the synchronizers whenever voltage is supplied to both power domains. Therefore, there must be a method of selecting a clock pair to distribute the clock signals to the loads in the power domains. This is performed via the Select #1 1172, Select #2 1174, Select #3 1176, and Select #4 1178 circuits. These circuits provide a multiplexer-type function, and allow a specified clock pair to pass to Clock Distribution Circuitry A 1162 and Clock Distribution Circuitry B 1180 at the direction of the Network Interface Modules (NIM) A 1182 and B 1184. The NIMs provides a user interface for clock pair changes desired by the user. Automatic clock pair changes are also possible when error detection circuitry indicates clock signal errors to the NIMs. The error detection circuitry of the present invention includes Skew Fault Detection A 1186 and B 1188. This error detection circuit is discussed in a later portion of this description.

NIM circuits, such as NIM A 1182 and B 1184, reside in each power domain which houses a Clock Source, such as Clock Source A 1040 and B 1042. In other words, a NIM will not be present in power domains which only house additional circuit loads. The capability of the clock distribution system to provide clock signals to additional loads is described in a later portion of this description. One of the two NIM circuits acts as a master controller, while the other acts as a slave controller. Three control signals are provided from the master NIM to each of the Select circuits to enable one of the three Synchronized Clock Signals. There are also three signals provided from the NIM to each of the Select circuits to enable one of three synchronization (SYNC) signals (not shown). A SYNC signal is a periodic pulse which is sent to the synchronization circuitry to determine whether or not the two Clock Signals are synchronized. A SYNC signal is created at the Primary Clock Signal Drive A 1106 and at the Redundant Clock Signal Drive A 1108 of Clock Source A 1040. A SYNC signal is also created at the Primary Clock Signal Drive B 1110 and at the Redundant Clock Signal Drive B 1112 of Clock Source B 1042. Synchronizers A1 1138, A2 1140, B1 1142, and B2 1144 use these SYNC signals to help synchronize the Clock Signals. The SYNC signals are also sent to each load in the system to produce multiple phases of the clock signal, which in turn are used because certain circuits within each load require offset phases for timing purposes. The SYNC signal which is selected will always be derived from the Clock Signals which comprise the selected clock pair. In other words, if clock pair A1-B1/B1-A1 (comprising Synchronized Clock Signals A1-B1 1148 and B1-A1 1156) is selected by Select #1 172, and Select #3 1176 respectively to clock Load A 1048 and Load B 1050, then a SYNC signal which is derived from the Primary Clock Signal Drive A 1106 in Clock Source A 1040 is sent to Synchronizer A1 1138 and Load A 1048, and a SYNC signal which is derived from the Primary Clock Signal Drive B 1110 in Clock Source B 1042 is sent to Synchronizer B1 1142 and Load B 1050. These SYNC signals are only required as a result of the specific synchronizer utilized in the preferred embodiment, and due to the preferred use of a multiple phase clock signal at the loads. Many different types of synchronizers are known in the prior art, and the specific SYNC signal used in the preferred embodiment would not be required in those synchronizers.

There are six signals sent from the master and slave NIM to each of the Select circuits (24 signals total) to enable the desired Synchronized Clock Signal and SYNC signal to pass to Clock Distribution Circuitry A 1162 and Clock Distribution Circuitry B 1180. Any type of selection circuitry could be used to select the desired signals, and in the preferred embodiment each of the 24 signals is ANDed with one of the 24 Clock Signals or SYNC signals to allow the desired signal to pass to the Clock Distribution Circuitry A 1162 and B 1180. The master NIM A 1182 or B 1184 selects particular signals depending upon whether an error has occurred, or whether a request was made by User Interface A 1190 or B 1192 to switch to a new clock pair.

FIG. 35 shows that some of the Synchronized Clock Signals are connected to more than one Select circuit. Synchronized Clock Signal A1-B1 1148 and its complement Synchronized Clock Signal B1-A1 1156, and Synchronized Clock Signal A2-B2 1152 and its complement Synchronized Clock Signal B2-A2 1160 are each connected to one Select circuit within its power domain, and to one Select circuit in the other power domain. Synchronized Clock Signal A1-B1 is connected to Select #1 1172 and Select #4 1178, Synchronized Clock Signal A2-B2 is connected to Select #1 and Select #4, Synchronized Clock Signal B1-A1 is connected to Select #2 1174 and Select #3 1176, and Synchronized Clock Signal B2-A2 is connected to Select #2 and Select #3. This is to provide alternate routes for Clock Signals which are synchronized with a Clock Signal from the other power domain. If a problem occurs with one of the two available Select circuits connected to a Synchronized Clock Signal, the Clock Distribution Circuitry A 1162 or B 1180 will recognize the loss of the Synchronized Clock Signal to its Primary A 1194 or B 1196 input, and will automatically switch to the alternate Select circuit which will supply the Synchronized Clock Signal to the Secondary A 1198 or Secondary B 1200 input. For example, if Select #1 became unavailable or failed for any reason, Clock Distribution Circuitry A's 1162 Primary A 1194 input would recognize the loss of the Synchronized Clock Signal A1-B1 1148 input, and would switch so that the Secondary A 1198 input which is connected to Select #4 1178 would receive the Synchronized Clock Signal A1-B1 1148.

For further details concerning the redundant clock distribution system, see co-pending Patent Application, entitled "Fault Tolerant Clock Distribution System", identified above.

b. Fiber Optic Interface

The Fiber Optic Interface 112 is a dedicated I/O interface and related protocol for data transmissions from point to point over a fiber optic link. It provides an asynchronous, full duplex data path based on the ANSI X3T9.5 (FDDI) Physical and Data Link Layer standards of the Open Systems Interconnection model developed by the International Standards Organization.

The Fiber Optic Interface 112 is compatible with the Physical Media Dependant (PMD) and Physical Layer (Layer 1), as defined by the FDDI standards, for transmission and reception of data across Fiber Optic Links 142, 144, 146, 148. Multiple data streams are transmitted in parallel over a pair of cascaded PLAYER+devices. Two fiber optic channels are used to double the throughput and bandwidth. Each fiber can handle up to 12.5 million bytes (MB) per second of data. The even bytes of a data block are transferred on one fiber. The odd bytes of the data block are concurrently transferred on the other fiber. Thus, by using a cascaded mode of operation, the throughput is expanded to 25 MB per second (200 million bits per second). The two fibers must be operated in lock step with each other and both must be operational for any data to be transferred. The fibers are 62.5 micron multimode graded index fiber optic cables with a wavelength of 1,300 nanometers and a frequency of 125 million Hertz (MHz). The length of the fibers must not exceed four kilometers. The total skew between the two data paths must be less than 80 nanoseconds. Because data throughput is a performance limiting factor in the outboard file cache XPC 102, the interface between the Host system 10 and the outboard file cache System is an ideal candidate for a high speed point-to-point Fiber Optic Interface.

(1) Functional Operation

FIG. 38 is a block diagram of the components of the Fiber Optic Interface. Recall that in the Host system 10, the DM 110 is connected to a I/O Bus 40, sometimes referred to as an M-BUS. When the operating system on the Host 10 system needs to send data to the XPC 102, a command packet is sent through the M-Bus Write VLSIs 5018, 5020 via Lines 2124, 2126 to the Send Frame Transfer Facility (SEND FXFA) 2128 component of the DM, where it is buffered. The FXFA is responsible for data segmentation, flow control, and Fiber Optic Interface retries. The FXFA is a 448 Complementary Metal-Oxide Semiconductor (CMOS) VLSI gate array. The Send FXFA 128 has eight buffers in which to store data. The Send FXFA uses these eight buffers in a circular fashion. The Send FXFA converts the command packet from 36-bit words to 32-bit words. It performs this conversion because data stored on the Host computer system 12 is in a 36-bits per word format, but data handled by the PLAYER+components and the rest of the components of the File Cache System must be in 32-bits per word format. The Send FXFA 2128 inserts control information to the front of the command packet and transfers the data over Line 2130 to the DM Light Pipe Frame Control (LPFC) component 132. This data consists of 32-bit words plus two parity bits. The LPFC 132 is a 448 CMOS VLSI gate array that connects to the FXFAs on one side and to the PLAYER+components on the other side. It is responsible for clock synchronization, speed matching, packet formation, and error detection.

Although this is a non-FDDI application because it is a point-to-point implementation rather than a token ring, the rules for FDDI framing must be followed in order to utilize the PLAYER+components. A frame is the basic unit of information that is transmitted across the Fiber Optic Interface 112. It consists of multiple symbol pairs of control symbols and data symbols.

The DM LPFC 2132 takes the command packet, synchronizes this data to a local clock and splits the 32-bit words plus two parity bits into two 16-bit words plus two parity bits each word. It then splits the 16-bit words plus two parity bits into two byte streams. The byte streams consist of 9-bit blocks with one parity bit each block. The DM LPFC 2132 creates encoded frames with added error checking information from each stream. The even bytes of data are put into one frame and the odd bytes of data are put into a second frame. The DM LPFC 2132 then passes the even byte data frame to DM PLAYER+0 2138 over Line 2134 and the odd byte data frame to DM PLAYER+1 2140 over Line 2136. The data is serialized in the two PLAYER+components and sent one bit at a time to their respective optical transmitters (not shown). The frames on the two fibers are transmitted in parallel.

The functionality of DM PLAYER+0 2138 and DM PLAYER+1 2140 is fully described in The Fiber Distributed Data Interface (FDDI) Databook available from National Semiconductor Corporation. The DP83251/55 PLAYER+ Device is an FDDI Physical Layer Controller that contains Non-Return to Zero (NRZ)/Non-Return to Zero Invert on Ones (NRZI) and 4B/5B encoders and decoders, serializer/deserializer, framing logic, elasticity buffer, line state detector, repeat filter, smoother, and configuration switch. The PLAYER+device also contains clocking capabilities formerly resident on separate devices such as the Clock Recovery Device (CRD) and Clock Distribution Device (CDD), also commercially available from the National Semiconductor Corporation. The PLAYER+device implements the Physical Layer protocol as defined by the American National Standard "FDDI Token Ring Physical Layer Protocol (PHY)" document, ANSI X3.148-1988. The PLAYER+devices convert a 12.5 MB/s input stream into a 125 Mbaud 4B/5B encoded bit stream as specified in the FDDI Physical Layer standard. Additional components relating to the PLAYER+devices are the Transceivers (not shown), which provide electrical to light conversions.

The DM PLAYER+0 2138 and DM PLAYER+1 2140 transmit the frames in parallel across two Fiber Optic Links 2142, 2144 to HIA PLAYER+0 2174 and HIA PLAYER+1 2176. The use of two Links is called cascade mode. In cascade mode, multiple PLAYER+devices are connected together to provide data transfer at multiples of the FDDI data rate. While the DM LPFC 2132 is transmitting the frames, it computes a Frame Check Sequence (FCS) value for each frame, until all data in each frame has been transferred to the DM PLAYER+0 2138 and DM PLAYER+1 2140. At the end of the data, the DM LPFC transmits the FCS field and an Ending Delimiter (ED) field to DM PLAYER+0 2138 and DM PLAYER+1 2140.

The receiving HIA PLAYER+0 2174 and HIA PLAYER+1 2176 components receive the frames serially from the Fiber Optic Links 2142, 2144 through optical receivers (not shown). The data is then resynchronized and deserialized. Each PLAYER+device then sends a stream of bytes obtained from their respective frames to the HIA LPFC 178 over Lines 2180 and 2182, respectively. The HIA LPFC 2178 verifies the packet formats to ensure that valid data symbols are being received. The HIA LPFC 178 also performs a FCS error check on the data contained in each frame as each frame is received. The two byte streams are merged to form 16-bit words. The 16-bit words are then combined to form 32-bit words. The HIA LPFC 2178 then resynchronizes the data and sends this reconstituted data to the HIA REC FXFA 2184 over Line 2186 where the data is buffered. The HIA REC FXFA 2184 transmits the data over Lines 2192 and 2196 through other VLSIs in the HIA 252 to the intended recipient via the Street 1 or Street 2.

The HIA REC FXFA 2184 sends an acknowledgement (ACK) or negative acknowledgment (NAK) to the HIA SEND FXFA 2202 over Line 2210, depending on the status of the data transfer. The HIA SEND FXFA 2202 buffers the ACK or NAK packet and passes the data to the HIA LPFC 2178 over Line 2212. The HIA LPFC 2178 converts the ACK or NAK into two frames by splitting the data into even and odd portions and sends the frames to the HIA PLAYER+0 2174 and HIA PLAYER+1 2176 components over Lines 2214 and 2216, respectively, for subsequent transmission to the DM PLAYER+0 2138 and DM PLAYER+1 2140 components. The DM PLAYER+0 2138 and DM PLAYER+1 2140 components receive the frames over Fiber Optic Links 2146 and 2148, respectively, and pass them to the DM LPFC 2132 over Lines 2150 and 2152, respectively. The DM LPFC unpacks the ACK or NAK from the frames. If the ACK is unexpected or does not match a previous transmission, or the message received is really a NAK, then the DM SEND FXFA 2128 is required to resend the command packet according to the steps described above. The DM LPFC 2132 sends the NAK over Line 2154 to the DM REC FXFA 2156, which forwards a request to resend the data to the DM SEND FXFA 2128 over Line 2162. Otherwise, the data transfer process is considered to be complete.

Similarly, if data or status is to be sent from the HIA 214 to the DM 110, data is received by the HIA SEND FXFA 202 from the Street 1 or Street 2 via other VLSIs in the HIA over Lines 2204, 2208. The HIA SEND FXFA 2202 passes the data to the HIA LPFC 2178 over Line 2212, where the data is then formatted into two frames for transmission by HIA PLAYER+0 2174 and HIA PLAYER+1 2176 components. The frames are received by the DM PLAYER+0 2138 and DM PLAYER+1 2140 components, which pass the frames to the DM LPFC 2132. The DM LPFC unpacks the frames and sends the data to the DM REC FXFA 2156. The data is then transferred across the M-Bus (not shown) back to the operating system on the Host system 10 (not shown). An ACK or NAK is then transmitted back to the HIA according to the ACK or NAK sequence described above.

(2) Clocks, Clock Recovery, and Resynchronization

FIG. 39 is a block diagram of the clock domains for one end of the Fiber Optic Interface. Each end of the Fiber Optic Interface is clocked by a local oscillator running at 50 MHz plus or minus 50 parts per million (PPM). This Local Clock Domain 2218 includes part of the LPFC 2132 and most of the PLAYER+components 2138, 2140. The 50 MHz clock is divided by four down to 12.5 MHz in LPFC 2132 before it is passed to the PLAYER+components. The remainder of the PLAYER+components are contained in a Recovered Clock Domain 2222, which is clocked by a recovered clock synchronized with the incoming data. The remainder of LPFC 2132 is contained in the System Clock Domain 2224. The System Clock Domain 2224 is clocked by system clocks that clock the rest of the outboard file cache XPC 102. The system clock frequency must be between 30 MHz and 50 MHz. The DM's 110 system clock operates at 44 MHz and the HIA's 214 system clock operates at 40 MHz.

The Fiber Optic Interface 112 uses NRZI encoding. NRZI is a common serial data communication encoding scheme that allows both clock and data information to be transmitted over a single serial path. A binary one is represented by a transition from either light on to light off or light off to light on. A zero is represented by the lack of a transition, i.e., the light stays on or stays off during the bit time.

At the receiving end of the Fiber Optic Interface, a recovered clock is developed from the incoming NRZI encoded data using a phase locked loop oscillator. Every time an edge occurs in the incoming NRZI data, the phase locked loop corrects the phase of the oscillator. Between transitions the oscillator begins to drift. To prevent the oscillator from drifting too far, a restriction of no more than three consecutive zeros is placed on the serial interface.

There are two components of the Fiber Optic Interface that perform resynchronization of data. The PLAYER+ components 2138, 2140 resynchronize incoming data being clocked by the recovered clock to the local oscillator. Since the recovered clock is synchronized to the local oscillator on the other end of the Interface, its frequency must be within plus or minus 50 PPM of 12.5 MHz. The local oscillator on the receiving end must also be within this range. Hence, the two clocks can differ by as must as 100 PPM, making resynchronization necessary. The PLAYER+components have internal serial asynchronous First-In-First-Out (FIFO) buffers deep enough to resynchronize data differing in frequency by 100 PPM as long as the packets are no longer than 4500 bytes. This buffer recenters itself between packets to prevent underflow or overflow.

The other component involved in resynchronization is LPFC 2132. It contains an eight deep, 32-bit word asynchronous FIFO buffer in both its transmit and receive paths. These buffers resynchronize data between the Local Clock Domain 2218 and the System Clock Domain 2224.

(3) Data Link Layer Protocol

The I/O protocol at the Data Link Layer of the Fiber Optic Interface defines the methods of communication over the interface. It includes two types of messages: line states and frames. Line state information is used only for interface control functions such as initialization, termination, and clearing of the interface. Information packets called frames are used to contain user-supplied information to be transferred across the Fiber Optic Links. Line state information and frames are both made up of data units called symbols.

The interface between the LPFC 2132 (see FIG. 39) and the PLAYER+components 2138, 2140 consists of two byte-wide paths, one for data input to the PLAYER+components (i.e., Lines 134, 2136), and one for data output from the PLAYER+components (i.e., Lines 2150, 2152). Each byte-wide path consists of a parity bit (odd parity), a control bit, and two 4-bit symbols. Each 4-bit symbol passed to a PLAYER+component from the LPFC is encoded in a 5-bit format for transmission via one of the Fiber Optic Transmitters (Optic Send) 2226, 2228. Upon reception of a 5-bit symbol from one of the Fiber Optic Receivers (Optic Rec)

2230, 2232, the PLAYER+component decodes the symbol back into a 4-bit symbol and passes it to the LPFC. The most significant byte of a pair of bytes is transmitted by PLAYER+0 138, and the least significant byte is transmitted by PLAYER+1 2140.

FIG. 40 is a table of the symbols transferred from the Light Pipe Frame Control to the PLAYER+components. The symbol pair "JK" 2234 represents the Starting Delimiter (SD) for a frame boundary. The "T" symbol 2236 represents the Ending Delimiter (ED).

FIG. 41 is a table of the symbols transferred from the PLAYER+components to the Light Pipe Frame Control. The "I" symbol 2242 represents the Idle command. The "H" symbol 2244 represents the Halt command. The "JK" symbol pair 2234 represents the SD. The "T" symbol 2236 represents the ED. The "Q" symbol 246 represents the Quiet command. Finally, all other 5-bit symbols not specified in FIG. 41 are considered to be invalid symbols.

The Transmitter logic receives data from the SEND FXFA, resynchronizes the data to the Local Clock, puts the data in packet form, and passes the packet to the transmit section of the PLAYER+components.

FIG. 42 is a block diagram of the Transmitter logic of the Light Pipe Frame Control gate array. When the SEND FXFA 2128 has no data to transmit, signals Write Data Transfer (not shown) and Write Data Valid (not shown) are inactive. The Write Data Transfer signal is active during transmission of an information packet from the SEND FXFA 2128 to the LPFC 2132. Transition of this signal from inactive to active by the SEND FXFA signifies the start of a new information packet. Transition of this signal from active to inactive signifies the end of an information packet. The Write Data Valid signal is driven active by the SEND FXFA to indicate to the LPFC that the current contents of the 32 Write Data lines 2500 is the next valid word of the information packet to be sent across the Fiber Optic Links.

The data word is taken off the Write Data lines 2500 and stored in the Input Register (IN REG) 2502. This information consists of 32 bits of data and two bits of parity. The data is then loaded into an Asynchronous FIFO 2504 under the control of the System Clock. The data is resynchronized to the Local Clock in the Asynchronous FIFO 2504 and is output from the FIFO to Register 0 (REG 0) 506 under control of the Local Clock. The 32-bit data word is split into two 16-bit words and loaded into the transmit pipeline via Multiplexer (MUX) 2508 on two successive 80 nanosecond cycles. The transmit pipeline consists of three registers (Register 1 2510, Register 2 2512, and Register 3 2514) connected in series.

Separate FCS values are generated for each of the two byte-wide paths in the transmit pipeline. The data is passed by MUX 2508 to FCS Generator logic 2516. Each of the byte-wide paths is fed into a separate section of the FCS Generator logic. Each FCS Generator logic section generates a 32-bit FCS value which is inverted and appended to the end of its data stream. At the end of the transmit pipeline, frames are formed using information from Symbol Generator logic 2518, the data path, the FCS Generator 2516, and MUX 2520. The Symbol Generator logic 2518 provides the Starting Delimiter (SD) and the Ending Delimiter (ED) for the frame. The frame is then encoded into a 9-bit PLAYER+ code and stored in Register 4 (REG 4) 2522. The frame is then output from Register 5 (REG 5) 2524, each byte being sent to one of the two PLAYER+components every 80 nanoseconds for transmission on one of the two transmit Fiber Optic Links. The frame is sent on 16 Transmit Data lines 2526.

When there are no data packets to send, the Symbol Generator 518 outputs a stream of Idle symbol pairs.

The Transmitter logic can be disabled under control of a Micro Sequencer Bus Controller.

The Receiver logic receives data packets from the receive section of the PLAYER+components, translates them, checks them for errors, resynchronizes them to the System Clock, and passes them to the receiving FXFA.

FIG. 43 is a block diagram of the Receiver logic of the Light Pipe Frame Control gate array. Each of the two PLAYER+components send a stream of 9-bit encoded information representing control symbols and data information to the LPFC 132. The data is received on 16 Receive Data lines 2528 and stored in the Input Register (IN REG) 2530. The two streams are concatenated as they are stored into IN REG 2530. The data is passed to the History Queue 2532 and Register 0 (REG 0) 2534. The data is then checked by dual FCS Checker logic sections 2536, 2538 to determine if the FCS value is correct, indicating a good transmission of the data over the Fiber Optic Links. Each byte stream is treated independently for FCS checking. A new FCS is generated for each incoming byte stream and compared with the received FCS values. This redundancy insures that any single error in the FCS logic at either end of the Fiber Optic Interface is immediately detected. The FCS values must be equal and must be the inverse of the received FCS code before the data packet is validated.

The data is passed through a receive pipeline consisting of seven registers 2540, 2542, 2544, 2546, 2548, 2550, and 2552. As the stream of data passes through the receive pipeline, it is decoded, checked for protocol and data errors, and reformatted into 32-bit words by storage in Register 8 (REG 8) 2554 and Register 9 (REG 9) 2556.

Next, these 32-bit words are resynchronized to the System Clock. They are loaded into an Asynchronous FTFO 2558 under control of the Local Clock from REG 8 2554 and REG 9 2556 and removed under control of the System Clock. The data is extracted from the Asynchronous FIFO 558 and stored in Output Register 0 (OUT 0) 2560. The data then passes to Output Register 1 (OUT 1) 2562 for transmission to the REC FXFA 2156 over 32 Read Data Transfer lines 2564.

The LPFC 2132 presents the data packet to REC FXFA by raising a Read Data Transfer line (not shown) at the beginning of each packet. This signal remains high throughout the transfer of the packet to REC FXFA 2156. A Read Data Valid line (not shown) is activated by the LPFC 2132 each cycle that the Read Data Transfer lines contain the next valid data word. When the last word of the transfer is being passed, a Read Last Word line (not shown) is also active. The LPFC then drops the Read Data Transfer lines, followed by either a success or a failure line on the subsequent cycle. If the success line is activated, the REC FXFA processes the packet normally. If the failure line is activated, the REC FXFA discards the packet. If an error occurs on a SD or on the first six data bytes from either of the PLAYER+ components, a lost packet results. Then the interface to the REC FXFA stays idle for the lost packet.

The LPFC 2132 contains an eight deep receive History Queue 2532. Each data word received from the PLAYER+ components is put into the History Queue 2532 as it is received. If an error occurs, the History Queue is disabled, saving the last eight words received prior to the error.

The Receiver logic can be enabled and disabled under control of the Micro Sequencer Bus Controller. When it is disabled, it will still recognize and respond to the Halt Line State (HLS). When the Receiver logic is disabled while a data packet is being received, that packet will be received normally. Once the Receiver logic is disabled, the LPFC 2132 ignores the incoming symbol streams, except for the HLS.

(4) Frame Transfer Facility (FXFA)

The FXFA is a 448 CMOS technology, 256 functional pin gate array. It is used on the DM 110 and HIA 214 components. The FXFA buffers data in data blocks consisting of 127 32-bit words. This buffered data is to be sent across the Fiber Optic Links via the LPFC 2132 or has been received from the LPFC. There are two FXFA's for each LPFC, one to send data and one to receive data. The FXFA builds the FC fields for each frame to indicate the type of frame being transmitted. The FXFA also maintains a Sequence Number for each frame. Sequence Numbers are used to keep track of the order in which frames are sent and received across the Fiber Optic Links. As frames are sent across the interface, the receiving FXFA sends an ACK to the transmitting FXFA on the other side of the Fiber Optic Interface if there were no errors in transmission. Otherwise it sends a NAK to direct the transmitting FXFA to resend the data.

FIG. 44 is a block diagram of the Frame Transfer Facility gate array. The FXFA accepts HIA Status, DM Commands, or word 0 of DM Data on Line 2600 and stores this information in Write Register 0 (W0 REG) 2602. The FXFA accepts HIA Data, DM Commands, or word 1 of DM Data on Line 2604 and stores this information in Write Register 1 (W1 REG) 2606. The contents of both W0 REG 2602 and W1 REG 606 are passed to 36/32 Conversion logic 2608. This section of the FXFA is used on the DM 110 for transmission only, because it converts 36-bit data words obtained from the Host 10 system into 32-bit words used throughout the rest of the outboard file cache XPC 102.

Only data received from a DM 110 and destined for the NVS 220 is converted to 32-bit words. All other commands and messages are assumed to be 32 bits of data, right justified in the 36-bit input word. The four most significant bits are discarded. This data is passed through the Bypass Register 2610 to Multiplexer (MUX) 2612 instead of being converted. All input words are assumed to have a parity bit associated with each half word, for either 36-bit or 32-bit words. The FXFA uses all data bits and their parity bits to generate the parity for the converted word length.

The 32/36 Conversion logic 2614 is employed only on the DM 110 in the receive FXFA position. On the HIA 214, all transmissions to and from both FXFAs are in 32-bit words. On the DM 110 however, the data in the REC FXFA frames must be converted from 32-bit words to 36-bit words for the M-Bus transmission for eventual use by File Cache Handler Software 208. Status transfers from the HIA 214 to the DM 110 are assumed to be in 32-bit words, right justified into 36-bit format, and therefore do not need to be translated. On the HIA 52, no translation is ever needed. Instead, data is sent through the Bypass Register 2616. Reconnect Status and single word ACK/NAK frames do not go into the frame buffers and therefore never get converted. They get re-routed into ACK/NAK Receive Logic 2618 and are sent out of the FXFA on Lines 2620 and 2622, respectively.

The Command Register (CMD REG) 2624 is the alternate path for Frame Control fields, ACKs, and NAKs. There is a Frame Control field decode (not shown) on the output of the CMD REG 2624 that controls the flow of data per its contents. The CMD REG is only used in FXFA positions that receive data from the LPFC 2132.

The Frame Send Control logic 2626 is used to control the transmission of data out of the FXFA. This interface, shown as Lines 2628, 2629, 2630, and 2631 is used when the FXFA is writing data to the LPFC 2132 or the M-Bus. The send interface of the FXFA becomes active and transmits data out of the FXFA when a frame becomes valid, i.e., completely filled or done being written.

The FXFA will throttle the data going out when a pause signal 2628 is activated by the LPFC 2132 or the M-Bus, the FXFA receives a transmit fatal NAK signal 629 from the LPFC 132, or an internal error is detected on the DM 110.

Two main signals control data transfer out of the FXFA. An Out Data Transfer line 2630 stays active for the entire transfer of a frame, while an Out Data Valid signal 2631, which indicates the cycle in which the data is valid, may go active and inactive many times in one frame transfer. When the Out Data Valid signal is inactive, it throttles the data coming out of the FXFA (the forward direction of the transfer).

Other signals input to the Frame Send Control logic 2626 are the Frame Valid Control signal 632 received from the Frame Receive Control logic 2634, and the Retransmit Frame signal 636 received from the ACK/NAK Receive logic 2618.

The Frame Receive Control logic 2634 of the FXFA is used to control the reception of data into the FXFA. The Frame Receive Control logic 2634 is used when the FXFA is written to by either the LPFC 2132 or the M-Bus. The reception of data by the FXFA is passive; it accepts data upon request from the logic that drives it. This interface has sets of control signals 2638, 2639, and 2640. The FXFA can throttle the data coming in by indicating no more frames are available by driving the Frame Available control signal 2638 inactive. This signal goes inactive the first cycle that In Data Transfer 2639 and In Data Valid control 2640 signals are both active and the frame that is being filled is the last frame available. This signal remains inactive until a LPFC ACK frees another frame to be filled.

The two main signals that control data transfer into the FXFA are the In Data Transfer 2639 and In Data Valid 2640 signals. The In Data Transfer signal 2639 stays active for the entire transfer of the frame, while the In Data Valid signal 2640 indicates the cycle in which the data is valid, and may go active or inactive many times in one frame transfer. The In Data Valid signal 2640, when inactive, throttles the data coming into the FXFA (the forward direction of the transfer).

The ACK/NAK Receive Logic 2618 is used only on the REC FXFAs on both the DM 110 and the HIA 52. This logic receives all ACKs and NAKs over Line 2642 for frames sent and generates all ACKs and NAKs for frames received. ACKs and NAKs for frames sent are responses from the FXFAs on the other end of the Fiber Optic Interface for frames they received. For all frames sent across the Fiber Optic Interface, ACKs or NAKs are expected in return. ACKs free up frames in the SEND FXFA for future use and NAKs require that the specified frame and all subsequent frames must be re-sent. ACKs and NAKs for frames received are the ACK and NAK data for frames coming off of the Fiber Optic Interface into the FXFA. These are generated as frames come into the REC FXFA and are sent to the SEND FXFA. The SEND FXFA then sends this ACK/NAK data to the other end of the Fiber Optic Interface to indicate the transfer was either successful or faulty.

The ACK/NAK Send logic (ACK/NAK SND) 2644 controls the sending of ACKs and NAKs. All ACKs and NAKs are sent from the REC FXFA to the SEND FXFA, and ACKs/NAKs for frames received are sent across the Fiber Optic Link on the next frame break. Note that ACK/NAK frames themselves do not use a frame buffer in the Frame Transfer Memory 2654. All ACKs for frames sent come into the SEND FXFA and free up Frame Tracking Memory 2646 so those Frame Tracking Memory locations with Sequence Numbers equal to or less than the Sequence Number received in the ACK can be used for the transmission of other frames. NAKs cause the frame to be re-sent and do not free up Frame Tracking Memory 2646 for that frame. ACKs and NAKs can be compressed, i.e., if an ACK or NAK is received, it is assumed to be for the frame with the Sequence Number equal to or less than the Sequence Number in the ACK or NAK frame. The Sequence Number sent with the ACK or NAK is the last good Sequence Number received on the other end of the Fiber Optic Interface.

The Frame Transfer Memory 2654 is used to buffer up to 127 34-bit words for transmission to or reception from the LPFC 132. Each word consists of 32 bits of data and two bits of parity. The DM 110 or HIA 214 hosting the FXFA keeps track of the frame length and sends 126 32-bit words before it has to drop the In Data Transfer and In Data Valid signals for at least one cycle. The SEND FXFA inserts the check sum into the 127th frame location. The REC FXFA generates a new checksum covering the data and checksum received from the LPFC and writes this value into the 128th frame location. When the frame is read, the REC FXFA removes both checksums.

Frames are written by the DM 110 or HIA 214 hosting the FXFA and a Number Of Frames Busy Counter (not shown) increments when the frame is written. When a frame is full or done being written, a Valid flag for that frame is set. When the Valid flag is set, it means the frame is ready to be sent to the LPFC. After the frame has been sent to the LPFC, a Transmit flag is set and the Valid flag is cleared. The Transmit flag is cleared when the frame is successfully acknowledged by the other end of the Fiber Optic Interface. The frame cannot be used for another transfer until both of these flags are cleared. When a frame must be retransmitted because of the SEND FXFA received a NAK, the Valid flag is set again and the Transmit flag is cleared.

When all available frame buffer locations are busy, the Frame Available signal (not shown) goes inactive and the DM 110 or HIA 214 hosting the FXFA is forced to suspend the transfer once the last frame is filled. This assumes the DM or HIA is keeping track of the length of the frames and at the frame boundary, or when this transfer is complete, transmission is suspended until the Frame Available signal goes active again. It is also assumed that the In Data Transfer and In Data Valid signals coming into the FXFA will go inactive for a minimum of one cycle between frames and not go active again until one cycle after the Frame Available signal is re-activated.

The Frame Tracking Memory 2646 serves two functions on the FXFA. First, it registers a Frame Control Word that is sent out as the first word to the LPFC 2132 preceding every frame transmitted. Secondly, it stores the Frame Control Word in the event that a frame requires retransmission. The Frame Tracking Memory 2646 is a 16-deep stack of 20-bit words that is written by the Frame Receive Control logic 2634 and read by the Frame Send Control logic 2626. On retransmission of a frame, the Frame Send Control logic 2626 selects the proper frames and associated Frame Tracking Memory addresses when a NAK is received. Transmissions and retransmissions are done only by a SEND FXFA.

The Checksum (CHK SUM) logic 2648 has two parts, an input checksum store and an output checksum compare. As the frame buffer is being loaded, a running checksum is kept and at the end of the transmission, the total checksum is stored in the last address of the new frame buffer plus one. When the frame is read out of the FXFA, a new checksum is generated covering the data and the checksum that was written in the frame. If this read checksum has any data bits set or does not have both parity bits set, an internal error will occur and the communications path between the FXFA and the LPFC or M-Bus is downed.

Data is output from the FXFA through MUX 2649, Output register (OUT REG) 2650 to Line 2652. Frame Transfer Memory 2654, Read Register (RD REG) 2656, and Write Register (WR REG) 2658 are used as the frame buffer data path.

A system for reliable and efficient communications between a main processor and a peripheral processor has been defined. This dedicated, point-to-point fiber optic interface provides improved performance and better fault detection capabilities than previous I/O channel architectures. The preferred embodiment uses fiber optic links based on the FDDI standard, but not the complete and unwieldy implementation of the standard, to provide the speed necessary to relieve system bottlenecks for high-volume transaction processing computer systems.

Details of the functional characteristics of the Fiber Optic Link 112 in conjunction with DM 110 and HIA 214, can be found in co-pending Pat. Application, entitled "Dedicated Point to Point Fiber Optic Interface", identified above.

C. Microsequence Bus Controller System

A custom microprocessor-based system is required to meet speed requirements and it must contain simple logic in order to minimize development costs. A reduced instruction set computer (RISC) satisfies these requirements. RISC processors implement a small set of very basic instructions to minimize instruction decode and execution times. RISC processors operate on fixed length instructions that support only one or two operands. Because of the simplicity of the instruction set, the logic design of a RISC processor is hardwired rather than microprogrammed. Thus, the overall speed of the processor is improved.

The Microsequencer Bus Controller System provides the capability of flexible, microprocessor-based control of multiple gate arrays on a circuit card within a larger computer system. In the preferred embodiment as described above, it is a part of the outboard cache XPC 102. However, it may also be used in other computer systems where microprocessor control of multiple gate arrays is needed. It is a flexible solution to the problem of controlling function-specific VLSI gate arrays on one circuit card because one or more gate arrays can be changed without any other changes in the Microsequencer Bus Controller System hardware. When a gate array is changed, a corresponding change to the program the microprocessors execute may easily be made.

FIG. 45 is a block diagram of the Microsequencer Bus Controller System. The Microsequencer Bus Controller System 3200 contains up to eight Stations 3202, 3204, 3206, 3208, 3210, 3212, 3214, 3216 connected to a bi-directional internal communication bus called the Micro Bus 3218. For this embodiment a Station is a collection of logic implemented in a gate array on a VLSI part produced with CMOS 448 technology that performs specific functions. It is understood that other implementations or technologies may be used. A Station is coupled to the Micro Bus 3218 and also may interface with another bus, I/O mechanism, or subsystem that is external to the Microsequencer Bus Controller System. That is, it may read data from or write data to other hardware components in the outboard file cache XPC 102. In the preferred embodiment, there are ten different gate array designs representing Stations in the XPC. However, it is possible that any custom designed gate array supporting a set of required functions can fulfill the role of a Station and be connected to the Micro Bus 3218.

The Micro Sequencer Bus Controller (uSBC) 0 3220 and uSBC 1 3222 are special purpose RISC microprocessors that control the operation of the Stations via the Micro Bus 3218. The uSBCs execute an instruction stream that is stored in the Control Store 3224, a high speed static random access memory (SRAM). The instruction stream is written into the Control Store 3224 at system initialization time. The instruction stream is fetched by uSBC 0 3220 from the Control Store 3224 over Line 3226. The same instruction stream is fetched by uSBC 1 3222 from the Control Store 3224 over Line 3228. The first microprocessor, uSBC 0 3220, is the master, and the second microprocessor, uSBC 1 3222, is the slave. The master and slave execute the same instructions at the same time but only the master microprocessor writes data on the Micro Bus 3218. Results of operations performed by the slave microprocessor uSBC 1 3222 are forwarded over Line 3230 to the master microprocessor uSBC 0 3220, where they are compared with the results of operations performed by the master microprocessor uSBC 0 to detect any possible errors or loss of program control. The uSBCs connect to the Micro Bus 3218 over three distinct sets of lines: Address Lines 3232, 3234, Data Lines 3236, 3238, and Control Lines 3240, 3242.

The Micro Bus 3218 is a bidirectional bus used by the uSBCs to communicate with the Stations and for data transfer between Stations. It provides access from a uSBC to hardware registers and designators resident on a Station. The Maintenance Clock Control (MTCC) gate array 3244 provides maintenance operations such as fault detection, clock distribution and control, and system reset/recovery for all components of the Microsequencer Bus Controller System 3200. The MTCC drives a bus enable line, which allows the uSBCs 3220, 3222, and the Stations to drive data on the Micro Bus 3218.

The Micro Bus 3218 is a bi-directional bus which provides communication paths between the uSBCs and the Stations. The Micro Bus consists of Data lines 3232, Address lines 3236, and various Control lines 3240. The address portion of the bus is capable of addressing up to eight Stations. The Stations and the uSBCs transmit and receive data between themselves across the Micro Bus. The Micro Bus is adaptable to either a 36-bit data bus (DM), or a 32 bit data bus (HIA). The mode of parity checking on the Micro Bus is different depending on whether the data bus is 36 bits or 32 bits.

The Micro Bus timing is defined in terms of the clock cycles it takes for the data transmitted on the bus to propagate from the transmitter to the receiver. This time is three machine clock cycles. Since a clock cycle on a DM 110 is 22.5 nanoseconds, the transmission time for a DM is 67.5 nanoseconds. Since a clock cycle on a HIA 214 is 25 nanoseconds, the transmission time for a HIA is 75 nanoseconds.

FIG. 46 is a block diagram illustrating the Data and Data Parity paths of the Micro Bus. The Data path 3246 between the uSBCs 3220, 3222, and the Stations 3202, 3204, 3206, 3208, 3210, 3212, 3214, 3216, consists of 36 bits. The Data Parity path 3248 consists of two bits. Data and Data Parity can be sent from a uSBC to a Station, or from a Station to a uSBC.

FIG. 47 shows the parity domain for the Data path of the Micro Bus 3218 when the Microsequencer Bus Controller System 3200 is a Data Mover 110. The full 36 bits are used for data transfer purposes, with Data Parity Bit 0 3250 representing the odd parity of Data bits 0–17 3252, and Data Parity Bit 1 3254 representing the odd parity of Data bits 18–35 3256. Of course it is understood that other known parity systems could be used.

FIG. 48 shows the parity domain for the Data path of the Micro Bus 3218 when the Microsequencer Bus Controller System 3200 is a Host Interface Adapter 214. Only 32 bits of the 36 bits available are used for data transfer purposes, with Data Parity Bit 0 3258 representing the odd parity of original Data bits 4–19 3260, and Data Parity Bit 1 3262 representing the odd parity of Data bits 20–35 3264. Thus, the 36-bit transfer is mapped onto a 32-bit representation. Bit 4 in FIG. 8 is the MSB, and Bit 35 is the LSB.

FIG. 49 is a block diagram illustrating the Address and Address Parity paths of the Micro Bus. Each uSBC can independently put 11 bits of Address 3266 onto the Micro Bus 3218 to select a Station and register from which to read data or write data. For bus driving reasons, each uSBC drives four Stations. USBC 0 3220 drives the addresses for Stations 1, 2, 3, and 4, labelled 3202, 3204, 3206, and 3208, respectively, and uSBC 1 3222 drives the addresses for stations 5, 6, 7, and 8, labelled 3210, 3212, 3214, 3216, respectively (see FIG. 45). An Address Parity bit 3268 corresponding to each Address is also put onto the Micro Bus. This Address Parity bit represents the odd parity of the Address 3266.

FIG. 50 is a block diagram showing how the parity domains for the Addresses on the Micro Bus are distributed. USBC 0 3220 addresses the four Stations as shown. Although uSBC 0 is actually sending the address to those four Stations, uSBC 1 3222 simultaneously generates the same address that uSBC 0 3220 is outputting (recall that the uSBCs execute the same microcode instruction stream at the same time). USBC 1 3222 computes the Address Parity bit 3268 for Stations 1, 2, 3, and 4, labelled 3202, 3204, 3206, 3208, respectively. Similarly, uSBC 0 3220 computes the Address Parity bit 3268 for Stations 5, 6, 7, and 8, labelled 3210, 3212, 3214, and 3216, respectively, that are addressed by uSBC 1 3222.

This alternative parity checking scheme provides an extra level of parity checking between the dual microprocessors. FIG. 51 is a block diagram showing the two levels of Address Parity checking performed by the Microsequencer Bus Controller System 3200. At Level 1, the Address Parity is generated within uSBC 0 220 and checked to determine if the Address has been generated correctly. A parity error will occur if the Address has not been generated correctly. When this occurs, the uSBC blocks the transmission of data to the desired Station. At Level 2, a parity check is performed at the receiving Station to determine if the Address it received was correct. Thus, while Level 1 checks for Address "generation" errors, Level 2 checks for Address "transmission" errors, or logical errors caused by the uSBCs getting out of synchronization with each other.

This Level 2 parity checking is accomplished by requiring uSBC 1 222 to generate the same Address 266 that uSBC 0 220 generates. USBC 1 222 generates an Address Parity 268 from the Address and sends it to the Station that uSBC 0 3220 has addressed. The Station then determines whether an Address Parity error has occurred by comparing the Address 3266 it received from uSBC 0 3220 with the Address Parity bit 3268 it received from uSBC 1 3222. This parity distribution scheme provides for an extra level of security for detecting Address transmission errors.

FIG. 52 shows the format of an Address for the Micro Bus 3218. The Station Selector field 3270, stored in bits 0–2, is used to address one of the eight Stations. The Based Addressing Bit field 3272, stored in bit 3, is used to select one of two possible modes of operation: Direct addressing, when clear, or Based addressing, when set. Direct addressing is used to address registers and designators on a Station that do not have a particular addressing structure. Direct addressing allows for up to 128 registers and/or designators if the station is designed to accommodate both Direct and Based addressing modes. If the Station does not have Based addressing mode, then up to 3256 registers and/or designators can be addressed. Based addressing is used to reference register stacks, and allows addressing of buffers up to 128 registers deep. Since the Micro Bus 3218 is either 32 or 36 bits wide, the number of possible addressable registers on a Station could be as high as 2*N, where N is either 32 or 36 as applicable. The Register Buffer Index field 3274, stored in bits 4–10, indicates which register or designator to reference within the selected Station.

This specific configuration of signal transfers and usage involving signals identified as Source, BusBusy, Data Designate, Latch Set, Latch Clear Branch on External Conditions, Lock Bus; and signal derived from a Station such as Continue, External Branch Conditions, Station Abort, and Station Error, are all defined in detail in co-pending United States paten Application entitled "Microsequencer Bus Controller System" identified above.

Referring back to FIG. 45, the Control Store 3224 is used to store the instructions that are executed by uSBC 0 3220 and uSBC 1 3222. These instructions are 44 bits wide. The Control Store 3224, although in reality a RAM, is used as a read-only memory (ROM). A Control Store consists of seven SRAM chips (not shown). Each SRAM holds 32 * 1024 (K) 8-bit bytes of data. Each unit of data stored in a Control Store consists of 44 bits of instruction, 8 bits of parity for the instruction, and 2 bits of address bit parity (one bit for even address drivers, one bit for odd address drivers). Since there are seven SRAMs, each holding 8 bits per byte, a total of 56 bits is available for storage of each storage unit if part of each storage unit is stored in each of the seven SRAMs.

The Control Store 3224 is loaded with instructions at system initialization time by a support computer system through a maintenance path (not shown). The parity bits and address bits are computed by the Host 10 computer system and appended to each instruction as it is stored. Later, as uSBC 0 3220 and uSBC 1 3222 are executing instructions, each instruction is fetched from the Control Store and parity values are computed from it. Each uSBC compares the parity values computed by it against the parity checks stored in the Control Store. If there are any discrepancies, the Control Store is assumed to be corrupted and an internal check condition is raised in the uSBC. This is a fatal error for uSBC processing. The error is reported to the MTCC 3244 and processing is halted.

The Microsequencer Bus Controller (uSBC) is a special purpose microprocessor that executes instructions to monitor and control the transfer of data within the Microsequencer Bus Controller System 3200. (See FIG. 45) There are two uSBCs in the system to ensure that all data manipulations are verified with duplex checking. One is considered to be the master 3220, and the other the slave 3222. Only the master uSBC 3220 drives the Data on the Micro Bus 3218, but both master and slave uSBCs drive Address 3236, 3238, and Control 3240, 3242, signals to lower the loading on the Micro Bus 3218. The slave uSBC 3222 sends the results of each instruction to the master uSBC 3220 on a separate Line 3230. The master uSBC then compares this value to the result it computed. If the values are different, an internal check error condition has occurred. Program control has been lost. This is a fatal error that is reported to the MTCC 3244. The uSBC processing is halted because of the error.

The uSBCs 3220, 3222, interface with the Micro Bus 3218 over three separate sets of fines. Refer again to FIG. 45.

The Address lines 3236, 3238, contain 11 bits. The Data lines 3232, 3234, contain 36 bits plus 2 parity bits if the Microsequencer Bus Controller System 3200 is a DM 110. The Data lines contain 32 bits plus 2 parity bits if the Microsequencer Bus Controller System is a HIA 214. The Control lines 3240, 3242, contain 11 bits. Notice that the uSBCs, although connected to the Micro Bus, are not considered to be Stations. Furthermore, the slave uSBC has its transmitters disabled, thus it can only receive data from the Micro Bus 3218.

The uSBCs also interface with the MTCC 3244 for initialization and maintenance functions, and clock circuitry to receive signals that control the sequential elements of the uSBC.

FIG. 53 is a block diagram of the main components of the Microsequencer Bus Controller. The Instruction Decode logic 3401 fetches instructions from the Control Store 3224 and decodes the instruction to determine which command is requested, what operands the command is to be executed with, and which one of the Stations, if any, operands are to be fetched from or the result is to be written to. The Arithmetic, Logical, and Shift logic 3402 performs the requested command by executing arithmetic, logical, or shift operations on the operands. The operands are fetched from one or more Internal Registers 3403 or a Local Store memory 3404. The result of the command execution is forwarded to Station Activity logic 3405, which controls the operation of the Micro Bus 3218, and to Error Detect logic 3406, which detects any internal or slave microprocessor errors. Finally, Branch Control logic 3407 determines the flow of instruction control by examining signals received from Stations over the Micro Bus 3218 and the results of the Arithmetic, Logical, and Shift 3402 command execution.

FIG. 54A through FIG. 54D, when arranged as shown in FIG. 54, is a detailed diagram illustrating the architecture of a Microsequencer Bus Controller. The Control Store 3224 holds the instructions to be executed by the uSBC. The Control Store 3224 is accessed by the uSBC via Bi-Directional Line 3226, which is controlled by Bus Control Logic 3408. The Bus Address Register 3407 holds the address of the designator specified by the instruction, if any. The Program Counter 3409 is a register that holds the address of the instruction to be fetched from the Control Store 3224. The instruction is retrieved from the indicated position in the Control Store 3224 and stored in the Instruction Register 3410 for subsequent processing. For most instructions, the Program Counter 3409 is then incremented to address the next instruction in the Control Store to execute. Multiplexor (MUX) 3439 controls the input to the Program Counter 3409. Input is accepted from the Program Counter itself, the Instruction Register 3410, and Branch Logic 3440. The address in the Control Store where the instruction was fetched from is saved by the Jump History logic 3411 in the Local Store Write Register (LSW0) 3413 (see FIG. 54B) over Line 3412 and subsequently written to the Local Store 3414.

The Local Store 3414 stores data internal to the uSBC for use in executing instructions. The Local Store 3414 holds 1024 36-bit words. It is accessed by storing the address to read data from or write data to in one of four special purpose registers. These registers are the Address Read 0 3415, Address Read 1 3416, Address Write 0 3418, and Address Write 1 3420. Local store memory locations can be accessed by the Arithmetic Logic Unit (ALU), MOVE, and SHIFT instructions (described below) more quickly than references to the uSBC's general registers. This allows the uSBC to process instructions faster than if no Local Store was available. The Local Store 3414 is implemented as a four port RAM cell. The four port RAM cell provides the capability of concurrent access to the memory via two read ports and two write ports.

FIG. 55 shows the allocation of the Local Store memory locations. Instructions implemented in the preferred embodiment use the Local Store 3414 to hold Activity Control Block (ACB) Buffers 3422, Special Purpose Variables 3424, General Purpose Variables 3426, and Pre-Defined Constants 3428. The uSBC hardware logic uses the Local Store 414 to hold Branch Tables 3430, the Call/Return Stack 3432 and a Jump History Table 3434. The Local Store address domains (from 0 to 3FF overall) of each of these data entries are shown in hexadecimal format in FIG. 55.

Referring back to FIG. 55A, the Saved Program Counter 3436 is a register holding the address in the Control Store 3224 where the current microcode instruction to be executed is stored. It is loaded with a value selected by MUX 3437 from the current Program Counter 3409, the current Saved Program Counter 3436, or the output of Branch Logic 3440 over Line 3441. The Saved Program Counter 436 is also stored in the Local Store 3414 by Jump History logic 3408. The Jump History Table 3434 holds the most recent 64 traced changes in program counter control. The contents of the Saved Program Counter 3436 are also forwarded to MUX 3504 over Line 3438.

When the current instruction is a branch instruction, Branch Logic 3440 (see FIG. 54C) determines if the branch condition has been satisfied and if it has, then Branch Logic 3440 forwards the address of the instruction to be branched to over Line 3441 to MUX 3439 for subsequent storage in the Program Counter 3409. This causes the next instruction fetched to be the instruction stored at the branch address rather than the next sequential instruction. Evaluation of the branch condition includes reading the External Branch Condition signal 3443 via External Branch Detection logic 3444 if the branch instruction is an External Branch instruction. It includes accepting input from the Internal Branch Detection logic 3445 if the branch instruction is an Internal Branch instruction. It also includes accepting input from the Accumulator 3442 if the branch instruction is a Table Branch instruction.

The instruction stored in the Instruction Register 3410 is processed by two sets of logic. The Command Decode Logic 3446 determines what kind of command is indicated by the instruction and forwards data and control information contained in the instruction to the Arithmetic Logic Unit (ALU) 3448 over Line 3450 and to the Station Activity Control logic 3452 (shown on FIG. 54D) over Line 3454. The Station Decode Logic 3456 determines which Station is to be referenced by the instruction, if necessary. The Station identification information obtained by the Station Decode Logic 3456 is forwarded over Line 3458 to MUX 3460. This Station identification information is used to select which Continue signal (1 through 8) 3462 (shown on FIG. 54D) activation is expected as a result of the execution of the current instruction. The Station Decode Logic 3456 also forwards the Station identification information directly to the Station Activity Control logic 3452 over Line 3464.

The Immediate Move Data register 3466 (shown on FIG. 54A) holds the data to be transferred to a uSBC internal register, an external register, or to the Local Store 3414. The Immediate Move Data 3466 is obtained from the instruction stored in the Instruction Register 3410.

The uSBC contains various internal registers used during processing of instructions. Operand data for an instruction is read out of the Local Store 3414 and stored in general purpose Register A (REGA) 3468 (see FIG. 54B). A mask/merge bit pattern for manipulating operand data is read out of the Local Store 3414 and stored in the Mask/Merge Register (MMRG) 3470. The Bus Receive Register (BUSR) 3472 (see FIG. 54A) is a 36-bit register that holds data, received from the Micro Bus over Line 3474, resulting from an external read. It is the only uSBC register that can be written by the Micro Bus 3218. During the execution of a operation to read a register on a station external to the uSBC, the resulting data is put into the BUSR 3472. It can then be moved to the Local Store 3414 or used as an operand for an instruction. The Accumulator (ACC) 3442 (see FIG. 54C) is a 36-bit register that holds the results of the ALU 3448 after execution of an instruction. It is the only register that can output data from the uSBC to the Micro Bus 3218. Therefore, every write of an external register or designator uses the ACC 3442.

There are six other special purpose registers used by the uSBC. The Local Store Base Register (LSBR) 3476 is a 6-bit register used for Based addressing of the Local Store 3414. If Based addressing is selected, the uSBC uses the contents of LSBR 3476 as the six most significant bits of the 10-bit Local Store address, and obtains the four least significant bits from the instruction. Instructions use Based addressing to access the ACB Buffers 3422 within the Local Store 414. The Maintenance Data Out Register (MDOR) 3478 is used to report fatal and non-fatal errors. It is a 32-bit dynamic scan/set register connected to the Maintenance processing of the outboard file cache XPC 102 via the MTCC 3244. The Maintenance Data In Register (MDIR) 3480 is a 32-bit dynamic scan/set register under the control of the Maintenance processing of the XPC 102 via the MTCC 3244. The MDIR is used by Maintenance to send messages to the uSBC.

The Flags Register (FLGR) 3482 is a hardware flags register. It contains 16 bits which are individually tested, set, and cleared. Any number of these flags can be set/cleared in one instruction. The flags are also used as branch condition indicators. The Source Index Register (SIXR) 3484 and the Destination Index Register (DIXR) 3486 are 14-bit registers used for indexing external registers and as internal loop counters. The SIXR 3484 is used for indexing read requests from Local Store 3414, and DIXR 3486 is used for indexing write requests to Local Store 3414. These registers can be automatically incremented as part of the execution of many instructions. Thus they are useful and efficient loop counters.

The uSBC contains two main processing groups of logic. The Shift/Mask/Merge unit performs all shift operations, as well as masking and merging of operands. Shift logic 3488 selects the contents of one of the registers described above as input data via MUX 3490 and MUX 3491 as shown. Control of the shift, such as shift direction and length, is obtained from the Command Decode logic 3446. The results of the Shift operation are forwarded to Mask logic 3492. The Mask logic 3492 also obtains input data representing a mask bit pattern from the MMRG register 3470 over Line 3494. Results of the Mask logic 3492 are forwarded to Merge logic 3496. Merge logic 3496 also accepts input data representing an address in the Local Store 3414 from REGA 3468 over Line 3498 or from one of the internal registers multiplexed by MUX 3489. Merge logic 3496 obtains a merge bit pattern from the MMRG register 3470 over Line 3494. The results of the Shift/Mask/Merge operation are forwarded via Line 3502 and MUX 3504 to the Accumulator 3442.

The ALU 3448 performs all arithmetic and logical operations. It processes either 32-bit or 36-bit data words, depending on the whether the uSBC is on a DM 110 or a HIA 214 component in the XPC 102. The ALU 3448 selects operand data from one of the internal registers and REGA 3468 via MUX 3489, or MMRG 3470 over Line 3494. It also obtains command information from the Command Decode Logic 3446 via Line 3450. The result of the arithmetic or logical operation is stored in the Accumulator 3442 (see FIG. 54C) via MUX 3504 and Line 3508.

The Accumulator 3442 selects data to store via MUX 3504 from four possible sources. The first source is the Saved Program Counter 3436 which forwards data over Line 3438. The data from the Saved Program Counter 3436 represents the address of the instruction being executed. The second source is the output from the ALU 448 over Line 3508. The third source is MUX 3510 which forwards Immediate Move Data from an instruction or data from one of the internal registers over Line 3512. The fourth source is the output from the Shift/Mask/Merge logic grouping over Line 3502.

The contents of the Accumulator 3442 may be selected by MUX 3490 as an operand for the execution of a subsequent instruction via Line 3514. The contents of the Accumulator 3442 are also stored in the Local Store 3414 via Line 3514. The contents of the Accumulator 3442 may also be written to a register on a Station connected to the Micro Bus 3218. Bus Control Logic 3516 controls transfers over the bi-directional Micro Bus 3218.

If the uSBC is a slave uSBC, then the contents of the Accumulator 3442 are forwarded over Line 3230 to the master uSBC for comparison with the result stored in the master uSBC's Accumulator. Checker logic 3518 compares the two values and indicates a fatal error to the uSBC Halt logic 3520 (see FIG. 54B) if the two values are not equal. The uSBC Halt logic 3520 then stops the microprocessor. Processing is also halted if an error indication is received from one of the Stations via a Station Error 3522 or Station Abort 3524 signal. These signals are processed by Station Error Detection logic 3525 and a error indication is forwarded to uSBC Halt logic 3520. A Lock Bus signal 3324 is then sent out to notify the other Stations that there is a problem. Multiple Continue Error Detection logic 3526 detects errors relating to multiple Continue signals being received by the uSBC from MUX 3460 over Line 3528. If such an error occurs, the uSBC Halt logic 3520 stops the microprocessor. Finally, if an internal fault occurs, Internal Fault Capture logic 3529 detects the error and notifies the uSBC Halt logic 3520.

Data may be received over the Micro Bus 3218 in either full-word or half-word modes. In full-word mode, the data consists of either 32 or 36 bits, depending on the mode setting of the uSBC. In half-word mode, the data consists of either 16 or 18 bits, again depending on the mode setting of the uSBC. The data received over the Micro Bus 3218 is stored in the Bus Received Register 3472 after being selected by MUX 3530 depending on the setting of the Half Word signal 3532. If the Half Word signal is present, then the lower half of the bits in the data sent to the Bus Received Register 3472 is zeroed out.

The uSBC informs the Stations that it is transmitting data over the Micro Bus 3218 by manipulating the Bus Busy lines 3534. Bus Busy Logic 3536 accepts as input command information from the Command Decode Logic 3446 over Line 3454 and Station identification information from the Station Decode Logic 3456 over Line 3458. The Bus Busy Logic 3536 sets the corresponding Bus Busy line to high when the uSBC is transferring data from the Accumulator 3442 over the Micro Bus 3218 to that particular Station.

High level functional control of the Micro Bus 3218 is managed by the Station Activity Control logic 3452. Station Activity Control 3452 implements the uSBC/Station communication protocol by setting and clearing the eight Source signals 3540, the Data Destinate signal 3308, four of the eight Branch On External Condition signals 3320, the Latch Set signal 3312, and the Latch Clear signal 3316. Bus Wait Logic 3548 ensures that Station Activity Control 3452 does not attempt to access the Micro Bus 3218 if it is not available or data transfers.

The SBC Instructions such as MOVE, EXTERNAL SOURCE, SET/CLEAR, BRANCH, ARITHMETIC AND SHIFT with various selections are described in co-pending United States Patent Application entitled "Microsequencer Bus Controller System" identified above.

d. HUB and Street System

The HUB and Street System provides enhanced reliability while mitigating the extreme cost of total redundancy by coupling a series of shared busses, called Streets 742 (See FIG. 28) with a series of smart switching elements which are capable of directing data across the streets to the desired destination. The present invention also provides a means for prioritizing bus requests which ensures that the highest priority data is transferred first.

The prior art teaches that point-to-point architectures are more reliable than a shared bus approach because of the plurality of paths from any input to any output. However, point-to-point architectures require more hardware and are therefore more expensive to build and maintain. In contrast, shared common bus architectures are not as reliable as the point-to-point architectures but do not require as much hardware and therefore are less expensive to build and maintain. The present invention provides an intermediate alternative to the two above mentioned approaches. The HUB and Street System can be configured very much like a point-to-point architecture by increasing the number of Streets within a given system. Conversely, the HUB and Street System can be configured very much like a shared-common bus architecture by decreasing the number of streets within the system. Therefore, the present architecture can be configured for applications anywhere within this spectrum, depending on the reliability and cost requirements of a particular application. The present invention allows the system designer to trade cost for reliability. This added flexibility results in more reliable and cost effective computer systems.

The HUB and Street System is a network of interconnected HUB elements 728, 730 that allows one set of HUB elements to transmit and receive data either directly or through another set of HUB elements. In the preferred embodiment, the HUB elements are grouped into pairs with a HUB0 728 and a HUB1 730. Each HUB0 and HUB1 pair are horizontally connected together and each HUB1 is horizontally connected to a supporting device such as a memory element. The HUB0 740 elements are connected to an IXP 236 and to a HIA 234 processing elements which initiate the transmission of data and requests for the transmission of data to and from the memory element.

The HUB0 728a, 728b, 728c and 728d elements are vertically connected to adjacent HUB0 elements through requester streets (both an UP and a DOWN street). Similarly, the HUB1 elements are vertically connected to adjacent HUB1 730a, 730b, 730c and 730d elements through responder streets. The streets are bidirectional busses which can be utilized by any HUB element connected thereto and each HUB element can transmit data either UP or DOWN the appropriate Street. Each Street can only be accessed by one HUB element at a time and therefore each HUB element has a built in priority scheme which enables high priority data to be transferred first.

To further increase the reliability and to be consistent with the "power domain" architecture of the rest of XPC 102, the preferred embodiment also contains a redundant set of HUB elements and Streets as just described which are located in a completely different power domain. In the particular application for which the preferred embodiment was designed, it was decided that a two-Street architecture would be a good balance between cost and reliability.

FIG. 56 is a block diagram of the outboard file cache Extended Processing Complex (XPC) 102. The total system includes an Instruction Processor 12, I/O Processor 38, disk storage 106, outboard file cache XPC 102 and Host Main Storage 16. Instruction Processor 12 receives instructions from Host Main Storage 16 via cable 13. Host Main Storage 16 is also coupled to BUS 4014. I/O Processor 38 is coupled to BUS 4014 and is farther coupled to Disk Storage 106 via cable 4020. The outboard file cache XPC 102 is also coupled to BUS 4014. Outboard file cache XPC 102 comprises a Data Mover 100 and Nonvolatile Memory 220. Data Mover 110 is coupled to Nonvolatile Memory 220 via fiber-optic link 112. The data signals are transferred from the Disk Storage 106 through I/O Processor 38 to the Host Main Storage 16. But now, any updates that occur in the data are stored in the outboard file cache XPC 102 Nonvolatile Memory 220 instead of Disk Storage 106, at least momentarily. All future references then read or modify the data in the Nonvolatile Memory 220. Therefore the Nonvolatile Memory 220 acts like a cache for the disk and significantly increases data reference rates. Only after this data is no longer being used by the system is it transferred back to Disk Storage 106. In the outboard file cache XPC 102, Data Mover 110 connected to BUS 4014 is used to transmit data signals from the Host Main Storage 16 to the Nonvolatile Memory 220 and vice versa. Only one Data Mover 110 is illustrated in FIG. 56, but it is of course understood that multiple Data Movers will occur in most systems.

FIG. 57 is a block diagram of the outboard file cache system. Within the outboard file cache system, additional components are required to interface with the Nonvolatile Memory 220. As described above, these include Host Interface Adapter 214 coupled via Link 112 to Data Mover 110, which in turn is coupled to BUS 4014. System Interface 228 is coupled to HIA 214 via cable 234 and is coupled to Nonvolatile Memory 220 via cable 232. For every Data Mover 110 there is a HIA 214 and System Interface 228 which is added to the system. As more and more DMs 110 are added to the system, it becomes apparent that a bottle neck could occur in requests to the NVS 220. As a result, the size of the NVS 220 and the necessary bandwidth which is required to address this memory becomes a major performance concern. The present invention alleviates this problem by allowing a plurality of Nonvolatile Memory elements to be connected in parallel and further allowing access to every Nonvolatile Memory element from very input port.

On each System Interface card 228 an Index Processor (IXP) 236 (see FIG. 6) is used to manage the caching function, this being just one of the IXP's functions. Each Index Processor (see FIG. 28) has a path to Nonvolatile Memory 220.

FIG. 58 is a block diagram of the interconnect of the outboard file cache blocks within the system. The Street architecture is a network of interconnecting System Interface cards (SIF) that allow requesters on one SIF card to travel to another SIF card to gain access to the Nonvolatile Memory 220. The System Interface Cards are indicated on FIG. 58 via reference numerals 4036, 4080, 4096, 4112, 4044, 4120, 4134 and 4148, and each System Interface includes an IPX 236, two HUBs 728, 730 and on Storage Interface Controller (SICT) 228, each of which is shown and described with FIG. 28. Each Nonvolatile Memory 4030, 4084, 4100 and 4116 is independent from the others. However, any Nonvolatile Memory can be referenced by any SIF by way of the Streets.

Data Movers 110-28, 110-72, 110-88 and 110-104 are coupled to input ports 4014, 4070, 4086 and 4102, respectively. Similarly Data Movers 110-52, 110-128, 110-142, and 110-156 are coupled to input ports 4054, 4130, 4144 and 4158, respectively. Host Interface Adapter 214 is coupled to Data Mover 110-28 via fiber-optic interface Link 112-26 and further coupled to SIF 4036 via conductors 4034. HIA 214-76 is coupled to DM 110-72 via fiber-optic interface Link 112-74 and further coupled to SIF 4080 via conductors 4078. HIA 214-92 is coupled to DM 110-88 via fiber-optic interface Link 112-90 and further coupled to SIF 4096 via conductors 4094. Host Interface Adapter 214-108 is coupled to Data Mover 110-104 via fiber-optic interface Link 112-106 and further coupled to System Interface 4112 via conductors 4110. HIA 214-48 is coupled to DM 110-52 via fiber-optic interface link 112-50 and further coupled to SIF 4044 via conductors 4046. HIA 214-124 is coupled to DM 110-128 via fiber-optic interface Link 112-126 and further coupled to SIF 4120 via conductors 4122. HIA 214-138 is coupled to DM 110-142 via fiber-optic interface Link 112-140 and further coupled to SIF 4134 via conductors 4136. HIA 214-152 is coupled to DM 110-156 via fiber-optic interface Link 112-154 and further coupled to SIF 4148 via conductors 4150.

Nonvolatile Memory 4030 is coupled to SIF 4036 via conductors 4038 and further coupled to SIF 4044 via conductors 4042. Nonvolatile Memory 4084 is coupled to SIF 4080 via conductors 4082 and further coupled to SIF 4120 via conductors 4118. Nonvolatile Memory 4100 is coupled to SIF 4096 via conductors 4098 and further coupled to SIF 4134 via conductors 4132. Nonvolatile Memory 4116 is coupled to SIF 4112 via conductors 4114 and further coupled to SIF 148 via conductors 4146.

System Interface 4096 is coupled to SIF 4112 via conductors 4060 and further coupled to SIF 4080 via conductors 4058. SIF 4036 is coupled to SIF 4080 via conductors 4056 and further coupled to SIF 4044 via conductors 4040. SIF 4120 is coupled to SIF 4044 via conductors 4062 and further coupled to SIF 4134 via conductors 4064. Finally, SIF 4148 is coupled to SIF 4134 via conductors 4066.

Conductors 4060, 4058, 4056, 4040, 4062, 4064 and 4066 represent the Streets 234 (see FIG. 6) within the system architecture. Note that the Nonvolatile Memories 4030, 4084, 4100 and 4116 are distributed among the System Interface cards 4036, 4080, 4096, 4112, 4044, 4120, 4134 and 4148. Each SIF card has its own local memory but may gain access to any of the other Nonvolatile Memories by taking the appropriate Street to that particular Nonvolatile Memory.

The structure depicted in FIG. 58 is for one power domain and can be considered to be in the "A" power domain, except for the Data Movers 110-28, 110-72, 110-88, 110-104, 110-52, 110-128, 110-142 and 110-156. A power domain is defined as the portion of a system that is driven by a particular group of power supplies. In the preferred embodiment, each power domain has two power supplies connected to two different AC entrances (not shown). For resilient purposes, the outboard file cache XPC 102 has two power domains, namely "A" and "B".

In the preferred embodiment, there is a redundant structure, identical to that contained in FIG. 58, but not shown in FIG. 56, that is connected to the "B" power domain. See the configuration and description with FIG. 28. Each Nonvolatile Memory 4030, 4084, 4100, 4116 then has two common power domain paths from Data Movers 110-28, 110-72, 110-88, 110-104, 110-52, 110-128, 110-142 and 110-156 that are in the "A" power domain and two other common power domain paths from those Data Movers that are in "B" power domain.

FIG. 59 is a detailed block diagram of the interconnect between system interface cards and the Nonvolatile Memory. FIG. 59 shows both "A" power domain System Interface cards and the redundant "B" power domain System Interface cards. SIF 4160 is coupled to Street 4176 and further coupled to SIF 4162 via Street 4168. SIF 4160 is also coupled to Nonvolatile Memory 4188 via conductors 4172. SIF 4162 is coupled to Street 4178 and further coupled to Nonvolatile Memory 4188 via conductors 4180. Similarly, SIF 4166 is coupled to Street 4186 and further coupled to SIP 4164 via Street 4170. SIF 4166 is also coupled to Nonvolatile Memory 4188 via conductors 4174. SIF 4164 is coupled to Street 4184 and further coupled to Nonvolatile Memory 4188 via conductors 4182. It can be seen from this diagram that both "A" power domain system cards and "B" power domain system cards have access to the same Nonvolatile Memory 4188.

While in FIG. 58 the Streets between SIF's 4036, 4080, 4096, 4112, 4044, 4120, 4134 and 4148 were represented by single lines 4060, 4058, 4056, 4040, 4062, 4064 and 4066, the preferred embodiment contains two pairs of streets connecting each SIF card (and consequently, two HUB's). The general arrangement of functional elements was described with reference to FIG. 28 and FIG. 58. A more detailed discussion will describe the HUB and Street configurations. Both HUB0 728 and HUB1 730 can communicate either up the "UP" streets or down the "DOWN" streets. The Streets on HUB0 728 are called Requester Streets because only the IXP's 236 and HIA's 214 may direct requests to these Streets. The Streets on HUB1 730 are called Responder Streets because only the Nonvolatile Memory 732 may direct responses to these Streets. Having separate Streets for Requests and Responses improves overall performance of the Street network. However, it should be noted that this description should not limit the scope of the present invention to this configuration.

The HUB0 elements 728a, 728b, 728c and 728d have five interfaces each: (1) HIA 214, (2) IXP 236, (3) UP Street (4) DOWN Street, and (5) an interface to the corresponding HUB1 730 element. The HUB1 730 elements 730a, 730b, 730c and 730d are the same electrical device as the HUB0 728 elements but the interfaces within the system are (1) SICT 228, (2) UP Street, (3) DOWN Street, (4) cross-over interface 238 to the other power domain and (5) interface to the corresponding HUB0 728 element.

HUB0 728c is coupled to IXP 236c and is further coupled to HIA 214c. HUB0 728c is also coupled to UP Street 740 and DOWN Street 741, and further is coupled to HUB0 728a via UP Street 740 and DOWN Street 743. In a similar manner HUB0 elements 728a, 728b and 728d are coupled to respectively associated IXPs, HIAs, HUB0s, HUB1s, and to UP and DOWN Streets. HUB1 730a is coupled to HUB0 728a via conductors 746 and further coupled to SICT 228a via conductors 748. HUB1 730a is also coupled to UP Street 750 and DOWN Street 752, and further coupled to HUB1 730c via DOWN Streets 754 and UP Street 756. In a similar manner HUB1 elements 730b, 730c, and 730d are coupled to respectively associated SICTs, cross-overs, HUB0s, HUB1, UP Streets and DOWN Streets.

Two HUB elements are contained in each System Interface (see FIG. 58). HUB0 728 and HUB1 730 are identical gate array devices. The HUB gate array comprises the logical interconnect between an Index Processor (IXP), a Host Interface Adapter (HIA) 214 and a NonVolatile Memory (NVM) 732 via Storage Interface Control (SICT) 728.

Each HUB has five interfaces to which it can route information packets. Because there is only one HUB type, the HUB identifier (HUBID) is used for differentiating between HUB0 728 and HUB1 730.

The movement of packets between HUB gate arrays follows conventional requests-acknowledge protocols. Available lines, a header destination, address and identification straps determine the path selection. Localized control allows a HUB to stack, purge a rogue packet, or grant priority to the appropriate interface.

Various cabinet and power domain configurations, and control parameters are described in copending United States Patents Applications, entitled, HUB and Street Architecture, identified above.

FIG. 60 is a table containing the output priority scheme for the HUB0 and HUB1 elements. There are five priority sections in a HUB element; one for each interface. Each of the priorities of the five output interfaces is independent from the others. Conventional snap-shot priority is used on the IXP 236 and HIA 214 interfaces for HUB0 728 and on the NVS 732 and the CROSSOVER 238 interfaces for HUB1 730. Snap-shot priority allows requests that are received simultaneously, to be serviced in a high to low priority-before another snap-shot is taken.

The priority on the Street output node is designed such that the Street is given the highest priority. Only when the R-flag (release a local requester to the Street) is set, will the Street node allow another requester on the Street. (See FIG. 61 for the HUB control format.) This assumes that the Street request traffic is continuous. Of course, if there is no request from the Street to Street output nodes, then the local requesters (IXP or internal for HUB) have access to the Street.

The R-Flag is set by all requesters including IXP's, HIA's and NVS's. The order of priority at each Street interface remains the same whether the R-Flag is set or not, however the snap changes depending on the value of the R-Flag. If the Street request has the R-Flag set, then one local requester will follow the Street request out of the Street output node. The priority then resnaps. The R-Flag is cleared when the Street request leaves the Street node. If the Street request does not have the R-Flag set, then the Street request goes out the Street output node and the priority resnaps. The R-Flag remains cleared in this instance. If the Street request R-Flag is set and there are no local requesters, the R-Flag remains set upon leaving the Street node. The R-flag either remains set or it is cleared by the Street requester. However, it is never cleared by the local requesters.

The internal interface of HUB0 and HUB1 are also designed such that the Streets (UP/DOWN) have the highest priority for access. If both the UP and DOWN streets are snapped simultaneously, then priority resnaps after the DOWN has been serviced. The R-Flag has no effect on these interfaces. FIG. 60 describes the output priority for the HUB0 and HUB1 interfaces.

FIG. 61 is a diagram defining the HUB control format. The HUB uses a request-acknowledge protocol in transferring data packets. The HUB, upon detection of the EXTEND LINE going high, determines by the destination address which interface the request is directed. If there is no contention at that output node, the packet goes out and an acknowledge is sent back to the requester. This acknowledge informs the requester that it may send another packet. If this request is in contention with other requester also attempting to go out the same interface or node, then an acknowledge is not returned until this new request is serviced. When the initial request receives priority, a response is sent back to the requester and the HUB begins transmitting the packet to its destination. When a packet is received on any HUB interface, the packet is always stored in a Random Access Memory (RAM) (not shown). If the priority for this interface is busy, control will switch over and take the packet from the RAM. Therefore, the request sitting in RAM forms a request to the interface priority determined by a destination address and available line. Once the previous request is through transmitting and this request is next in the priority que, the control will act on this request.

Because it is important to be able to redirect the packet when a particular interface is not available, the available line enters into the formation of the request to a particular interface as priority. The interfaces that have this ability are the streets and the interfaces to the NVS via the SICT block.

The S-Flag is sent by the requester and informs the HUB which direction to take on the streets (either UP or DOWN). S-Flag=0 is defined as an UP street direction. S-Flag=1 is defined as a DOWN street direction.

As stated earlier, the R-Flag is set by all requesters. The HUB only recognizes the R-Flag on an in-coming street. For example, if a HIA makes a request to the NVS in a different Backpanel, the immediate HUB0 will direct the packet to the appropriate Street. The receiving HUB0 on that Street then recognizes the R-Flag. This receiving HUB0 then permits one local requester to follow the Street out of the output node. The R-Flag is cleared and the local requester follows the Street requester on the Street. If there are no other requesters in the queue for this Street, then the R-Flag remains set.

The C-Flags are used to route a packet between HUB elements. These flags are set by the HUB's themselves. The C0 Flag is set when HUB0sends a packet to HUB1 via the internal interface. The C1 Flag is set when HUB1sends a packet to the adjacent HUB1 via the crossover interface. The C1 Flag is cleared by the receiving HUB1 once the packet is transmitted out of HUB1. Similarly, the C0 Flag is cleared after the data has been received by the receiving HUB0 and transmitted.

The unit identification field, bits 8–11 of the word, are used to addresses a particular UNIT. The Backpanel identification field, bits 12–15, are used to addresses one of the sixteen Backpanels used in the preferred mode.

FIG. 62 is a diagram defining the unit identification field. All relevant UNIT's have a Unit Identification code associated with them. The unit identification code is used for addressing a particular UNIT (see FIG. 61).

FIG. 63 is a diagram defining the HUB error status format. The "F" bit zero signifies the error flag. This bit is set when the HUB detects a first time occurrence error. The remainder of the fields contained in FIG. 63 are available to report the status of miscellaneous errors for other components, such as SICT and NVS.

FIG. 64 is a timing diagram for the basic interface for the transmission of one maximum length packet. All interface timing (for the preferred embodiment of the HUB) is on a 50 nanosecond (ns) time step. Also, the diagram assumes that the interface to which the request was directed was not busy.

The "Extend" signal goes active at time-step zero, indicating that the street is available for data transmission. The requester HUB then sends out two header words on the "Data" line to indicate, among other things, what unit the requester wants to communicate with. The unit whose address matches the unit ID in the header word then responds with an "ACK to REQ" signal when it is available. The "ACK to REQ" signal indicates to the requester that the RAM in the receiving HUB now has room for another packet. The pulse contained on the "ACK from REC" signal indicates the latest time an acknowledge can be received at the HUB for continuous requests to the HUB. This acknowledge can be received up to the maximum of the timer associated with that particular interface.

If a HUB detects a transmission error, the "LINE AVAIL" signal will go inactive 100 ns after the "EXTEND" line goes inactive (in this diagram 100 ns after pulse number 93). This will either force a retry or shut down that particular street and force the HUB elements to re-route the request or response. Rerouting is described co-pending United States Pat. Application entitled, Routing Priorities Within A System Using HUB and Street Architecture, identified above, and United States Patent Application entitled XPC HUB and Street Architecture, identified above.

FIG. 65 is a block diagram showing the HUB street priority circuitry. The operation of said circuitry is as follows: When the Extend Designator 4648 gets set from an incoming Street packet, a compare 4652 is made to see if the request is continuing on the Street. If other requesters are present in the same time frame as the Street request, then the PRIORITY HOLD Register 4654 will store all of these requests. The Priority Encoder 4658 determines the order the requests are to be serviced. The priority order for the Street output node is (1) Street, (2) IXP, (3) HIA and (4) request from HUB1. A Priority Disabled Designator 4664 gets set once the Priority Encoder goes active. The primary purpose of the Priority Disable Designator 4664 is to disable the Compare logic 4652 so that if other requests are present, they will be held out of Priority Encoder 4658 until all requests that are snapped in the same time frame are serviced.

The R-flag Designator 4662 gets set if bit one (1) of the packet header is enabled. The R-flag Designator feeds the Priority Disable Designator 4664 and determines when priority should open back up for another re-snap or service the requesters that are in the PRIORITY HOLD Register. The R-flag is only present in the header of the packet. Therefore, since the packet may be many transfers long, control into the R-flag's SEL 4672 only selects the R-flag out of the header during the first transfer and then switches back to normal packet data.

The Priority Encoder 4658 drives into the R-flag SEL 4670 which determines whether the R-flag should remain set or should be cleared out when leaving the HUB via the Selector 4672 and Selector Out 4668. The Selector Out 4668 is required because up to four registers (street, IXP, HIA and internal) can exit the HUB via the Selector.

The Priority Decode Register 4660 latches the output of Priority Encoder 4658. When the packet transmission is complete, the Priority Decode Register 4660 is used to clear all of the priority registers.

Detail discussion of the UP Street decode circuitry, DOWN street decode circuitry, Port-1 (P1) decode circuitry, Port-2 decode circuitry and Port-3 (P3) decode circuitry is set forth in co-pending United States Patent Application entitled XPC HUB Street Architecture identified above.

e. Conclusion

From the foregoing description of the preferred embodiment, it will be understood by those skilled in the art that the various stated objectives of the invention have been met. The outboard file cache extended processing system described provides file caching capability not taught or contemplated by the prior art. Having described the preferred embodiment, various modifications, substitutions, and deletions may be well become apparent to those skilled in the art without departing from the spirit and scope of the invention. It is intended, therefore, that the Specification be descriptive of the invention without limiting its scope. Accordingly, what is intended to be protected by Letters Patent is set forth in the appended claims.

What is claimed:

1. For use with a host data processing system for processing and modifying data files and having an instruction processor, a storage controller, a file mass storage device for storing the data files, main operational memory coupled to the storage controller, a data mover system to control the reading and writing of the data files to and from the host data processing system and being coupled to the instruction processor and to the main operational memory, and a transmission link coupled to the data mover, an outboard file cache external processing complex comprising:

a bidirectional bus structure;

a host interface adapter having host coupling terminals to be coupled to the transmission link to receive the data files and command signals from the host data processor systems and to transmit the data files and said command signals to the host data processing system, and having bus coupling terminals coupled to said bidirectional bus structure;

an index processor coupled to said bidirectional bus structure to control transmission of the data files and said command signals on said bidirectional bus structure;

a file-relative addressable nonvolatile storage system adapted to selectively redundantly cache the data files received from the host data processing system so that multiple copies of each data file are cached substantially simultaneously, said addressable nonvolatile storage system further adapted to selectively read the data files; and a storage interface control circuit coupled to said addressable nonvolatile storage system and to said bidirectional bus structure to receive said command signals and in response thereto, to control selectively redundantly storing the data files in said file-relative addressable nonvolatile storage system and to further control selectively reading the data files from said file-relative addressable nonvolatile storage system, whereby file caching and control is closely coupled to the host data processing system and is accomplished in parallel to file data processing and related control functions performed by the host data processing system.

2. The outboard file cache external processing complex as in claim 1 and further including a clock signal distribution system for providing clock signals.

3. The outboard file cache external processing complex as in claim 2 wherein said clock signal distribution system includes redundant oscillators and oscillator control circuits to select one of said redundant oscillators to provide said clock signals.

4. The outboard file cache external processing complex as in claim 1 and further including a power source for providing power.

5. The outboard file cache external processing complex as in claim 4 wherein said power source includes redundant power supplies and power supply control circuits to select one of said redundant power supplies to provide power.

6. The outboard file cache external processing complex as in claim 1 wherein said index processor includes:

first and second microsequencer devices, each having a micro processor and a local storage device;

a control storage device for storing instructions to be executed, said control storage device couple to said first and second microsequencer devices to provide the same instructions stored in said control store device to both said first and second microsequencer devices;

input circuits coupled to said first and second microsequencer devices to receive control signals from said bidirectional bus structure;

an output circuit from said first microsequencer device coupled to said bidirectional bus structure; and an intercoupling circuit coupling said second microsequencer device to said first microsequencer device to pass the results of instruction execution made by said second microsequencer device to said first microsequencer device, whereby error checking of operations is achieved by comparing said results of said instruction execution.

7. For use with a host data processing system for processing file data signals described in data files, an outboard file cache system comprising:

a data mover circuit having input terminals to be coupled to the host data processing system, said data mover circuit having first link terminals;

a host interface adapter circuit having second link terminals;

a bidirectional link coupled between said first link terminals and second link terminals;

system interface circuits coupled to said host interface adapter circuit and including routing control circuits, bidirectional busses, storage interface control circuits, and storage access terminals; and a file addressable redundant nonvolatile storage system coupled to said storage access terminals to selectively redundantly cache selected ones of the data files processed by the host data processing system.

8. The outboard file cache system as in claim 7 wherein said routing control circuits include an index processor to manage allocation and cache replacement for the storage space available in said addressable nonvolatile storage system.

9. The outboard file cache system as in claim 8 wherein said index processor includes:

first and second microsequencer devices, each having a micro processor and a local control storage;

a control storage device for storing instructions to be executed, said control storage device coupled to said first and second microsequencer devices to provide the same instructions stored in said control store device to both said first and second microsequencer devices;

input circuits coupled to said first and second microsequencer devices to receive control signals from said bidirectional bus structure;

an output circuit from said first microsequencer device coupled to said bidirectional bus structure; and an intercoupling circuit coupling said second microsequencer device to said first microsequencer device to pass the results of instruction execution made by said second microsequencer device to said first microsequencer device, whereby error checking of operations is achieved by comparing said results of said instruction execution.

10. The outboard file cache system as in claim 7 and further including a clock signal distribution system for providing clock signals.

11. The outboard file cache as in claim 10 wherein said clock signal distribution system includes redundant oscillators and oscillator control circuits to select one of said redundant oscillators to provide said clock signals.

12. The outboard file cache as in claim 7 and further including a power source for providing power.

13. The outboard file cache as in claim 12 wherein said power source includes redundant power supplies and power supply circuits to select one of said redundant power suppliers to provide power.

14. The file cache system as in claim 7 wherein said bidirectional link comprises fiber optic transmission elements.

15. For use in a host data processing system for processing file data signals and having at least one instruction processor, a storage controller, a file mass storage device for storing file data signals that compose data files, main operational memory for use by the instruction processor, data mover circuits to control reading and writing of the file data signals to and from the host data processing system, each of the data mover circuits are coupled to the instruction processor and to the main operational memory, and a separate transmission link coupled to each of the data mover circuits, an outboard file cache external processing complex comprising:

first and second bidirectional bus structures;

first and second host interface adapter circuits, each having host coupling terminals to be coupled to an associated one of the transmission links to receive the data files and command signals from the associated data mover circuit in the host data processing system and to transmit the data files and said command signals to the associated data mover circuit in the host data processing system, and having bus coupling terminals wherein said first host interface adapter circuit is coupled to said first bidirectional bus structure and said second host interface adapter circuit is coupled to said second bidirectional bus structure;

a first index processor couple to said first bidirectional bus structure and a second index processor coupled to said second bidirectional bus structure, each of said first and second index processors to control transmission of the data files and said command signals on the associated one of said first and second bidirectional bus structures;

first and second addressable nonvolatile storage devices, each adapted to selectively and substantially simultaneously cache multiple copies of the data files and to selectively read the data files;

first and second storage interface control circuits, said first storage interface control circuit coupled to said first bidirectional bus structure and said second storage interface control circuit coupled to said second bidirectional bus structure, and said first and second storage interface control circuits each coupled to said addressable nonvolatile storage devices, wherein said first and second storage interface control circuits control said cache and said read operations of the data files in response to said command signals thereby storing duplicate copies of the data files in said first and second addressable nonvolatile storage devices.

16. The outboard file cache external processing complex as in claim 15 and further including a clock signal distribution system for providing clock signals.

17. The outboard file cache external processing complex as in claim 16 wherein said clock signal distribution system includes redundant oscillators and oscillator control circuits to select one of said redundant oscillators to provide said clock signals.

18. The outboard file cache external processing complex as in claim 17 wherein said clock distribution system includes a first set of selected groups of said redundant oscillators and control circuits arranged to provide said clock signals to said first bidirectional bus structure, said first host interface adapter circuit, said first index processor, said first addressable nonvolatile storage device, and said first storage interface control circuit; and includes a second set of selected groups of different ones of said redundant oscillators and oscillator control circuits arranged to provide said clock signals to said second bidirectional bus structure, said second host interface adapter circuit, said second index processor, said second addressable nonvolatile storage device, and said second storage interface control circuit; and a synchronization circuit for synchronizing said clock signals provided by first and second groups.

19. The outboard file cache external processing complex as in claim 18 and further including a power source for providing power.

20. The outboard file cache external processing complex as in claim 19 wherein said power source includes redundant power supplies and power supply control circuits to select one of said redundant power supplies to provide power.

21. The outboard file cache external processing complex as in claim 20 wherein said power source includes a first set of said redundant power supplies coupled to provide power to said first bidirectional bus structure, said first host interface adapter circuit, said first index processor, said first addressable nonvolatile storage device, said first storage interface control circuit, and said clock signal distribution system associated therewith; and a second set of said redundant power supplies coupled to power said second bidirectional bus structure, said second host interface adapter circuit, said second index processor, said second addressable nonvolatile storage device, said second storage device, said second storage interface control circuit, and said clock signal distribution system associated therewith, said first set and said second set establishing separate power domains.

22. The outboard file cache external processing complex as in claim 15 and further including a crossover circuit intercoupling said first and second bidirectional bus structures.

23. For use with a host data processing system for processing and modifying data files, each data file being referenced by a file identifier and file offsets, an outboard file cache system comprising:

redundant nonvolatile file cache storage means for receiving copies of selected ones of the data files from the host data processing system and for redundantly storing duplicate cached copies of said selected ones of the data files, each of said selected ones of the data files being stored substantially simultaneously with the associated said duplicate cached copy;

file cache storage interface means coupled to said redundant nonvolatile cache storage means for controlling caching and retrieval operations for said duplicate cached copies of said selected ones of the data files according to file identifiers and file offsets associated with said selected ones of the data files;

index processor means coupled to said file cache storage interface means for controlling transmission of said selected ones of the data files and command signals to and from said redundant nonvolatile file cache storage means;

host interface adapter means coupled to said file cache storage interface means for formatting said selected ones of the data files received from and to be sent to the host data processing system and for providing said selected ones of the data files to be cached by said redundant nonvolatile file cache storage means;

bidirectional bus means coupled to said file cache storage interface means, said index processor means, and said host interface adapter means for transmitting said selected ones of the data files;

bidirectional link means coupled to said host interface adapter means for transmitting said selected ones of the data files and said command signals; and data mover means coupled to said link means for formatting and controlling said selected ones of the data files at the host data processing system.

24. The outboard file cache system as in claim 23 wherein said index processor means includes:

control storage means for storing instructions to be executed;

first and second microsequencer means coupled to said control storage means for executing instructions read therefrom in parallel;

intercoupling circuit means coupling said second microsequencer means to said first microsequencer means to pass the results of instruction execution made by second microsequencer means to said first microsequencer means for allowing error checking of operations.

25. The outboard file cache system as in claim 23 and further including clock signal distribution means for providing clock signals.

26. The outboard file cache system as in claim 25 wherein said clock signal distribution means includes redundant oscillator means and oscillator control circuit means for selecting one of said redundant oscillator means for providing said clock signals.

27. The outboard file cache system as in claim 26 wherein said clock distribution means includes a first set of said redundant oscillator means and control circuit means arranged to provide clock signals to a first portion of said bidirectional bus means, a first portion of said redundant nonvolatile file cache storage means, a first portion of said file cache storage interface means, a first portion of index processor means, and a first portion of said host interface adapter means for timing operations; and said clock distribution means includes a second set of said redundant oscillator means and control circuit means arranged to provide clock signals to a second portion of said bidirectional bus means, said redundant nonvolatile cache storage means, file cache storage interface means, index processor means, and host interface adapter means for separately timing operations; and synchronization means for synchronizing said clocking signals provided by said first and second sets of redundant oscillators means and control circuit means.

28. The outboard file cache system as in claim 23 and further including power source means for providing power.

29. The outboard file cache system as in claim 28 wherein said power source means includes redundant power supply means and power supply control circuit means for selecting one said redundant power supply means to provide power.

30. The outboard file cache system as in claim 29 wherein said power source means includes a first set of said redundant power supply means coupled to provide power to a portion of said bidirectional bus means, a portion of said redundant nonvolatile file cache storage means, a portion of said file cache storage interface means, a portion of said index processor means, and a portion of said host interface adapter means and the portion of said clock signals distribution means associated therewith; and a second set of said redundant power supply means coupled to power a second portion of said bidirectional bus means, a second portion of said redundant nonvolatile cache storage means, a second portion of said file cache storage interface means, a second portion of said index processor means, and a second portion of said host interface adapter means, and said clock signal distribution means associated therewith; said first set and said second set establishing separate power domains.

31. The outboard file cache system as in claim 23 wherein said bidirectional bus means further includes a crossover circuit means for providing access to both portions of said redundant nonvolatile file cache storage means in the event of partial failure of a portion of said bidirectional bus means.

32. For use with a data processing system having n hosts for processing file data signals which compose data files, where n is an integer greater than one, an outboard file cache system comprising:

2n data mover circuits, each of said 2n data mover circuits having input terminals to be coupled in pairs to associated ones of the n hosts and each of said 2n data mover circuits having first link terminals;

2n host interface adapter circuits, each of said 2n host adapter circuits having second link terminals;

2n bidirectional links, each of said 2n bidirectional links coupled between associated ones of said first link terminals and said second link terminals;

2n system interface circuits, each of said 2n system interface circuits coupled to adjacent ones of said 2n system interface circuits and coupled to an associated one of said 2n host interface adapter circuits, each of said 2n system interface circuits including routing control circuits, bidirectional busses, storage interface control circuits, and storage access terminals, and 2n addressable nonvolatile storage devices arranged in pairs, each of said pairs of said 2n addressable nonvolatile storage devices coupled to said storage access terminals of associated pairs of said 2n system interface circuits to selectively redundantly cache file data signals of selected ones of the data files.

33. The outboard file cache system as in claim 32 wherein each of said routing control circuits includes an index processor to manage allocation and cache replacement for the storage space available in the associated pairs of said 2n addressable nonvolatile storage devices.

34. The outboard file cache system as in claim 33 wherein said index processor includes:

first and second microsequencer devices, each having a micro processor and a local control storage;

a control storage device for storing instructions to be executed, said control storage device coupled to said first and second microsequencer devices to provide the same instructions stored in said control store device to both first and second microsequencer devices;

input circuits coupled to said first and second microsequencer devices to receive control signals from said bidirectional bus structure;

an output circuit from said first microsequencer device coupled to said bidirectional bus structure; and an intercoupling circuit coupling said second microsequencer device to said first microsequencer device to pass the results of instruction execution made by said second microsequencer device to said first microsequencer device, whereby error checking of operations is achieved by comparing said results of said instruction executions.

35. The outboard file cache system as in claim 32 and further including a clock signal distribution system for providing clock signals.

36. The outboard file cache system as in claim 35 wherein said clock signal distribution system includes redundant oscillators and oscillator control circuits to select one of said redundant oscillators to provide said clock signals.

37. The outboard file cache system as in claim 36 wherein said clock signal distribution system includes a first set of groupings of said redundant oscillators and control circuits arranged to provide said clock signals to n ones of said 2n host interface adapter circuits, to a first portion of said 2n nonvolatile storage devices, and to n ones of said first 2n system interface circuits; and includes a second set of groupings of different ones of said redundant oscillators and oscillator control circuits arranged to provide said clock signals to n different ones of said 2n host interface adapter circuits, a second portion of said 2n addressable nonvolatile storage devices, and n different ones of said 2n storage interface control circuits; and a synchronization circuit for synchronizing said clock signals provided by said first and second sets of groupings.

38. The outboard file cache system as in claim 32 and further including:

2n additional system interface circuits, each of said 2n additional system interface circuits coupled to associated ones of said 2n additional system interface circuits, and coupled to associated ones of said 2n system interface circuits; and n crossover circuits interconnecting selected pairs of said 2n system interface circuits.

39. The outboard file cache system as in claim 38 and further including a power source for providing power.

40. The outboard file cache system as in claim 39 wherein said power source includes redundant power supplies and power supply control circuits to select one of said redundant power supplies to provide power.

41. The outboard file cache system as in claim 40 wherein said power source includes:

a first set of said redundant power supplies and power supply control circuits to establish a first power domain coupled to n selected ones of said 2n host interface adapter circuits, to n selected ones of said 2n system interface circuits, to n selected ones of said 2n additional system interface circuits, and to a first portion of said 2n addressable nonvolatile storage devices; and a second set of said redundant power supplies and power supply control circuits to establish a second power domain coupled to n different selected ones of said 2n host interface adapter circuits, to n different selected ones of said 2n system interface circuits, to n different selected ones of said 2n additional system interface circuits, and to a second portion of said 2n addressable nonvolatile storage devices, wherein loss of power in either one of said first power domain or said second power domain will not cause failure of the outboard file cache system.

42. For use with a host data processing system for processing data files addressed using file identifiers and file offsets, a fault tolerant file cache system comprising:

redundant nonvolatile file cache storage means for receiving data files from the host data processing system and for redundantly storing duplicate cached copies of the data files substantially simultaneously according to the file identifiers and file offsets;

host interface adapter means for formatting the data files received from and to be sent to the host data processing system and for providing the data files to be cached; and cache control means coupled to said redundant nonvolatile file cache means and to said host interface adapter means for controlling the redundant storage and retrieval of the data files.

43. The fault tolerant file cache system as in claim 42, and further including:

redundant power means for providing isolating power to predetermined separate portions of said redundant nonvolatile file cache storage means.

44. The fault tolerant file cache system as in claim 43, and further including:

redundant clocking means coupled to said redundant power means for providing synchronized isolated clocking signals to said predetermined separate portions of said redundant nonvolatile cache storage means.

45. The fault tolerant file cache system as in claim 44, and further including:

cross over means for selectively providing access to one of said predetermined separate portions of said redundant nonvolatile file cache storage means when another of said predetermined separate portions of said redundant nonvolatile cache storage means fails to function.

* * * * *